United States Patent [19]

Frederiksen

[11] Patent Number: 4,475,172

[45] Date of Patent: Oct. 2, 1984

[54] AUDIO/VISUAL HOME COMPUTER AND GAME APPARATUS

[75] Inventor: Jeffrey E. Frederiksen, Arlington Heights, Ill.

[73] Assignee: Bally Manufacturing Corporation, Chicago, Ill.

[21] Appl. No.: 274,864

[22] Filed: Jun. 18, 1981

Related U.S. Application Data

[60] Division of Ser. No. 910,964, May 30, 1978, Pat. No. 4,301,503, which is a continuation-in-part of Ser. No. 812,662, Jul. 5, 1977, Pat. No. 4,296,930, which is a continuation of Ser. No. 635,406, Nov. 26, 1975, abandoned.

[51] Int. Cl.[3] .......... G06F 3/16

[52] U.S. Cl. .......... 364/900

[58] Field of Search .......... 340/723, 724, 725, 726, 340/727; 364/200, 900; 84/DIG. 6, DIG. 8, DIG. 23

[56] References Cited

U.S. PATENT DOCUMENTS

| | | |
|---|---|---|
| Re. 28,507 | 8/1975 | Rauch et al. . |
| Re. 28,598 | 10/1975 | Baer et al. . |
| 1,180,470 | 6/1959 | Feyzeau et al. . |
| 2,455,922 | 12/1948 | Goldsmith et al. . |
| 2,595,646 | 5/1952 | Doba et al. . |
| 2,847,661 | 8/1958 | Althouse . |
| 3,017,625 | 1/1962 | Evans et al. . |
| 3,046,676 | 7/1962 | Hermann et al. . |
| 3,122,607 | 2/1964 | Balding . |
| 3,135,815 | 6/1964 | Spiegel . |
| 3,345,458 | 10/1967 | Cole et al. . |
| 3,388,391 | 6/1968 | Clark . |
| 3,422,420 | 1/1969 | Clark . |
| 3,435,136 | 3/1969 | Bachmann et al. . |
| 3,462,639 | 8/1969 | French . |
| 3,497,760 | 2/1970 | Kiesling . |
| 3,569,617 | 3/1971 | Allen et al. . |
| 3,577,130 | 5/1971 | Rice et al. . |
| 3,583,538 | 6/1971 | Hurley . |
| 3,585,628 | 6/1971 | Harrison . |
| 3,631,457 | 12/1971 | Hamada et al. . |
| 3,657,716 | 4/1972 | Ambrico . |
| 3,659,284 | 4/1972 | Rusch . |
| 3,659,285 | 4/1972 | Baer et al. . |
| 3,685,039 | 8/1972 | Flanagan . |
| 3,716,842 | 2/1973 | Belady et al. . |
| 3,725,563 | 4/1973 | Woycechowsky . |
| 3,728,840 | 4/1973 | Baer . |
| 3,736,411 | 5/1973 | Berndt . |
| 3,747,087 | 7/1973 | Harrison et al. . |
| 3,760,375 | 9/1973 | Irwin et al. . |

(List continued on next page.)

OTHER PUBLICATIONS

"Illustrations of Computer Powers", Computers and Automation, Sep. 1954, vol. 3, No. 7, p. 26.

"On the Demonstration of High-Speed Digital Computers," Bauer, et al., Tour of the Assoc. for Computing Machinery, vol. 1, No. 4, Oct. 1954, pp. 177–182.

Computers and Automation, Feb. 1957, vol. 6, No. 2, pp. 8–9.

"The Design and Use of Electronic Analogue Computers", Gilbert, 1964, pp. 471–473.

"Electronic Information Displays for Management," Howard, 1966, pp. 22, 33–35, 47.

"Looking Ahead," Lachenbruch, TV Guide, Apr. 13, 1968, pp. 8–12.

Software Newsletter, vol. II, Apr. 1969, of Systems Engineering Laboratories, Title page and Preceding page.

"Games Computers Play," Popular Science, Oct. 1970, p. 44.

(List continued on next page.)

*Primary Examiner*—Thomas M. Heckler

*Attorney, Agent, or Firm*—Welsh & Katz, Ltd.

[57] ABSTRACT

A home computer system provides a video processor for use with a television receiver. The video processor can selectively perform a variety of modifications to pixel data under the direction of the CPU of the computer system before the pixel data is stored in a random access memory to effectively increase the speed or data handling power of the system.

24 Claims, 168 Drawing Figures

U.S. PATENT DOCUMENTS

| | | | |
|---|---|---|---|
| 3,766,313 | 10/1973 | Carlson et al. . | |
| 3,774,669 | 11/1973 | Ariano et al. . | |
| 3,778,058 | 12/1973 | Rausch . | |
| 3,789,200 | 1/1974 | Childress et al. . | |
| 3,793,483 | 2/1974 | Bushnell . | |
| 3,809,395 | 1/1974 | Allison et al. . | |
| 3,809,868 | 5/1974 | VillaLobo et al. . | |
| 3,812,485 | 5/1974 | Moreton . | |
| 3,822,363 | 7/1974 | Moyer et al. . | |
| 3,826,864 | 7/1974 | Paufve . | |
| 3,872,446 | 3/1975 | Chambers . | |
| 3,874,669 | 4/1975 | Ariano et al. . | |
| 3,895,183 | 7/1975 | Collier . | |
| 3,899,662 | 8/1975 | Kreeger et al. . | |
| 3,906,197 | 9/1975 | Grover . | |
| 3,911,597 | 10/1975 | Millard et al. . | |
| 3,921,161 | 11/1975 | Baer . | |
| 3,936,664 | 2/1976 | Sato . | |
| 3,949,375 | 4/1976 | Ciarlo . | |
| 3,955,189 | 5/1976 | Thomson . | |
| 3,973,244 | 8/1976 | Lovercheck et al. . | |
| 3,978,470 | 8/1976 | McQuire . | |
| 3,980,992 | 9/1976 | Levy et al. . | |
| 3,996,585 | 12/1976 | Hogan et al. . | |
| 4,011,546 | 3/1977 | Kawata et al. . | |
| 4,026,555 | 5/1977 | Kirschner et al. . | |
| 4,034,990 | 7/1977 | Baer . | |
| 4,043,983 | 7/1977 | Dash et al. . | |
| 4,053,740 | 10/1977 | Rosenthal . | |
| 4,070,710 | 1/1978 | Sukonick et al. | 364/900 |
| 4,089,524 | 5/1978 | Hauck . | |
| 4,093,221 | 6/1978 | Dash . | |
| 4,112,422 | 7/1978 | Mayer et al. . | |
| 4,116,444 | 9/1978 | Mayer et al. . | |
| 4,142,180 | 2/1979 | Burson . | |
| 4,177,462 | 12/1979 | Chung . | |
| 4,296,930 | 10/1981 | Fredericksen . | |
| 4,301,503 | 11/1981 | Frederiksen . | |

OTHER PUBLICATIONS

"II Cybernetic Frontiers" Brand, Random House, 1974, pp. 54–60.

"Space War", Kuhfeld, Analog Science Friction/-Science Fact, pp. 67–79.

Gun Flight Computer Service Manual for the Midway 8080 Microprocessor Game Series, 1976.

Standardized Test Procedure for Midway's Processor Boards, Jul. 1976.

Marcus, A., "A Prototype Computerized Page–Design System", Visible Language, vol. 5, Summer, 1971.

Noll, A. M., "A Computer Technique for Displaying n–Dimensional Hyper Objects", Comm. of the ACM., vol. 10, 8/67.

Kolb, E. R., "Computer Printing Forecast for the 70's", Datamation, 12/1/70.

Andersson, P. L., "Phototypesetting–A Quiet Revolution", Datamation, 12/1/70.

Bonsiepe, G., "A Method of Quantifying Order in Typographic Design", The Journ. of Typographic Research, 7/68.

Sutherland, I. E., et al., "A Characterization of Ten Hidden–Surface Algorithms", Computing Surveys, vol. 6, 3/74.

Bell Lab Record, vol. 47, 5 & 6/69.

Newell, M. E., et al., "A Solution to the Hidden Surface Problem", Proceedings of ACM Nat. Conf., 1972.

Gelernter, H. L., et al., "An Advanced Computer–Based Nuclear Physics Data Acquisition System," Nuclear Instruments and Method, 9/67.

Knowlton, K. C., "A Comp. Technique for Providing Animated Movies", Proceedings AFIPS, 1964, SJCC, vol. 25.

Ophir, D., et al., "Brad: The Brookhaven Raster Display", Comm. of the ACM, vol. 11, 6/68.

Mermelstein, P., "Comp.–Generated Spectogram Displays for On–Line Speech Research", IEEE Transactions on Audio and Electroacoustics, 3/71.

Denes, P. B., "Computer Graphics in Color", Bell Lab. Record, vol. 52, 5/74.

Noll, A. M., "Scanned–Display Computer Graphics", Comm. of the ACM, vol. 14, 3/71.

Kajiya, J. T. et al., "A Random–Access Video Frame Buffer", Proc. of the Conf. on Comp. Graphics, Pattern Recognition, and Data Struc., 5/14–16–75.

Denes, P. B., "A Scan–Type Graphics System for Interactive Computing," Proc. of Conf. on Comp. Graphics, Pattern Recog., and Data Struc., 5/14–16–75.

Andersson, P. L., "Phototypesetting–A Quiet Revolution," Datamation, Dec., 1970, pp. 22–27.

Noll, A. M., "Scanned Display Computer Graphics," Communications of the ACM, vol. 14, Mar., 1971, pp. 143–150.

Katjiya, J. T, Sutherland, I. E., and Cheadle, E. C., "A Random Access Video Frame Buffer," Proc. of the Conf. on Comp. Graphics Pattern Recognition & Data Structure, May, 1975, pp. 1–6.

Denes, P. B., "A Scan–Type Graphics System for Interactive Computing," Proc. of the Conf. on Comp. Graphics, Pattern Recognition & Data Structure, May, 1975, pp. 21–24.

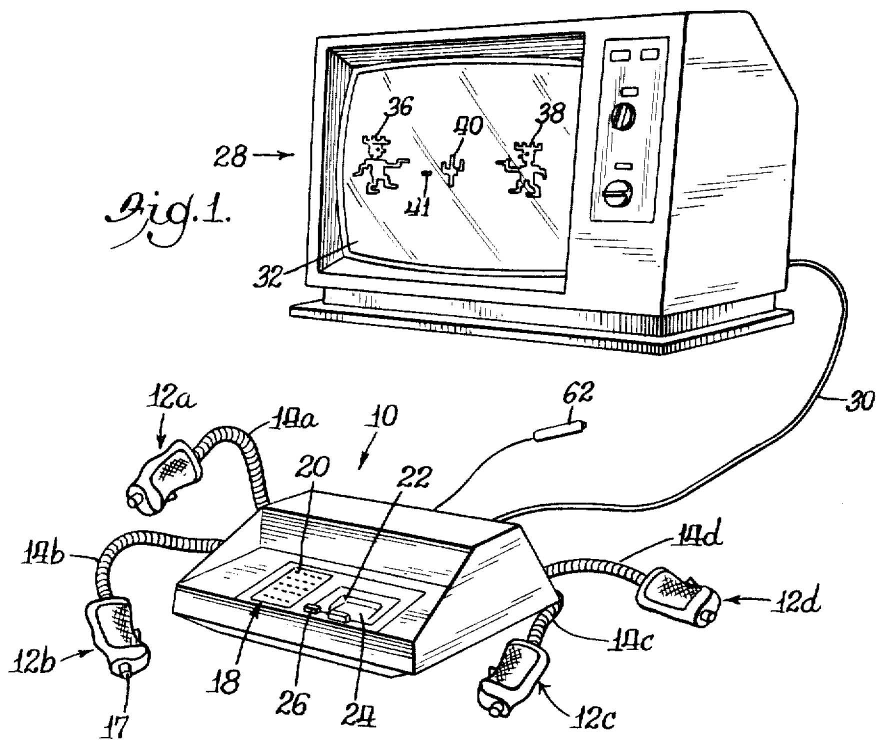
Fig.1.
Fig.2.
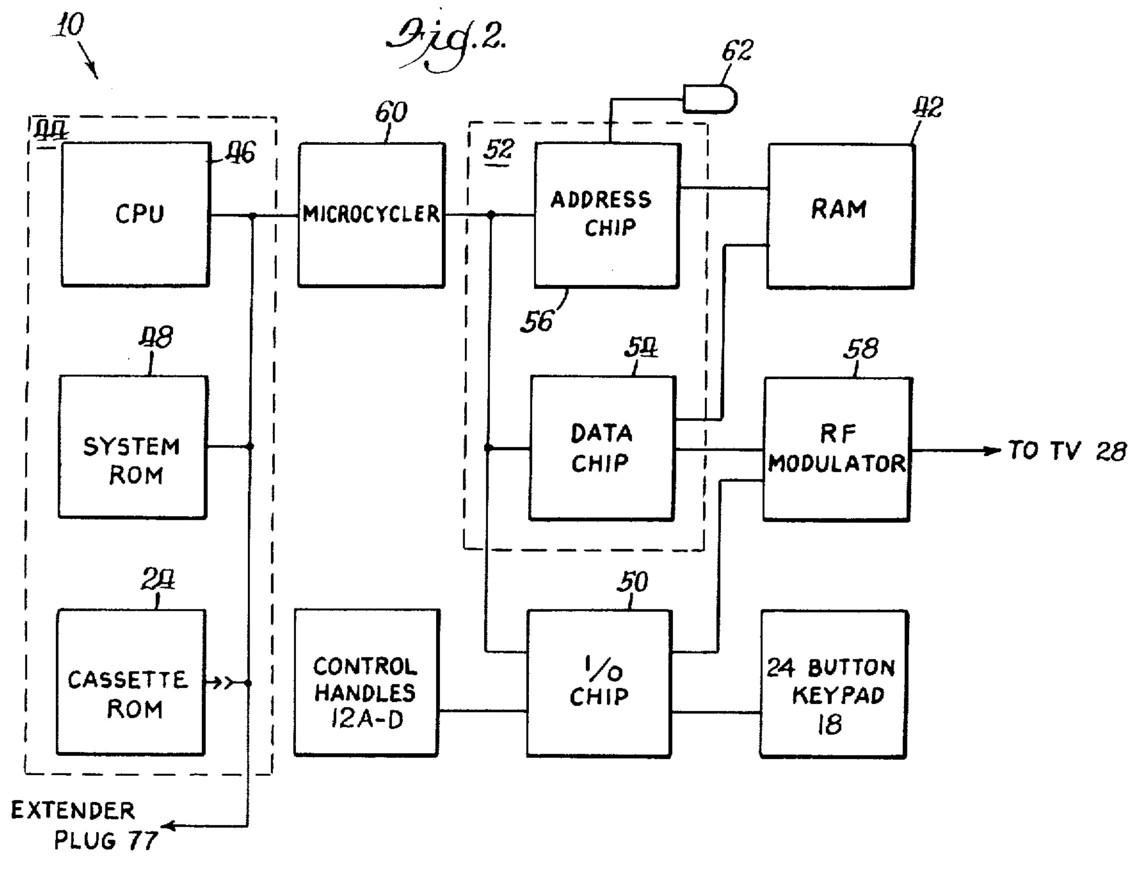

Fig. 8.

| PORT ↓ / BIT → | 7 | 6 | 5 | 4 | 3 | 2 | 1 | 0 | |
|---|---|---|---|---|---|---|---|---|---|
| 10H | | | | TRIG | RIGHT | LEFT | DOWN | UP | PLAYER 1 |
| 11H | | | | TRIG | RIGHT | LEFT | DOWN | UP | PLAYER 2 |
| 12H | | | | TRIG | RIGHT | LEFT | DOWN | UP | PLAYER 3 |
| 13H | | | | TRIG | RIGHT | LEFT | DOWN | UP | PLAYER 4 |
| 14H | | | = | + | − | × | ÷ | % | KEYPAD |
| 15H | | | | | | | | ↓ | KEYPAD |
| 16H | | | 0 | 2 | 5 | 8 | MS | ↑ | KEYPAD |
| 17H | | | CE | 1 | 4 | 7 | MR | C | KEYPAD |
| 1CH | ← POT → | | | | | | | | PLAYER 1 |
| 1DH | ← POT → | | | | | | | | PLAYER 2 |
| 1EH | ← POT → | | | | | | | | PLAYER 3 |
| 1FH | ← POT → | | | | | | | | PLAYER 4 |

Fig. 7A.

| PDB7 PDB6 | PDB5 PDB4 | PDB3 PDB2 | PDB1 PDB0 | BYTE ↓ |
|---|---|---|---|---|
| P3 | P2 | P1 | P0 | 0 |
| P7 | P6 | P5 | P4 | 1 |
| P11 | P10 | P9 | P8 | 2 |
| P15 | P14 | P13 | P12 | 3 |

ORIGINAL

Fig. 7B.

| PDB7 PDB6 | PDB5 PDB4 | PDB3 PDB2 | PDB1 PDB0 | BYTE ↓ |
|---|---|---|---|---|
| P15 | P11 | P7 | P3 | 0 |
| P14 | P10 | P6 | P2 | 1 |
| P13 | P9 | P5 | P1 | 2 |
| P12 | P8 | P4 | P0 | 3 |

ROTATED

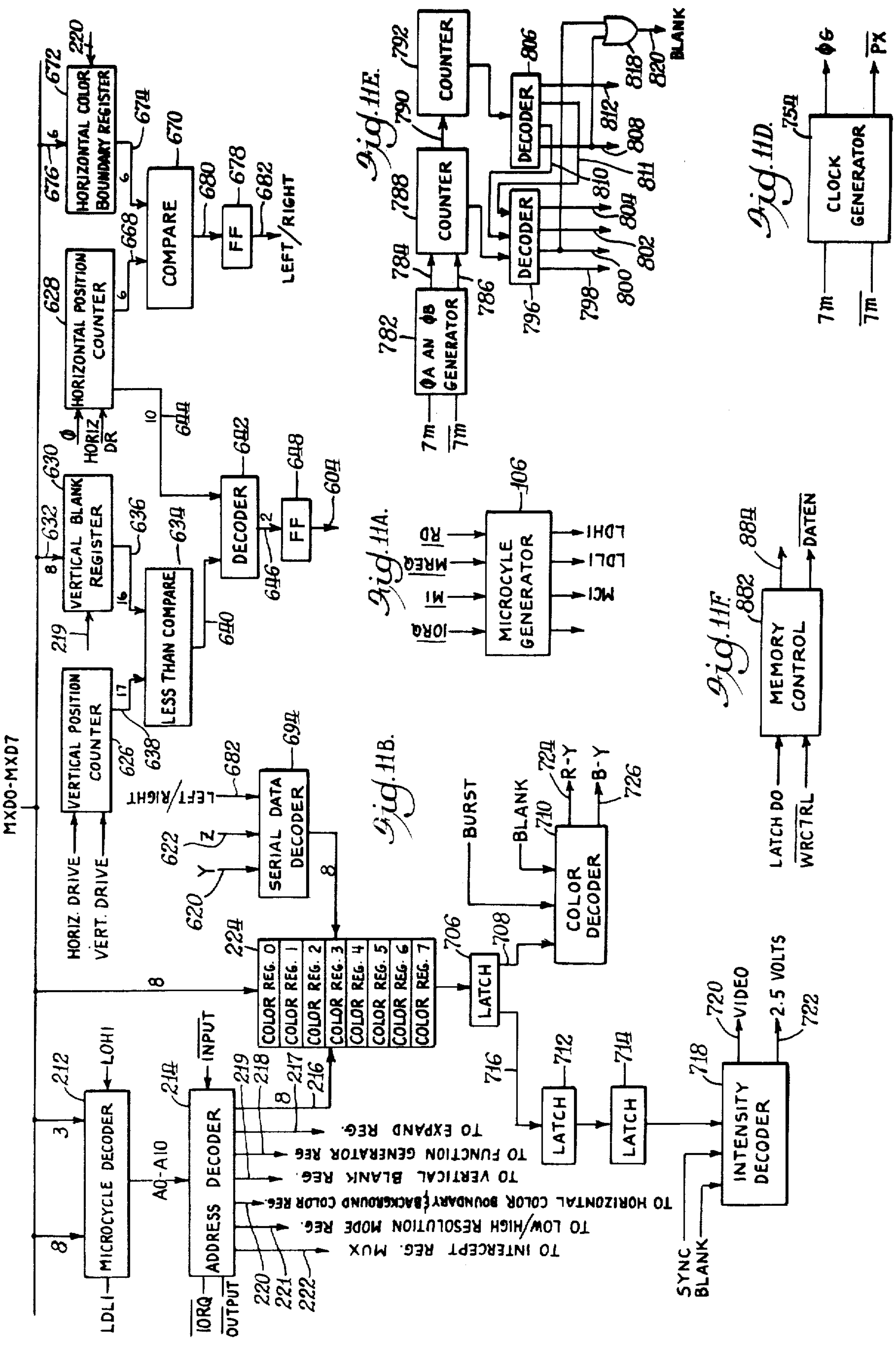
Fig. 11B.
Fig. 11A.
Fig. 11E.
Fig. 11D.
Fig. 11F.
HORIZONTAL COLOR BOUNDARY REGISTER
HORIZONTAL POSITION COUNTER
COMPARE
FF
LEFT/RIGHT
VERTICAL BLANK REGISTER
LESS THAN COMPARE
DECODER
VERTICAL POSITION COUNTER
HORIZ. DRIVE
VERT. DRIVE
MXD0-MXD7
SERIAL DATA DECODER
COLOR REG. 0
COLOR REG. 1
COLOR REG. 2
COLOR REG. 3
COLOR REG. 4
COLOR REG. 5
COLOR REG. 6
COLOR REG. 7
LATCH
COLOR DECODER
BURST
BLANK
R-Y
B-Y
INTENSITY DECODER
VIDEO
2.5 VOLTS
SYNC BLANK
MICROCYCLE DECODER
ADDRESS DECODER
A0-A10
LDLI
IORQ
OUTPUT
INPUT
LOHI
TO EXPAND REG.
TO FUNCTION GENERATOR REG
TO VERTICAL BLANK REG
TO HORIZONTAL COLOR BOUNDARY/BACKGROUND COLOR REG.
TO LOW/HIGH RESOLUTION MODE REG.
TO INTERCEPT REG. MUX
MICROCYLE GENERATOR
IORQ
M1
MREQ
RD
MCI
LDLI
LDHI
ΦA AN ΦB GENERATOR
COUNTER
DECODER
BLANK
CLOCK GENERATOR
ΦG
PX
7m
MEMORY CONTROL
LATCH DO
WRCTRL
DATEN

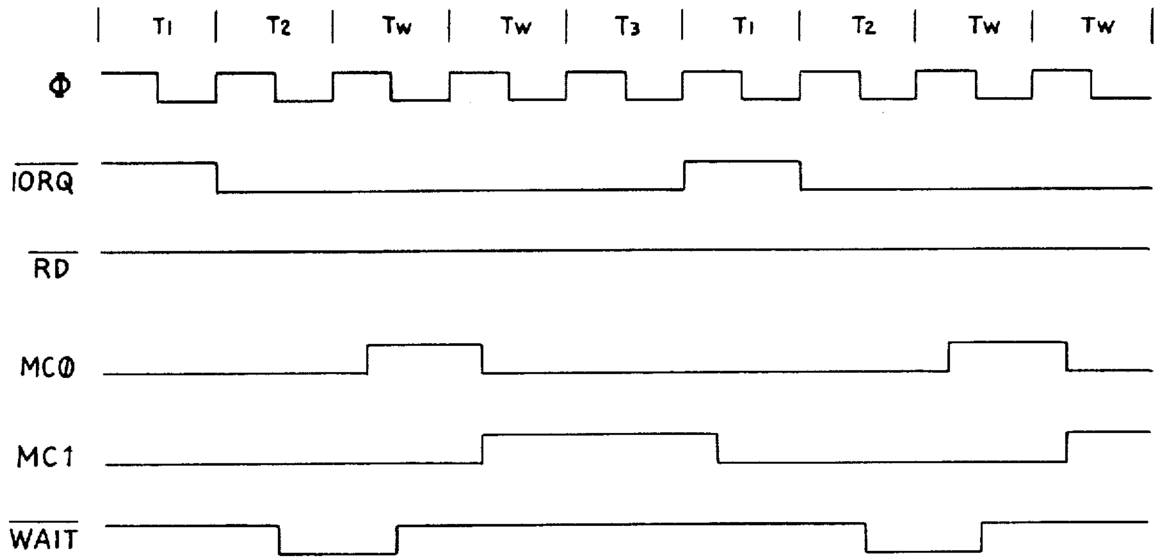
Fig. 12F.
Fig. 12G.
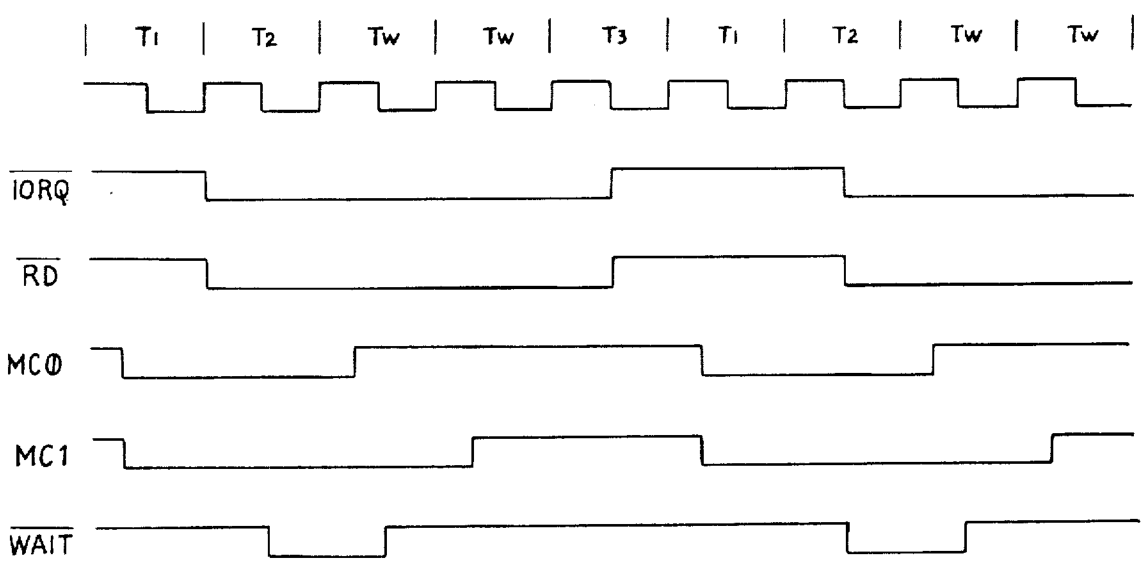

786
788
788h
788g
788f
788e
788d
788c
788b
788a
770
772
Ø2
Ø1
ØA
ØB
830
832
VDD
585
589
838
839
834
835
836
HORZ DR
850
TST
385
798
802
800
800
BURST
SYNC
ADDR
EMD
ZIP
MENB

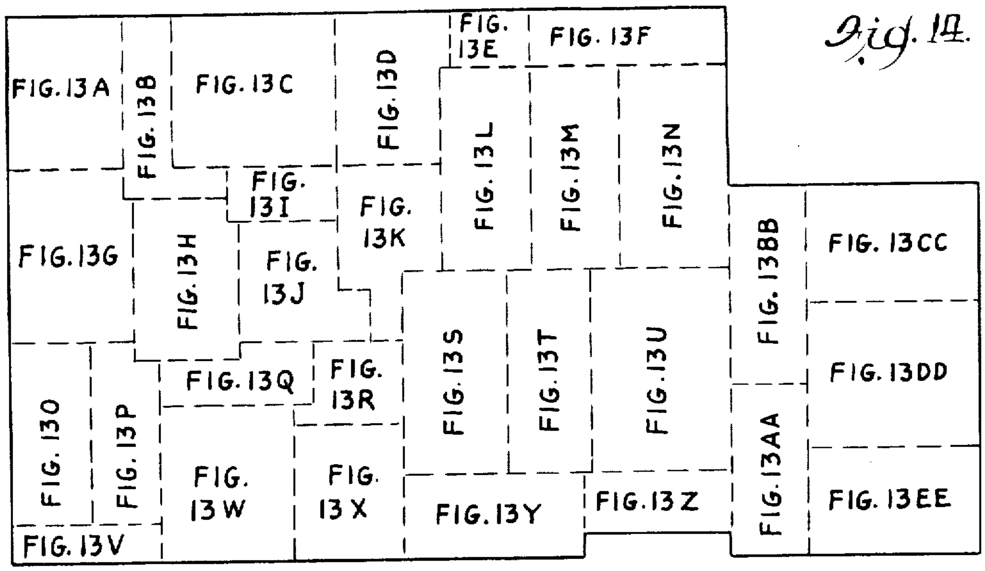
Fig. 14.
Fig. 46.
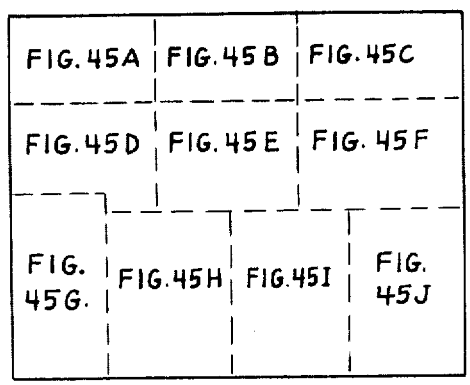
Fig. 74.
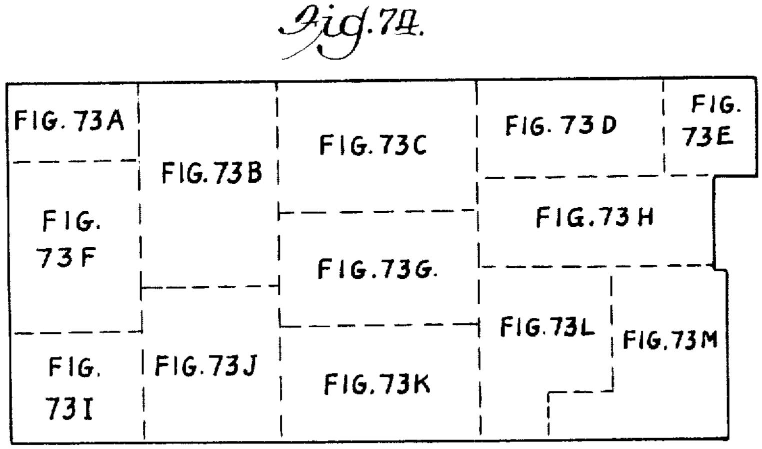

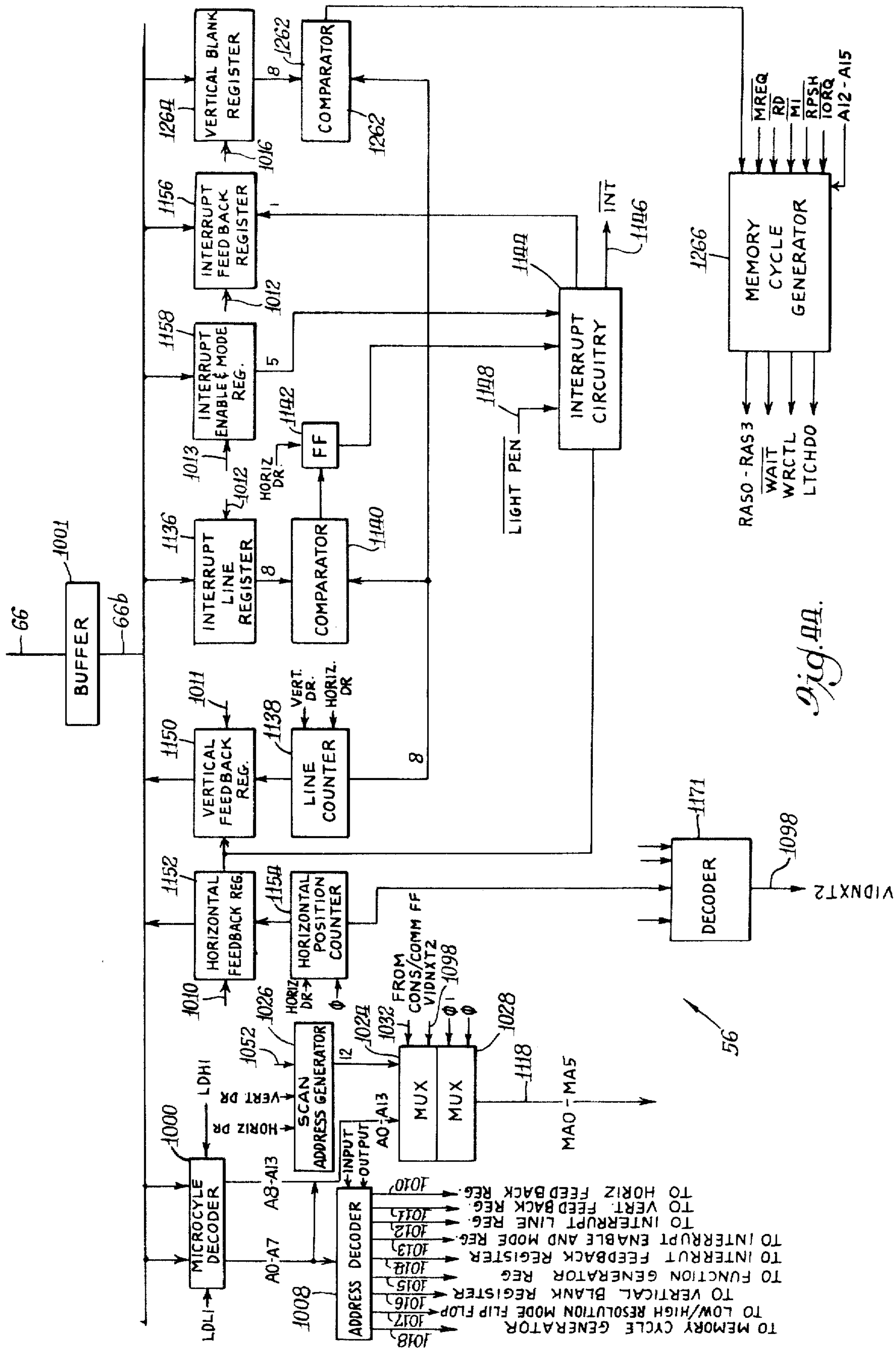
BUFFER
VERTICAL BLANK REGISTER
COMPARATOR
INTERRUPT FEEDBACK REGISTER
INTERRUPT ENABLE & MODE REG.
INTERRUPT LINE REGISTER
VERTICAL FEEDBACK REG.
LINE COUNTER
HORIZONTAL FEEDBACK REG
HORIZONTAL POSITION COUNTER
INTERRUPT CIRCUITRY
MEMORY CYCLE GENERATOR
DECODER
MICROCYCLE DECODER
SCAN ADDRESS GENERATOR
ADDRESS DECODER
MUX
MUX
LIGHT PEN
INT
VIDNXT2
MA0-MA5
RAS0-RAS3
WAIT
WRCTL
LTCHDO
MREQ
RD
MI
RPSH
IORQ
A12-A15
TO HORIZ FEED BACK REG.
TO VERT. FEED BACK REG.
TO INTERRUPT LINE REG.
TO INTERRUPT ENABLE AND MODE REG.
TO INTERRUPT FEEDBACK REGISTER
TO FUNCTION GENERATOR REG
TO VERTICAL BLANK REGISTER
TO LOW/HIGH RESOLUTION MODE FLIP FLOP
TO MEMORY CYCLE GENERATOR
Fig. 44.

A13
A12
A11
A10
A9
8
1000
1004
1002
1006
99b
1046
1044
1040
1042
1206
HORZ DR

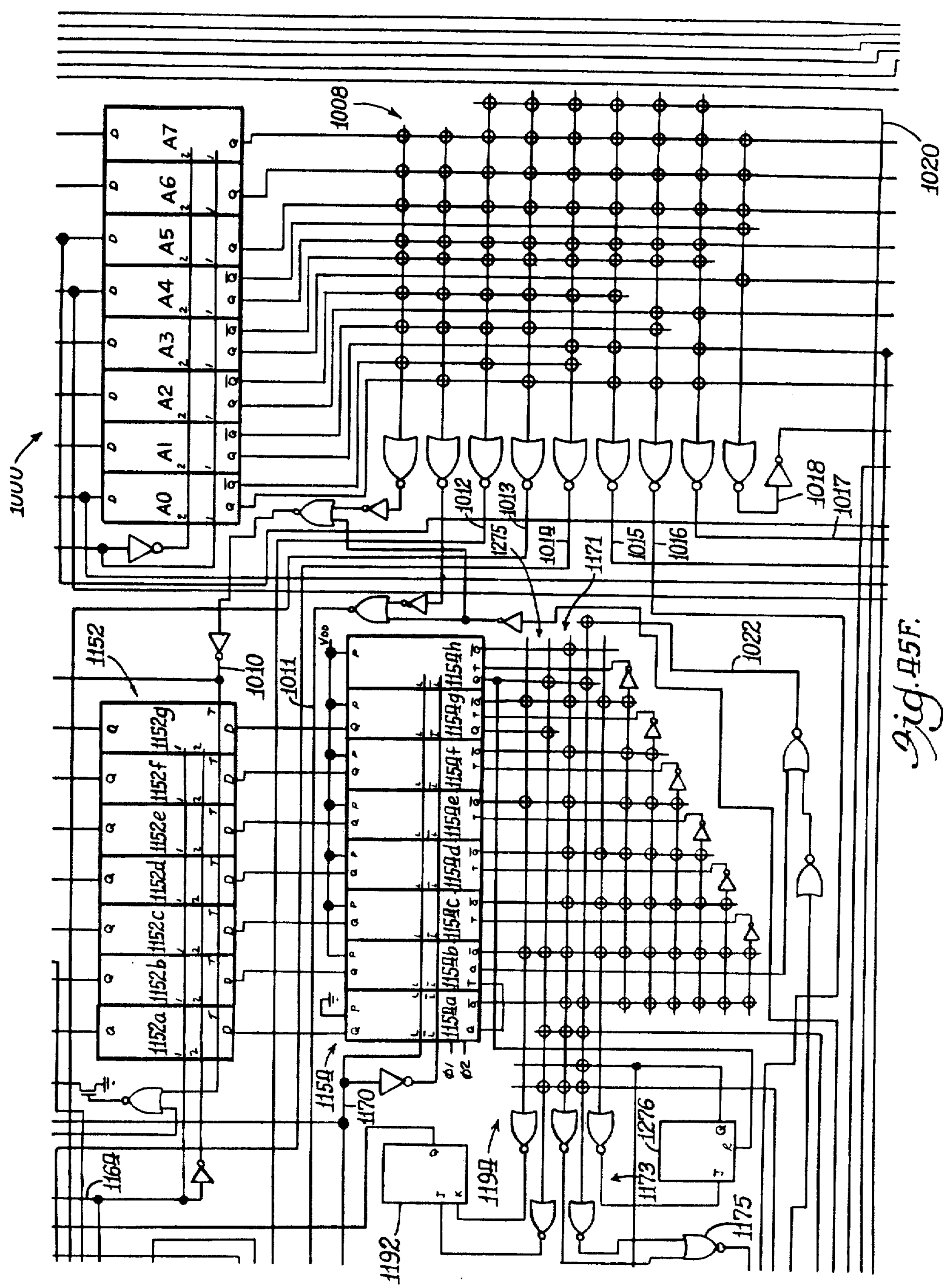
Fig. A5F.

AUDIO/VISUAL HOME COMPUTER AND GAME APPARATUS

This is a division of application Ser. No. 910,964 filed May 30, 1978 now U.S. Pat. No. 4,301,503 which is a continuation-in-part of Ser. No. 812,662 filed July 5, 1977, U.S. Pat. No. 4,296,930, which is a continuation of Ser. No. 635,406, filed Nov. 26, 1975, now abandoned.

The present invention relates to computers and more particularly to home computers and game apparatus adapted for use with cathode ray tube display apparatus, such as television receivers or monitors.

Video games typically employ a television receiver or monitor (hereinafter often referred to as merely "television") to display the game symbols and figures. Each player usually has a control which may be manipulated to cause the game symbols on the screen to interact in accordance with the rules of the particular game being played, often under the direction of a small computer, or microcomputer. Similarly, the television may be used as a display for a computer used as a calculator.

Each frame of the picture displayed on the television screen is comprised of a plurality of picture elements (pixels) which are rapidly and sequentially displayed in a raster scan of the television screen. One type of video game employs a random-access-memory (RAM) to store digital data representative of each picture element to be displayed on the screen. The digital data stored in the RAM is read synchronously with the raster scanning of the picture elements of the telelvision screen. The digital data is converted to signals suitable for the television receiver or monitor and supplied to the television to define the particular pixels being displayed. A programmed microprocessor (a type of computer) may be used to update or modify the data stored in the RAM and hence modify the picture displayed on the television screen in response to signals transmitted from the player controls, in accordance with the microprocessor program.

It is an object of the present invention to provide an improved computer particularly adapted for home use and having the capability of performing various game functions as well as normal computer and calculating functions. It is a further object to provide such a computer that is economical to manufacture. It is a still further object to provide such a computer adapted for use with interchangeable program storage devices.

These and other objects of the invention are more particularly set forth in the following detailed description and in the accompanying drawings of which:

FIG. 1 is a perspective view of a specific embodiment of the present invention;

FIG. 2 is a block diagram of a computer system of the embodiment of FIG. 1;

FIGS. 7A and 7B illustrate further examples of modifications performed on pixel data;

FIG. 8 is a diagram illustrating the particular data that can be read at a plurality of input ports;

Figure 10:
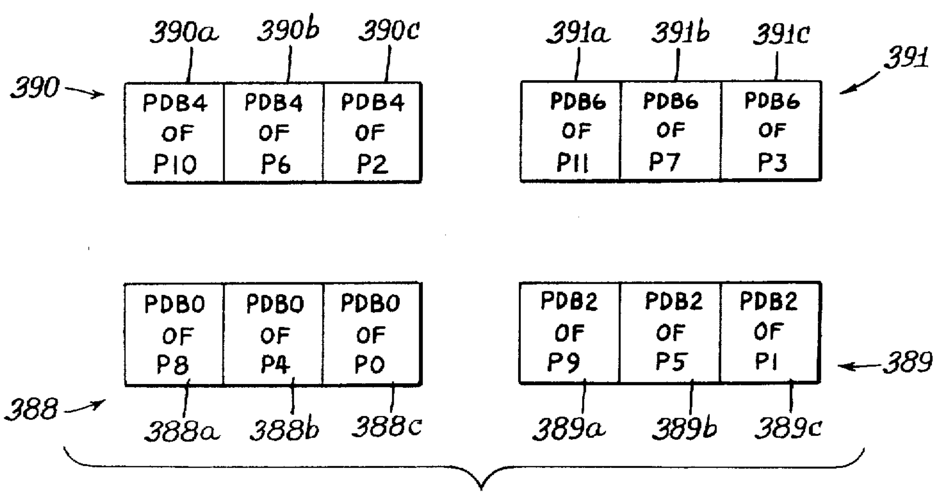
Figure 10A:
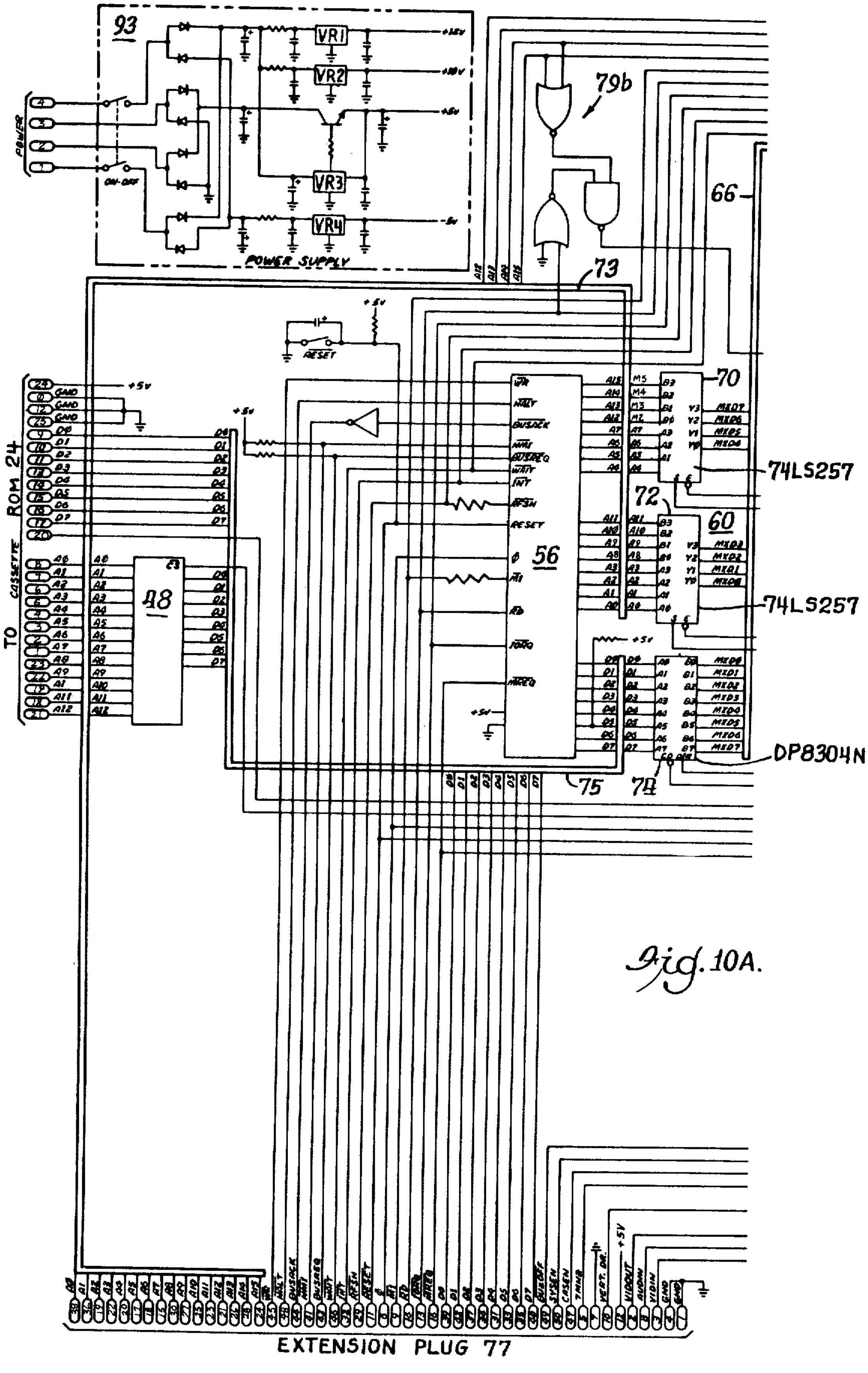
Figure 13A:
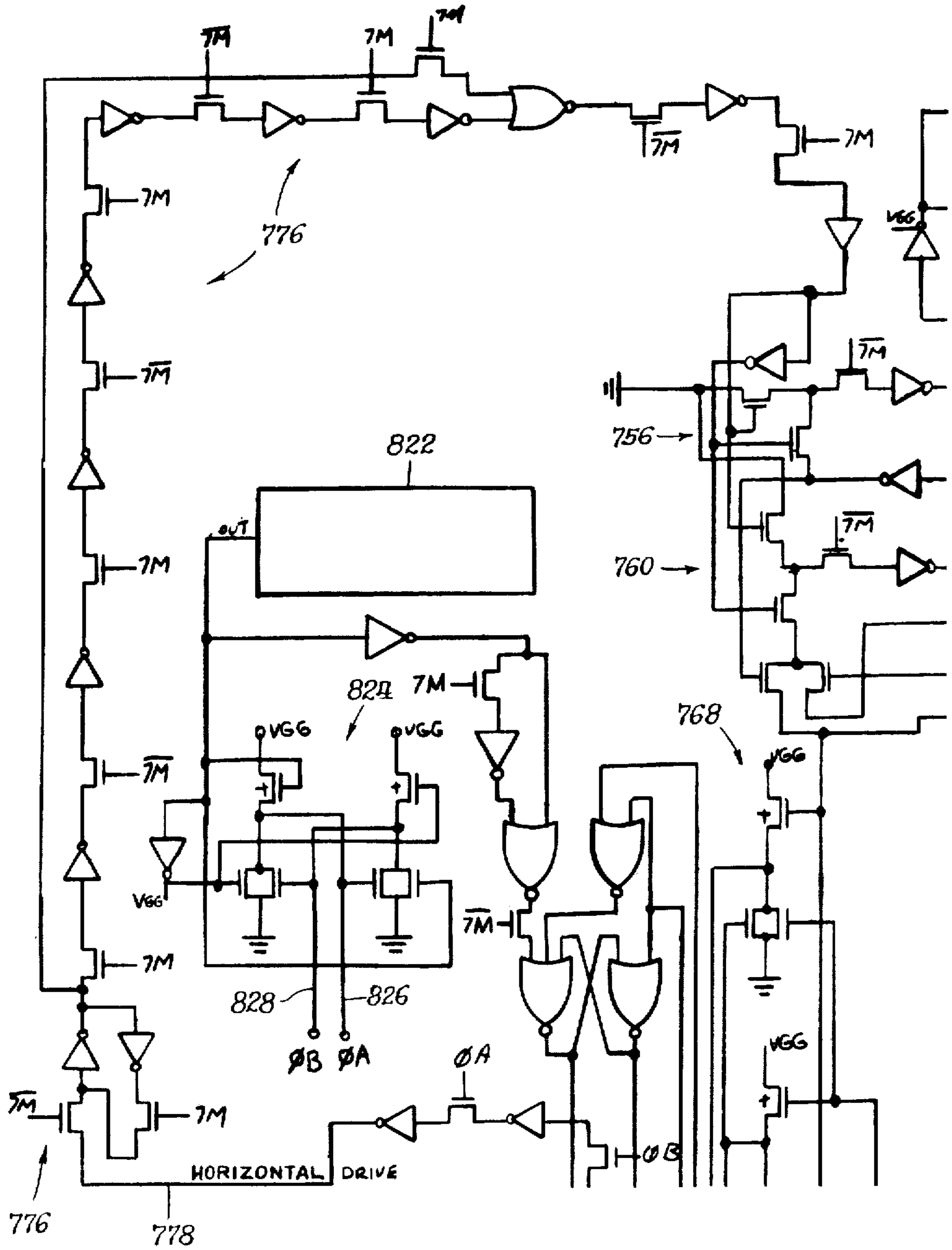
Figure 13B:
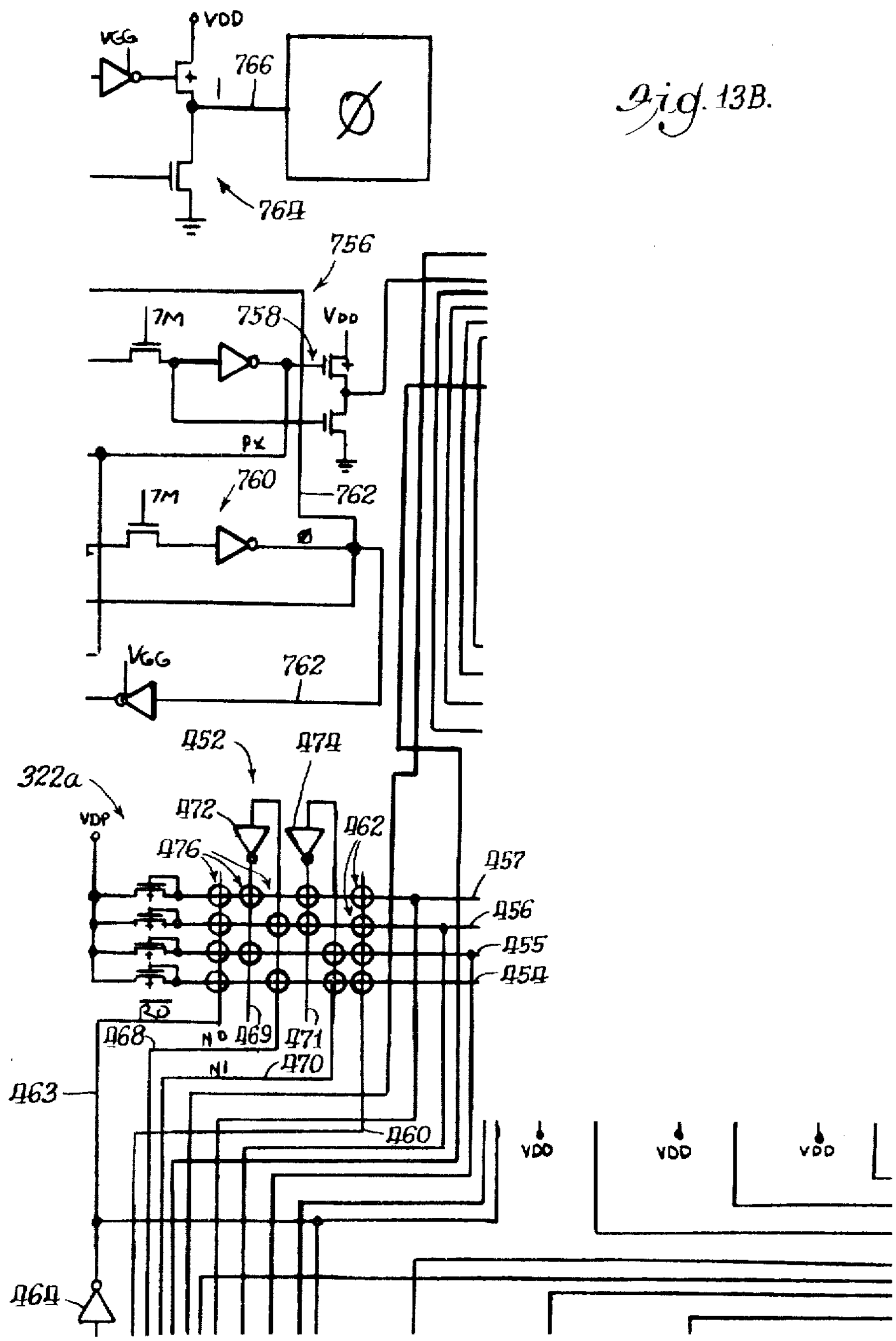
Figure 13C:
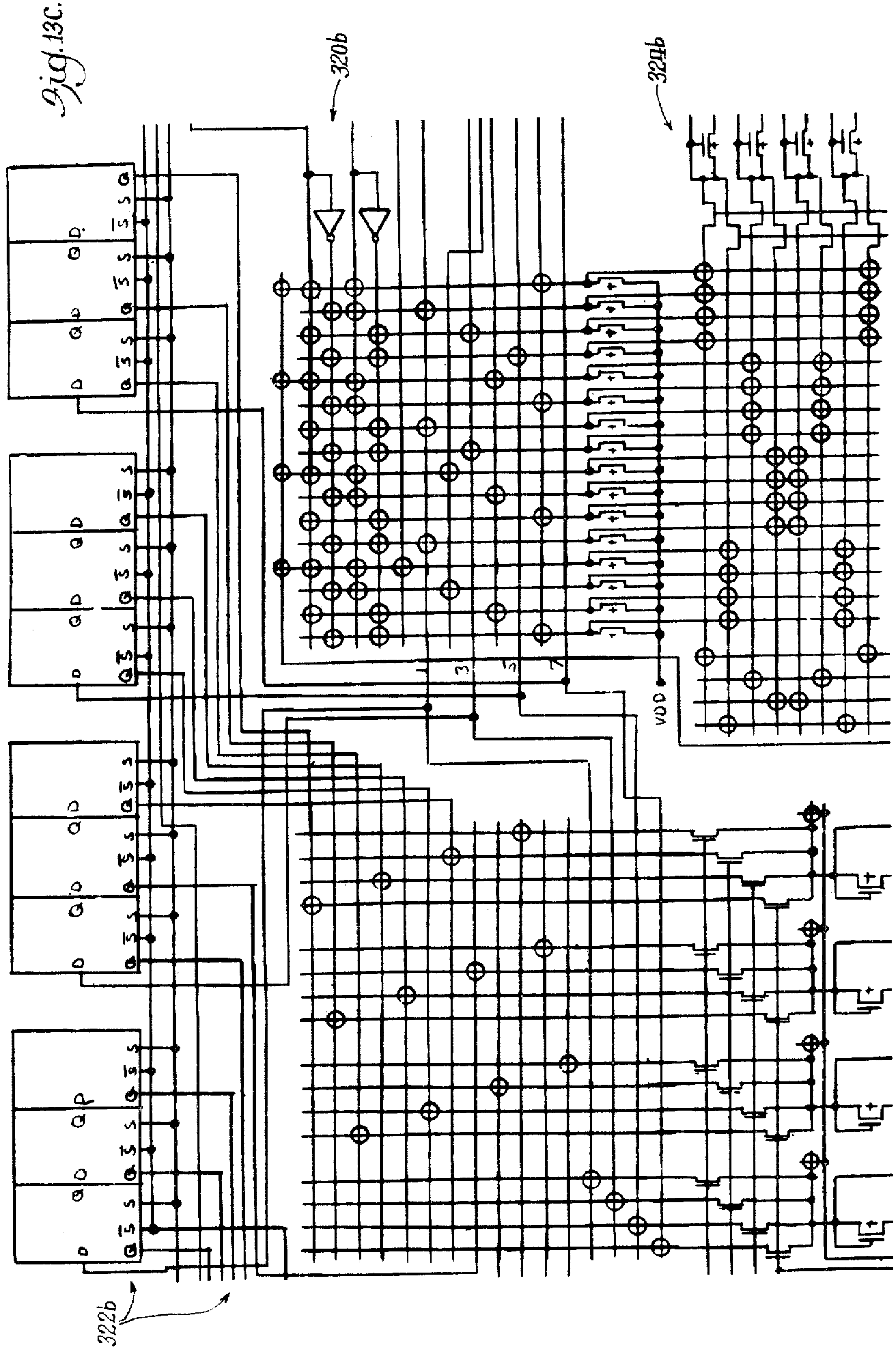
Figure 13D:
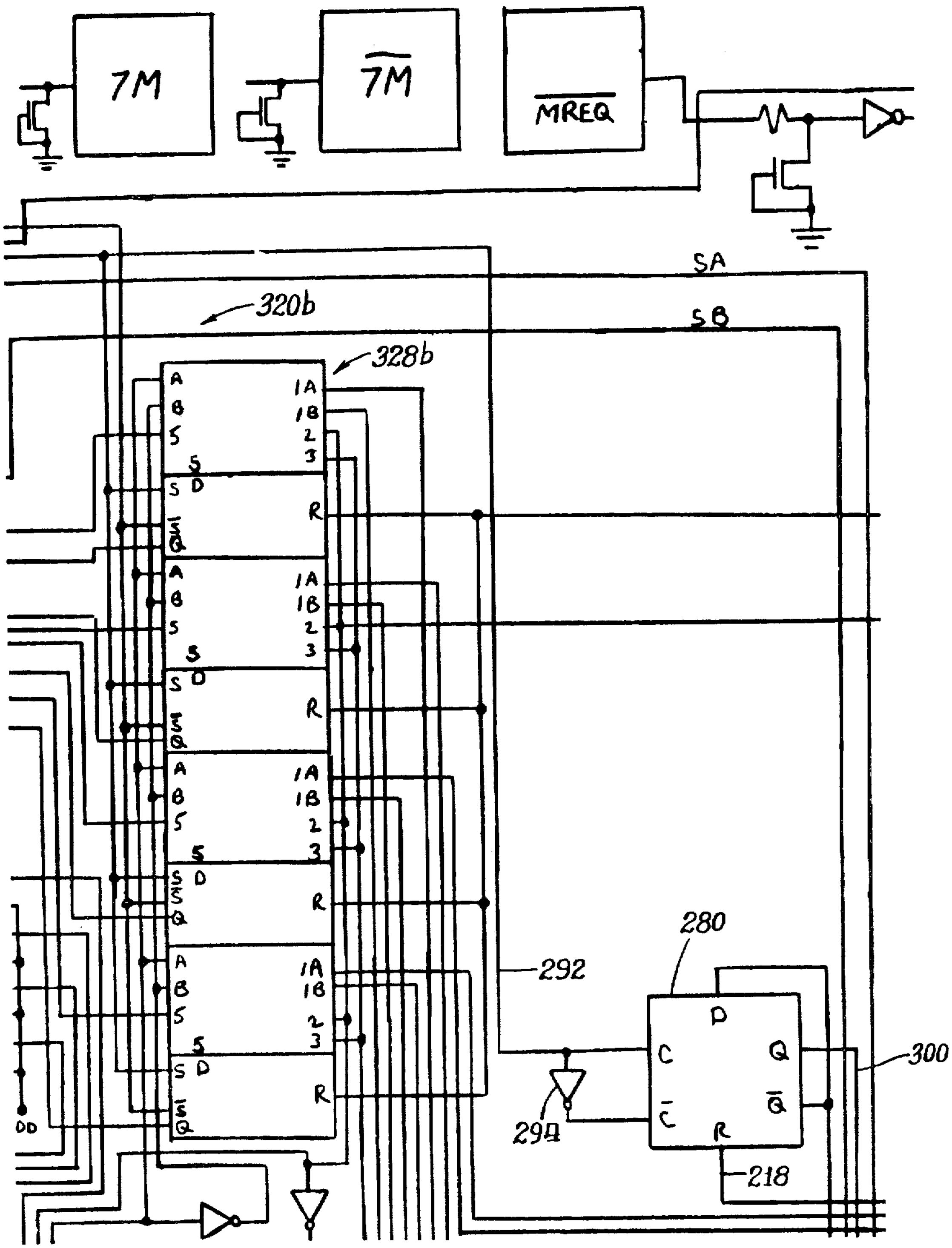
Figure 13E:
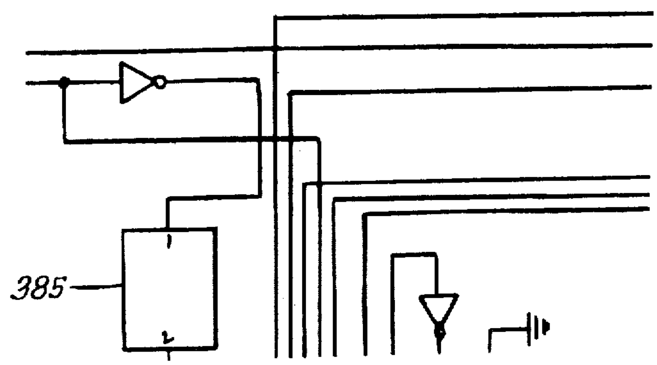
Figure 13F:
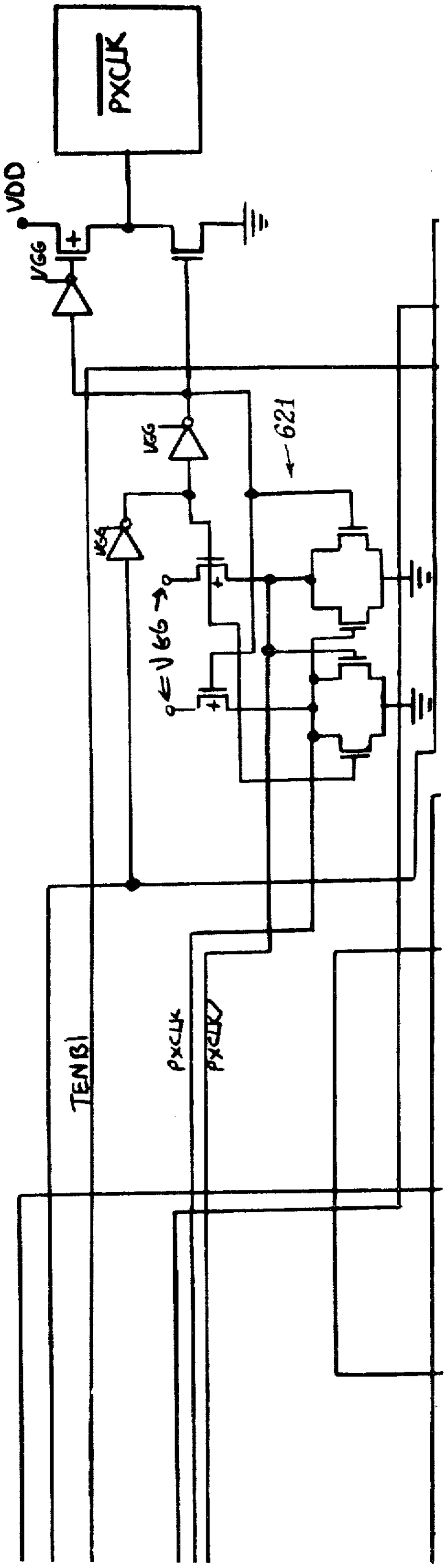
Figure 13G:
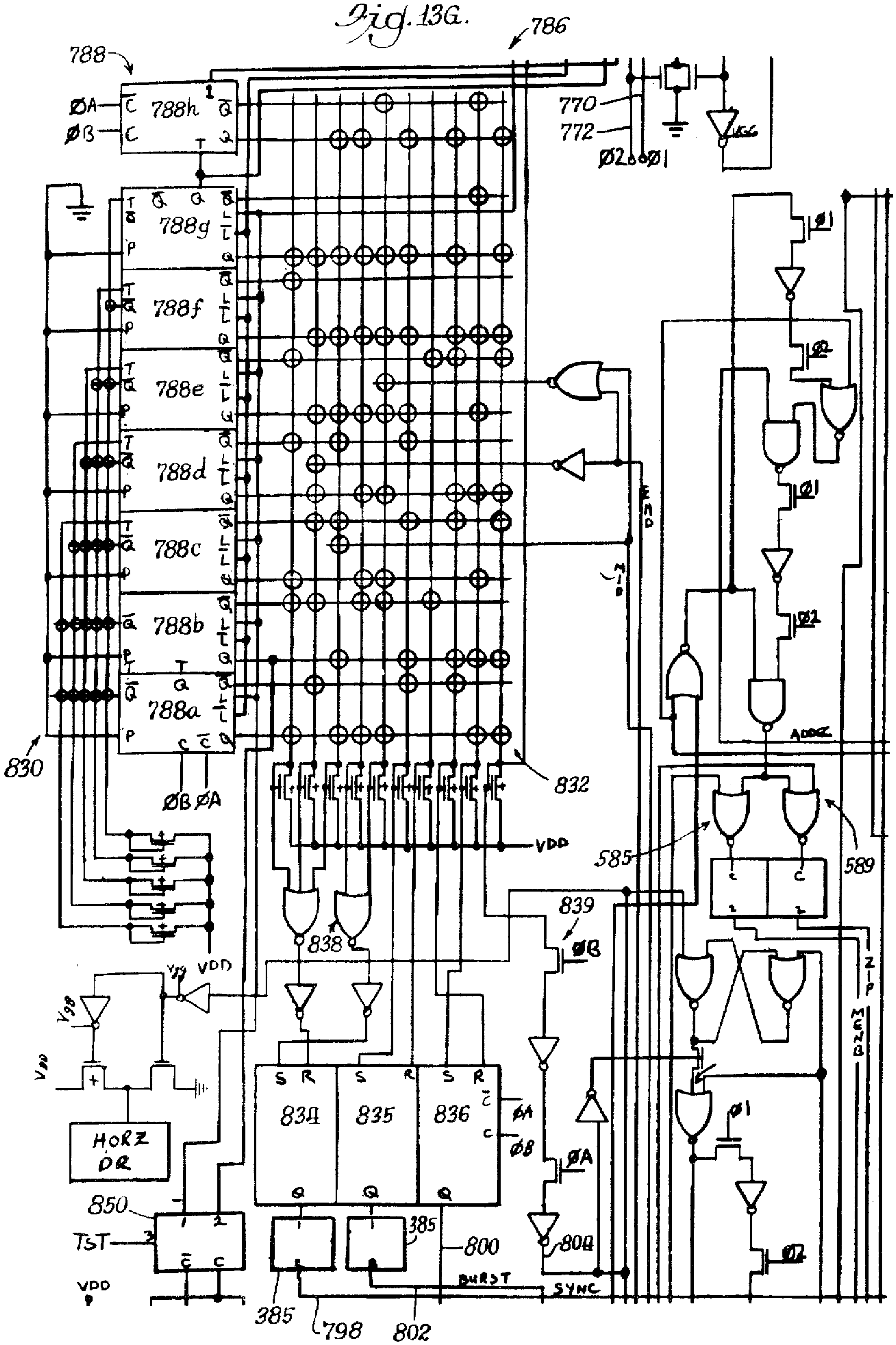
Figure 13H:
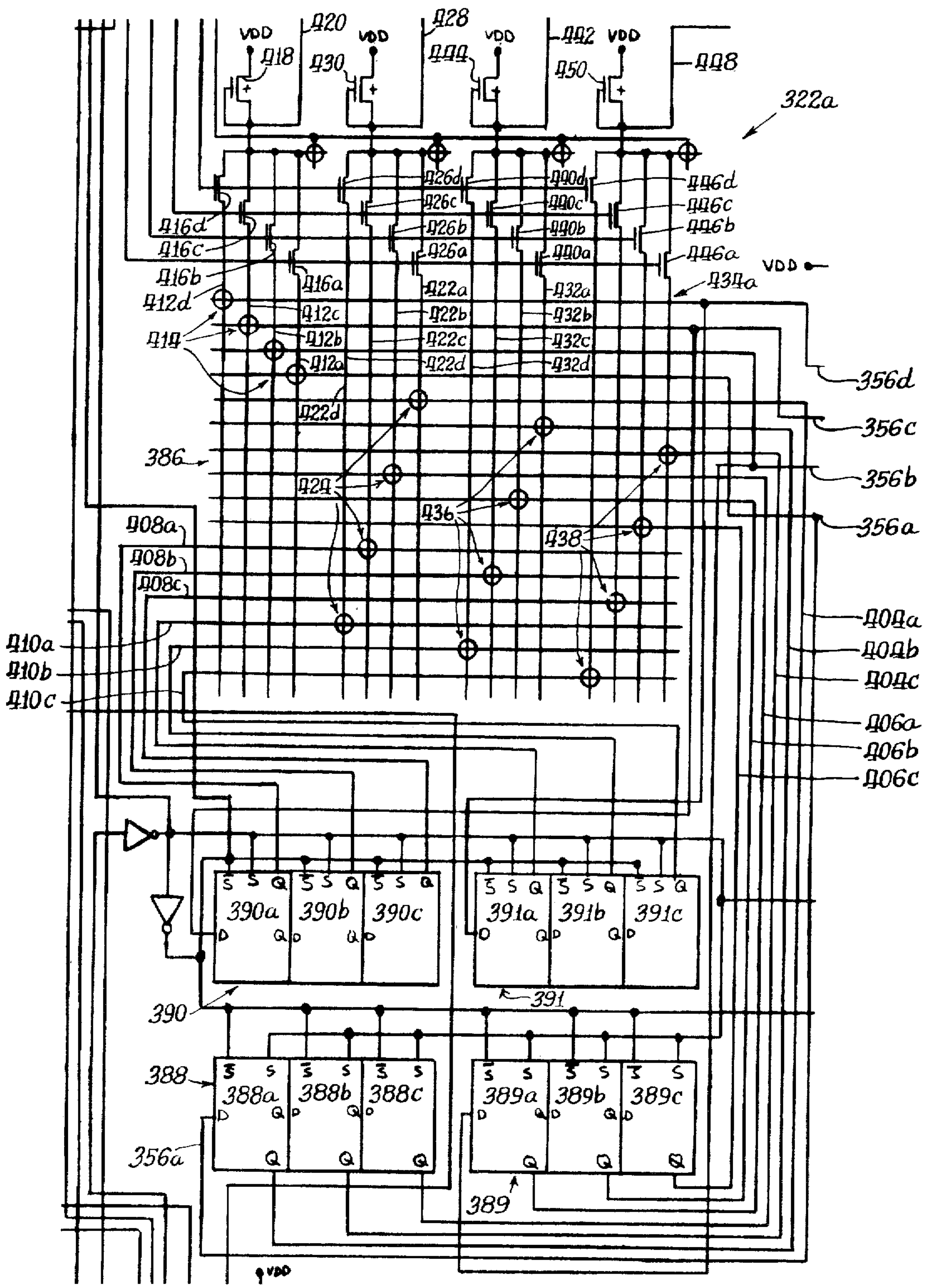
Figure 131:
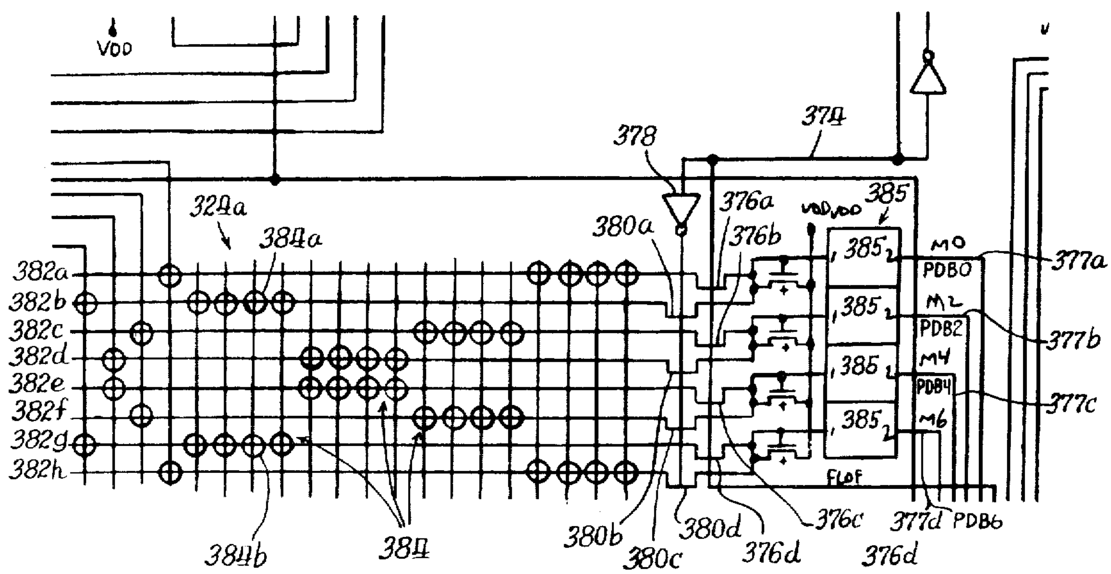
Figure 13J:
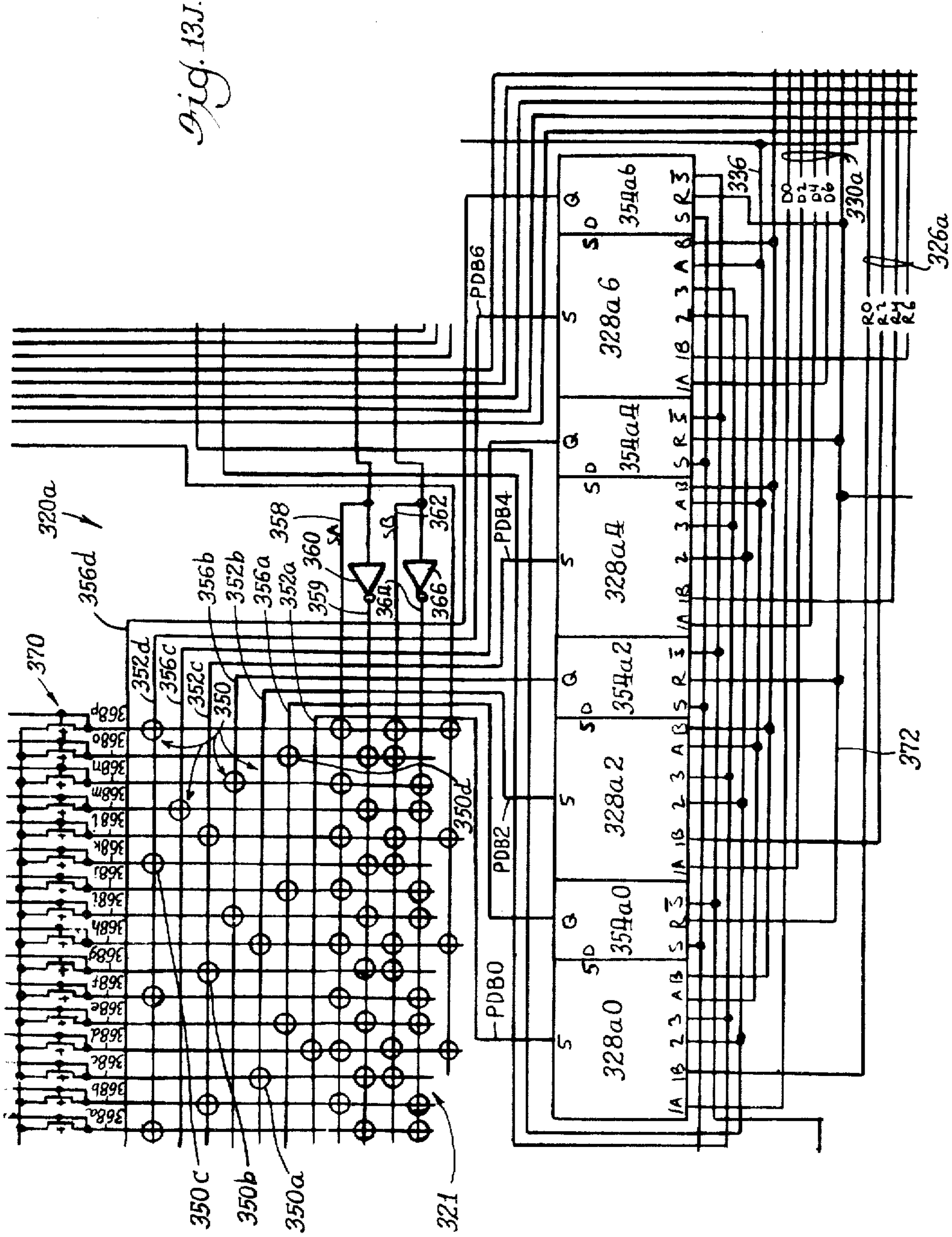
Figure 13K:
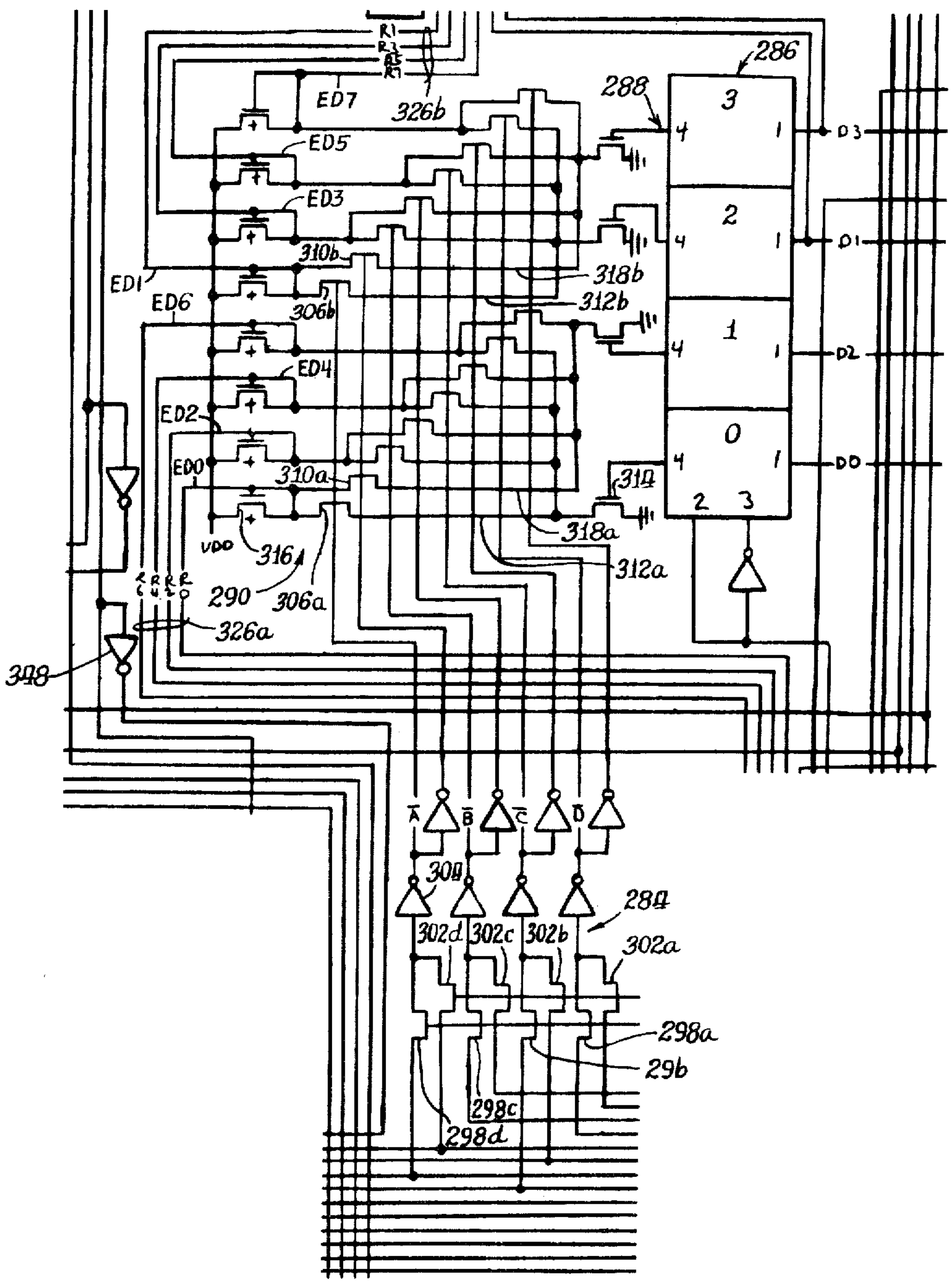
Figure 13L:
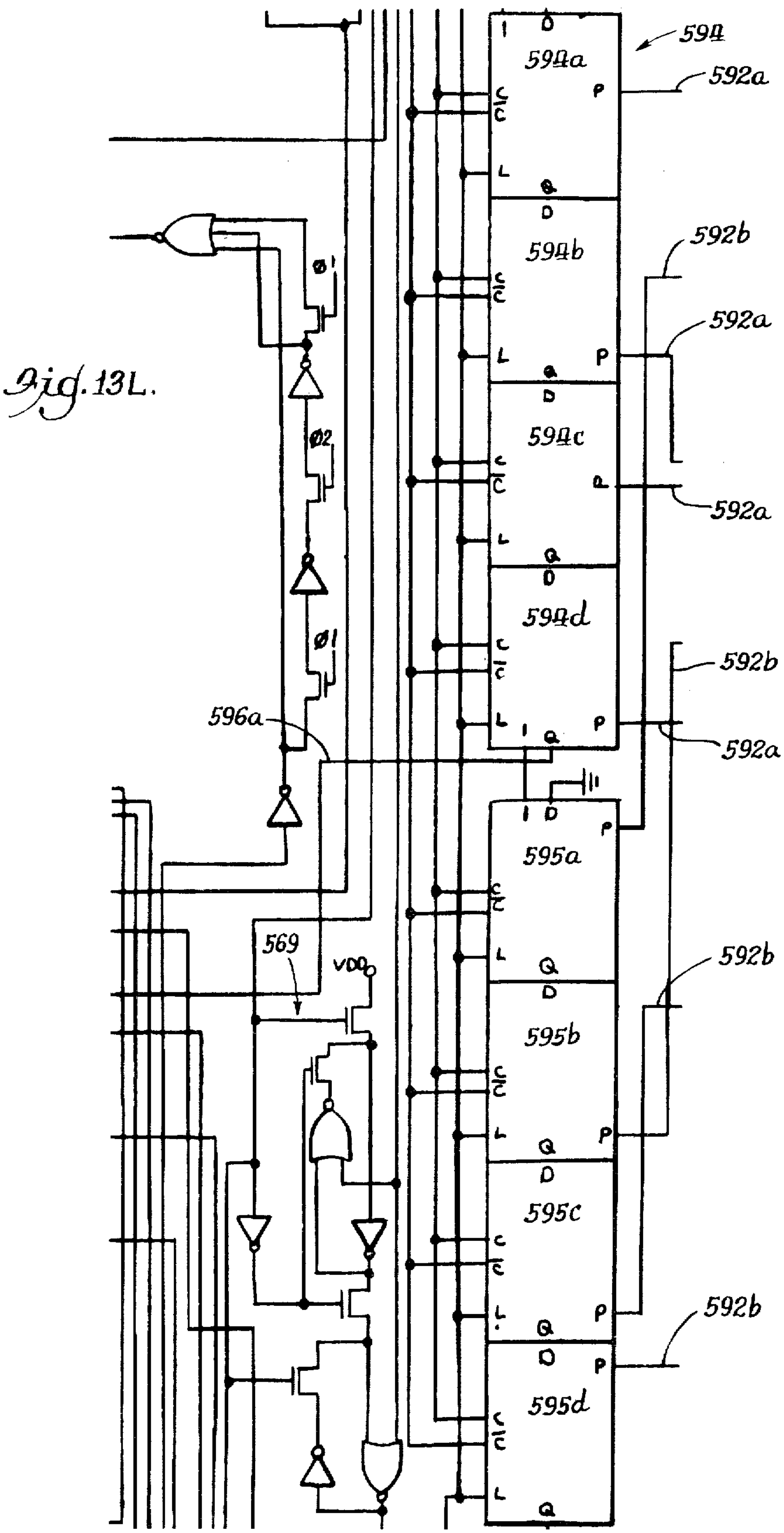
Figure 13M:
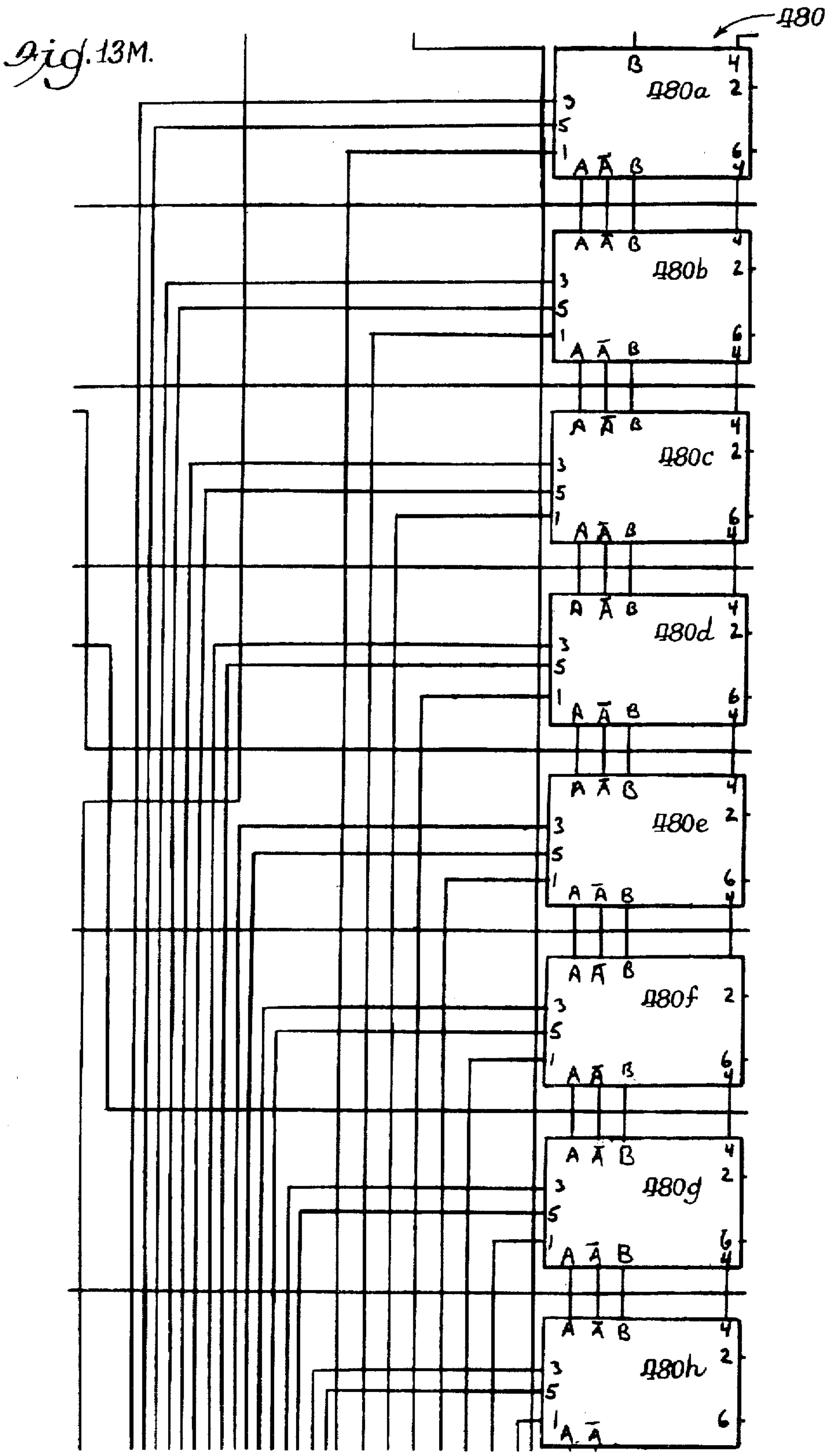
Figure 13N:
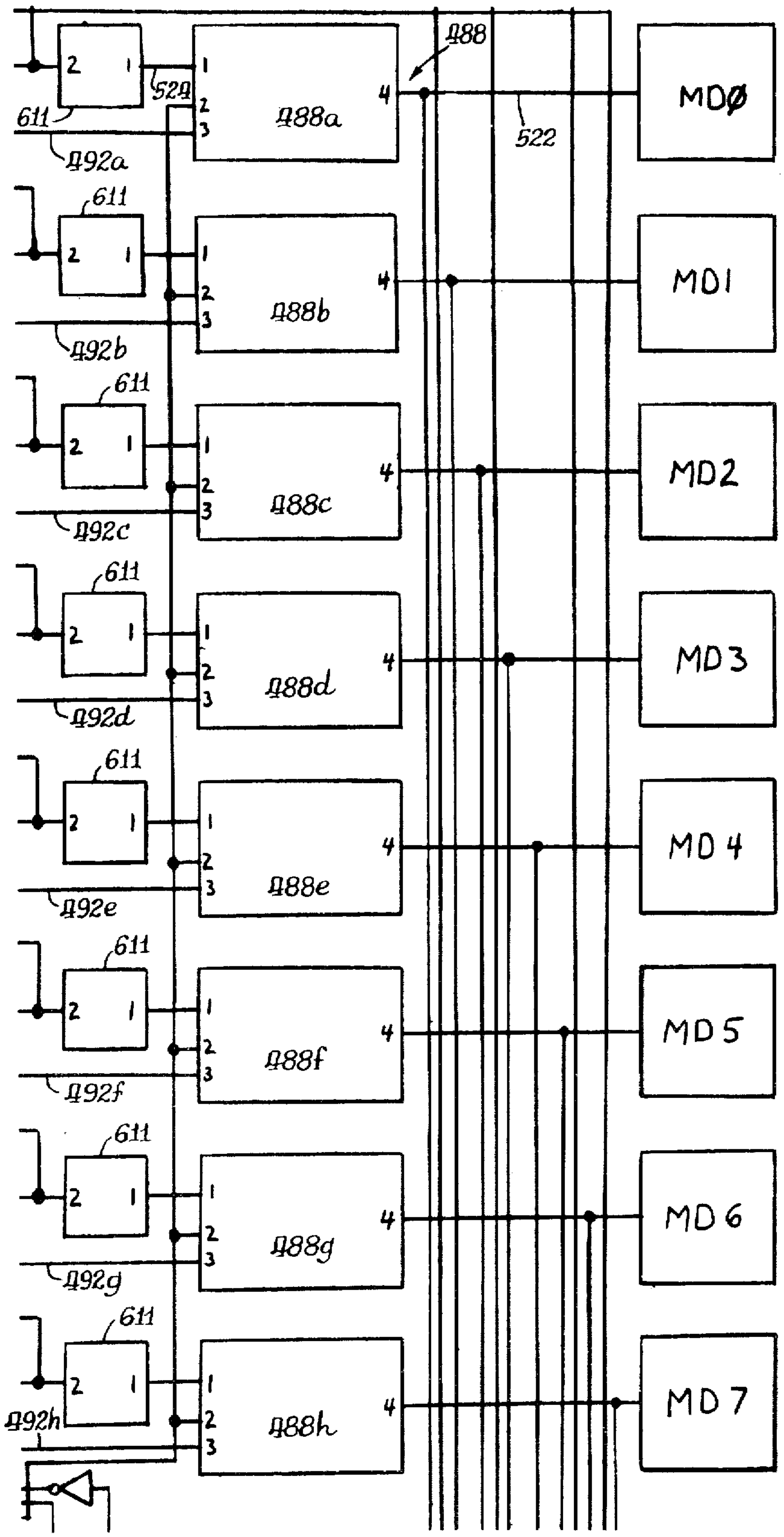
Figure 13:
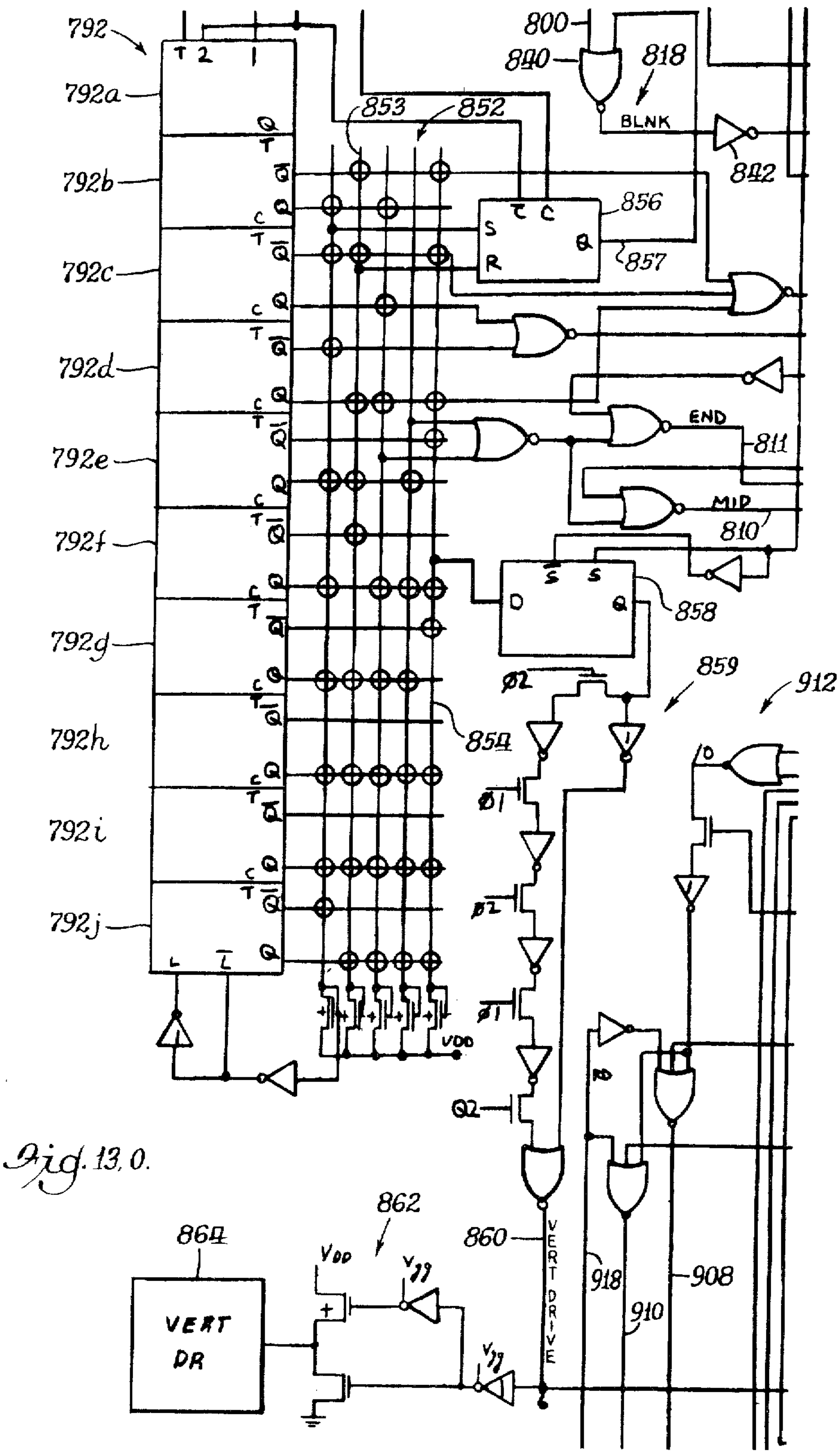
Figure 13P:
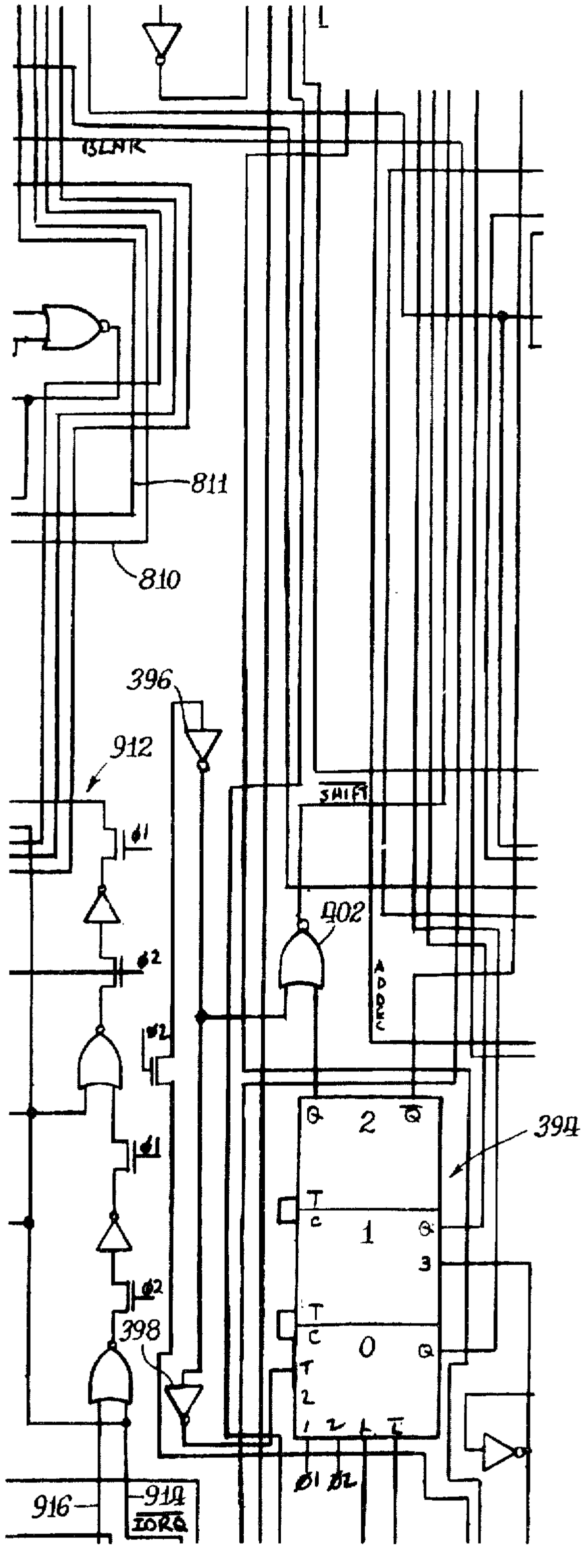
Figure 13Q:
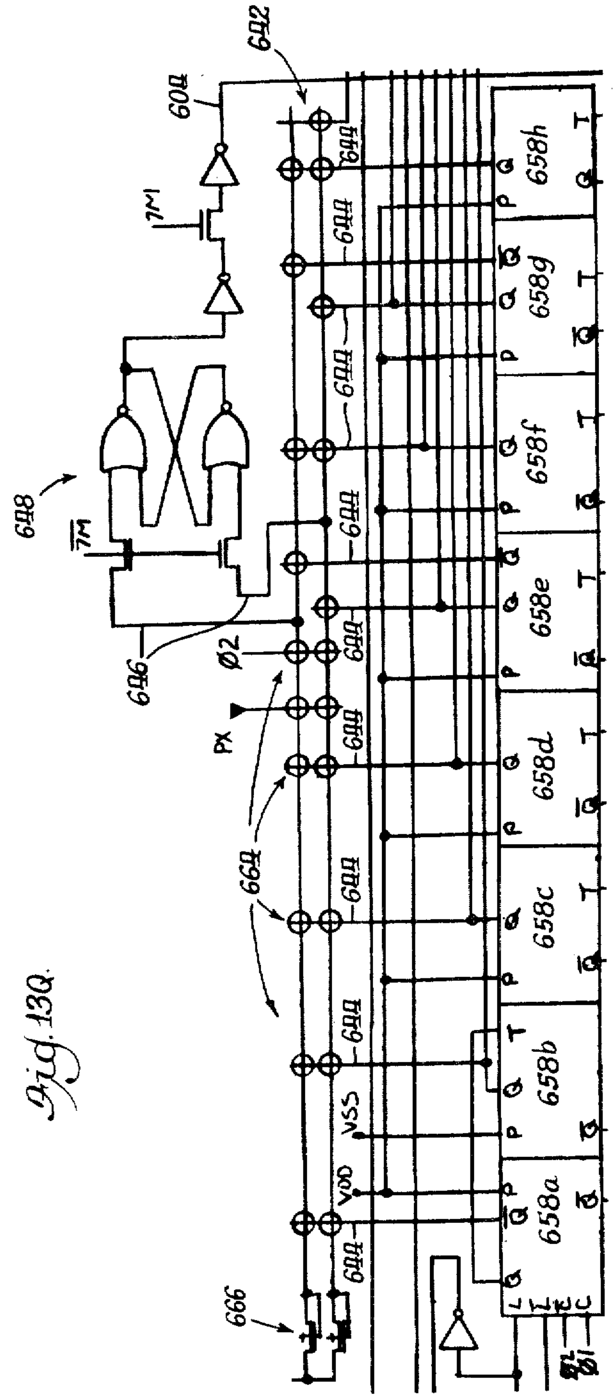
Figure 13R:
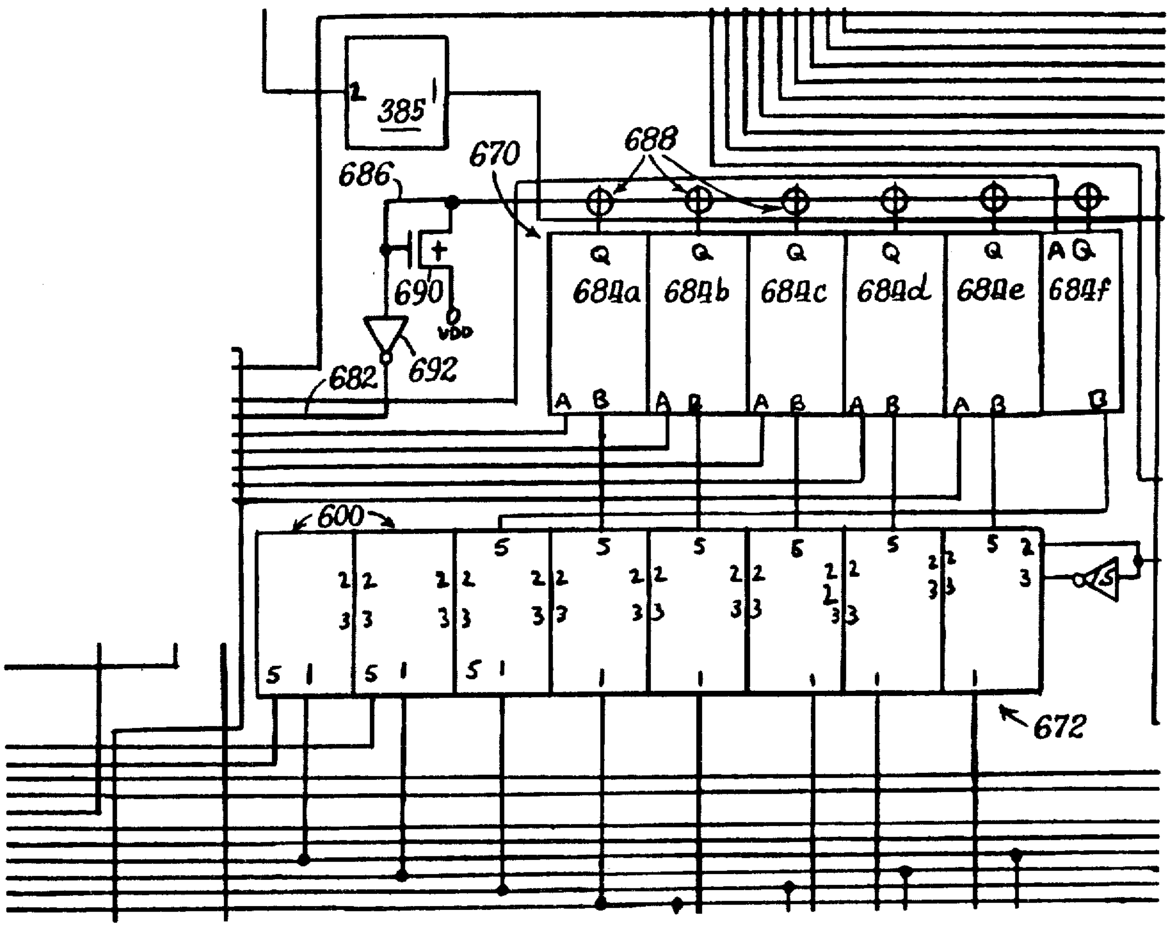
Figure 13S:
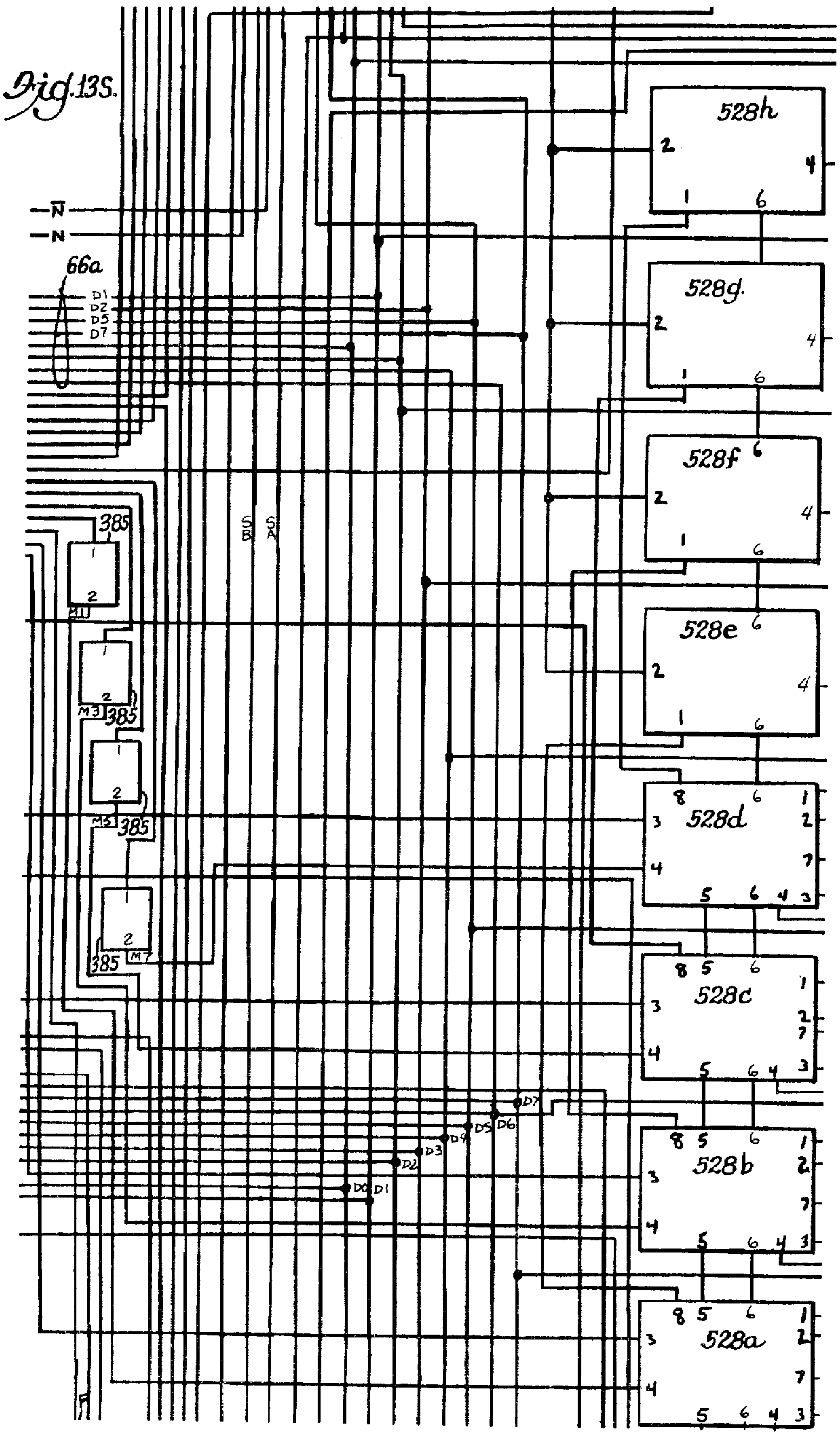
Figure 13T:
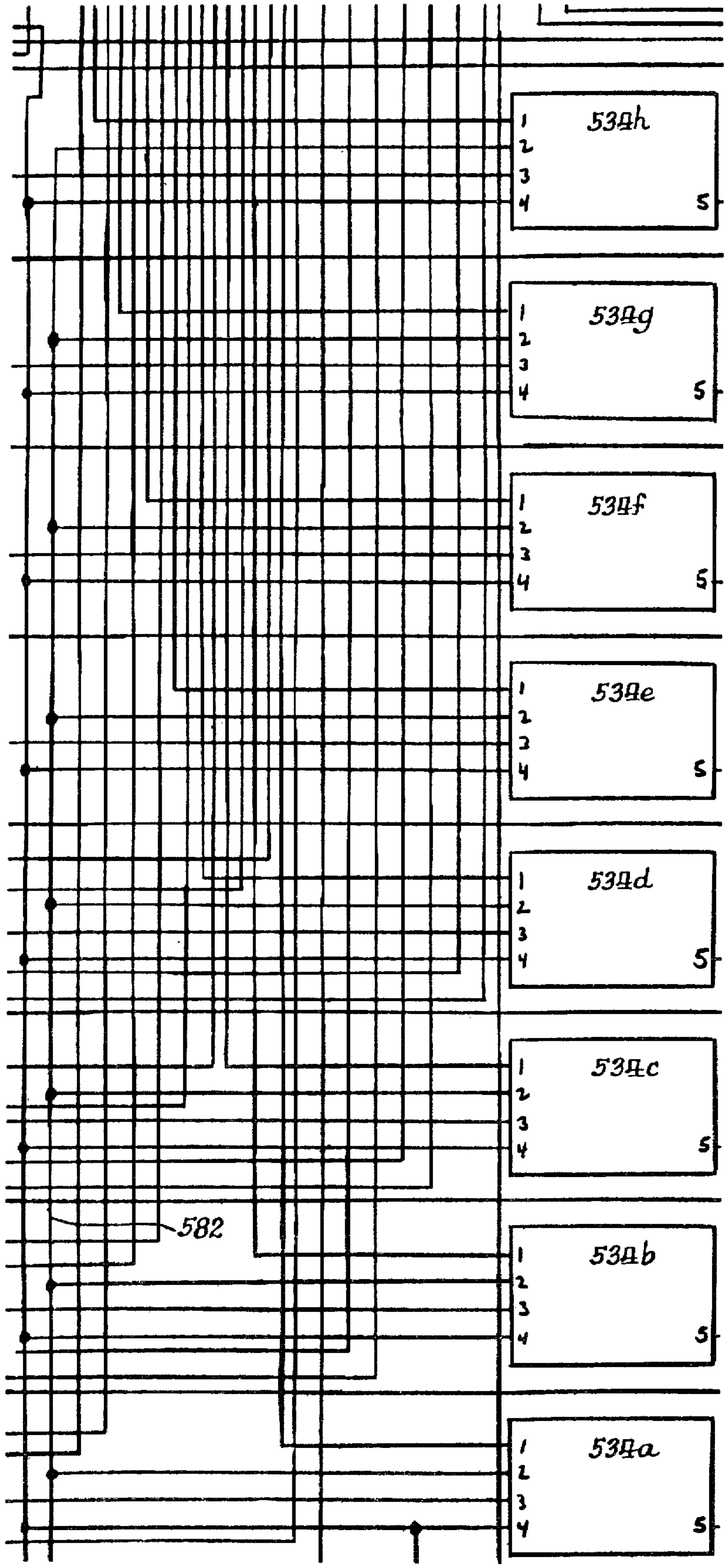
Figure 13U:
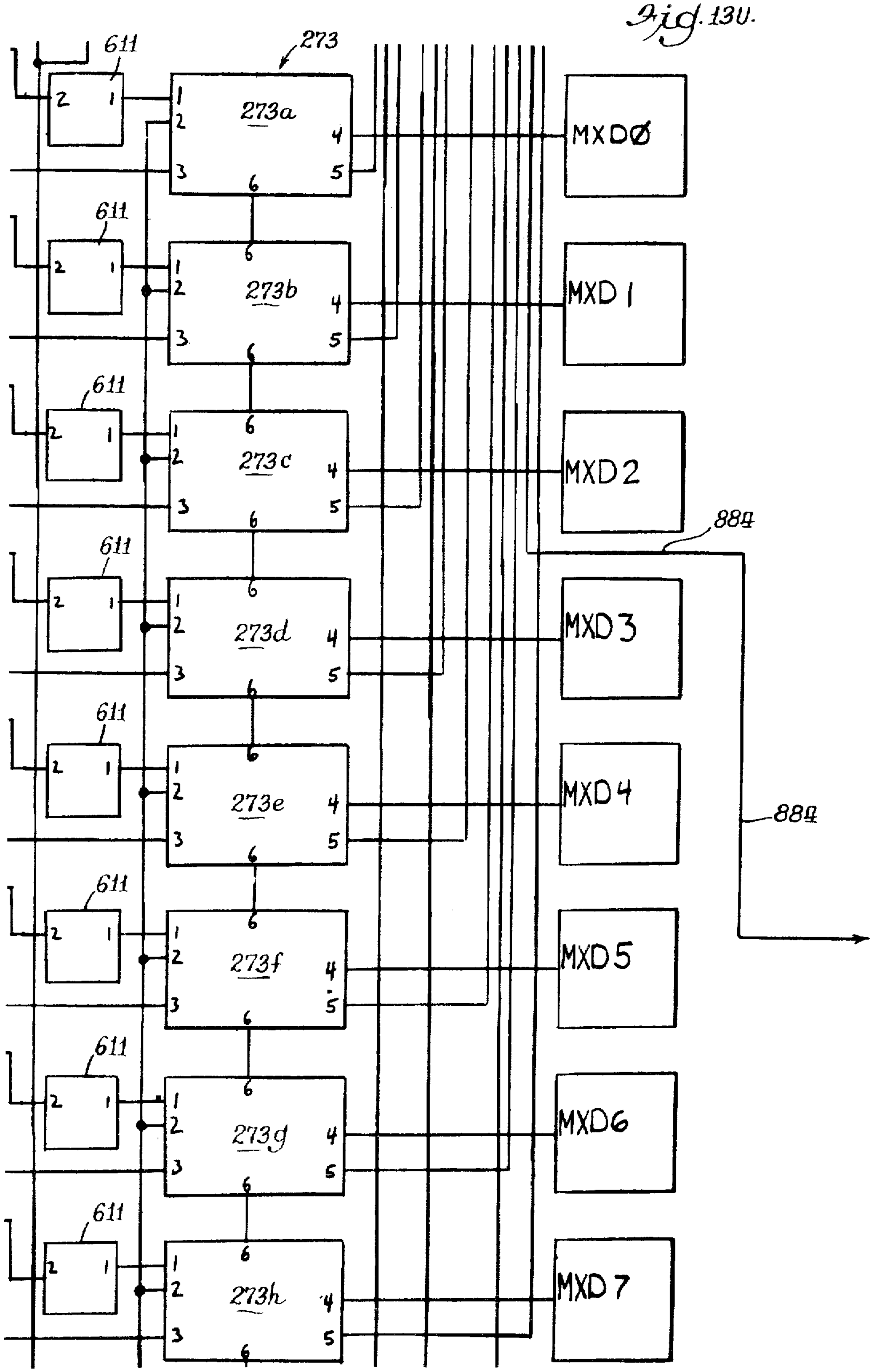
Figure 13V:
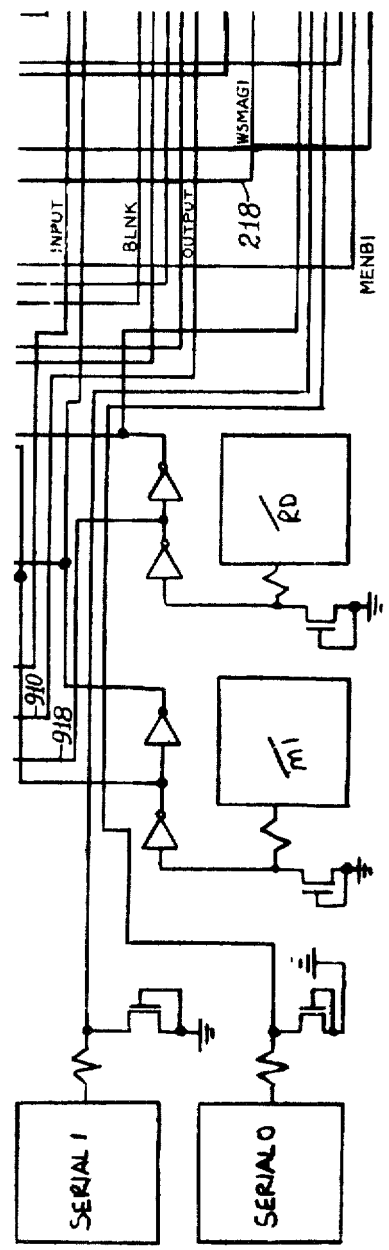
Figure 13W:
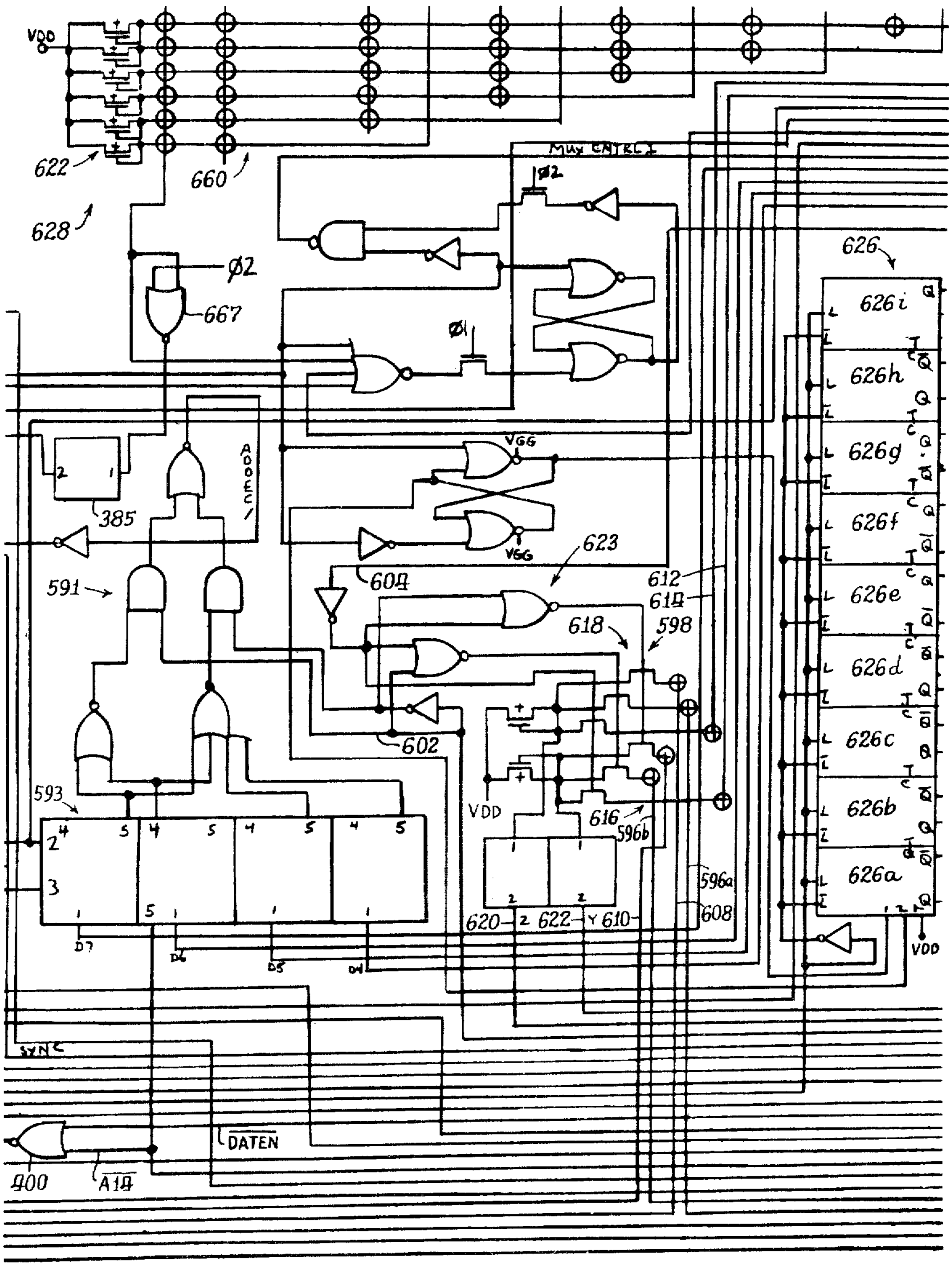
Figure 13X:
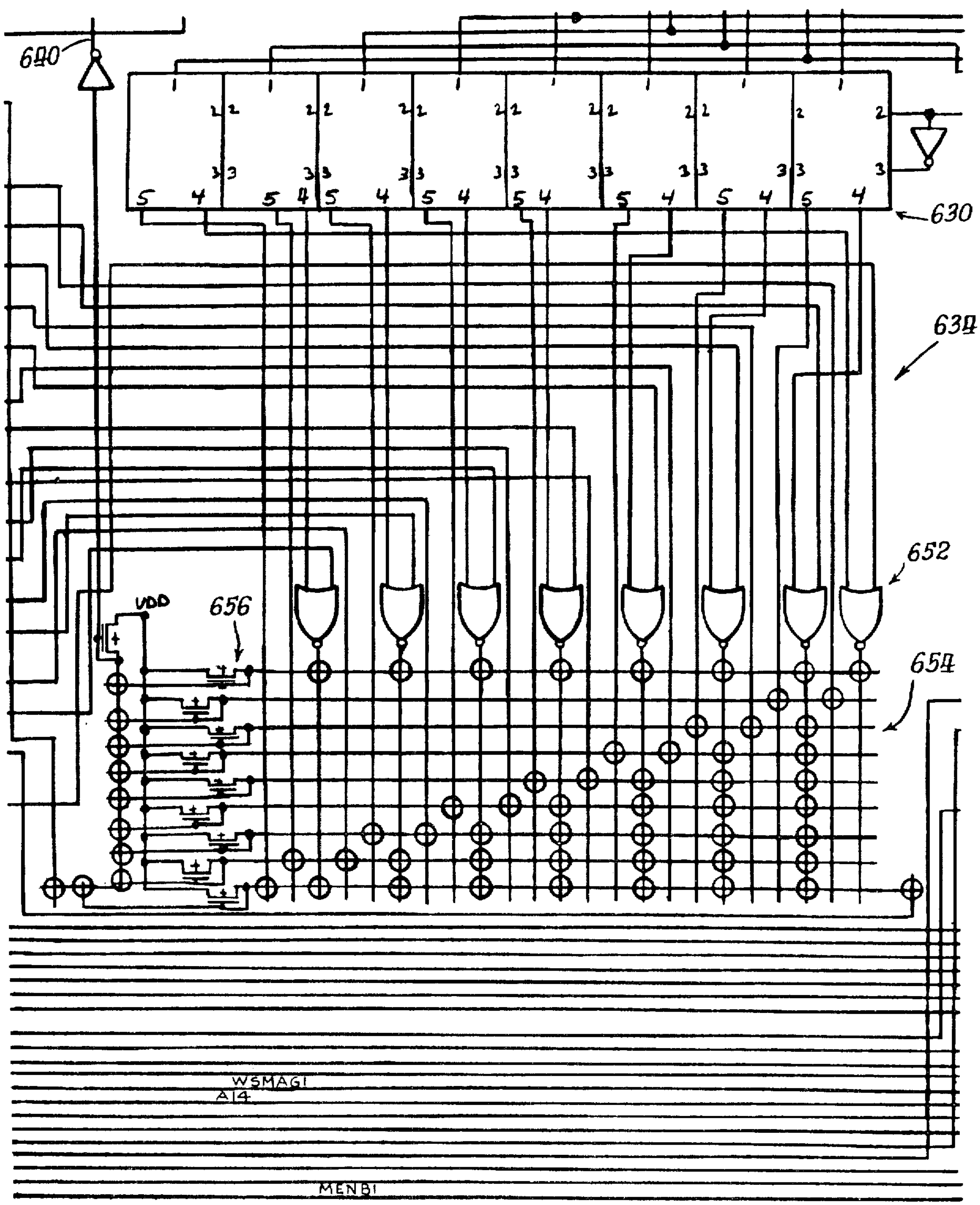
Figure 13Y:
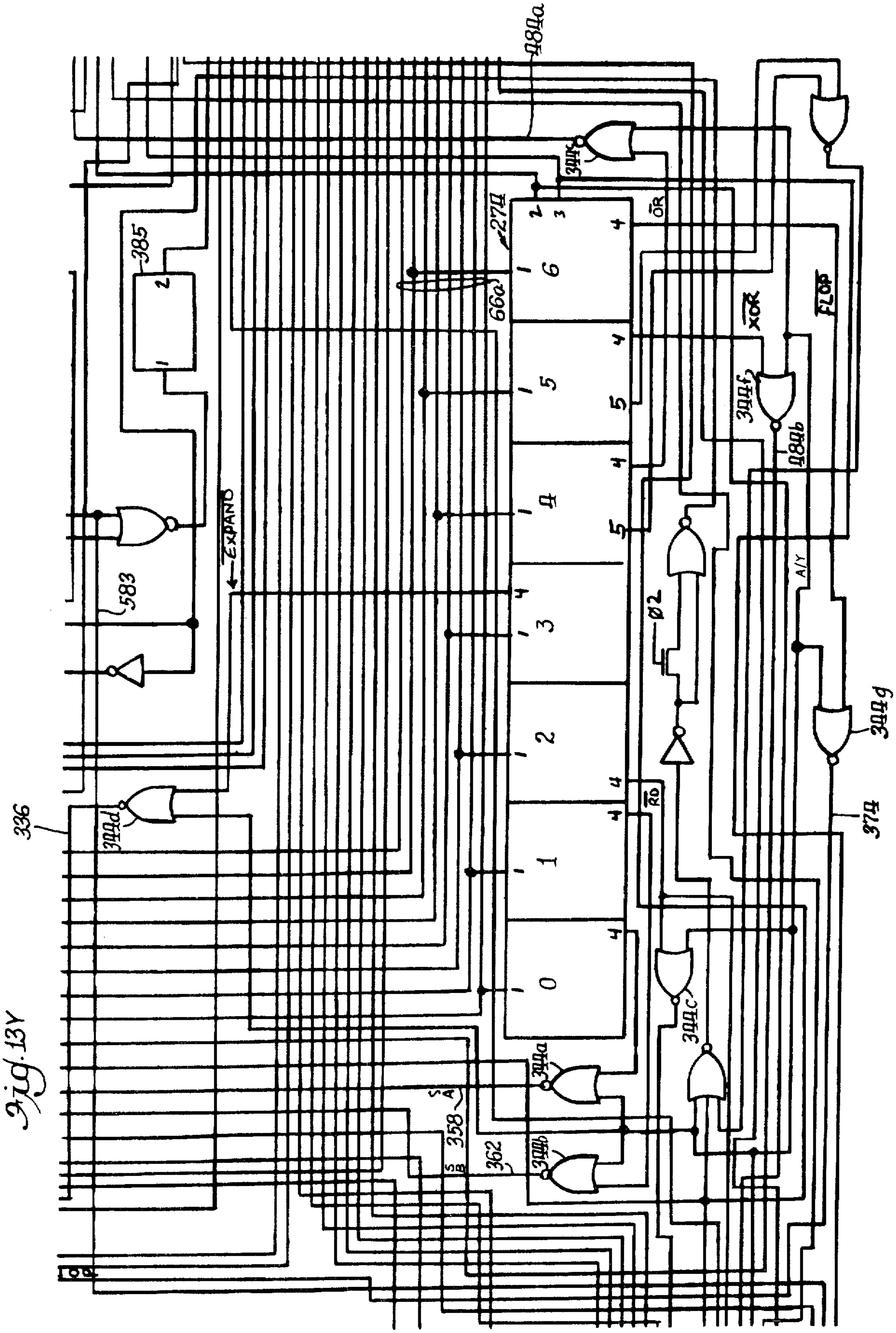
Figure 13Z:
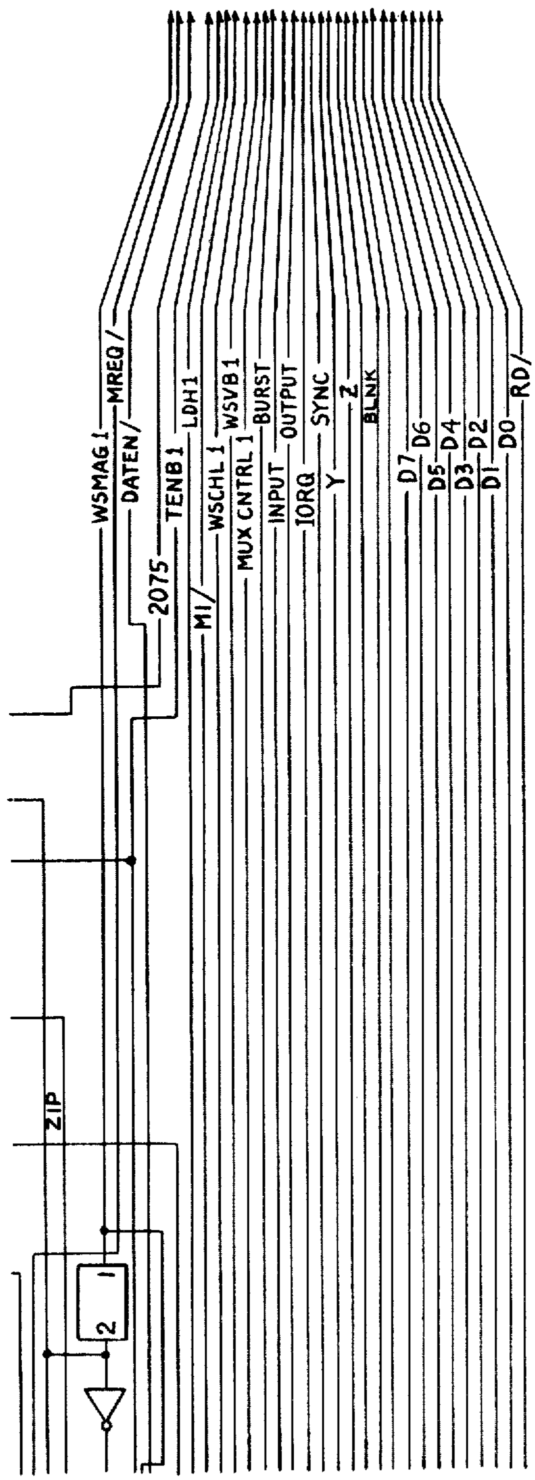
Figure 13A:
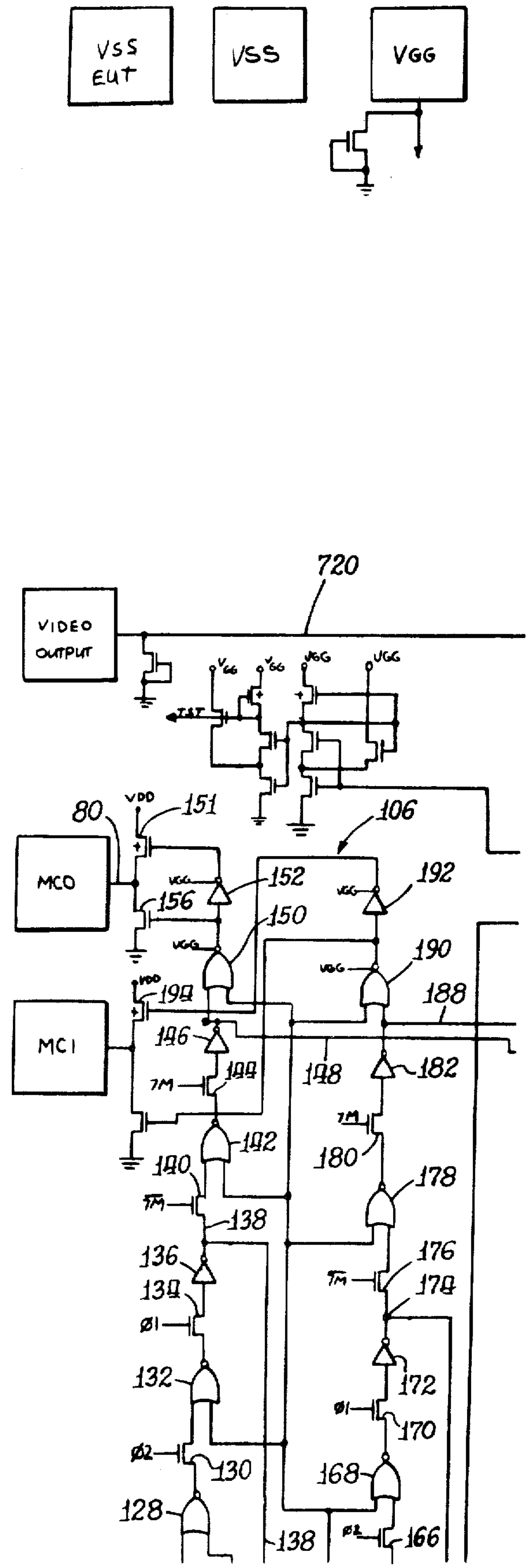
Figure 13B:
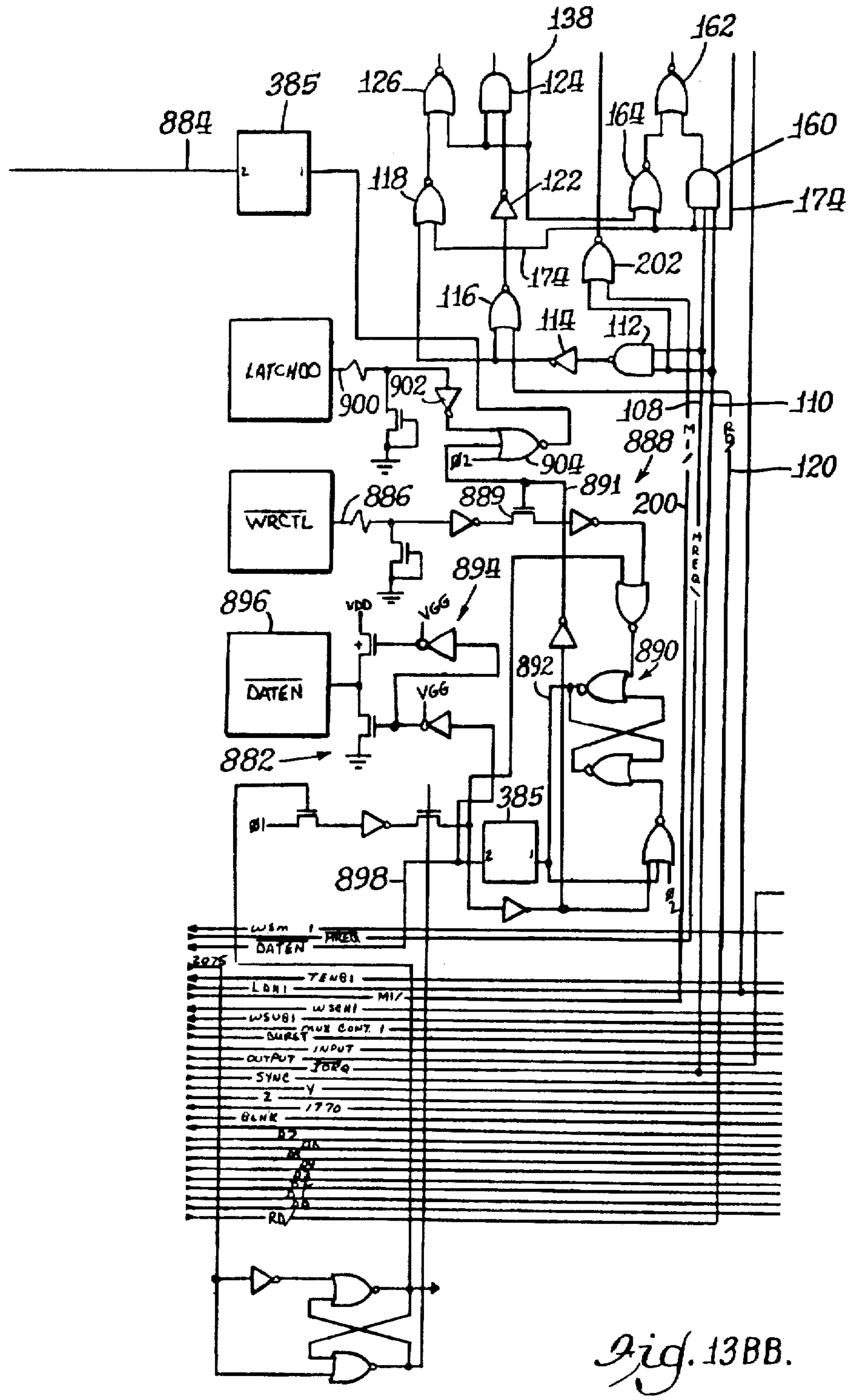
Figure 13C:
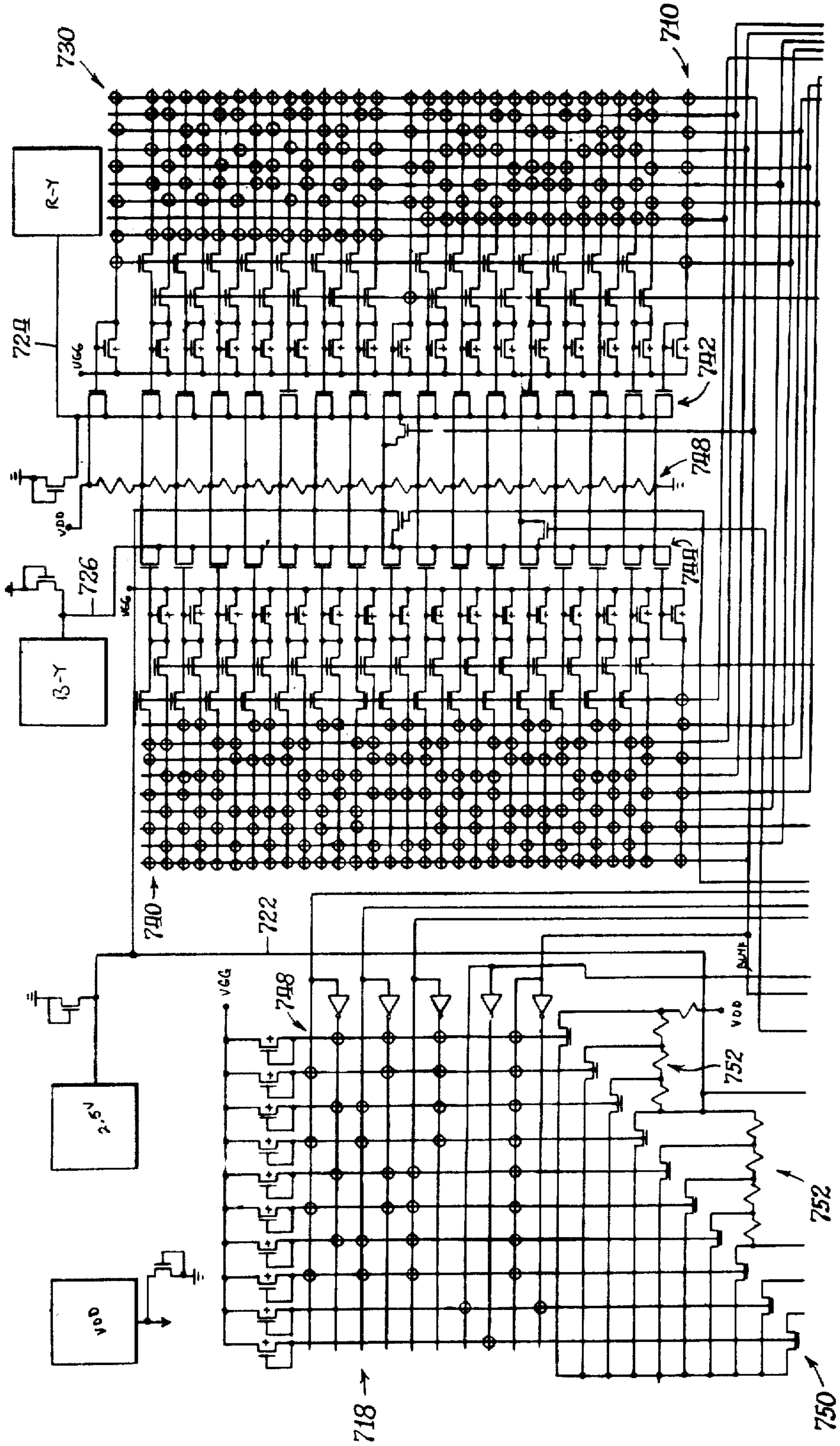
Figure 13D:
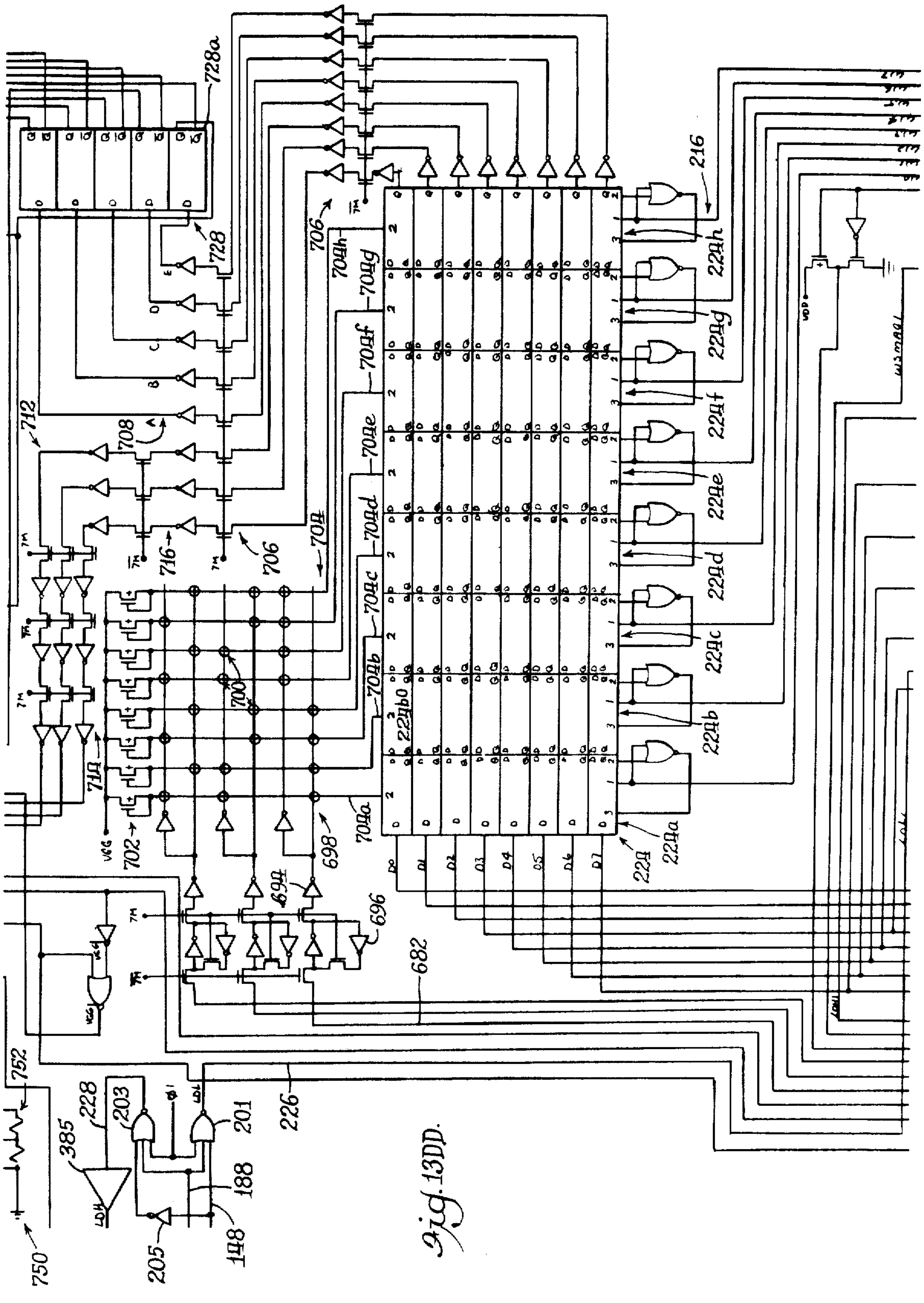
Figure 13E:
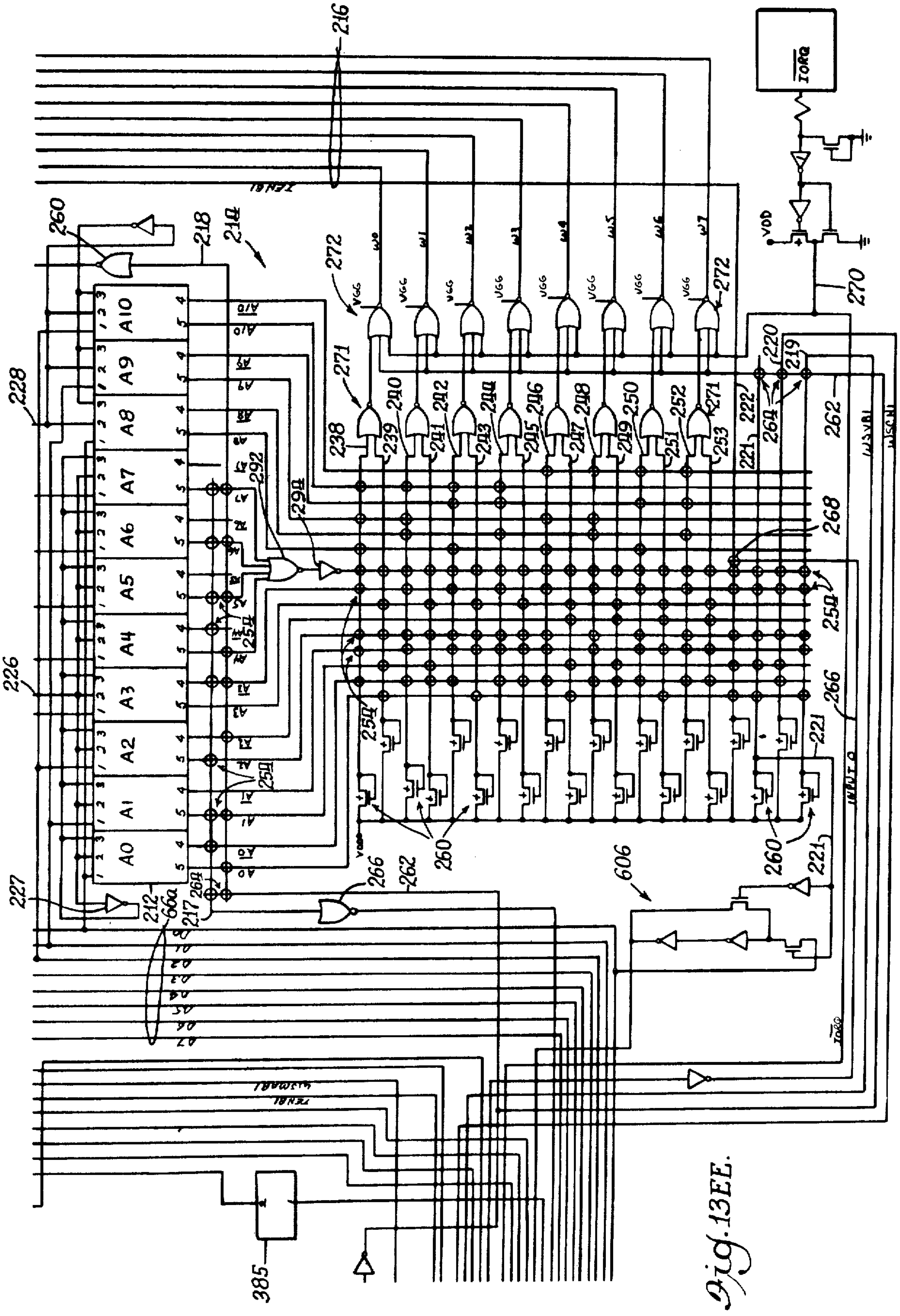

FIGS. 10A and, 10B and 10C are a schematic diagram of the interconnections of the integrated circuit chips of the system;

FIGS. 11A–11F are a block diagram of the data chip of the video processor of the system;

FIGS. 12A–12G are timing diagrams of various control signals of the system for various read and write operations;

FIGS. 13A–Z and 13AA–EE illustrate an example of a circuit implementing the block diagram of FIGS. 11A–F;

FIG. 14 is a composite diagram illustrating the relationship of FIGS. 13A–EE viewed as whole;

FIGS. 15–39 are diagrams showing blocks of FIGS. 13A–EE in greater detail.

Figure 41:
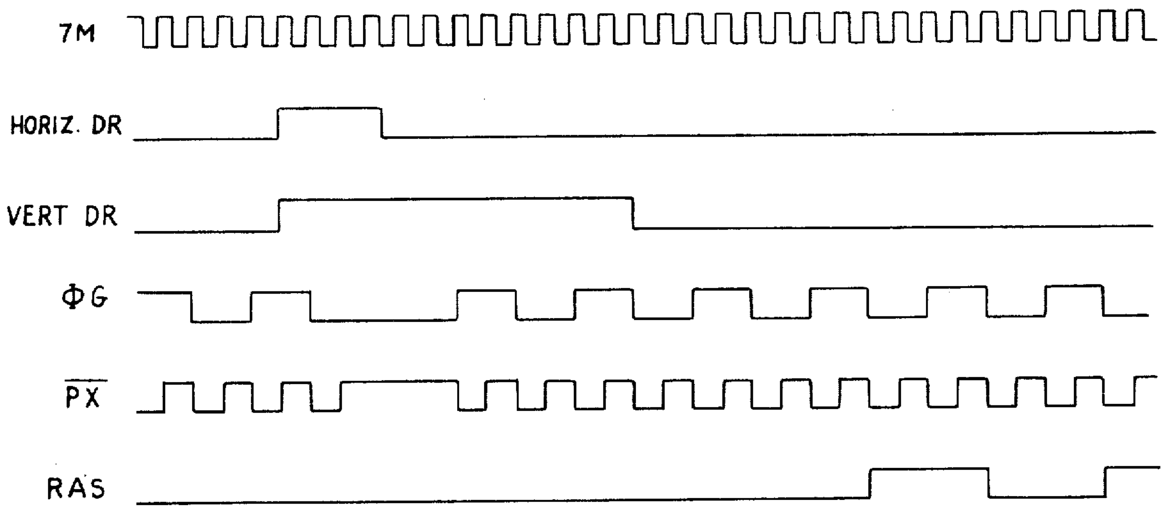
Figure 43:
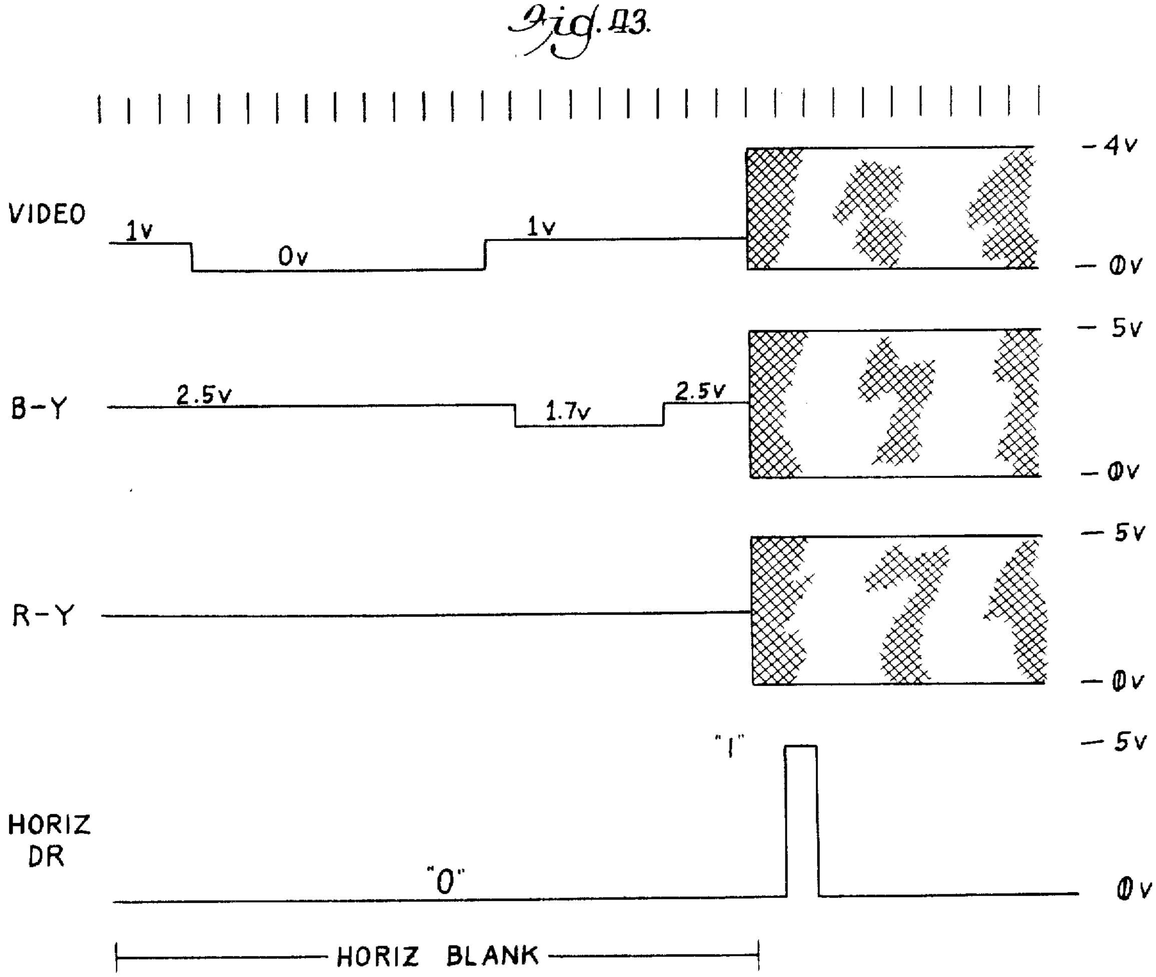
Figure 42:
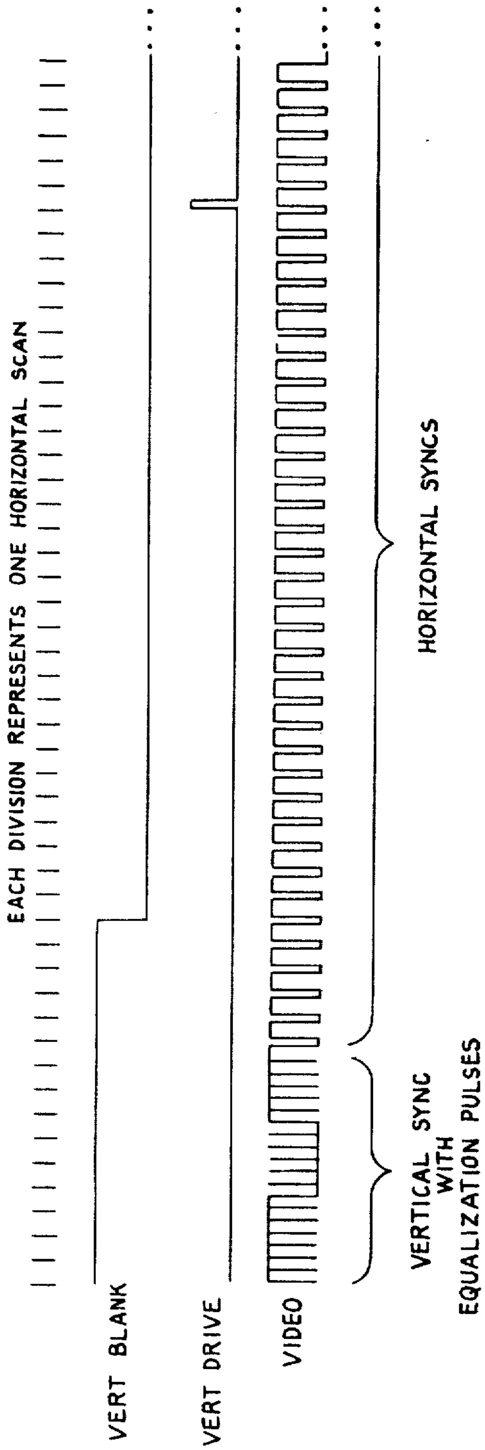
Figure 25A:
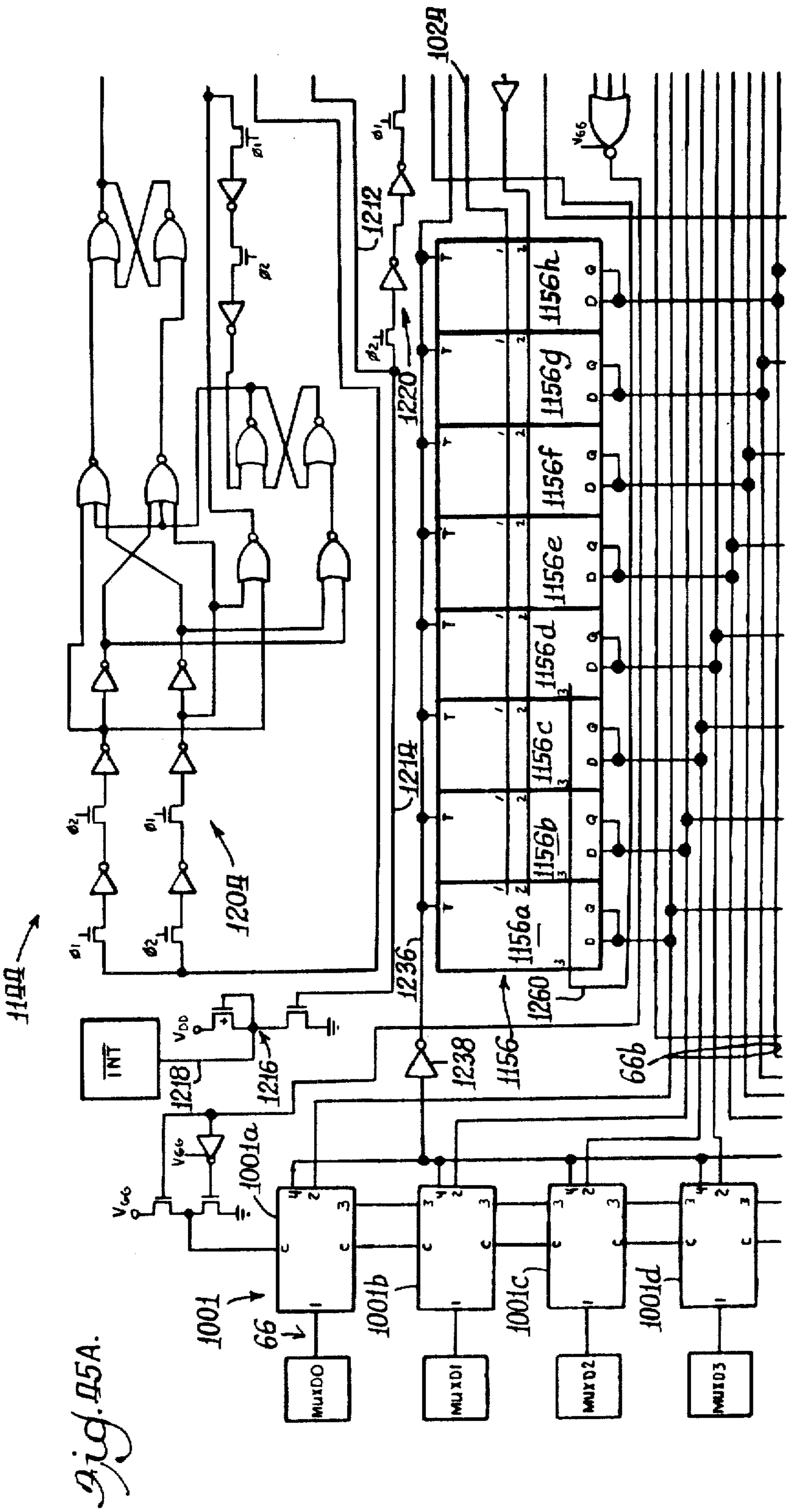
Figure 45B:
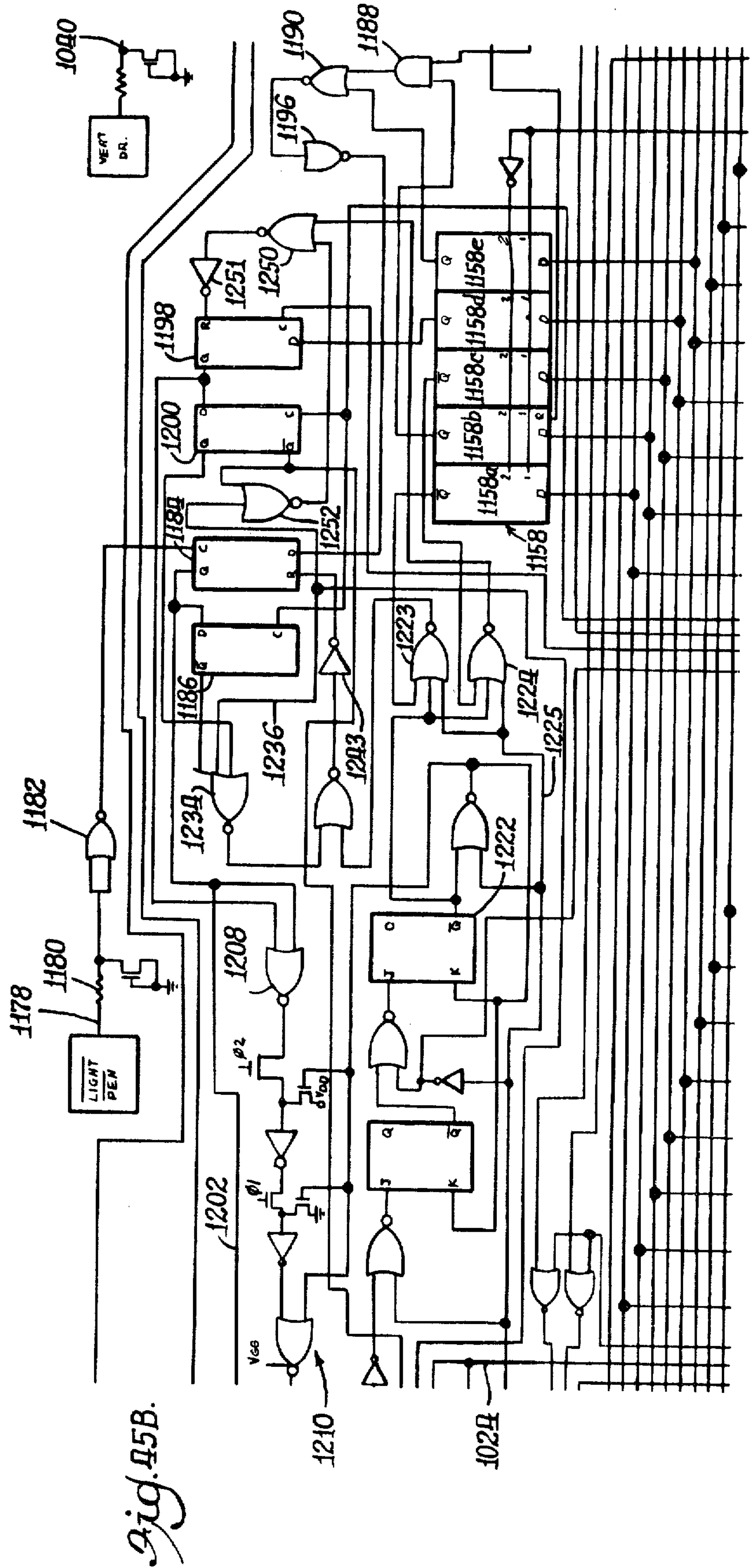
Figure 15C:
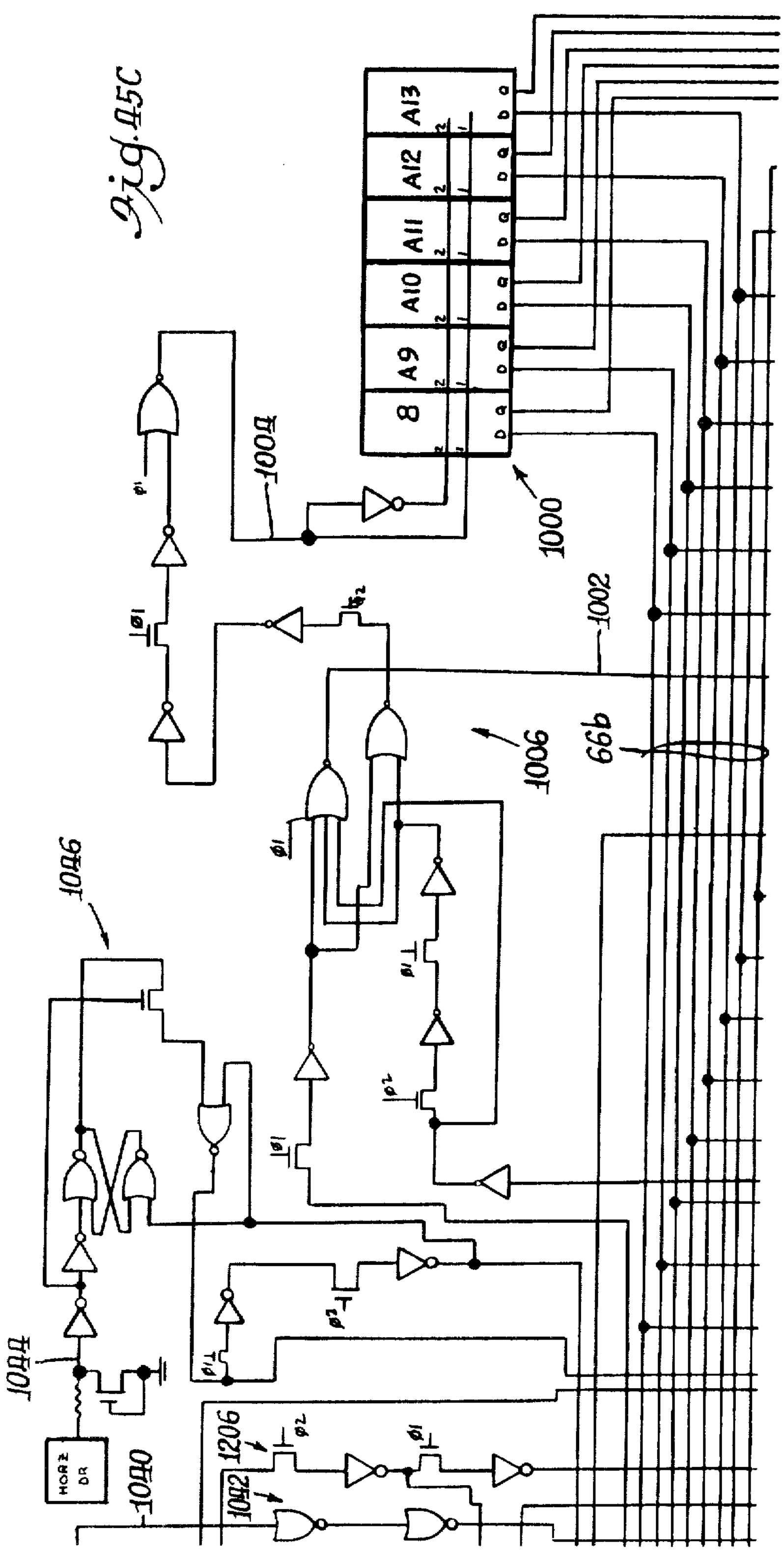
Figure 15D:
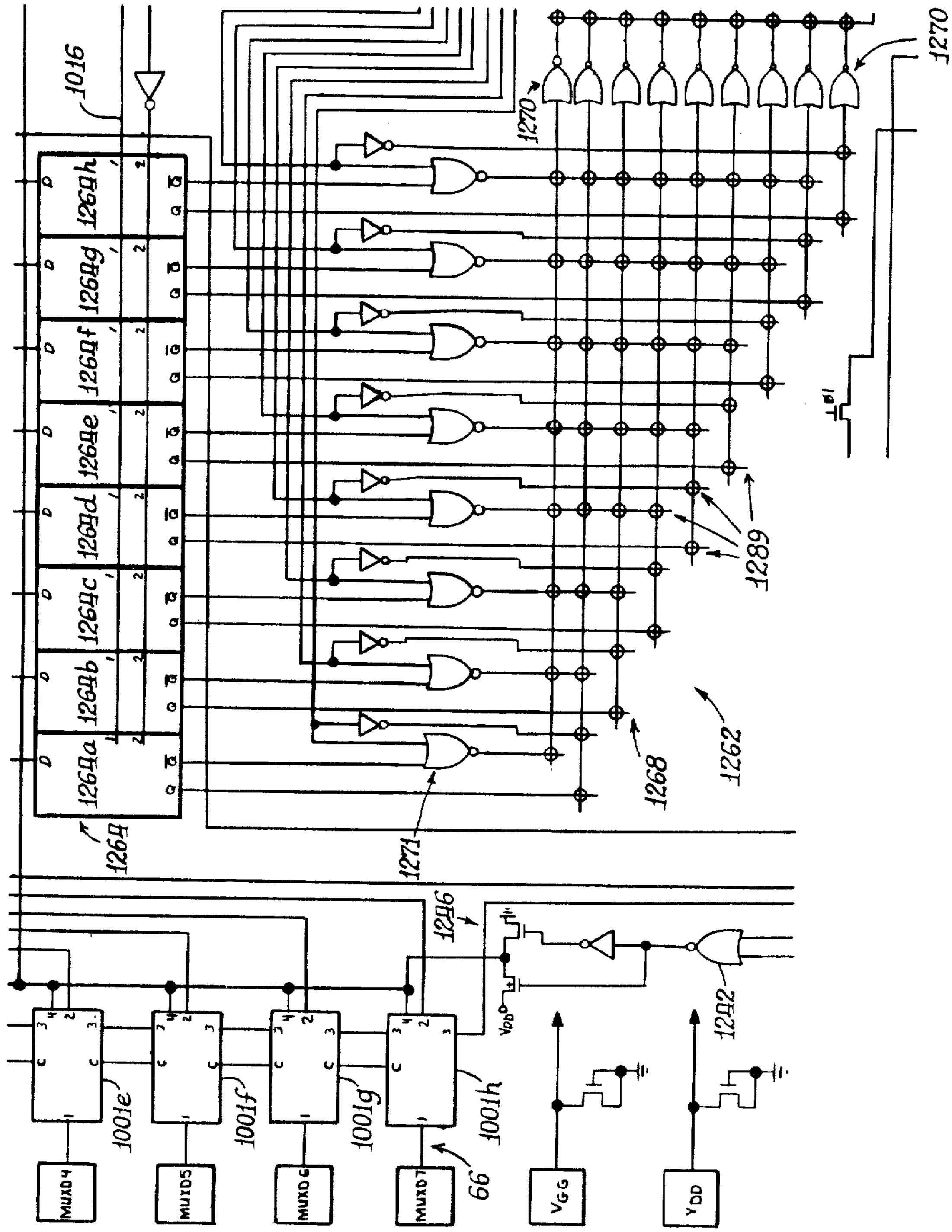
Figure 45E:
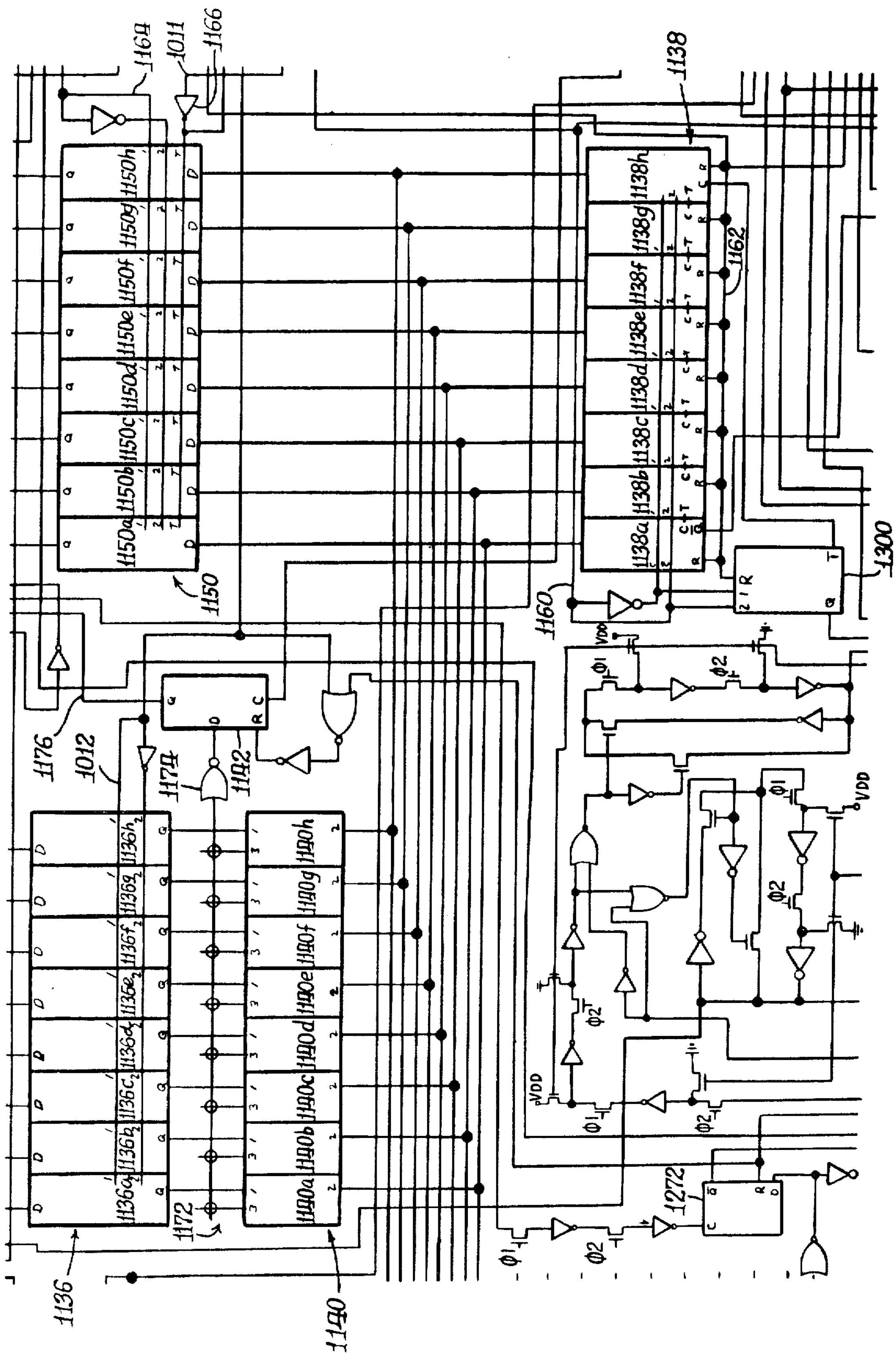
Figure 45G:
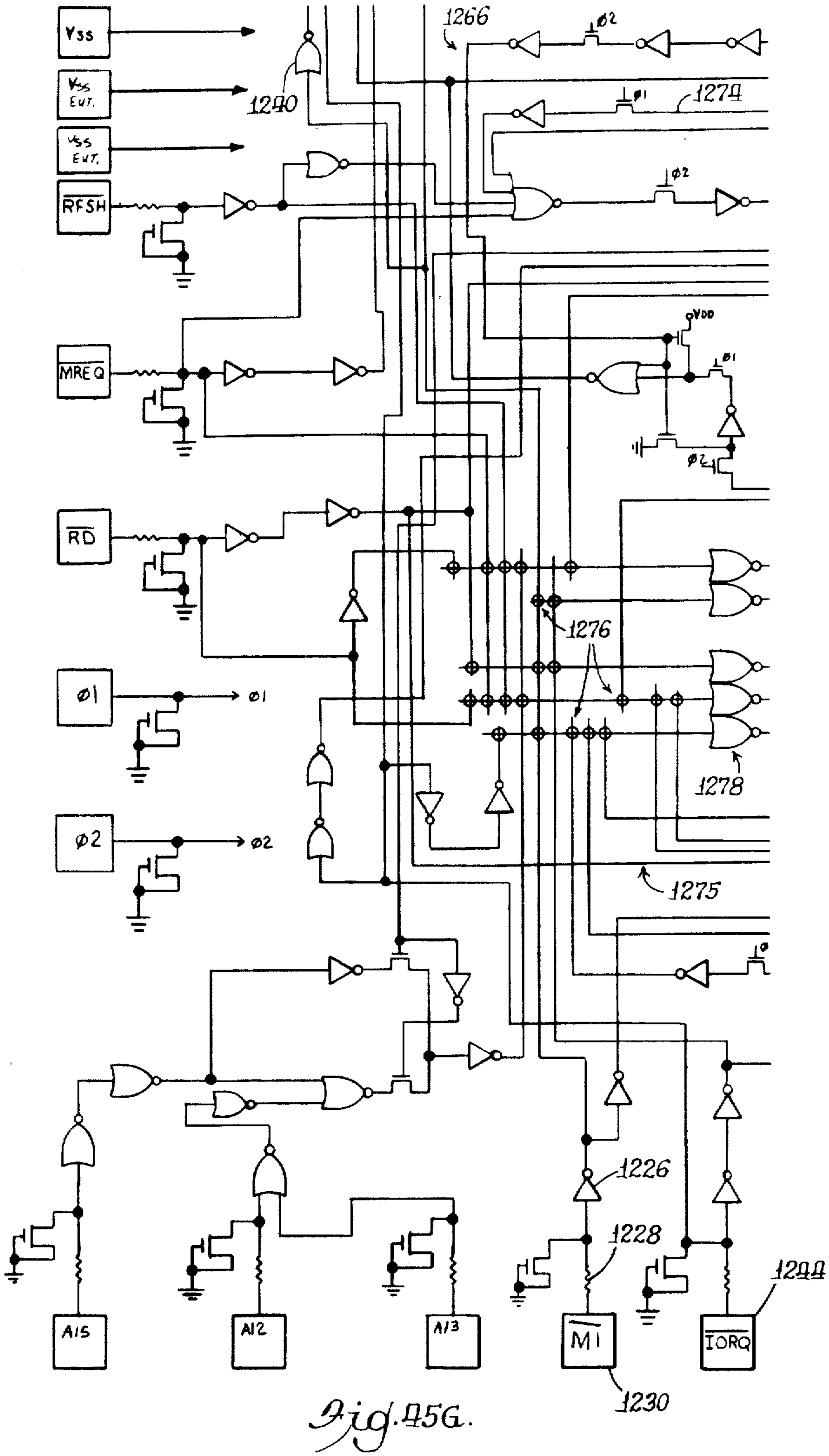
Figure 45H:
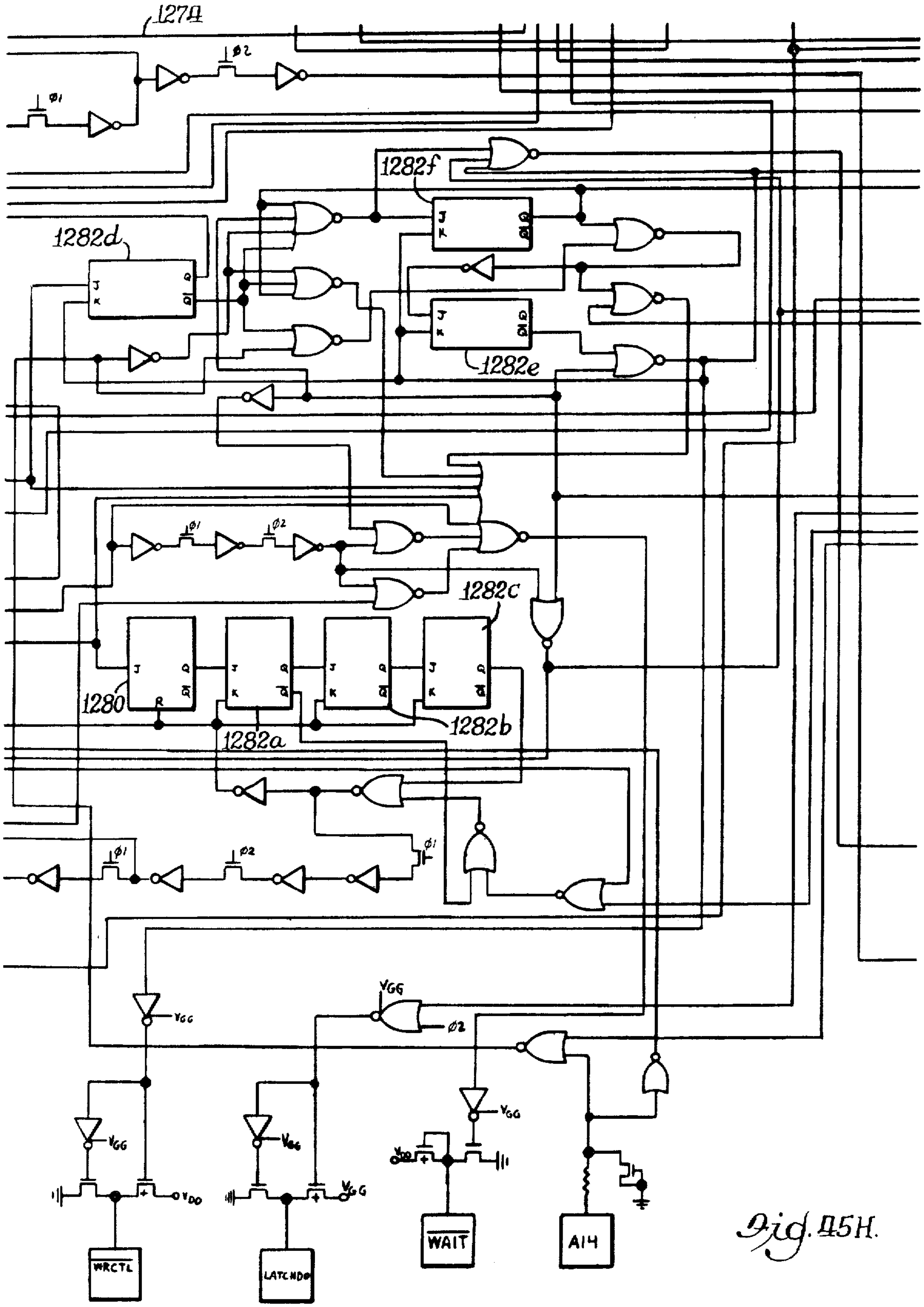
Figure 451:
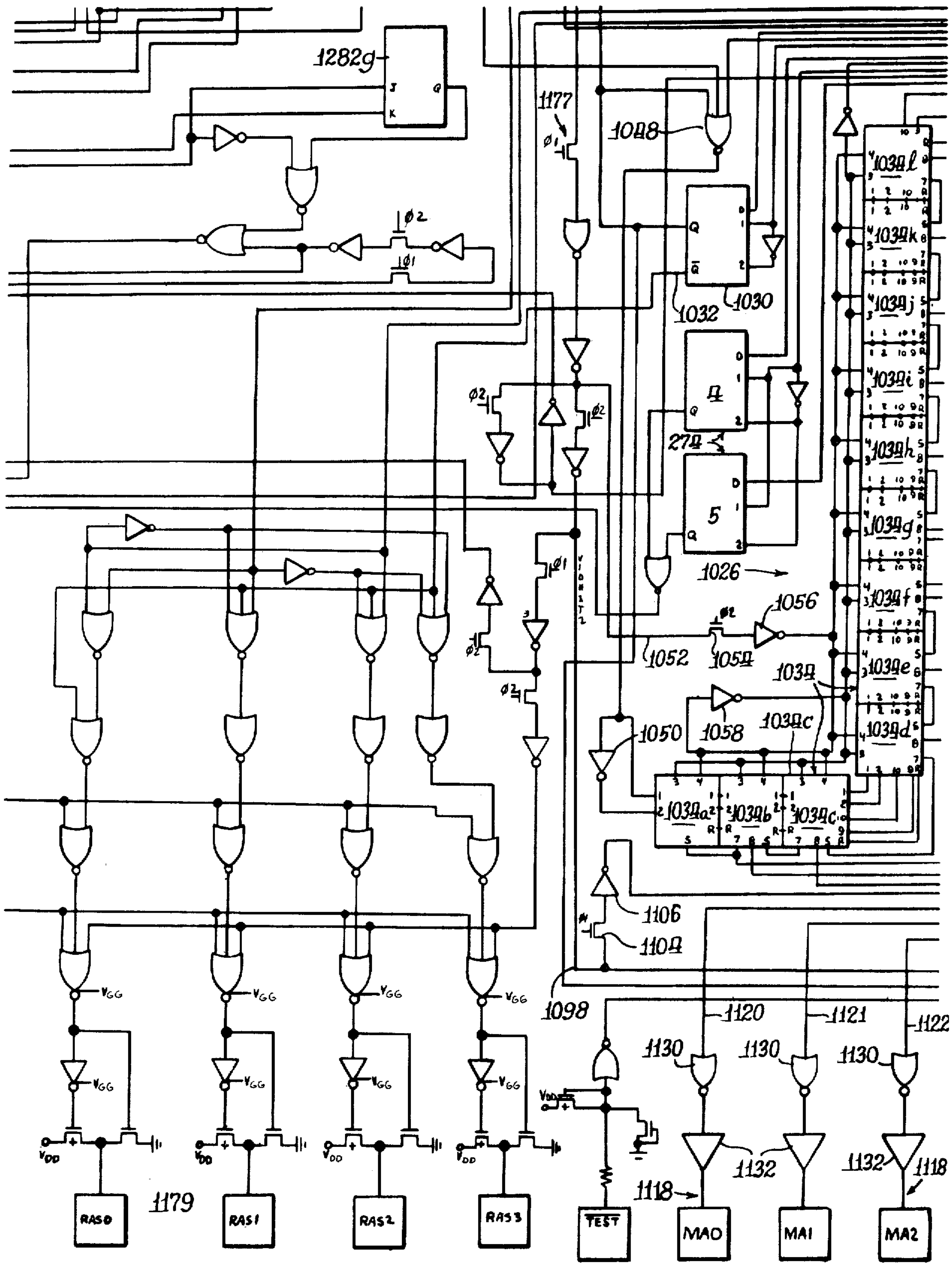
Figure 45J:
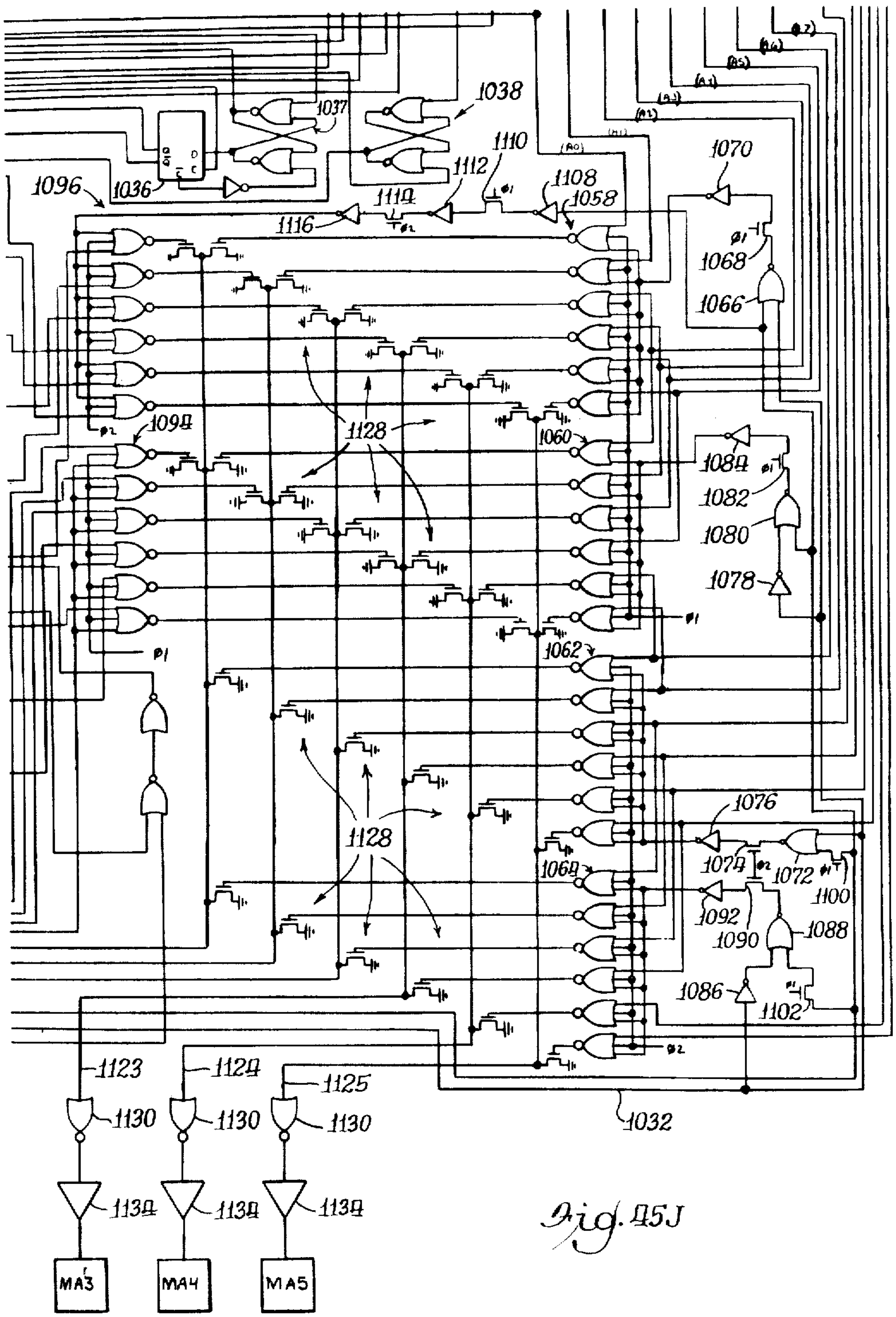
Figure 67:
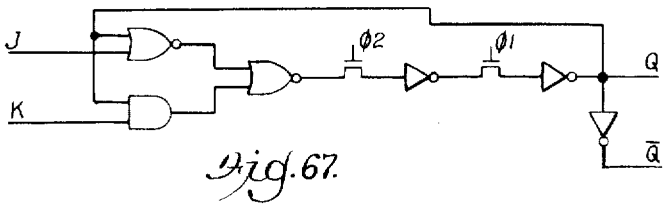
Figure 47:
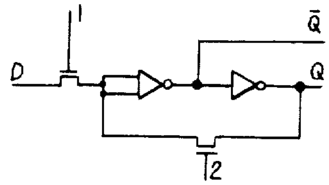
Figures 71A, 72:
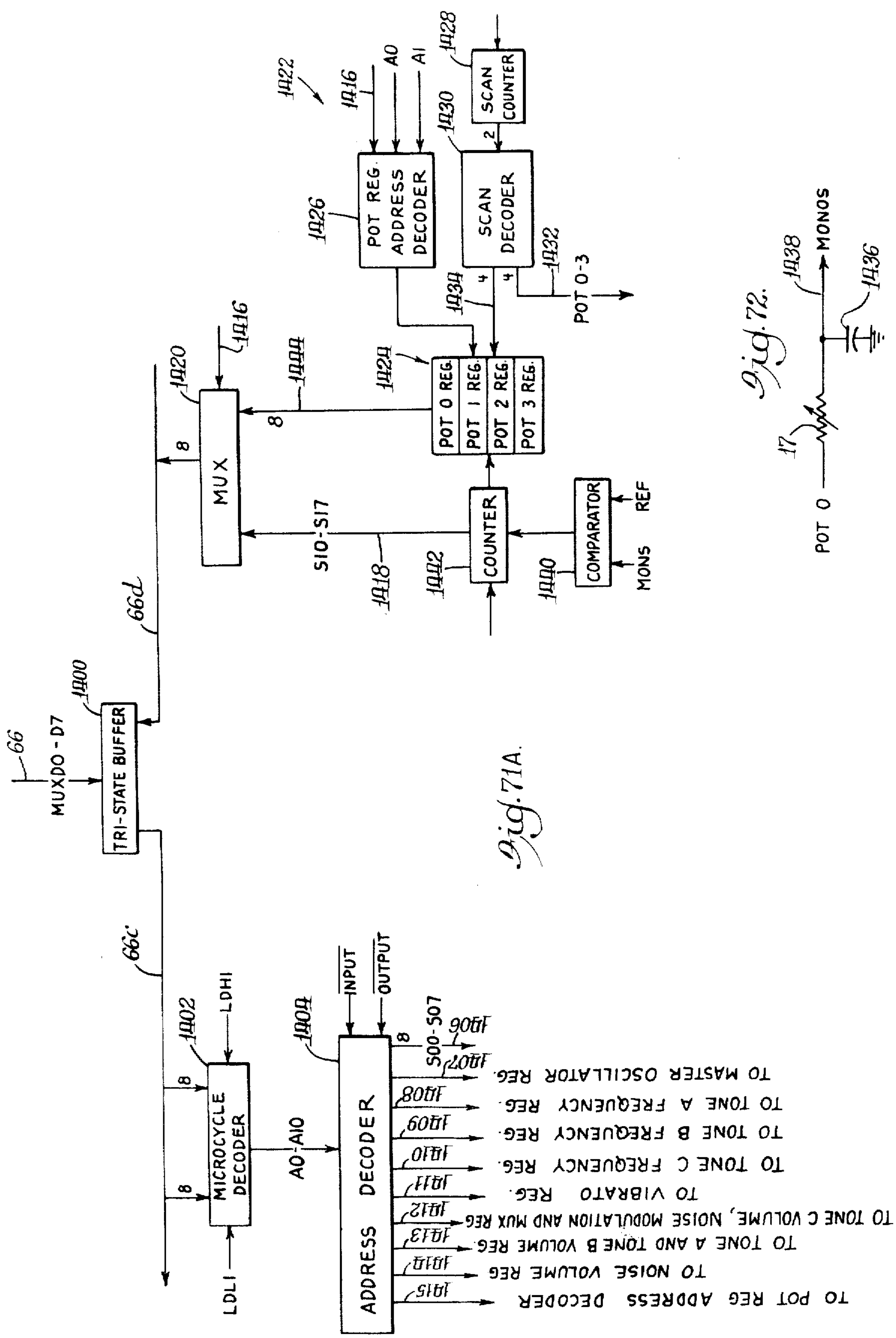
Figure 71B:
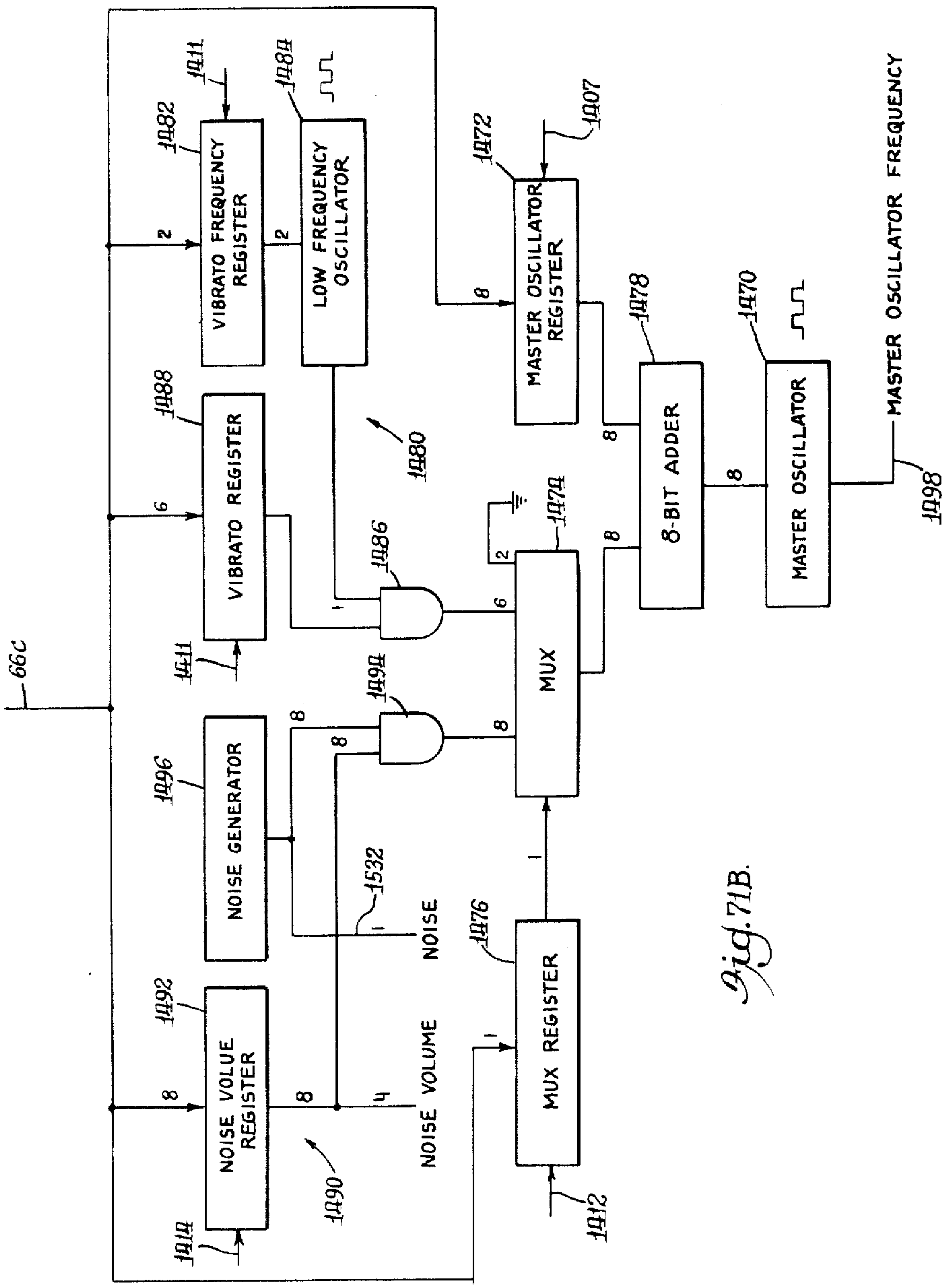
Figure 71C:
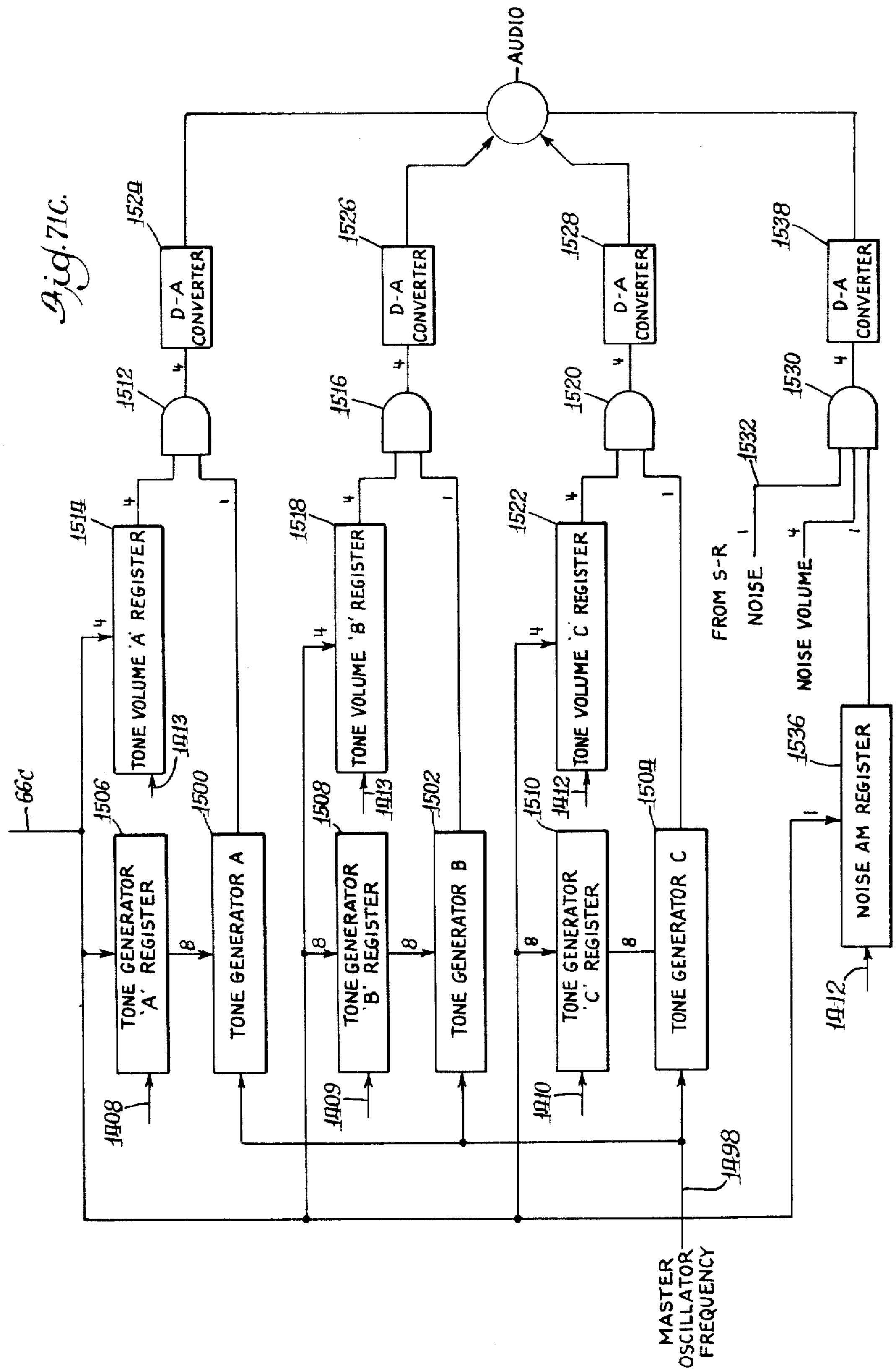
Figure 73A:
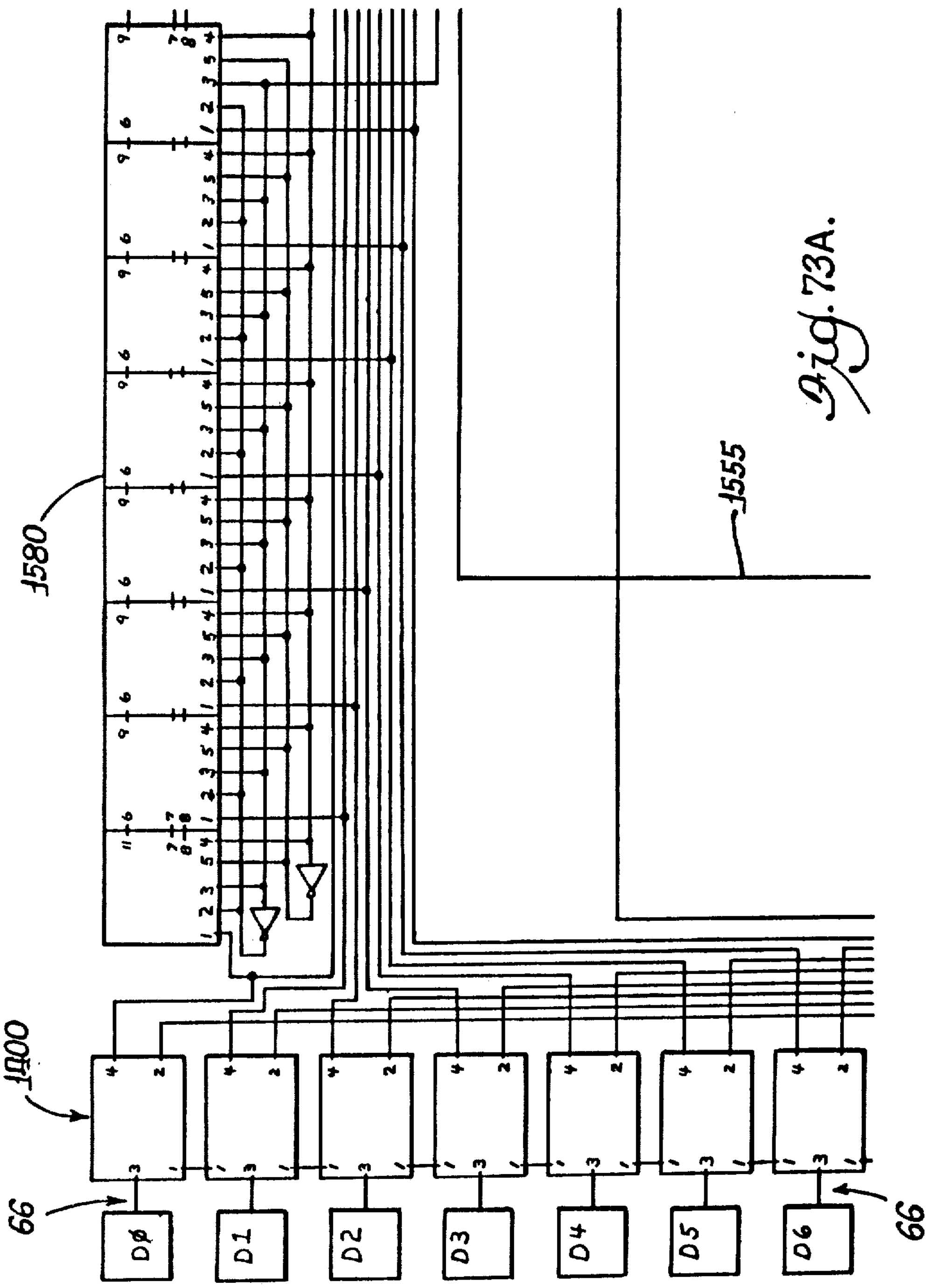
Figure 73B:
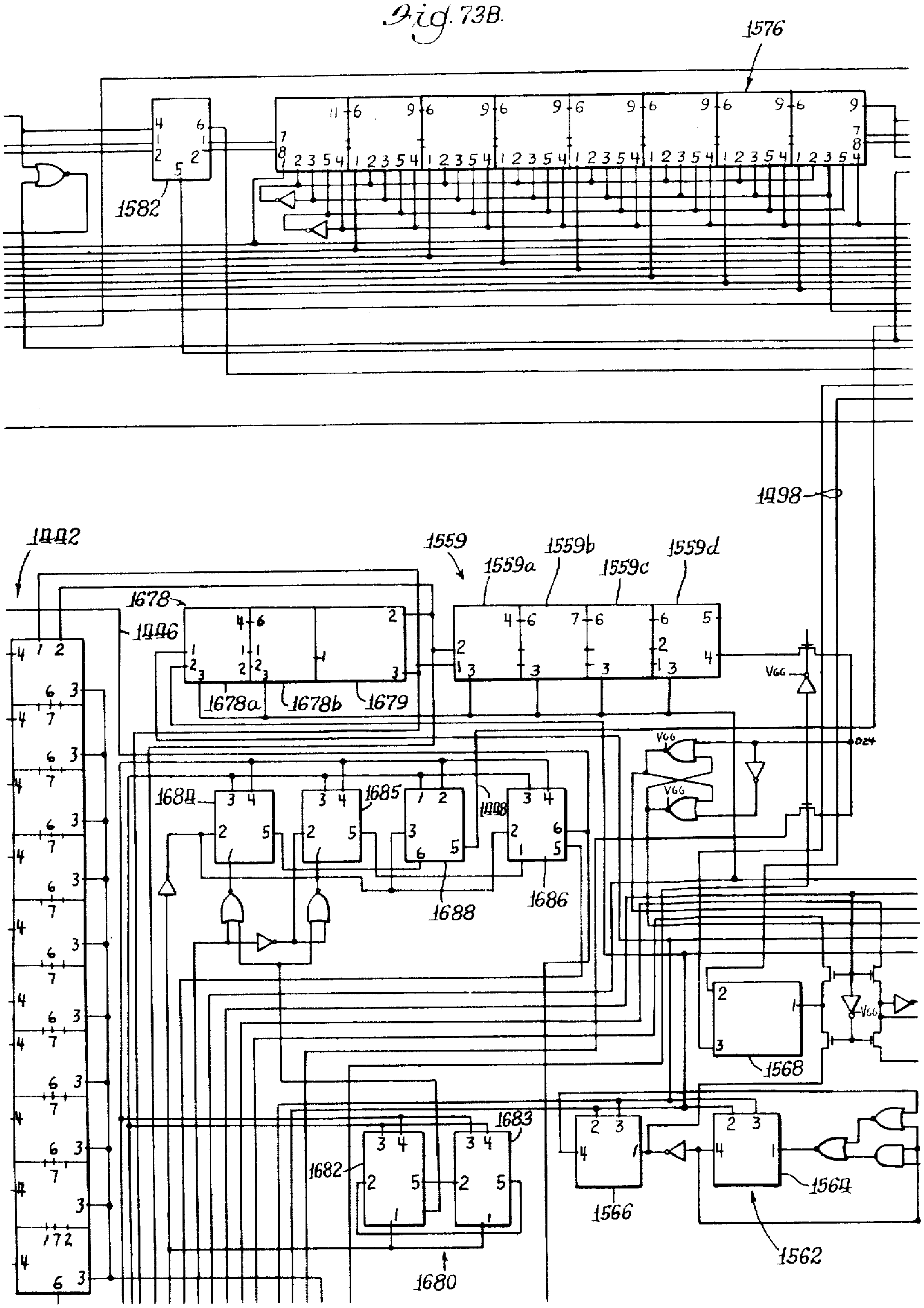
Figure 73C:
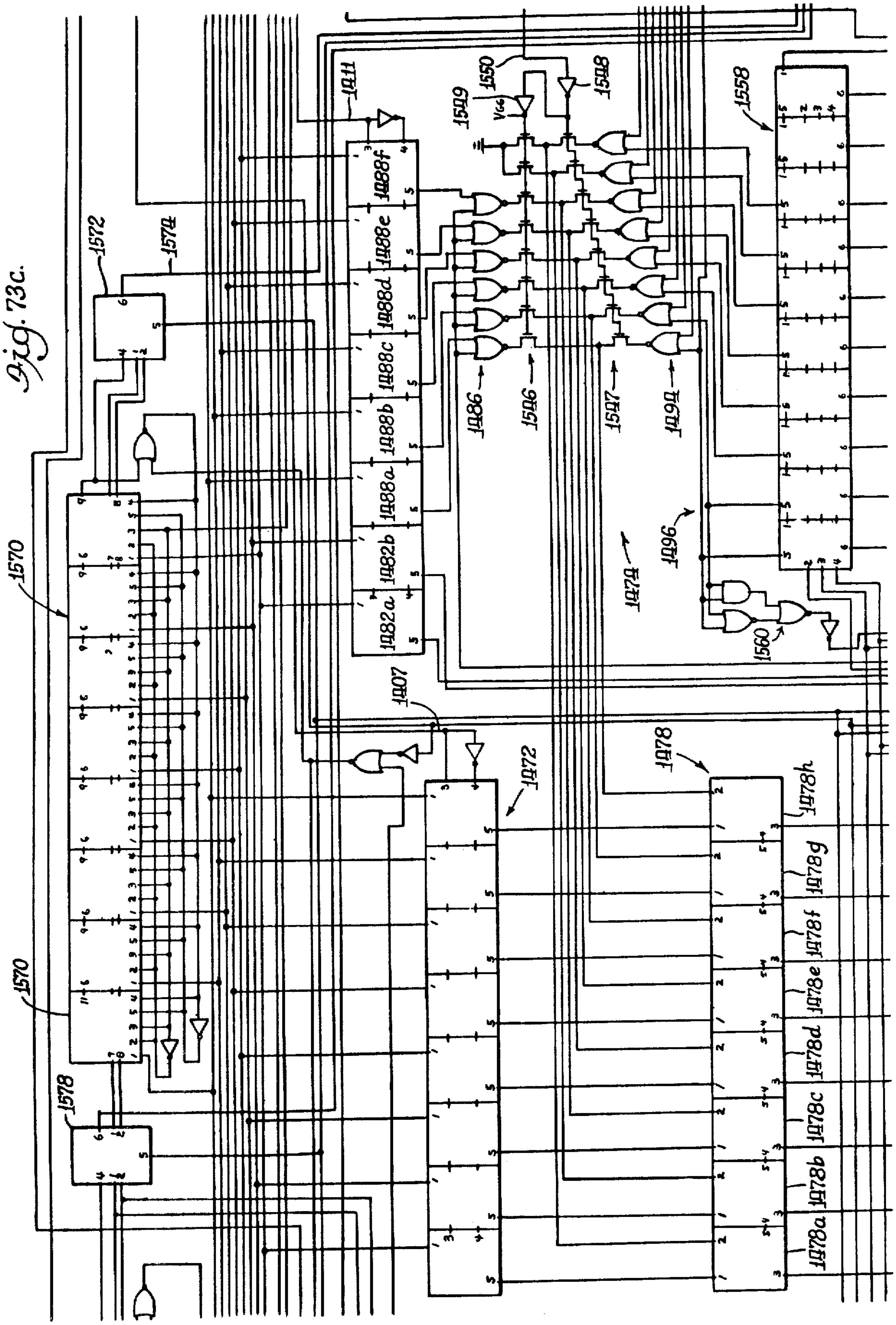
Figure 73D:
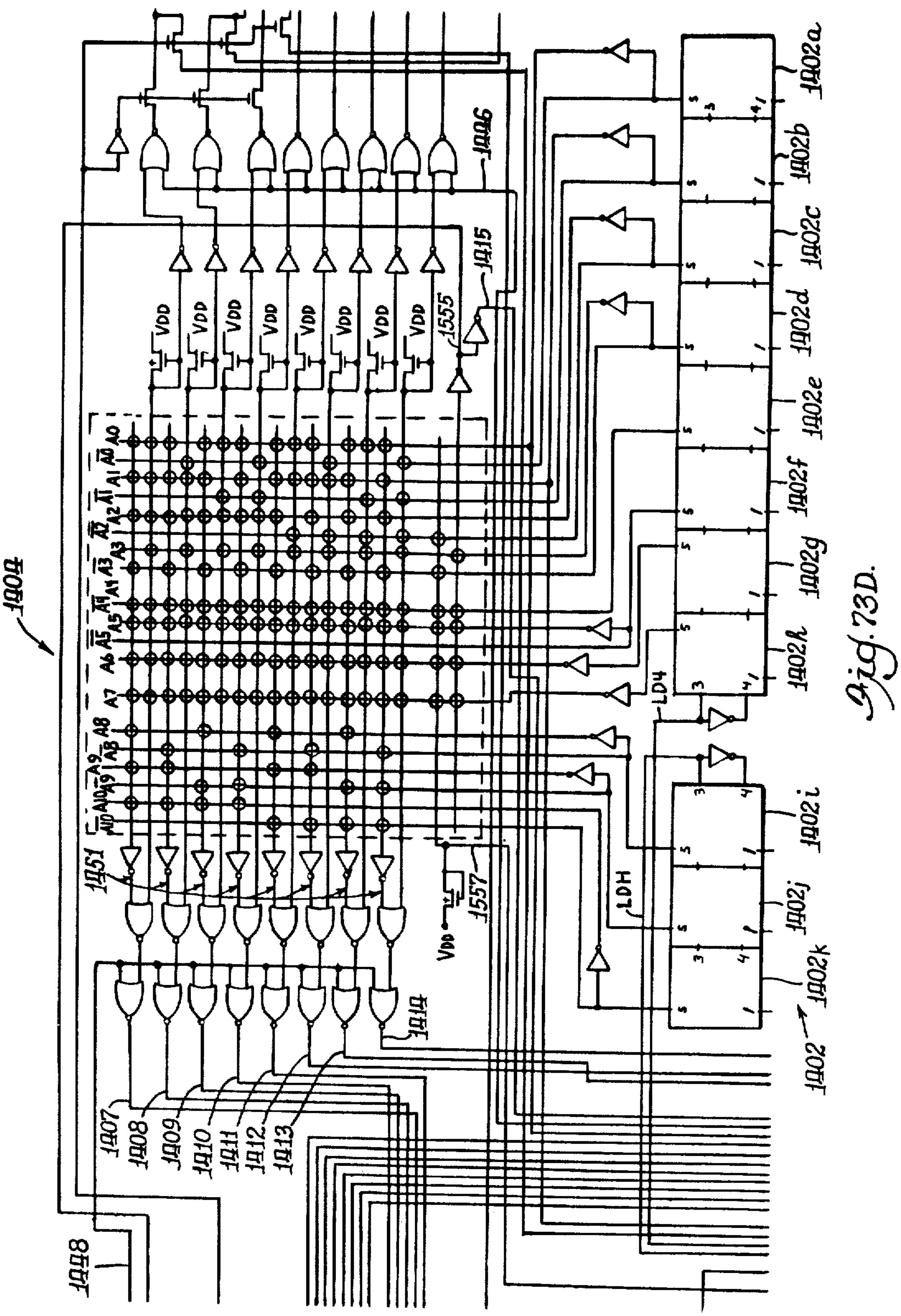
Figure 73E:
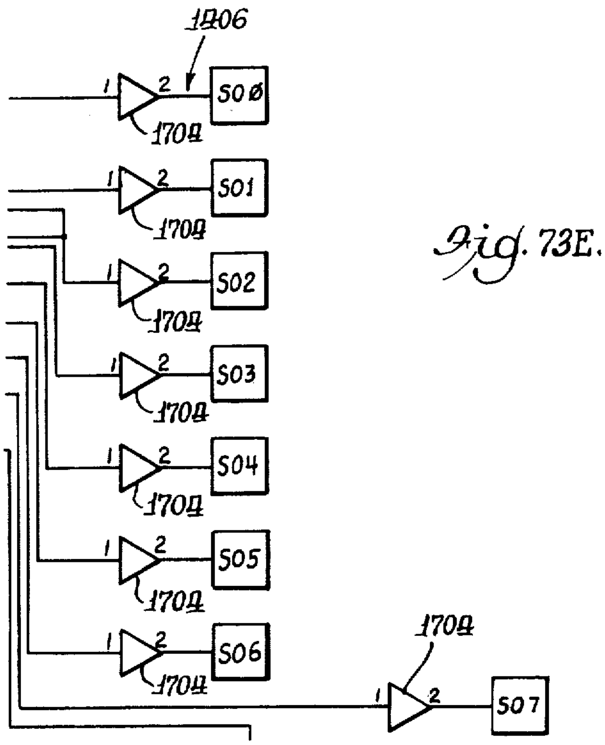
Figure 73F:
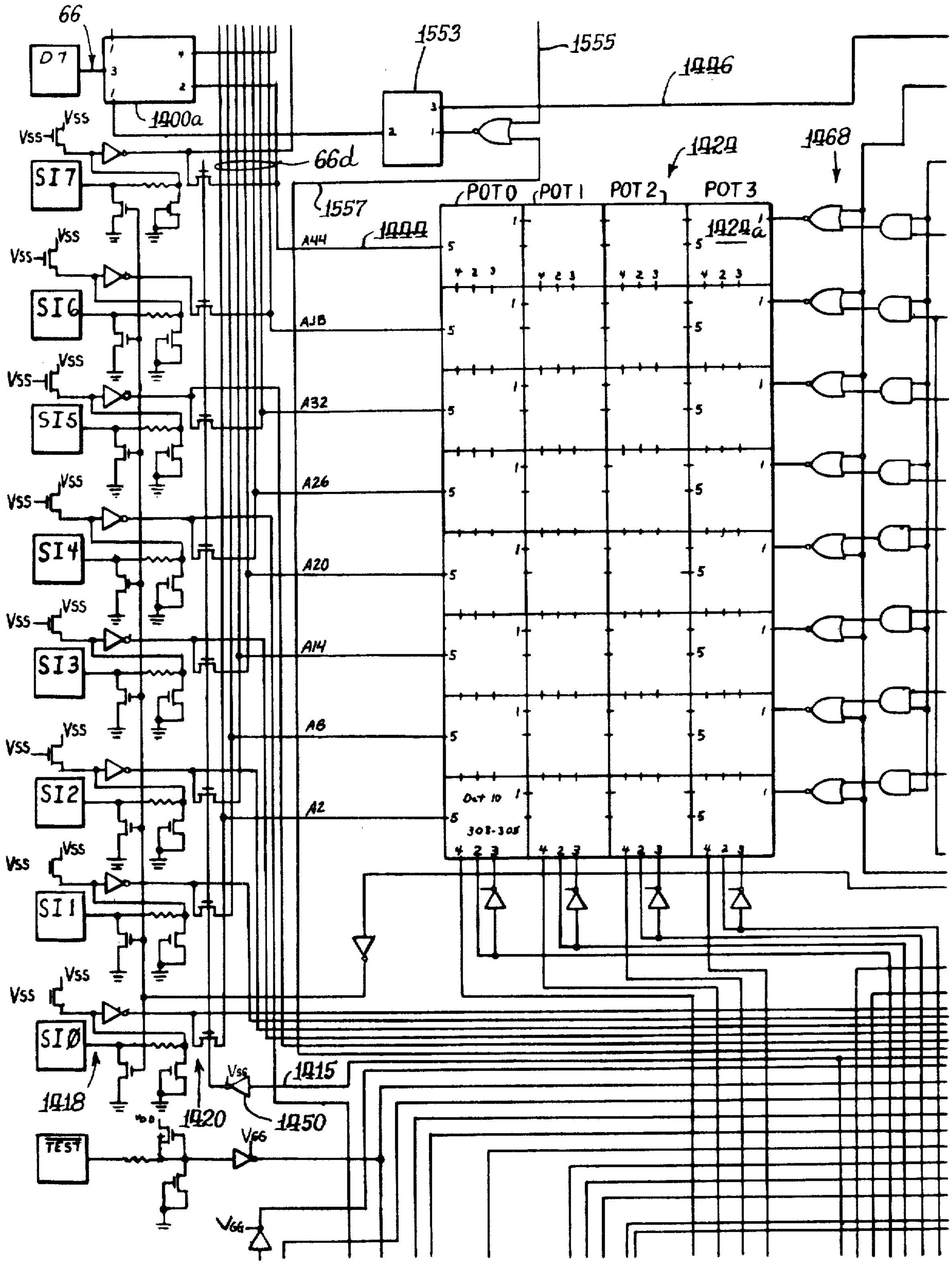
Figure 73G:
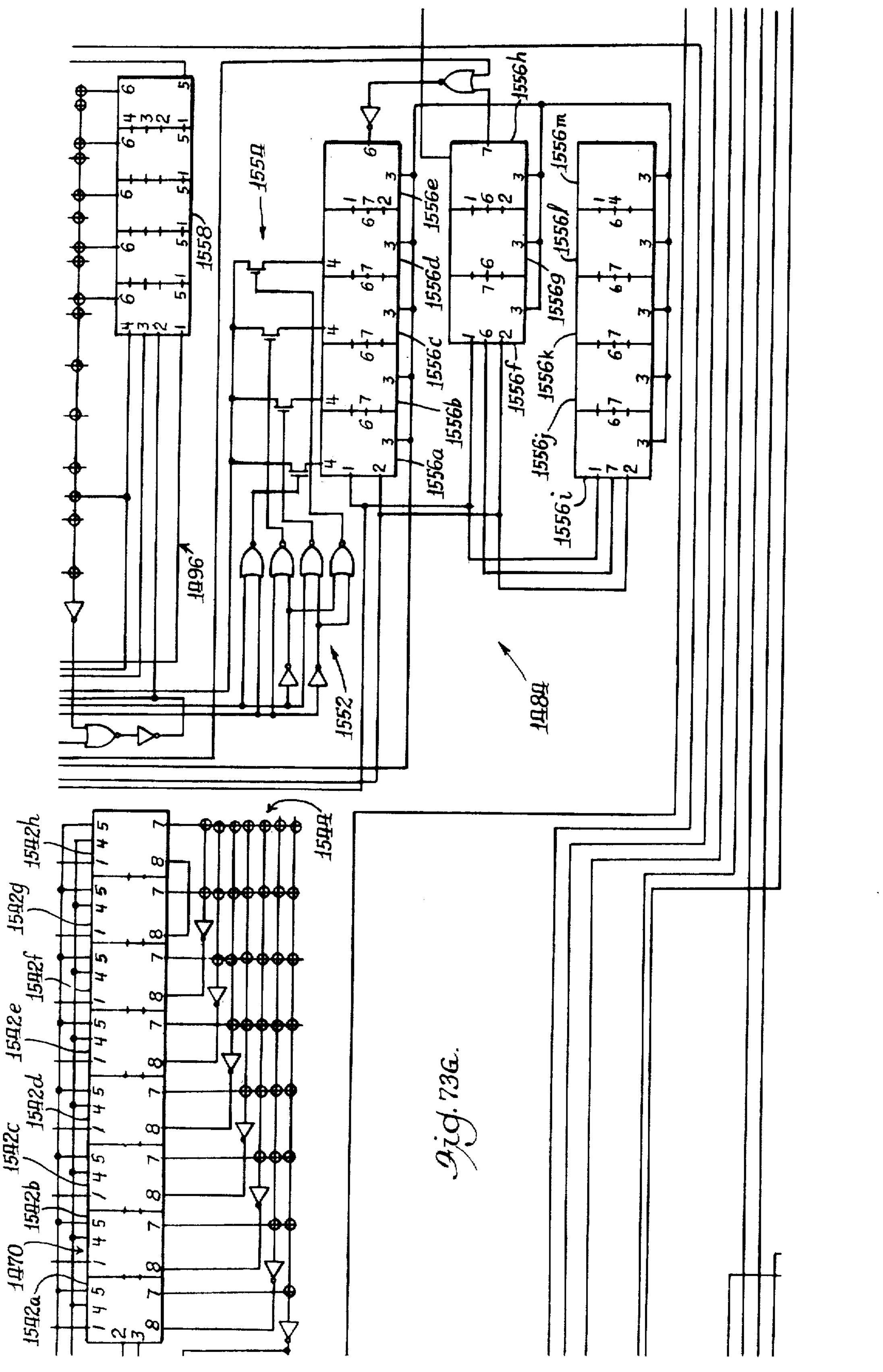
Figure 73H:
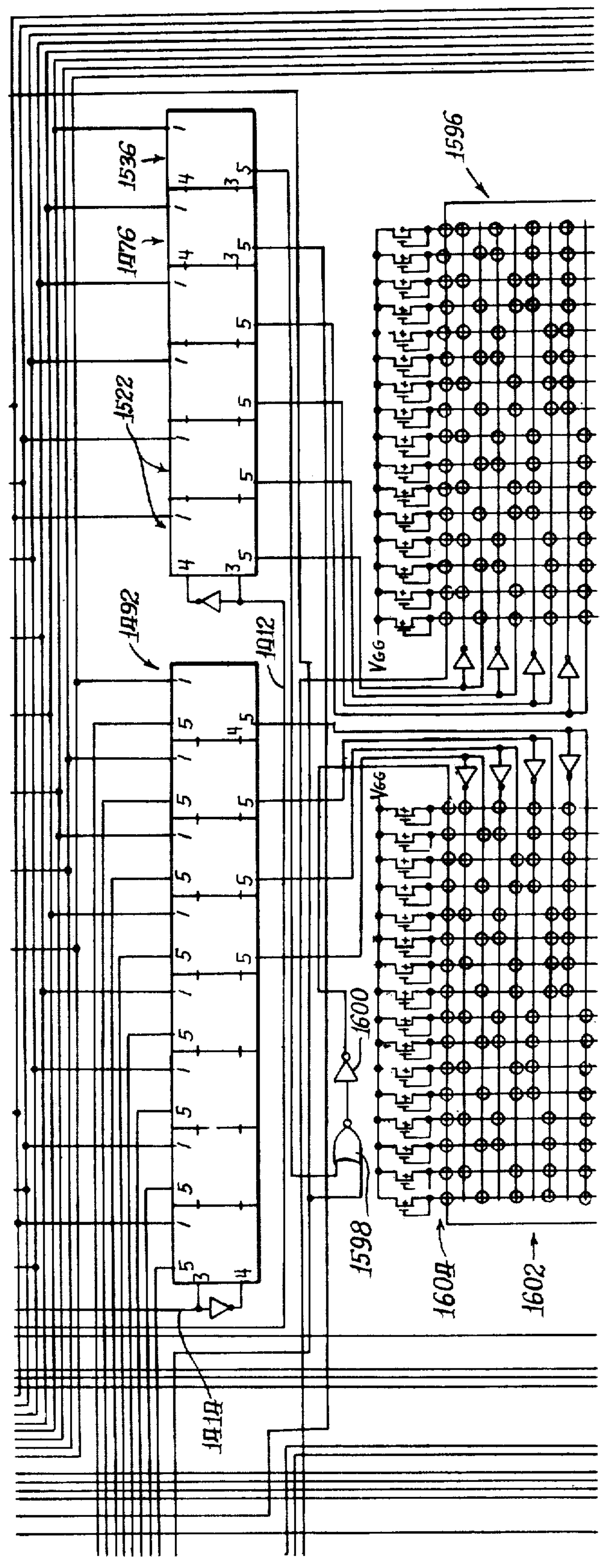
Figure 731:
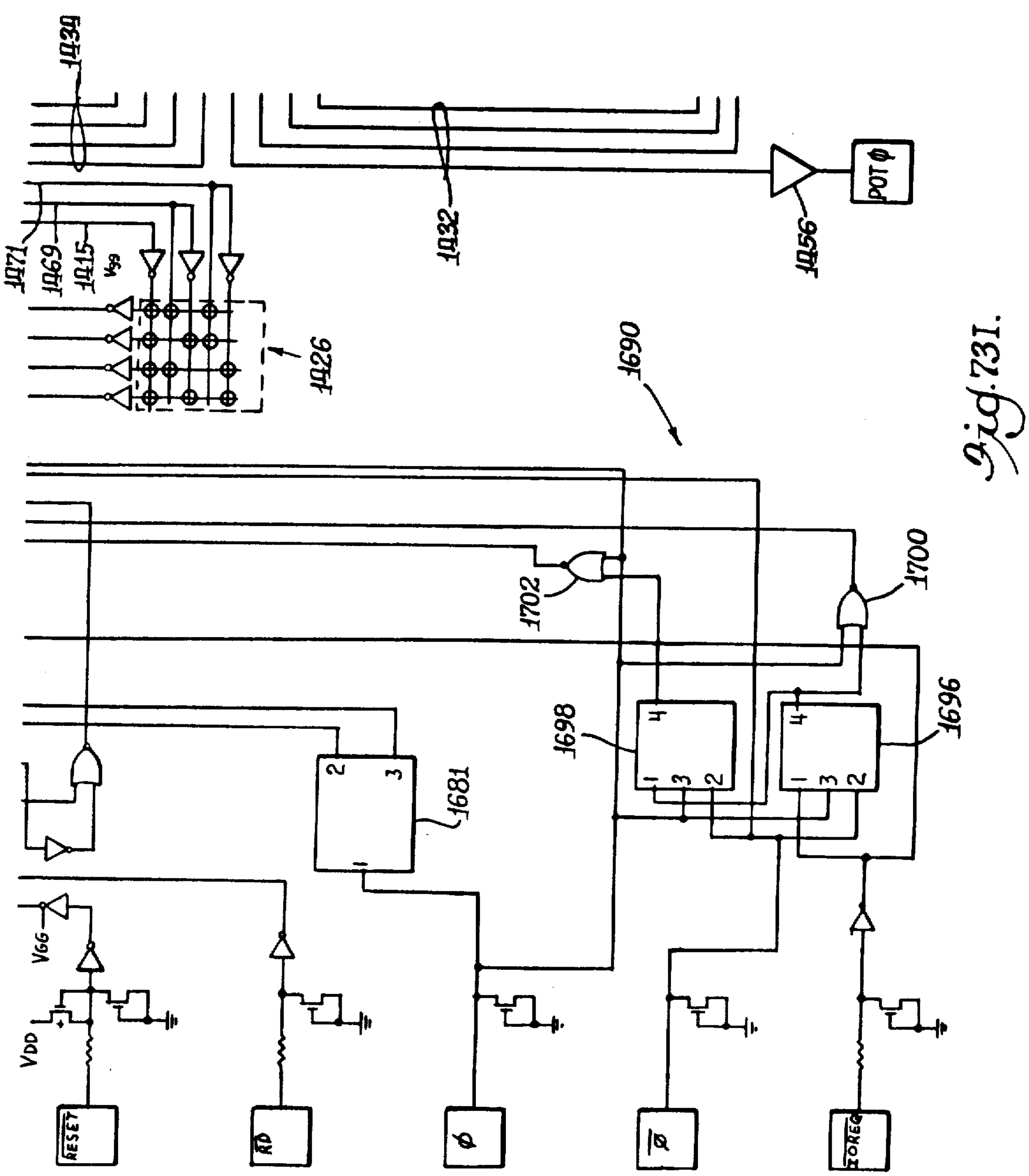
Figure 73J:
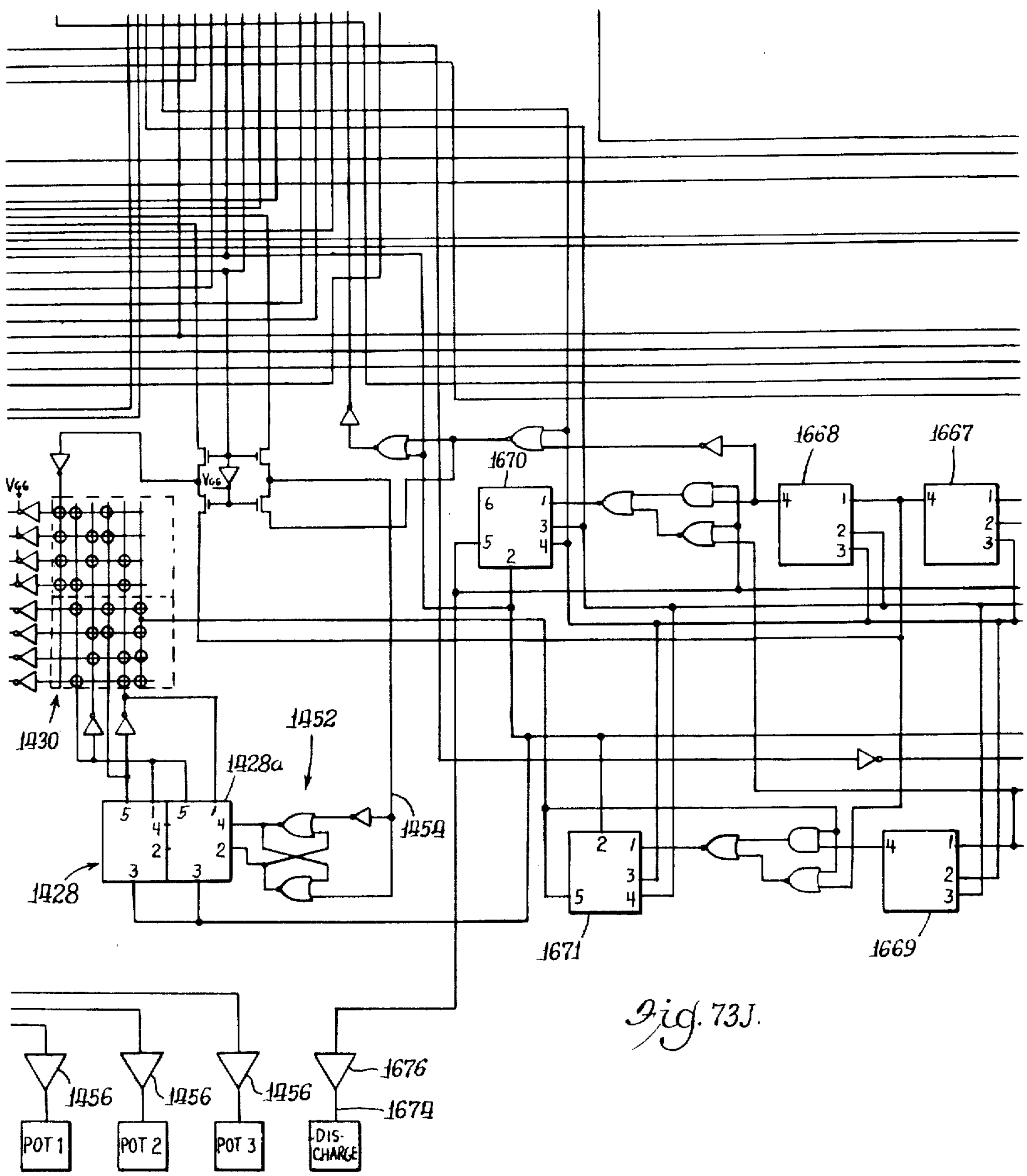
Figure 73K:
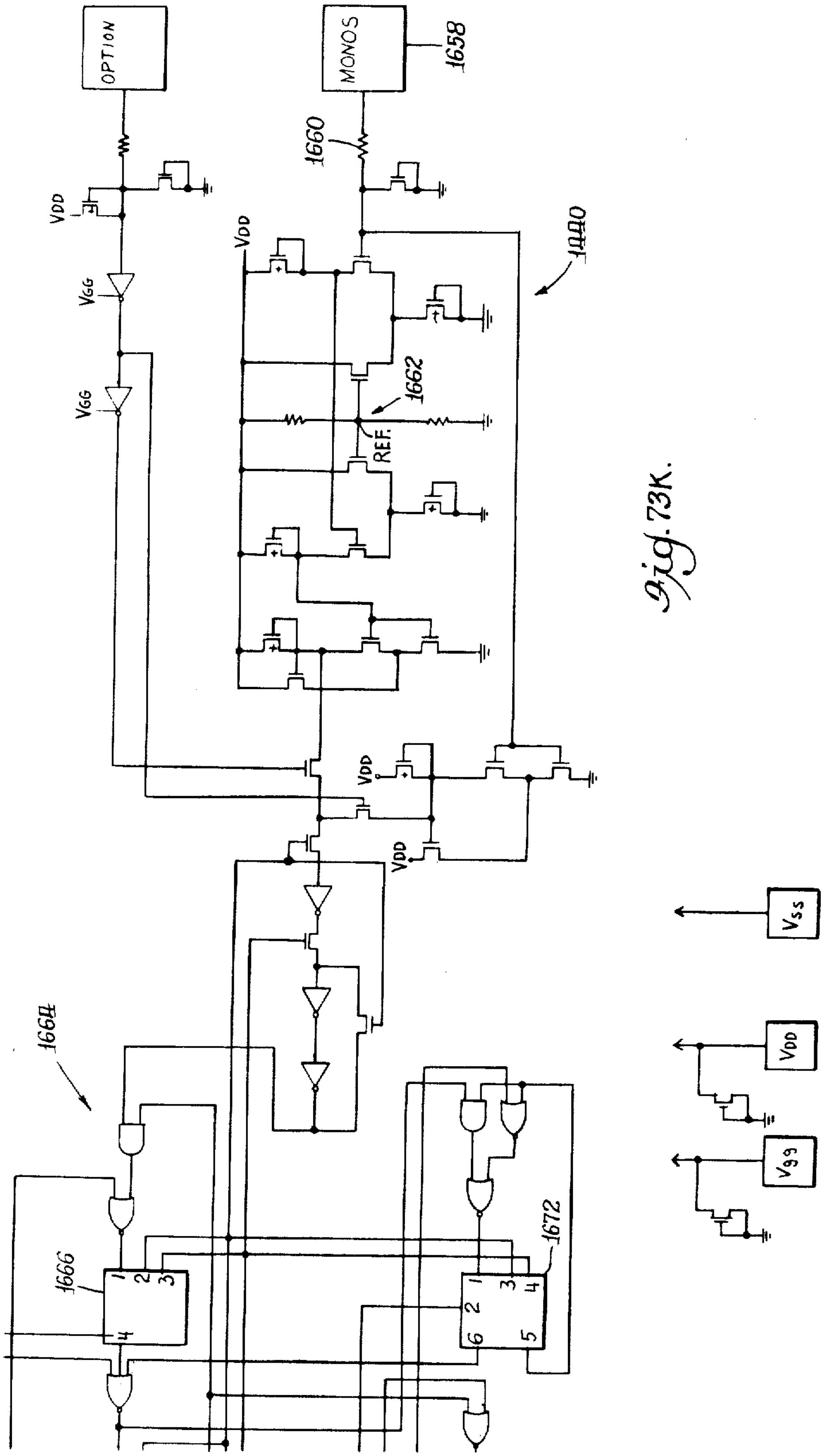
Figure 73L:
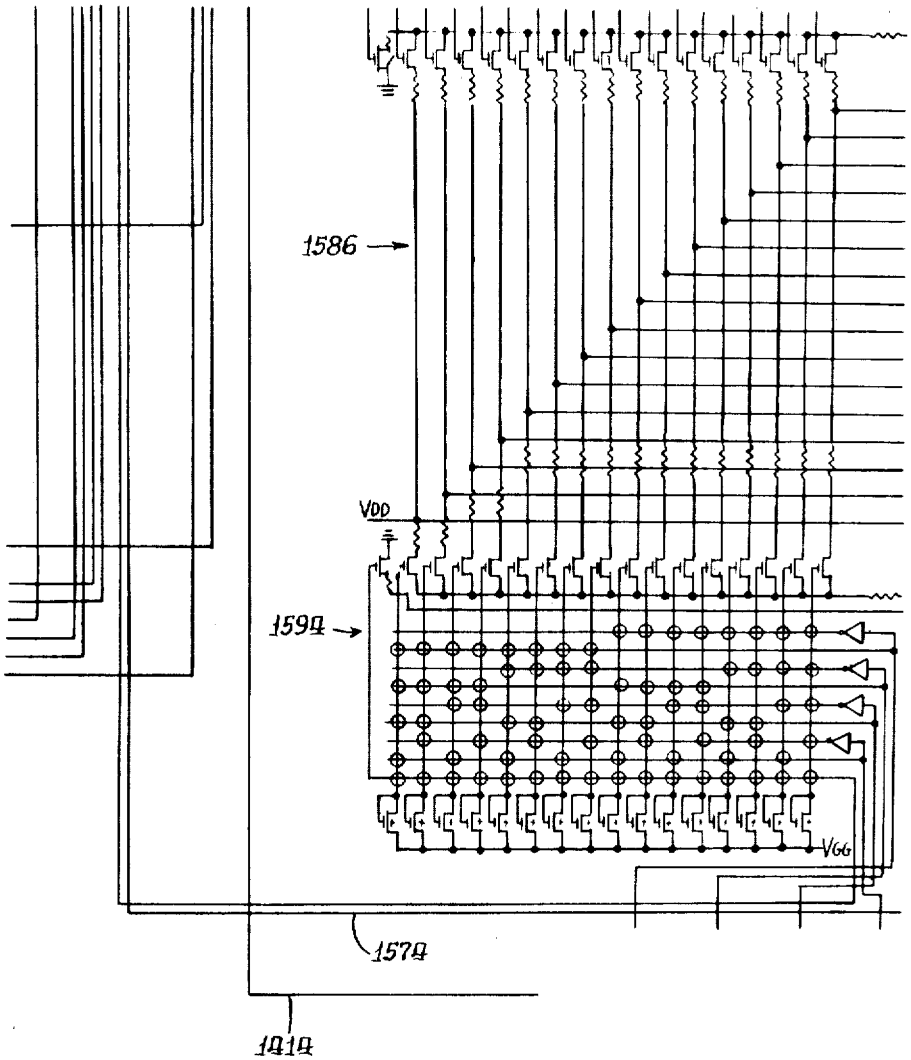
Figure 73M:
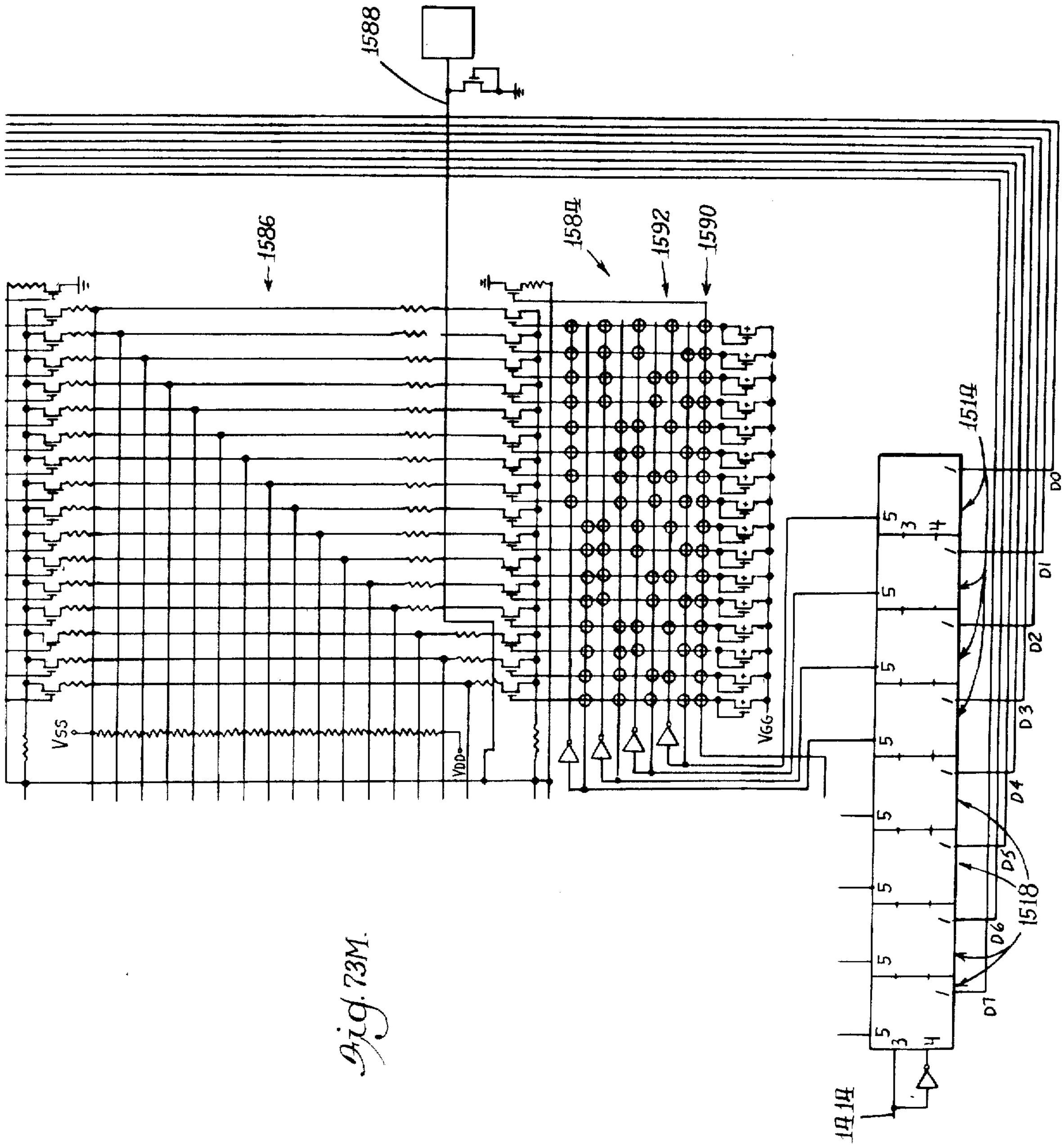
Figure 85:
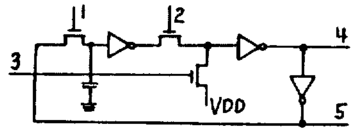

FIG. 40 illustrates the pixel data contained in registers of a rotator circuit of the video processor;

FIGS. 41–43 illustrate the relationship among control, clock and synchronization signals of the system;

FIG. 44 is a block diagram of the address chip of the video processor;

FIGS. 45A–J show a more detailed circuit of the address chip;

FIG. 46 illustrates a composite view of FIGS. 45A–J;

FIGS. 47–70 are diagrams showing blocks of FIGS. 45A–J in greater detail;

FIGS. 71A–C are block diagrams of the input/output chip;

FIG. 72 illustrates a circuit for the generation of an input signal;

FIGS. 73A–M show a more detailed circuit of the input/output chip;

FIG. 74 is a composite view of the FIGS. 73A–M; and

FIGS. 75–97 are diagrams showing blocks of FIGS. 73A–M in greater detail.

The preferred embodiments of the present invention are hereinafter described. In general, the system comprises a display for providing discrete picture elements for presentation of movable symbols and a display memory for storage of digital signals representative of picture elements of the display. The system further comprises a computer having a program memory for receiving digital input signals and supplying digital output data signals and other digital output signals representative of picture elements in response to the input signals and program memory. A video processor means is operatively connected to the computer and display memory for selectively performing a plurality of modifications to the picture element output signals from the computer in response to the output data signals and also for transferring the modified picture element signals to the display memory. The video processor means is also operatively connected to the display for supplying signals thereto in response to the digital picture element signals stored in the display memory whereby the picture elements represented therein are displayed.

The system shown in FIG. 1 comprises a computer console 10 having four player-operated control handles 12*a–d* connected by coiled line cords 14*a–d*, respectively, to the computer console 10. Thus, the console 10 can accommodate up to four players at a time. Each control handle has a trigger switch 16 and a top mounted joy-stick 17 for actuating four directional switches. The joy-stick 17 has a rotatable knob mounted thereon which controls a potentiometer. The console 10 further has a keypad 18 which has a plurality of keys or push-buttons such as indicated at 20, and a slot 22 for receiving a removable cartridge or cassette 24 containing stored programs. The console 10 further has a cassette eject button 26 for ejecting the cassette whereby the cassette 24 may be easily replaced with a different cassette containing different programs.

A display for presenting movable symbols is shown as a standard color television receiver 28 which is connected to the computer console 10 by a line 30. The television (TV) has a cathode ray tube screen 32 on which a plurality of movable symbols such as the cowboys 36 and 38 are presented for a "Gunfight" game. The picture presented on the screen 32 is made up of the cowboy symbols 36, 38, and a cactus symbol 40 superimposed on a background each in one or more of a variety of color and intensities and comprises a plurality of discrete picture elements or pixels.

A symbol's action is controlled in part by a control handle. For example, the cowboy 36 may be moved up, down, left, right, up and to the left, up and to the right, etc., by proper movement of the joy-stick 17. The direction of the cowboy's shooting arm may be controlled by rotating the potentiometer control knob of the joy-stick 17 and the gun may be fired by pulling the trigger 16. Should the bullet 41 strike the cowboy 38, the cowboy 38 will be caused to fall by a computer system contained within the console 10. In addition, suitable music such as the "Funeral March" will be played by the computer through the television 28.

A shematic block diagram of the computer system of FIG. 1 is shown in FIG. 2 to comprise a display memory for storage of digital signals representative of picture elements of the display (or pixel data) which is shown as a display random-access-memory (RAM) 42. The system further comprises a digital computer 44 which is shown to include a central processing unit (CPU) 46 which may be a microprocessor, for example. The computer 44 has a program memory which includes a system read-only-memory (ROM) 48 and a cassette ROM 24 connected to the CPU 46. The program memory contains instructions to direct the CPU 46 and the symbols and figures stored in digital form for the particular computer functions and games.

The cassette ROM 24 may be easily removed by pressing the ejector buttom 26 (FIG. 1) and replaced by another cassette in order to change a portion of the program memory. This greatly enhances the flexibility of the system in that a potentially endless variety of game and functions may be performed by the computer console 10 and TV display 28.

The computer 44 is operatively connected to an input/output (I/O) chip 50 and a video processor 52 comprising an address chip 56 and a data chip 54 through a microcycler interface 60. The control handles 12*a–d* and the keypad 18 are connected to the I/O chip and provide signals in response to manipulation by the players or operators to the I/O chip 50. The digital computer 44 receives the input signals from the I/O chip 50 in digital form and supplies digital output data signals and digital pixel data signals in response to the input signals and the program memory. The I/O chip 50 has a music processor which provides audio signals in response to output data signals from the computer to play melodies or generate noise through the TV 28.

The data chip 54 of the video processor 52 selectively performs a plurality of modifications to the pixel data signals from the computer in response to the output data signals from the CPU. The video processor is operatively connected to the display RAM 42 and transfers the modified or unmodified pixel data to the display memory 42 at address locations corresponding to address signals transmitted by the address chip 56. The computer 44 transmits the address to the address chip 56 which relays the address to the display RAM 42.

The video processor 52 is also operatively connected to the TV display 28 to supply signals to the display modulated by a radio frequency (RF) modulator 58 in response to the pixel data stored in the display RAM 42. The address chip 56 internally generates addresses for sequentially reading the pixel data stored in the display RAM 42 whereby the pixels represented in the display memory are displayed.

The microcycler 60 interfaces the computer 44 to a peripheral device such as the video processor 52 and the input/output chip 50. The computer provides a plurality of address signals on a plurality of address lines, a plurality of data signals on a plurality of data lines, and a plurality of control signals on a plurality of control lines to the microcycler 60. The purpose of the microcycler 60 is to combine the address lines and the data lines from the CPU 46 into one data bus 66 to the video processor 52 and the I/O chip 50.

The computer system is shown having an additional input device light pen 62, which provides an additional input signal to the computer 44. The light pen 62 is sensitive to light and may be used as a pointer by a player or operator to identify points on the TV screen 32 as will be more fully explained later.

The illustrated apparatus is a full-color video game and home computer system based on a mass-RAM-buffer technique in which two bits of the display RAM 42 are used to define the color and intensity of the pixel on the screen 32. The display RAM 42 has eight bits or a byte at each memory address or location at which data may be read or rewritten. In this manner, the picture on the screen is defined by the contents of the display RAM which can be easily changed by modifiying the contents of the display RAM. Data which defines pixels will be referred to as "pixel data".

The specific system of the illustrated embodiment uses a Zilog z—80 microprocessor as the CPU 46 of the computer 44. The system ROM 48 contains software or programming for a plurality of games. The cassette ROM 24 is a solid state cassette which provides additional memory whereby additional games may be played. These ROM's also contain pixel data which represents various game figures and symbols.

Figure 3B:
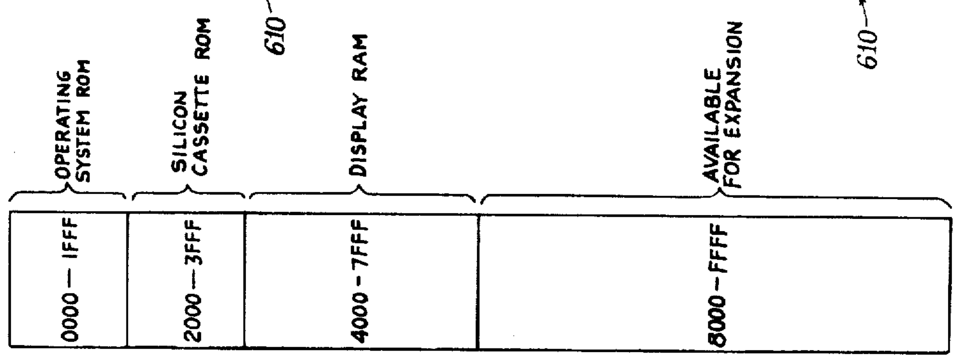
FIGS. 3A and 3B are charts illustrating the memory address allocations for low and high resolution alternative modes of operation.
Figure 3A:
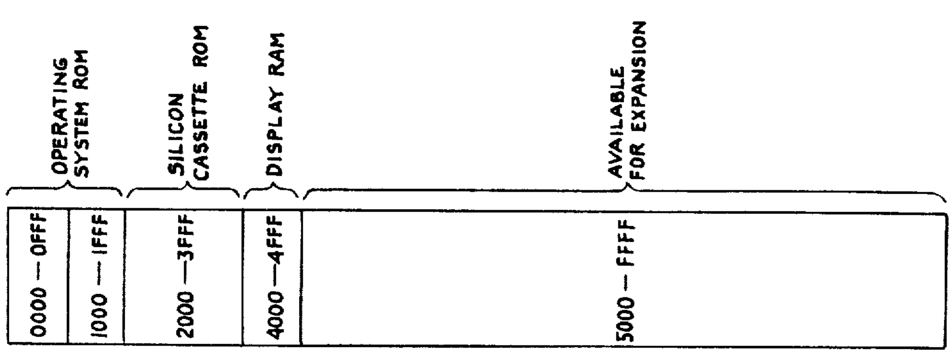

The system may be operated in a high resolution or low resolution mode. The high resolution mode generates a greater number of pixels per unit screen area resulting in a higher resolution. In both the low and high resolution modes, the operating system ROM 48 is allocated the first 8K of memory space; that is, approximately the first eight thousand memory addresses correspond to the system ROM 48 as shown in FIGS. 3A and 3B. Thus, addresses 0000-IFFF (hexadecimal) are addresses for the memory locations of the system ROM. The cassette ROM 24 has the next 8K of memory space, or memory addresses 2000-3FFF (hexadecimal), hereinafter "H") in both modes. The display RAM memory space begins at 16K or memory address location 4000H.

In the low resolution mode, the display screen RAM has 4K bytes; in the high resolution, 16K bytes.

The CPU can transfer the pixel data of a pattern or figure stored in either the system or cassette ROM to the display RAM via the video processor. As noted before, the video processor may perform a variety of modifications to the pixel data before it is written into the display RAM. The modifications are performed by what will be called a "function generator" which is located on the data chip 54 of the video processor 52. The modifications are performed by the function generator when the address bit A14 of the address of the data is a 0. Thus, the address of data to be modified by function generator and written into the display RAM will be less than $2^{14}$ or 3FFF H. Consequently, the address of the data to be modified will be between 0000 H and 3FFF H for the high resolution embodiment and between 0000 H and 0FFF H for the low. However, when the data is written the system actually writes the modified data in the display RAM at locations corresponding to addresses 40000-and 4FFF H for the low resolution model and 4000 H-7FFF H for the high resolution model. The system distinguishes a memory read from ROM addresses 000-1FFF H from a memory write to modified data display RAM addresses 0000-1FFF by circuitry external to the ROM and RAM chips shown in FIGS. 10A and B.

All memory space above 32K (memory location 8000 H) is available for expansion. In the low resolution mode, memory addresses 5000-8000 H are also available for expansion.

Figure 4A:
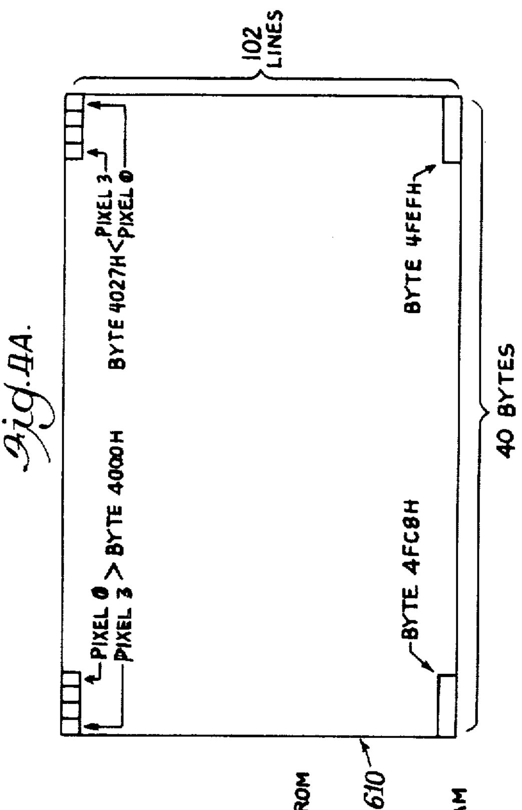
FIGS. 4A and 4B are diagrams illustrating the correspondence between the memory address locations in the display memory with the pixels of the display screen for the low and high resolution modes, respectively.

In the illustrated computer system, two bits of display RAM 42 are used to define a pixel on the screen. Thus, an 8-bit byte of the display RAM defines 4 pixels on the screen. In the low resolution mode, 40 bytes are used to define a line of data as shown in FIG. 4A. This gives a horizontal resolution of 160 pixels. The vertical resolution is a 102 lines. The areas 610 of the screen defined by the display RAM 42 therefore requires 102×40=4080 bytes. More of the RAM 42 can be used for scratch pad by blanking the screen before the 102nd line is displayed as will be described more fully later.

Figure 4B:
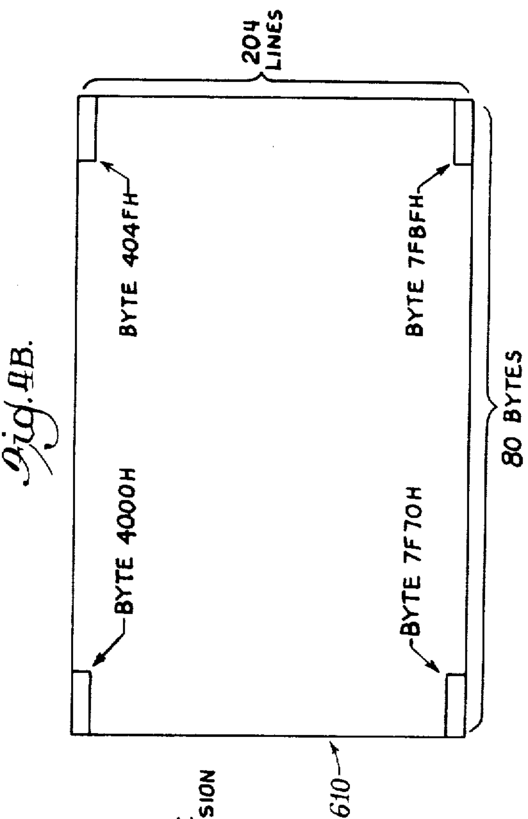

In the high resolution mode, there are 80 bytes or 320 pixels per line as shown in FIG. 4B. The vertical resolution is 204 lines thus requiring 16,320 bytes of display RAM. This leaves 64 bytes of RAM for scratch pad memory.

In both the high and low resolution modes, the first byte of the display RAM 42 (address 4000 H) corresponds to the upper left and corner of the area 610 of the display screen 32 defined by the display RAM. The last byte of the first line in the low resolution mode has address 4027 H with the last byte of the first line in the high resolution mode having address 404F H. In the low resolution mode, the highest display address (4FFF H) corresponds to a byte which corresponds to the lower righthand corner of the screen. Thus, as the RAM addresses increase, the position on the screen associated with the addressed bytes moves in the same directions as the TV scan: from left to right and from top to bottom.

The address chip 56 of the video processor 52 sequentially generates the addresses 4000 H to 4FFF H (7FFF H for the high resolution mode) as the screen is being scanned so that each byte defining 4 pixels is read in order to supply information necessary to display the corresponding 4 pixels of the picture. The 4 pixels associated with each byte are displayed with Pixel 3 defined by bits 6 and 7 shown on the left displayed first. Thus bits 6 and 7 of byte 4000 H define the pixel in the extreme upper lefthand corner of the screen area corresponding to the display RAM.

As noted earlier, two bits are used to represent each pixel on the screen. These two bits, along with a left/-right bit (which will be more fully explained later) map the associated pixel to one of eight different "color" registers 0–7. Thus, two bits from the display memory together with the left/right bit identify or select one of the eight different color registers. If the two bits from the display memory have the binary value 00, the color register will be color register 0 or 4 depending upon the left/right bit. Similarly, bits having the binary value 01 select register 1 or 5 depending on the left/right bit, etc.

Each color register is an 8-bit register for storage of output data from the computer. The binary bits in a selected color register define the color and intensity characteristics of the associated pixel to be displayed on the screen. The intensity of the pixel is defined by the three least significant bits of a color register, with 000 for darkest and 111 for lightest. The colors are defined by the 5 most significant bits. Thus each color register can define 1 of $2^3$ intensity levels and 1 of $2^5$ different colors. The CPU can change the data stored in the color registers which will cause the colors and intensities of subsequent pixels displayed to also change.

Figure 5:
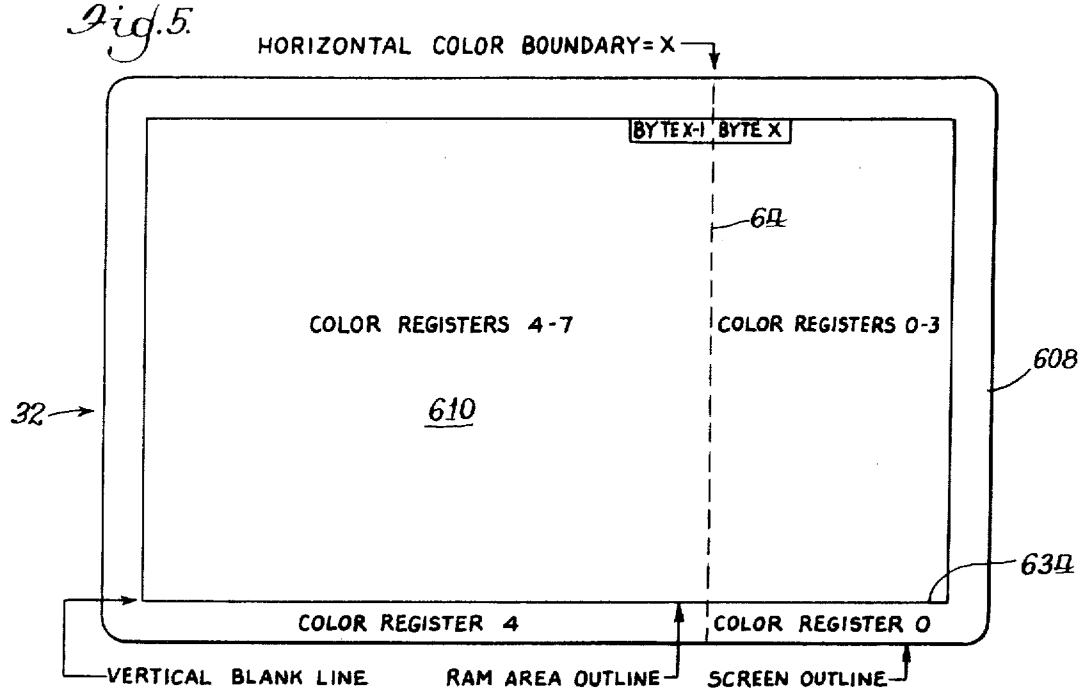
FIG. 5 is a diagram illustrating the correspondence of color registers 0–7 with particular display screen areas.

A horizontal color boundary register defines the horizontal position of an imaginary vertical line 64 on the screen 32, referring now to FIG. 5. The boundary line 64 can be positioned between any two adjacent bytes in the low resolution mode. The line is immediately to the left of the byte whose address is sent to the horizontal color boundary registor. For example, if the horizontal color boundary is set at 0 by the computer, the line will be just to the left of the byte 0 if it is set to 20, the line will be between bytes 19 and 20 which corresponds to the center of the screen.

The left/right bit is an additional register identifying signal supplied by the video processor in response to the data stored in the horizontal color boundary register. If a byte is to the left of the boundary, the left/right bit of the four pixels associated with that byte is set to 1. The left/right bit is set to 0 for pixels associated with a byte to the right of the boundary line 64. Color registers 0–3 are selected by a left/right bit=1, i.e., for the pixels to the right of the boundary line, and registers 4–7 are selected for the pixels to the left of the boundary. Thus, if a byte read from the display RAM 42 has the values 00 11 10 00, and was to the right of the boundary line, for example, the four pixels will be difined by color registers 0, 3, 2, and 0, respectively. However, if the byte was located to the left of the horizontal color boundary line, the four pixels will be defined by color registers 4, 7, 6, and 4 respectively.

In the high resolution mode, if a value X is sent to the horozontal color boundary register, the boundary line will be between bytes having addresses 2X and 2X-1 which corresponds to the same position on the screen as the low resolution mode but between different bytes. Thus, for example, if the value 20 is sent, the boundary will be between 39 and 40, corresponding to the center of the screen. To put the entire screen, including the rightside background, to the left of the boundary line 64, the horizontal color boundary line register should be set to 44.

If just four color registers are used, all the information necessary to generate the color and intensity of a particular picture may be stored utilizing only two bits of storage together with the color registers. However, the left/right bit and eight registers give added flexibility. The color and intensity pattern of a picture stored in memory may be quickly modified in one step by selective placement of the horizontal color boundary. For example, if the entire screen is to the right of the horizontal color boundary, the colors and intensities of the pixels will be selected from color registers 0–3. On the other hand, placing the entire screen to the left results in the colors and intensities of color registers 4–7 being utilized. In this manner, the colors and intensities of the entire picture may be altered by merely changing the address of the horizontal color boundary.

On most television screens, the area 610 defined by the display RAM will be somewhat smaller than the total screen area. Thus there will generally be extra space on all four sides of the display screen not defined by the display RAM. The color and intensity of this area is defined by a two-bit "background" color register. These two bits along with the left/right bit combine to identify one of the 8 color registers which determines the color and intensity of the particular background area. For example, if the two bits contained in the background color register have the value 00 the color and intensity of the background area to the right of the boundary line 54 will be defined by the color register 0, with the area to the left defined by the color register 4, as shown in FIG. 5.

As described earlier, the function generator is enabled to modify pixel data when the data is to be written to a memory address "X" less than 4000 H (A14=0) and that a modified form of the data is actually written to memory location X+4000 H in the display RAM. A register hereinafter called the function generator register determines how the data is modified.

The functions performed on the pixel data are: "expand", "rotate", "shift", "flop", "logical-OR" and "exclusive OR". As many as four of these functions can be used at any one time and any function can be bypassed. However rotate and shift as well as logical-OR and exclusive OR are not done at the same time. The modified pixel data is stored in the display RAM whereby the pixels associated with the pixel data appear similarly modified when displayed.

Referring back briefly to FIG. 2, the microcycler has an 8-bit data bus 66 connecting the microcycler to the video processor 52 and I/O chip 50. The expand function expands the 8 bits contained on the microcycler data bus into 16 bits where each bit of the 8 bits represents one pixel. In other words, it expands 1-bit pixel into 2-bit pixel data. For example, a 0 on the data bus is expanded into one 2-bit pixel data value and a 1 on the data bus into another 2-bit pixel data value. Accordingly, the pixel data before being expanded is encoded at a first level which can be decoded into pixel data encoded at a second level. Thus, the pixel data on the 8-bit microcycler data bus is encoded at the first level as 1-bit pixel data and when expanded, it is encoded into pixel data at the second level, i.e., 2-bit pixel data. In this manner, two-color patterns can be stored in a ROM in half the space.

The generator functions shift, flop and rotate can be thought of as operating on the pixel data as a whole rather than the individual bits of each pixel. Each byte of the display RAM 42 can be though of as four 2-bit locations, each location corresponding to a pixel and storing one of four pixel data values (0–3) although the pixels are, of course, acturally elements of the picture displayed on the screen. The four pixel data values of the first byte, byte 0, will be referred to as P0, P1, P2 and P3. P0 is composed of the first two bits (or least significant bits) of the byte.

Figure 6:
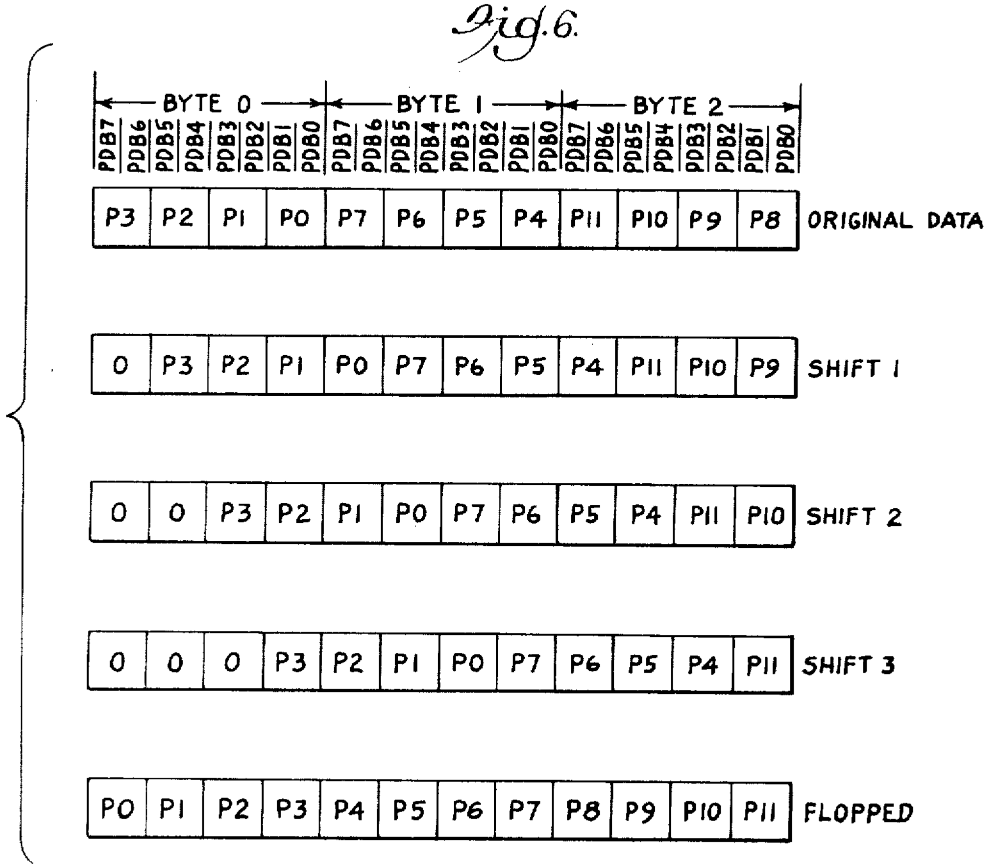
FIG. 6 is a diagram illustrating examples of modifications performed on pixel data.

The shift function shifts the pixel data 0, 1, 2 or 3 pixel locations to the right. FIG. 6 illustrates the effect of the above-mentioned shifts upon the 3 bytes. The pixel data values are shifted relative to each other wherein the pixels that are shifted out of one byte are shifted into the next byte with the corresponding pixels on the screen appearing shifted a similar amount when displayed. Zeros are shifted into the first byte of a sequence.

The output of the flop function is a mirror image of its input, the original data. The pixel locations interchange pixel data values relative to each other, i.e., the first and fourth pixel location of each flopped byte exchange pixel data values as to the second and third as shown in FIG. 6. The four pixels associated with the flopped byte will similarly appear flopped relative to each other when displayed on the screen.

The rotate function rotates a four pixel by four pixel block of data 90° in clockwise direction such that the pixel data values are rotated relative to each other. FIGS. 7A and 7B illustrate an example of rotation. The sixteen pixel data locations correspond to sixteen contiguous pixels displayed on the screen.

The logical OR and exclusive OR functions operate on a byte as 8 bits rather than four 2bit pixel data. When the OR function is used in writing pixel data to the display RAM, the input pixel data is logical OR-ed with the contents of the display RAM location being accessed. The result of the logical OR is sent to the display RAM at the above location. The exclusive-OR function operates in the same way except that the data is exclusive OR-ed instead of logical OR-ed.

The illustrated system can accommodate up to four player control handles **12*a*–12*d* (FIG. 1) at once. Each handle has five switches (i.e., the trigger switch, and four joystick directional switches) and a potentiometer. The switches are read by the CPU 46 via input ports through the I/O chip 50 (FIG. 2). These input ports are diagrammatically shown in FIG. 8 as input ports ICH-IFH where the port number indicates its hexadecimal address. Thus the port at which the player control handle switches for player 1 are read has a hexadecimal address of 10H**.

The trigger switch for each player control handle is read at bit 4 and the four directional switches of the joy-sticks are read at bits 0–3. The signals from the potentiometers are converted to digital information by an 8-bit analog to digital converter (FIG. 71A). The four potentiometers are read at input ports ICH-IFH (FIG. 8). All zeros are fed back when the potentiometer is turned fully counterclockwise and all 1's are fed back when turned fully clockwise.

The 24-button keypad 18 is read at bits 0–5 of ports 14–17H. The input data is normally zero and if more than one button is depressed, the data should be ignored.

Figure 9:
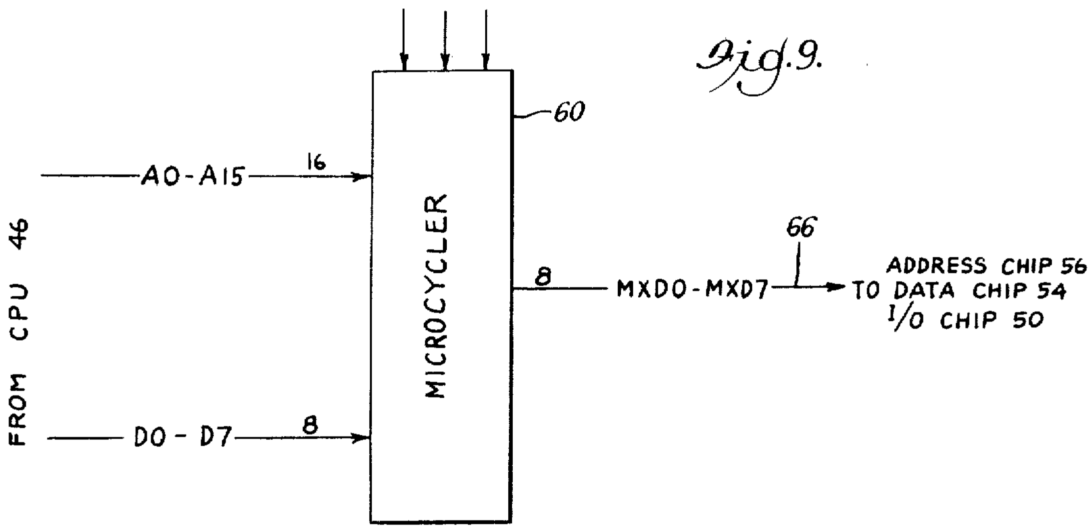
FIG. 9 is a block diagram of a microcycler interface employed in the system.

The microcycler functions as an interface between the CPU and the peripheral devices. The CPU 46 of FIG. 2 has a 16-bit address bus and an 8-bit data bus connecting the CPU to the microcycler 60. Referring now to FIG. 9, the microcycler 60 combines the 16-bit address bus, A0–A15, and the 8-bit data bus, D0–D7, from the CPU 46 into one 8-bit microcycle data bus 66, MXDO-MXD7, connected to the address chip 56, the data chip 54, and the I/O chip 50. One advantage of the microcycler is that the number of connector pins of the integrated circuit chips may be reduced since there are fewer connecting lines.

The microcycle data bus can have any of four modes which are defined by the contents or data carried by the microcycle data bus 66. Its mode is controlled by control signals MC0 and MC1 which are generated by the data chip from a plurality of CPU control signals which will be more fully explained later. The microcycle data bus mode is also controlled by a CPU control signal $\overline{\text{RFSH}}$ which indicates that the lower 7 bits of the address bus contains a "refresh" address for refreshing the RAM dynamic memories. The CPU control signals are discussed more fully in the Zilog Z80-CPU Technical Manual and is hereby incorporated by reference as if fully disclosed herein. The microcycle modes are shown below:

TABLE 1

| $\overline{\text{RFSH}}$ | MC1 | MC0 | Microcycle Data Bus Contents |
|---|---|---|---|
| 0 | 0 | 0 | A0–A7 from the CPU |
| 0 | 0 | 1 | A0–A7 from the CPU |
| 0 | 1 | 0 | A0–A7 from the CPU |
| 0 | 1 | 1 | A0–A7 from the CPU |
| 1 | 0 | 0 | A0–A7 from the CPU |
| 1 | 0 | 1 | A8–A15 from the CPU |
| 1 | 1 | 0 | D0–D7 from the CPU |
| 1 | 1 | 1 | D0–D7 to the CPU |

As can be seen above, when the $\overline{\text{RFSH}}$ signal is a logical zero or low state, the microcycler will allow the address bits A0-A7 from the CPU to be conducted through regardless of the state of MC0 or MC1 in order to refresh the RAM. However, when $\overline{\text{RFSH}}$ is a logical 1 (inactive), MC0 and MC1 detemine the contents of the microcycle data bus MXD0-MXD7.

Figure 10B:
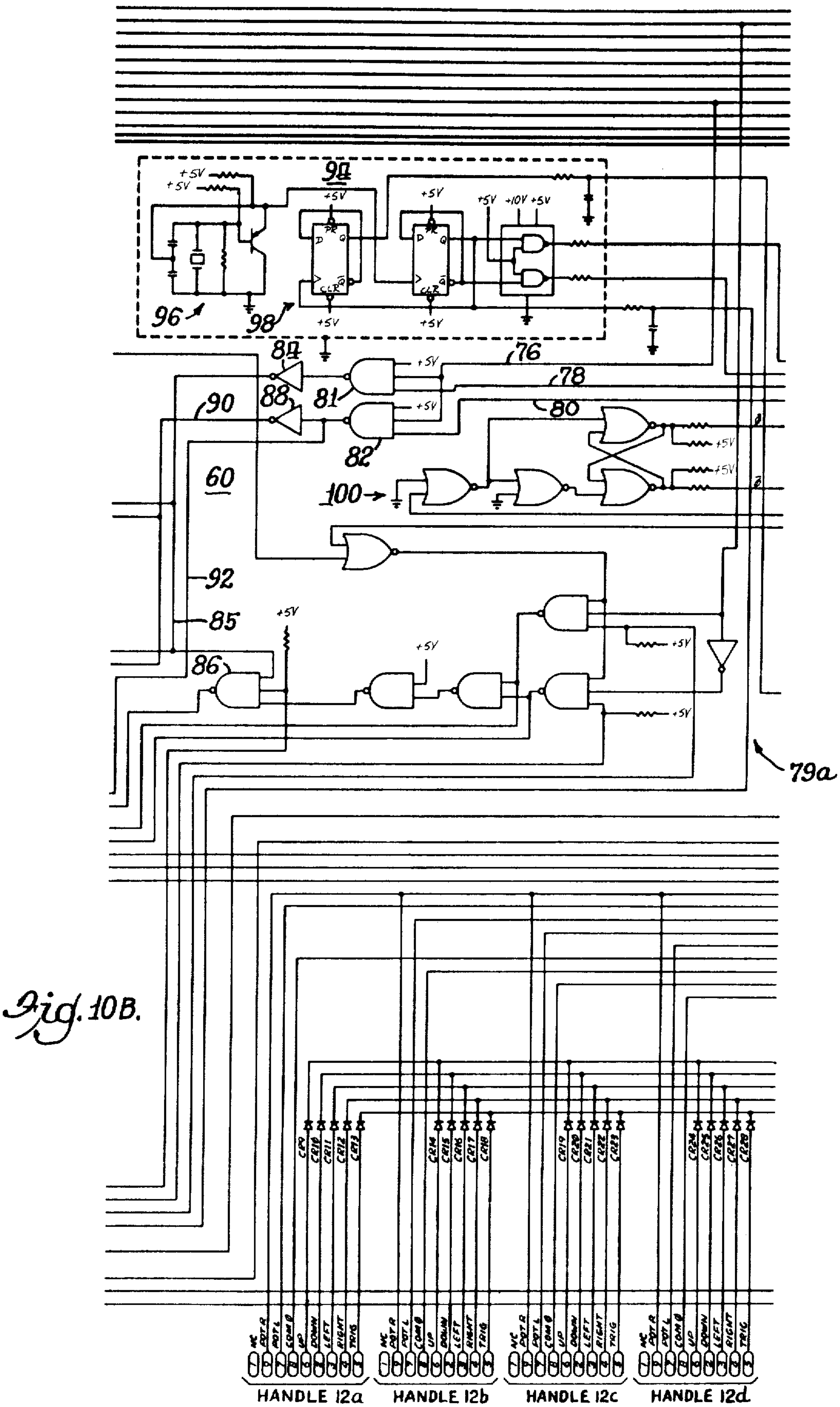
Figure 10C:
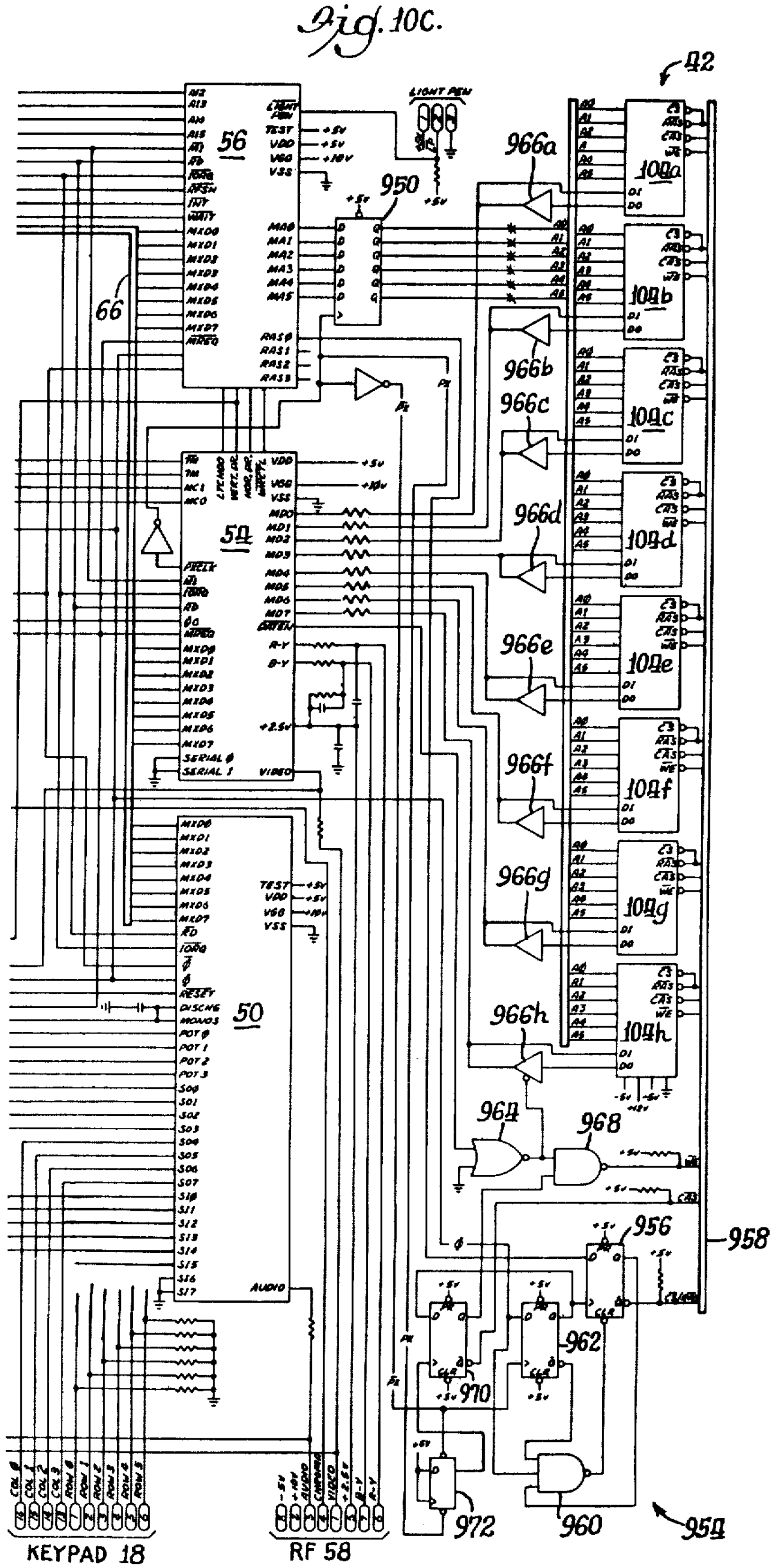

The microcycler as well as the interconnection of the various integrated circuit chips of the low resolution mode system are shown in greater detail in FIGS. 10A–C. The microcycler 60 comprises two 8-line to 4-line multiplexers 70 and 72, having four output lines MXD4-MXD7 and MXD0-MXD3, respectively, and each having 4A and 4B input lines, an enable input E and a select input S.

The address lines A0–A3 and A8–A11, from a CPU address bus 73 from the CPU 56 are connected to the A and B input lines of the address multiplexer 72, respectively. Similarly, the address bus lines A4–A7 and A1-2–A15 are connected to the 8 input lines of the address multiplexer 70. The address multiplexers 70 and 72 can selectively conduct either the "low address" bits A0–A7, or the "high address" bits A8–A15, to the microcycle data bus MXD0-MXD7 when enabled. The multiplexers have common industry designation number 74LS257.

The microcycler further comprises an 8 line bidirectional data gate 74 having 8 input/output lines connected to a CPU data bus 75 from the CPU 56, 8 input-/output lines connected to the microcycle data bus MXD0-MXD7, a direction input DIR and an enable input CD. The data gate 74 can conduct data either from the CPU data bus 75 to the microcycle data bus 66 or from the microcycle data bus 66 to the CPU data bus 75 as determined by the state of the DIR input when enabled.

These three logic elements 70, 72, and 74, function as a 24-line to 8-line multiplexer to sequentially conduct groups of address signals and groups of data signals to the microcycle data bus, in response to the control signals MC0 and MC1 and the CPU control signal $\overline{\text{RFSH}}$. Alternatively, the gate 74, of the microcycler further functions as a gate for conducting data signals from the microcycle data bus to the CPU data bus.

The microcycle data bus 66 is connected to the MXD0-MXD7 inputs of the address chip 56, data chip 54 and I/O chip 50. The microcycler 60 had input lines 76, 78, and 80 for the control signals $\overline{\text{RFSH}}$ MC1 and MC0 respectively. The input line 76 operably connects the CPU 56 $\overline{\text{RFSH}}$ output to the inputs of a pair of NAND gates 81 and 82. The output of the NAND gate 81 is inverted by an inverter 84 whose output is connected by a line 85 to the enable 'E' of the multiplexers 70 and 72 and is also connected to the input of a NAND gate 86 whose output is connected to the enable input CD of the gate 74. Thus, when the CPU 56 prepares to refresh the RAM, the refresh control signal, $\overline{\text{RFSH}}$, will go to the low state causing the output of the NAND gate 81 to go high which is inverted by the inverter 84. A low state at the enable input E of the multiplexers 70 and 72 causes these logic elements to be enabled whereby address signals can be conducted to the microcycle data bus 66. A low state on the line 85 also causes the output of the NAND gate 86 to go high which is presented to the enable input CD of the gate logic element 74 causing the gate 74 to be disabled whereby the outputs of the logic gate 74 are forced to an off state.

The output of the NAND gate 82 is connected to an inverter 88 having an output line 90 connected to the select inputs S of the multiplexers 70 and 72. Thus, when the refresh multiplexer control signal $\overline{\text{RFSH}}$ is low, the output of the NAND gate 82 is high. Consequently, the output of the inverter 88 is low. A low state presented at the selector input S causes address bits presented at the A inputs to be conducted to the multiplexer data bus. Thus when $\overline{\text{RFSH}}$ is low, the low address A0–A7, is conducted to the microcycle data bus for use in the refresh cycle.

The input lines 78 and 80 connect data chip 54 MC1 and MC0 outputs to the inputs of NAND gates 81 and 82, respectively. When the control signal $\overline{\text{RFSH}}$ is high, i.e., a refresh is not being done, the outputs of the NAND gates 81 and 82 are determined by the microcycler control signals MC1 amd MC0 respectively, from the data chip 54. Thus, when the control signal MC1 is in a low state, the output line 85 is also in a low state which enables the multiplexer logic elements 70 and 72 and disables the gate logic element 74 as when the $\overline{\text{RFSH}}$ signal is low. Thus, either the low address or the high address will be conducted onto the microcycler data bus as determined by the control signal MC0. When the control signal 'MC0' is in a low state, the output line 90 is also low which causes the low address to be conducted onto the microcycler data bus. If MC0 is at a high state, the high address is conducted to the microcycler data bus.

Control signal MC1 (and $\overline{\text{RFSH}}$ ) at a high state results in a high state at control line 85 which disables the mutliplexers 70 and 72 and enables the gate 74. Thus, the data on the data bus 75 for bits D0–D7 from the CPU 56 will be gated onto the microcycler data bus MXD0-MXD7, or the data on the microcycler data bus will be gated onto the data bus of the CPU, depending upon the direction input DIR. The direction input DIR is connected by a line 92 to the output of the NAND gate 82. Thus, the state of the control signal MC0 (with $\overline{\text{RFSH}}$ high) determines the direction that the gate 74 will gate the data. For example, if MC0 is in a low state, the output of the NAND gate 82 will be high resulting in the contents of the data bus D0-D7 being gated onto the microcycler data bus; if MC0 is high, the contents of the microcycler data bus will be gated onto the data bus D0-D7 to the CPU 56.

A power supply indicated generally at 93 supplies +15v, +10v, +5 V and −5v to the system. A clock circuit 94 comprising a 14.31818 MHz oscillator 96 and divider stages 98, provides a 7 MHz clock signal 7M, and an inverted 7 MHz clock signal $\overline{\text{7M}}$, to the 7M and $\overline{\text{7M}}$ inputs, respectively, of the data chip 54. A clock signal Φ G, generated by the data chip 54 from the 7M and $\overline{\text{7M}}$ clock signals, is outputted to a buffer 100 having output lines for clock signals Φ and $\overline{\Phi}$. The clock signals Φ1 and $\overline{\Phi}$2 are connected to the Φ and $\overline{\Phi}$ inputs of the address, data and I/O chips.

The CPU address bus 73 and data bus 75 are connected to the system ROM 48 having inputs A0-A12 and D0-D7 for the address and data bits, respectively. The address bus 73 and data bus 75 are also connected to the cassette ROM 24 (not shown) and the extension plug 77 (for expanding the system).

The system ROM chip 48 has a chip select input $\overline{\text{CS}}$ connected to the output of the chip select logic indicated at 79*a* and *b* with the cassette ROM chip select input $\overline{\text{CCS}}$ also connected to the output of the chip select logic 79*a* and *b*. The outputs of the logic 79*a and b* are functions of the CPU control signals MEMORY REQUEST ($\overline{\text{MREQ}}$) and READ ($\overline{\text{RD}}$), the address bits A13-A15 and the memory disable signals SYSEN, CASEN, AND $\overline{\text{BUZOFF}}$ from the extender plug 77.

DATA CHIP

The CPU control signal lines MEMORY REQUEST, INPUT/OUTPUT REQUEST, READ, and MACHINE CYCLE 1 are operatively connected to the data chip inputs $\overline{\text{MREQ}}$, $\overline{\text{IORQ}}$, $\overline{\text{RD}}$, and $\overline{\text{M1}}$, respectively, from the CPU 56. Two more control lines carrying control signals generated by the address chip 56 are connected to the data chip inputs LTCHDO, and $\overline{\text{WRCTL}}$, respectively. The data chip had VDD input connected to a +5 volts source, a VGG input connected to a +10 volt source, and a DVSS input connected to ground. Two more inputs SERIAL 0 and SERIAL 1 are grounded since they are used in the high resolution mode.

The data chip 54 has a plurality of outputs including the memory data inputs and outputs MD0-MD7, connected by a memory data bus 102 to the display RAM 42. The data chip input/output MD0 is operatively connected to the data input, D1, and data output D0, ports of the RAM chip 104*a*, with other memory data input/outputs, MD1-MD7 of the data chip similarly connected to seven RAM chips 104*b-h*. The data chip also has analog video outputs R-Y, B-Y, VIDEO and +2.5 volts reference operatively connected to the RF modulator 58 (not shown). The data chip has clock signal outputs, VERTICAL DRIVE (VERT. DR.) and HORIZONTAL DRIVE (HORZ. DR.), connected to the address chip 56. Finally, the data chip has control signal outputs MC0 and MC1 connected to the microcycler (as noted before) and an output $\overline{\text{DATEN}}$ used to generate the write enable signal, $\overline{\text{WE}}$, for the RAM chips.

A schematic block diagram of the data chip 54 is shown in FIGS. 11A-11F. The microcycle generator 106 of FIG. 11A generates the microcycle control signals MC0 and MC1 from the CPU control signals $\overline{\text{IORQ}}$, $\overline{\text{MREQ}}$, $\overline{\text{RD}}$, and $\overline{\text{M1}}$. Also generated are microcycle decoder control signals LOAD LOW (LDL1) and LOAD HIGH (LDH1) for loading the low and high address bits respectively.

A more detailed schematic diagram of the data chip is shown in FIGS. 13A-EE with a composite diagram of these figures shown in FIG. 14. The microcycle generator has an input line 108 for the $\overline{\text{MREQ}}$ control signal and an input line 110 for the $\overline{\text{IORQ}}$ control signal, both of which are connected to the inputs of a NAND gate 112 whose output is connected by an inverter 114 to the inputs of a pair of NOR gates 116 and 118. The microcycle generator has an input line 120 for the CPU control signal $\overline{\text{RD}}$ which is connected to the other input of the NOR gate 116. The output of the NOR gate 116 is connected by an inverter 122 to the input of an AND gate 124.

The output of the NOR gate 118 is connected to the input of a NOR gate 126 whose output is connected to the input of a NOR gate 128 with the output of the AND gate 124 connected to the other input of the NOR gate 128. The output of the NOR gate 128 is connected by a gating transistor 130 which acts as a delay to the input of a NOR gate 132. The gate of the transistor 130 is connected to the clock signal line Φ2. Φ2 is the complement of the clock signal Φ and a clock signal Φ1 is Φ uncomplemented.

The output of the NOR gate 132 is connected by a gating transistor 134 (which also acts as a delay) to an inverter 136 having an output line 138. The gate of the "delay" transistor 134 is connected to the clock signal Φ1.

The output line 138 is connected to the inputs of the AND gate 124 and the NOR gate 126 and is also connected by a delay transistor 140 to the input of a NOR gate 142. The gate of the transistor 140 is connected to the clock signal $\overline{\text{7M}}$. The output of the NOR gate 142 is connected by a delay transistor 144 to an inverter 147 having an output line 148. The gate of the transistor 144 is connected to the 7M clock signal.

The output line 148 of the inverter 146 is connected to an input of a NOR gate 150 whose output is connected to an inverter 152. A transistor 154 is connected to the voltage source VDD and to ground by a transistor 156. The gate of the transistor 154 is connected to the output of the inverter 152 and the gate of the transistor 156 is connected to the output of the NOR gate 150. The junction of the transistors 154 and 156 at the line 80 carries the microcycle control signal MCO.

The E,ovs/MREQ/ and $\overline{\text{IORQ}}$ input lines, 108 and 110, are connected to the input AND gate 160 whose output is connected to a NOR gate 162. The output line 138 of the inverter 136 is also connected to the input of a NOR gate 164 whose output is connected to the input of the NOR gate 162. The output of the NOR gate 162 is connected by a delay transistor 166 to a NOR gate 168. The gate of the transistor 166 is connected to the Φ2 clock signal. The output of the NOR gate 168 is connected by a delay transistor 170 to an inverter 172 having an output line 174. The gate of the transistor 170 is connected to the Φ1 clock signal.

The output line 174 is connected to an input of the AND gate 160 and inputs of the NOR gates 118 and 164 and is also connected by a delay transistor 176 to a NOR gate 178. The gate of the transistor 176 is connected to the $\overline{\text{7M}}$ clock signal. The output of the NOR gate 178 is connected by a delay transistor 180 to an inverter 182 having an output line 188. The gate of the transistor 180 is connected to the clock signal 7M.

The output line 188 of the inverter 182 is connected to a NOR gate 190 whose output is connected to an inverter 192. A gating transistor 194 is connected to the voltage source VDD and to a transistor 196 which is connected to ground. The output of the inverter 192 is connected to the gate of the transistor 194 and the output of the NOR gate 190 is connected to the gate of the transistor 196. The junction of the transistors 194 and 196 at the line 78 carries the microcycle control signal MC1.

The state of the control signal MCl is the same as the output of inverter 192 since a high state (logical 1) output of the inverter 192 will turn on the transistor 194 causing the MC1 line 78 to also go high. Similary, a high output from the NOR gate 190 (when inverter 192 is at a low state) causes the transistor 196 to turn on which causes the MC1 control signal line 78 to also go low. The state of the MCO control line 80 is similarly the same as the state of the inverter 152.

The microcycle generator has another input 200 for the CPU control signal $\overline{MI}$ which is connected to the input of a NOR gate 202 having another input connected to the input line 110 for the CPU control signal $\overline{IORQ}$. The output of the NOR gate 202 is connected to the inputs of the NOR gates 168, 132, 178, 142, 190 and 150.

The $\overline{MI}$ CPU control signal is active when low (logical 0) and indicates that the current machine cycle is an operaton code fetch cycle of an instruction execution. Thus, the $\overline{MI}$ control signal is normally high (logical 1) whenever the CPU is accessing a peripheral device such as a video processor. Hence, the NOR gate 202 having a logical 1 presented at the input will output a logical O. This logical O is presented at the inputs of the NOR gates 132, 168, 142, 178, 150 and 190 resulting in these NOR gates operating as inverters whenever the /OVs/M1/ control signal is high.

Similarly, whenever $\overline{MI}$ goes low indicating that the current machine cycle is the fetch cycle of an instruction execution, $\overline{IORQ}$ will normally be high with the same effect upon the above-mentioned NOR gates with an exception. $\overline{IORQ}$ and $\overline{MI}$ will both go low during an "interrupt ackowledge" cycle. With these two control signals both at a low state, the NOR gate 202 will output a high state causing the NOR gate 150 to produce a low state forcing the control signal MC0 to a high state or 1. In a similar fashion, the output of the NOR gate 190 is forced to a low state which also forces the control signal MC1 to a high state.

Referring back to the microcycle modes set out in Table I, it is seen that where MC0 and MC1 are both a logical 1, the microcycler will gate data from the microcycler data bus to the CPU data bus. This data was placed on the microcycler data bus by the peripheral device initiating the interrupt and will be used by the CPU in its response to the interrupt signal.

The "MEMORY REQUEST" control signal, $\overline{MREQ}$, is active when low and indicates that the address bus of the CPU holds a valid address for a memory read or a memory write operation. The "INPUT-/OUTPUT REQUEST" control signal $\overline{IORQ}$, is also active when low and indicates that the lower half of the address bus holds a valid I/O address for I/O read or write operation. The read control signal, $\overline{RD}$, is active when low and indicates that the CPU wishes to read data from the memory or an I/O device. When high, $\overline{RD}$ indicates the CPU wishes to write data to memory or an I/O device.

The generation of the microcycler control signals MC0 and MC1 as a function of the CPU control signals $\overline{MREQ}$, $\overline{IORQ}$, and $\overline{RD}$ together with clock signals Φ1 and 7M, are illustrated for a plurality of read and write operations in FIGS. 12A-G. An example of MC0 and MC1 as functions of $\overline{MREQ}$ $\overline{RD}$, and the clock signals Φ1 and 7M, is shown for a memory write operation in FIG. 12A.

A clock state, T, is defined by one complete period of the clock signal Φ. At the beginning of the initial clock state T1, the CPU control signals $\overline{MREQ}$ $\overline{RD}$ are at the same state as the previous clock state which is a high state with the microcycler control signals MC0 and MC1 also at the same state as the previous clock state which is a low state. During T1, after the clock signal Ø goes low, $\overline{MREQ}$ goes low which indicates that the CPU address bus holds a valid address for the memory write operation.

Referring to FIG. 13, the NAND gate 112 has the control signals $\overline{MREQ}$ and $\overline{IORQ}$ presented at its inputs which are both inactive or a logical 1 at the beginning of T1. When $\overline{MREQ}$ goes low, the output of the NAND gate 112 goes high which is inverted by the inverter 114 presenting a low state to one input of the NOR gate 118 and to one input of the NOR gate 116. the other input of the NOR gate 118 is connected by the line 174 to the output of the inverter 172.

Since $\overline{M1}$ is at a high state, the NOR gates 142, 178, 150 and 190 function as inverters. Thus the output of the inverter 172 at line 174 is at the same state as the previous MC1 state since there are an even number of "inverters" between the line 174 and the gate of the output transistor 194 (except insofar as the 7M and $\overline{7M}$ delay transistors 176 and 180 delay any change in MC1 resulting from a change in the output of the inverter 172 of line 174).

Thus since MC1 is at a low state, the line 174 connected to the input of the NOR gate 118 is at a low state with the other input of the NOR gate 118 at a low state, as noted before. This produces a high state at the output of NOR gate 118 which results in a low state at the output of the NOR gate 126.

The control signal $\overline{RD}$ is at a high state indicating a write operation which causes the NOR gate 116 to output a low state which is inverted by the inverter 122 to produce a high state. The line 138 is at the same state (except for a delay) as the previous MCO state (in a manner similar to that for the line 174) which causes the output of the AND gate 124 to be low. The NOR gate 128 thus has a low state presented at both of its inputs which results in a high state produced at its output.

Figure 12A:
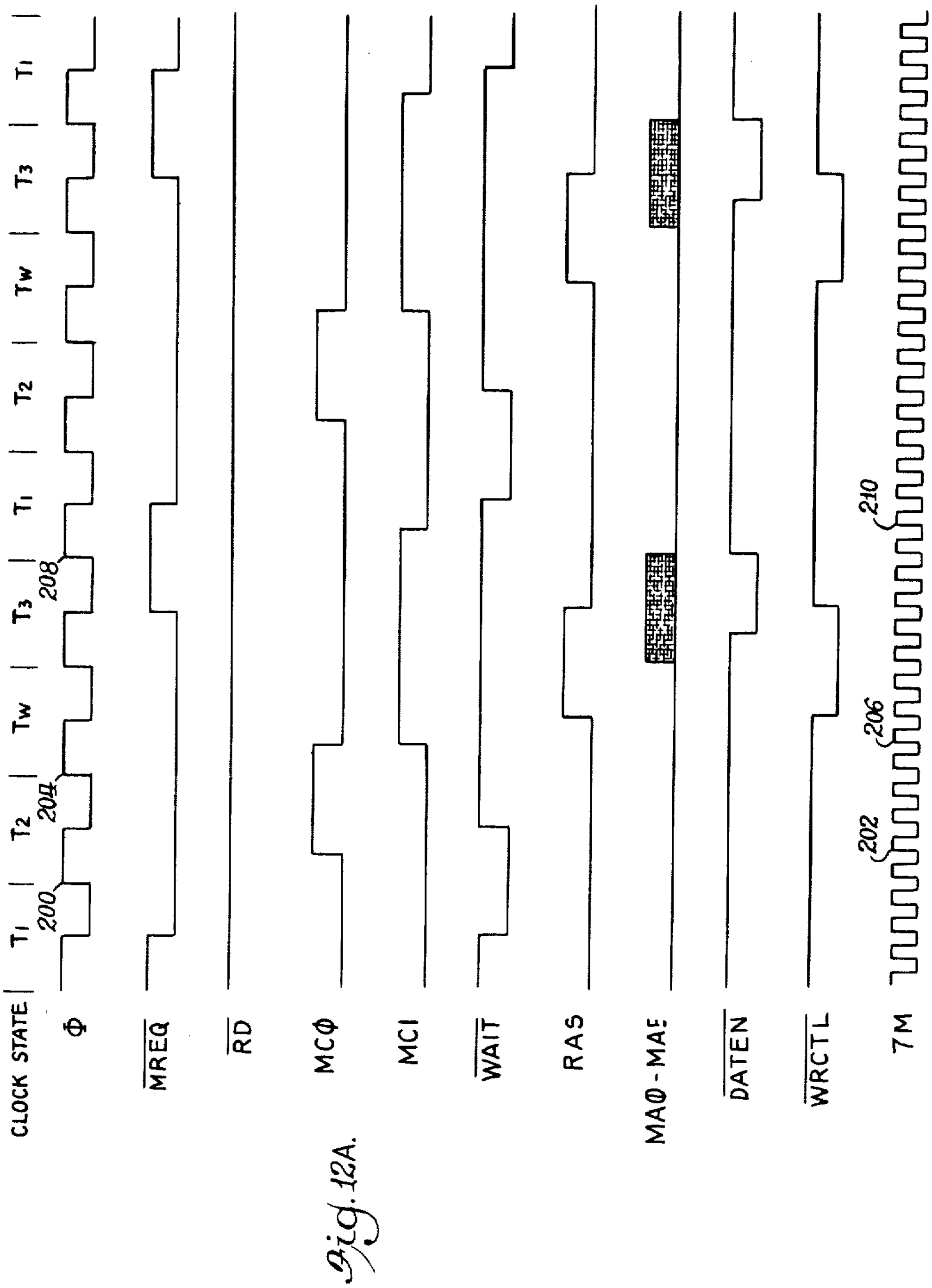

This output is connected when the clock signal Φ 2 goes high and is inverted by the NOR gate 132. The transistor 134 conducts this output when the clock signal Ø1 goes high resulting in the output of the inverter 136 going high. thus the output of the inverter 136 assumes the same state as the NOR gate 128 on the positive edge 200 (i.e., going from a low state to a high state) of the clock signal Φ (FIG. 12A).

The high state at the output of the inverter 136 is conducted by the transistor 140 when the clock signal $\overline{M}$ goes high which is inverted by the NOR gate 142 and conducted by the transistor 144 when the clock signal 7M goes high. The logical 0 is then inverted by the inverter 146, NOR gate 150, and inverter 152 to produce a high state at the output of the inverter 152 which turns on the transistor 154 to produce the high state at the line 86 which is the MCO control signal line. Referring back to FIG. 12A, it is seen that the control signal MCO goes to a high state on the positive edge 202 of the clock signal 7M which follows the positive edge 200 of the clock signal Φ occurring after the CPU control Signal $\overline{MREQ}$ goes low.

When MC0 changes from a low state to a high state, the contents of the microcycle data bus changes from the low address, A0–A7, to the high address, A8–A15. Thus the 16 address bits from the CPU are transmitted to the video processor and I/O chip in 2 eight-bit groups or slices.

The output of the inverter 136 rising to a high state causes the NOR gate 164 having an input connected to the output line 138 of the inverter 136 to fall to a low state. the output of the AND gate 160 is also low since $\overline{MREQ}$ is low causing the output of the NOR gate 162 to go high. This high output appears at the output of the inverter 172 at the line 174 on the positive edge 204 (FIG. 12A) of the clock signal Φ marking the start of the clock state Tw.

The high state then appears at the gate of the transistor 194 on the positive edge 206 of the clock signal 7M (FIG. 12A) causing the control signal MC1 to rise to a logical 1. The $\overline{RD}$ signal is at a high state (indicating a write operation) which causes the NOR gate 116 to output a "zero" which is inverted by the inverter 122. The output of the inverter 136, which is at a high state, is returned to the AND gate 124 causing the AND gate to output a "one" which causes the NOR gate 128 to output a "zero". This low state appears at the output of the inverter 136 on the positive edge 204 of the clock signal Φ (FIG. 12A). The low state then appears at the MC0 control signal line 80 on the positive edge 206 of the 7M clock signal (FIG. 12A).

With MC0 at a low state and MC1 at a high state, the contents of the CPU data bus are gated onto the microcycle data bus. Thus data placed on the CPU data bus is transmitted to the peripheral devices on the microcycle data bus.

During clock state T3, $\overline{MREQ}$ returns to a high state. Since $\overline{MREQ}$ as well as the output of the inverter 172 at line 174 and $\overline{IORQ}$ are at a high state, the output of the AND gate 160 is high which causes the output of the NOR gate 162 to go low. This low output appears at the line 172 on the positive edge 208 of the Φ1 clock signal at clock state T1. The low state at line 172 appears at the gate of the output transistor 194 (with a high state at the gate of the transistor 196) at the positive edge 210 of the clock signal 7M causing the microcycle control signal MC1 to go low. The microcycler is now ready to transmit the low address of the next address presented at its inputs. The relationship of the microcycler control signals MC0 and MC1 to the CPU control signals and system clock signals Φ and 7M is shown for a variety of other read and write operations in FIGS. 12B–G.

The microcycler further comprises a NOR gate 201 having inputs connected to outputs of the inverters 146 and 182 and to the clock signals Φ1. A NOR gate 203 also has inputs connected to the output of the inverter 182, to the output of the inverter 146 by an inverter 205, and to the clock signal input Φ. An output line 226 of the NOR gate 201 carries the microcycle decoder control signal LDL1 which is a logical 1 when the outputs of the inverters 146 and 182 are a logical 0 (corresponding to both MC0 and MC1 a logical 0), together with Φ1 a logical 0. An output line 228 of the NOR gate 203 carries the signal LDL1 which is a logical 1 when MC0 is a logical 1, MC1 a logical 0 and Φ1 a logical 0.

Each of the address, data, and I/O chips has a plurality of registers. Each of these registers is individually addressable by the CPU for inputting or outputting data contained in the register.

Figure 11C:
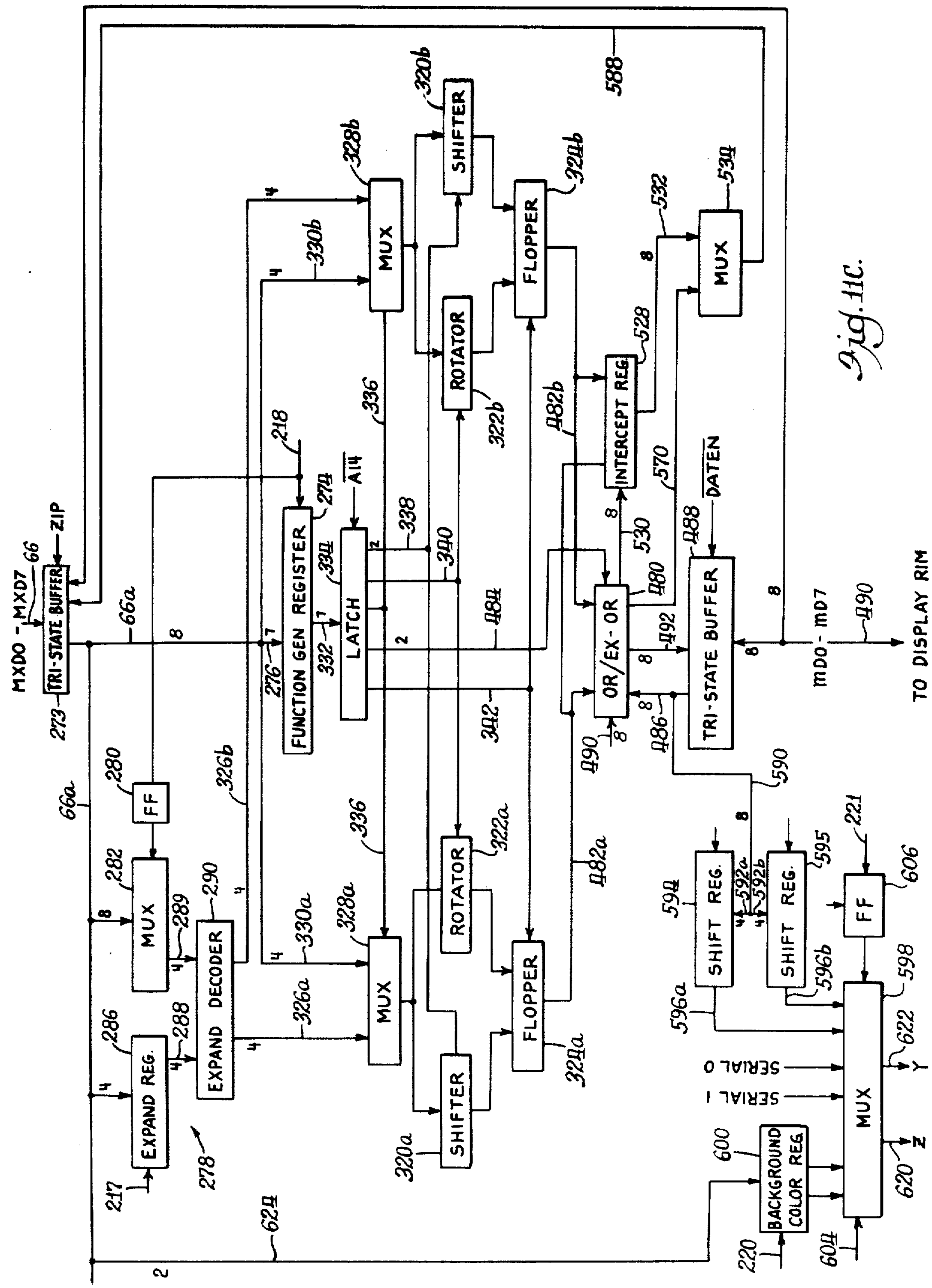

The data chip is shown in FIG. 11B to have microcycle decoder 212 which assembles 11 address bits A0–A10 from the low address bits, A0–A7, and high address bits, A8–A15, transmitted from the microcycle data bus. The microcycle decoder 212 has an eight bit input line connected to all the bits of an eight-bit data chip data bus *66a* and a three-bit input line connected to the lower 3 bits of the data bus *66a*. The microcycle data bus 66 is connected to the data bus *66a* by a tristate buffer 273 (FIG. 11C). (Other buffers shown in the more detailed schematic FIG. 13 are omitted from the FIGS. 11A–F for clarity).

The microcycle generator 106 (FIG. 1A) generates control signals LDL1 and LDH1 to signal that the microcycle data bus contains the low address bits or the high address bits, respectively. The microcycle decoder 212 is operatively connected to the microcycle generator to input these control signals such that the decoder latches up the low address bits from the eight bit input lines when LDL1 is high and subsequently the high ddress bits A8–A10 on the three bit input line when the control signal LDH1 is a high. The 11 bits latched in the microcycle decoder are utilized to address the registers on the data chip. The microcycle decoder has an 11 bit output bus A0–A10 which is connected to an address decoder 214 which decodes the address bits to activate one of a plurality of register select lines 216–222. Register select line 216 actually represents eight register select lines for eight different "color" registers 224.

In addition to the proper address, the register select lines 216–221 require the concurrence of a data chip generated control signal, $\overline{OUTPUT}$, in order to be activated. The eight color register select lines 216 further require a CPU generated control signal $\overline{IORQ}$. The register select line 222 requires the concurrence of another data chip generated control signal $\overline{INOUT}$, to be activated. The $\overline{INPUT}$ and $\overline{OUTPUT}$ signals are functions of z-80 CPU control signals including $\overline{MREQ}$, $\overline{IORQ}$, $\overline{RD}$ and $\overline{M1}$ and are generated to compensate for any delay caused by the microcycler.

The register select lines 216–221 are operatively connected to eight color registers 0–7, an "expand" register, "function generator" register, "vertical blank" register, "horizontal color boundary" and "background color" register and "low/high resolution mode" register, respectively. The line 222 is operatively connected to a multiplexer, which when activated causes the multiplexer to select the output of an "intercept" register. In this manner, the CPU may select any particular register of the data chip by transmitting an address corresponding to the register which is transmitted in two groups, the low and high addresses, by the microcycler to the microcycle decoder which reassembles the address bits into address bits A0–A10. These bits are then decoded and the corresponding register select line is activated which enables the addressed register to input or output data to the CPU via the microcycle data bus.

The microcycle decoder 212 and address decoder 214 are shown in greater detail in FIG. 13. The microcycle decoder 212 comprises an 11-bit latch with the eight least significant bits A0–A7 each having an input connected to the D0–D7 lines, respectively, of the data bus 66a. Each of the A0–A7 bits of the latch also have an input connected to the LDL1 control signal line 226 and an input connected the line 226 through an inverter 227. The most significant bits A8–A10 each have an input connected to the D0–D2 lines, respectively, of the dat bus 66a and each has an input connected to the LDH1 control signal input line 228 directly, and an input connected to the line 228 through an iverter 229.

The A0 bit has output lines A0 and its complement $\overline{\text{A0}}$ with the A1 bit having outputs A1, $\overline{\text{A1}}$, etc. all connected to the address decoder 214.

An example of a bit circuit of the latch of the microcycle decoder is shown in FIG. 13. The input of the A0 bit circuit of the latch is connected to a gating transistor 230 whose gate is connected to the LDL1 control signal line 226. The 1 input is also connected to the D0 line of the data bus 66a which carries (among others) address bits A0 and A8. Transistor 230 is connected to an inverter 232 whose output is the $\overline{\text{A0}}$ output line of the A0 latch which is also connected to an inverter 234 whose output is the A0 output line. The output of the inverter 234 is connected to a gating transistor 236 whose gate is connected to the output of inverter 227 (FIG. 13) which carries $\overline{\text{LDL1}}$. The output of the transistor 236 is connected to the input of inverter 232.

The bit of the D0 line of the data bus 66a is presented to the input of the transistor 230 which is gated by the LDL1 control signal when the D0 line carries the address bit A0. The inverter 232 inverts the address bit A0 and outputs the bit as address bit $\overline{\text{A0}}$. The output of the ivnerter 232 is inverted by inverter 234 whose output is the address bit A0. The bit A0 is stored in the A0 bit of the latch in this manner.

The address decoder is shown in FIG. 13) to comprise a programmed logic array (PLA) having a plurality of input lines A0–A10 and $\overline{\text{A0–A10}}$ connected to the corresponding output lines of the microcycle decoder 212. A plurality of output lines 217–222 and 238–253 are selectively coupled to the PLA input lines by a plurality of pull-down transistors, each of which is represented by a small circle 254.

Figure 16:
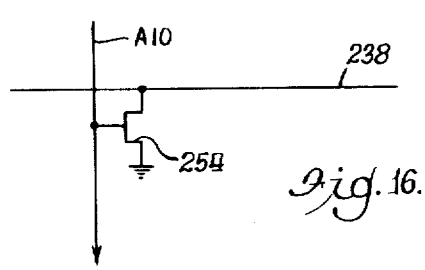
Figure 32:
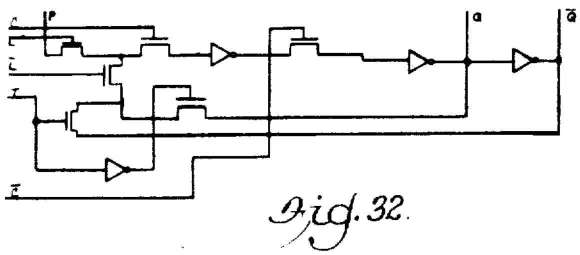
Figure 34:
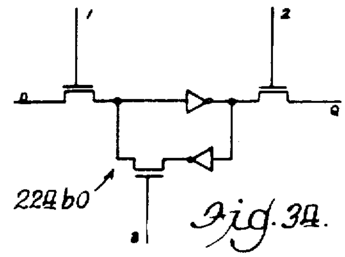

An example of these pull-down transistors, the transistor coupling the input line A10 to the output line 238 is shown in greater detail in FIG. 16. If the address bit A10 equals 1, i,e., a high state, the A10 address line will cause the pull-down transistor 254 to turn on which "pulls down" the output line 238 to ground.

Each output line 217–1222 and 238–253 is connected to the voltage source VDD by a pull-up transistor 260 referring back to FIG. 13. A logical 1 on any address bit input line coupled to an output line will cause that output line to be grounded which is a low state or logical 0.

The input lines of the PLA are selectively coupled to the output lines by the pull-down transistors 254 such that a particular output line will produce a logical 1 only when a predetermined address consisting of a predetermined combination of 1's and 0's are presented on the address input lines A0–A10 and $\overline{\text{AO–A10}}$.

The output lines 217–221 are coupled to the $\overline{\text{OUTPUT}}$ control signal line 262 by pull-down transistors 264 so that in addition to the proper address, the $\overline{\text{OUTPUT}}$ control signal must be low in order for one of these control lines to output a logical 1. For example, if the address bits A7, A6, A5, A4, A3, A2, A1 and A0 (A7 being the most significant) have the values 0, 0, 0, 1, 1, 0, 0 and 1, respectively, the control line 217 will be a logical 1, if the $\overline{\text{OUTPUT}}$ control signal is also low. Since the PLA output line 217 is the "expand" register select line, the expand register will be selected if the address bits A7–A0 have the value 00011001 or 19H. Thus 19H is the hexadecimal address of the expand register. If any of the address bits A7–A0 are different from the values just listed, the expand register will not be selected. For example, if the address bit A7 is a 1 instead of a 0, the pull-down transistor 254 associated with the A7 input line and the PLA output line 217 will be turned on which pulls the output line 217 to a logical 0.

The output line 222 has an associated address 8H and, as seen in FIG. 11B, is the "intercept" register select line. the intercept register select line 222 is coupled to an $\overline{\text{INPUT}}$ control signal line 266 by a pull-down transistor 268 so that in addition to the address 8H, the $\overline{\text{INPUT}}$ control signal must be low in order for the register select line 222 to be at a logical 1 state which will select the intercept register.

The output lines 238 and 239 are connected to the input of a NOR gate 270 whose output is connected to a NOR gate 272. The other inputs of the NOR gate 272 are the control signal line 262 and a $\overline{\text{IORQ}}$ control signal line 270. Thus, either of two hexadecimal addresses, BH or OH, will cause the output of the NOR gate 270 to go low which will cause the output of the inverter 272 to go high if the control signal $\overline{\text{OUTPUT}}$ and the control signal $\overline{\text{IORQ}}$ are both low.

The output lines 240 and 241, 242 and 243, etc. are also connected to a plurality of NOR gates 271 which are connected to a plurality of NOR gates 272 which also have inputs connected to the $\overline{\text{OUTPUT}}$ control signal lines 262 and $\overline{\text{IORQ}}$ control signal line 270. The output lines 216 of the NOR gates 272 are the register select lines for the color registers 224, as seen in FIG. 11B.

Thus, either the hexadecimal address 8H or BH will select color register 0. There is an extra address for each color register to accomodate a color block transfer operation which will be described in more detail later.

Thus, the CPU may address or select a particular register in order to input or output data from or to that register by transmitting the register's associated address together with the proper CPU control signals. The microcycler transmits this address in two groups, the low and high addresses, which are then reassembled by the microcycler decoder 212. The address latched in the microcycler decoder is decoded by the address decoder 214 which activates a register select line. The register select line enables the associated register to input from or output data to the microcycle data bus. The hexadecimal addresses for the input and output ports or registers for the Address, Data and I/O chips are set forth in Table II below:

TABLE II

| OUTPUT PORTS PORT ADDRESS | FUNCTION | INPUT PORTS PORT ADDRESS | FUNCTION |
|---|---|---|---|
| ØH | Color Register Ø | 8H | Intercept Feedback |

TABLE II-continued

| OUTPUT PORTS PORT ADDRESS | FUNCTION | INPUT PORTS PORT ADDRESS | FUNCTION |
|---|---|---|---|
| 1H | Color Register 1 | | Multiplexer |
| 2H | Color Register 2 | EH | Vertical Feedback |
| 3H | Color Register 3 | | Register |
| 4H | Color Register 4 | FH | Horizontal Feedback |
| 5H | Color Register 5 | | Register |
| 6H | Color Register 6 | 1ØH | Player 1 Handle |
| 7H | Color Register 7 | 11H | Player 2 Handle |
| 8H | Low/High Resolution | 12H | Player 3 Handle |
| | Register | 13H | Player 4 Handle |
| 9H | Horizontal Color | 14H | Keypad Column Ø |
| | Boundary Register | | (right) |
| | Background Color | 15H | Keypad Column 1 |
| | Register | 16H | Keypad Column 2 |
| AH | Vertical Blank | 17H | Keypad Column 3 |
| | Register | | (left) |
| BH | Color Block Transfer | | |
| CH | Function Generator | | |
| | Register | | |
| DH | Interrupt Feedback | | |
| | Register | | |
| EH | Interrupt Enable and | | |
| | Mode Register | | |
| FH | Interrupt Line Register | | |
| 1ØH | Master Oscillator Register | | |
| 11H | Tone A Frequency Register | | |
| 12H | Tone B Frequency Register | | |
| 13H | Tone C Frequency Register | | |
| 14H | Vibrato Register | | |
| 15H | Tone C Volume, Noise Modulation | | |
| | and MUX registers | | |
| 16H | Tone A Volume and Tone B | | |
| | Volume Registers | | |
| 17H | Noise Volume Register | | |
| 18H | Sound Block Transfer | | |
| 19H | Expand Register | | |

The function generator of the video processor can perform a variety of functions or modifications to the pixel data as the data is a written to the display RAM by the CPU from the system or cassette ROM. The function generator is enabled when the address of the data is less then 4,000H (address bit A14 equal to 0). The function generator is contained on the data chip 54 and is shown in FIG. 11C to comprise a 7-bit function generator register 274 which is connected to the data bus 66*a* by a 7-bit input line 276. The data chip data bus 66*a* is operatively connected to the microcycler data bus 66 by the tri-state buffer 273 shown in FIG. 13 to comprise 8 units 273*a–h*. (Buffer unit 273*a*, typical of the units 273*a–h*, is shown in greater detail in FIG. 17). The output 1 of each unit is connected to the data bus 66*a* by a buffer 611 (logically similar to that shown in FIG. 18).

The data contents of the register 274 determine how the pixel data is to be modified. The CPU 46 (FIG. 2) may output data to the register 274 by transmitting the address CH to the microcycle decoder 212 and address decoder 214 of FIG. 11B which activates the function generator register select line 218. When the register select line 218 is activated, the function generator register 274 is enabled to input (or latch up) the 7 bits of data transmitted by the CPU. The bits of the data contained within the function generator register 274 relate to different modifications of the pixel data as shown below in Table III:

TABLE III

| | |
|---|---|
| Bit 0 | Least Significant Bit of Shift Amount |
| 1 | Most Significant Bit of Shift Amount |
| 2 | Rotate |
| 3 | Expand |
| 4 | OR |
| 5 | Exclusive-OR |
| 6 | Flop |

The order in which the functions are performed is as follows: expansion is done first; rotating or shifting; flopping; and logical-OR or exclusive-OR. The video processor performs the modifications in response to the data stored in the function generator register. A logical 0 or 1 in the bits 2–6 determine whether or not the corresponding function is performed. Bits 0 and 1 of the function generator register determine the amount, if any, of the shift. As many as four of thes functions can be used at any one time and any function can be omitted. However, rotate and shift as well as logical-OR and exclusive-OR cannot be done at the same time.

The expand function expands the 8 bits contained on the microccyle data bus 66 four bits at a time into 16 bits. It expands a 0 on the microcycle data bus into one 2-bit pixel and a 1 into another 2-bit pixel. Thus, two-color patterns can be stored in the system or cassette ROM in half the memory space.

The expand function is performed by an expander indicated generally at 278. During each write operation to the display memory using the expander 278, either the upper half (D4–D7) or the lower half (D0–D3) of the data bus 66*a* is expanded but the expand function may be bypassed, as will be more fully explained below. The half that is expanded is determined by an expand flip-flop 282 having a reset input connected to the function generator register select line 218 and an output connected to a multiplexer 282. The flip-flop 280 is reset by an output to the function generator register 274 and is toggled after each write operation to the display RAM in which the function generator is utilized. The multiplexer 282 is responsive to the flip-flop to select either the upper half, or lower half, of the bits contained on the data bus 66a and output the selected bits on a 4-bit multiplexer data bus 284 for expansion. The upper half of the data bus 66a is expanded when the flip-flop 280 is at a low or zero state, and the lower half is expanded when the flip-flop toggles to the high state.

A 4-bit "expand" register 286 having a 4-bit output line 288 determines the pixel values into which the data contained on the multiplexer data bus 284 can be expanded. A 0 on thwe multiplexer data bus will be expanded by an expand decoder 290 connected to the expand register output bus 288 and multiplexer output bus 284 into the pixel value determined by bits 0 and 1 of the expand register 286. A 1 on the multiplexer data bus will be expanded into the pixel value determined by bits 2 and 3 of the expand register 286. Thus, the pixel data on the multiplexer data bus is encoded at the first level to identify either the 0 and 1 or 2 and 3 bits of the expand register. In this manner, the data from the computer is decoded into pixel data encoded at the second level, i.e., the pixel data stored in the expand register, which is transmitted when the particular bits of the expand register are selected or identified. The second level pixel data is stored in the display RAM after other modifications, if any, are performed. The pixel data stored in the RAM, when read, is utilized together with the left/right bit to select a color register to generate the pixels of the display as explained hereinbefore.

The expand register 286 has an address 19H at which the CPU may access the expand register in order to change the contents. The address 19H (together with an $\overline{\text{OUTPUT}}$ signal) transmitted to the address decoder 214 (FIG. 11B) causes the expand register select line 217 to be activated which enables the expand register 286 to receive data on the data bus 66a. In this manner, the pixel data values into which data is expanded may be changed.

The expander 278 is shown in greater detail in FIG. 13. The expand flip-flop 280 has a reset input R connected to the function generator register select line 218 so that the flip-flop is reset with each output of data to the function generator register 274. The flip-flop has a clock input C connected to a clock input line 292 and a clock input $\overline{C}$ also connected to the clock signal input line 292 through an inverter 294. (The line 292 carries a clock signal, $\overline{\text{SHIFT}}$ which will be more fully explained hereinafter.)

An output $\overline{Q}$ is connected to a D input of the flip-flop 280 so that the flip-flop toggles with each clock signal which occurs with each write to the display RAM. The output $\overline{Q}$ is also connected by a line 296 to the gates of four transistor switches 298a–d of the multiplexer 282. An output Q of the flip-flop is connected by a line 300 to the gates of four transistor switches 302a–d. (The flip-flop 280 is shown in greater detail in FIG. 19).

The inputs of the transistor switches 298a–d are connected to the four most significant bits (the upper half) of the data bus 66a with the transistor switches 302a–d connected to the four least significant bits (the lower half) of the data bus 66a. If the state of the expand flip-flop 280 is a logical 1, the transistor switches 302a–d will conduct the lower half of the data bus 66a to the expander. Otherwise, a logical 0 will cause the transistor switches 298a–298d of the multiplexer 282 to conduct the upper half of the data bus 66a.

The output of the transistor switches 302d and 298d are connected by an inverter 304 to the gates of a pair of transistor switches 306a and 306b of the expander decoder indicated generally at 290. The output of the inverter 304 is also connected by an inverter 308 to the gates of a pair of transistor switches 310a and 310b.

A line 312a is connected to ground by a transistor 314 whose gate is connected to the output of bit 0 of the expand register 286. (The logic design of each bit of the expand register is similar to that of the bit of the latch of the microcycle decoder 212 shown in FIG. 15). The line 312a is connected to the voltage source VDD by the transistor 306a and a pull-up transistor 316.

If the state of bit 0 of the expand register 286 is a logical 1, the transistor 314 is turned on which pulls the line 312 to ground or logical 0, otherwise it is a logical 1. Thus the contents of bit 0 of the expand register controls the logic state of the line 312 wherein the logic state of the line 312 is the complement of bit 0 of the expand register 286. In a similar manner, the logic state of a line 312b connected to the transistor switch 306b is the complement of the value of bit 1 of the expand register 286.

Also the logic state of a pair of lines 318a and 318b are the complements of the bits 2 and 3, respectively, of expand register 286. The lines 318a and 318b are connected to the transistor switches 310a and 310b, respectively.

If the input of the inverter 304 (either bit 0 or bit 4 of data bus 66a, depending upon flip-flop 280) is a logical 0, the transistors 306a and 306b are turned on, which selects the lines 312a and 312b which contain the complemented values of bits 0 and 1 of the expand register. On the other hand, if the input of the inverter 304 is a 1, the transistors 310a and *b* are turned on which selects the lines 318a and 318b containing the complemented values of the bits 2 and 3. The transistors 306a and 310a are connected to a common output line referred to as expand data bit 0 or EDB0. Similarly, the transistors 306b and 310b are connected to output line EDB1; thus a bit from the multiplexer 280 at inverter 304 is expanded into the logic states of lines ED0 and ED1, or simply bits ED0 and ED1. A 0 is expanded into bits ED0 and ED1 which are defined by the complement of bits 0 and 1 of the expand register and a 1 is expanded into bits ED0 and ED1 defined by the complement of bits 2 and 3 of the expand register 386.

In a similar manner, the remaining bits of the lower half of the data bus 66a, (or remaining bits of the upper half if the upper half of the microcycle data bus is selected by the multiplexer 282) are expanded into the expand data bits ED2 and ED3, ED4 and ED5, and ED6 and ED7 which are also defined by the complement of either bits 0 and 1 or 2 and 3 of the expand register. For example, if the expand register bits 0 and 1 contain the values 1 and 0, respectively, the expand register bits 2 and 3 contain the values 0 and 0, respectively, and the half of the microcycler data bus being expanded has the values 0, 1, 1 and 0. These values will be expanded into the pixel values 01, 00, 00 and 01, respectively.

A pixel is generally represented by 2 bits so that a byte of pixel data having 8 pixel data bits or PDB7–PDB0, represents four pixels with the first pixel represented by pixel data bits PDB0 and PDB1, the second pixel by PDB2 and PDB1, etc. The pixel data bit PDB6 will be referred to as the low bit of the first pixel with PDB7 as the high bit. Similarly, the second pixel has low and high bits PDB4 and PDB5, etc.

The functions shift, rotate, and flop can be thought of as operating on pixels as a whole rather than as individual bits. Accordingly, there is provided a shifter, rotator, and flopper for both of the two bits of data representing pixels. Thus, referring to FIG. 11C, there are provided shifter circuits 320*a* and *b*, rotator circuits 322*a* and *b*, and flopper circuits 324*a* and *b*, for the low pixel data bits (PDB6, PDB4, PDB2 and PDB0) and the high bits (PDB7, PDB5, PDB3 and PDB1), respectively, of a byte of pixel data.

The expand function, as with all the other functions, may be bypassed. Accordingly, the expand decoder 290 has a 4-bit output line 326*a* for the low pixel data bits connected to inputs of a 2-to-1 multiplexer 328*a* and a four-bit output line 326*b* for the high pixel data bits connected to inputs of a 2-to-1 multiplexer 328*b*. The other four inputs of the multiplexer 328*a* are connected to the low bits (D6, D4, D2 and D0) of the data bus 66*a* by a 4-bit input line 330*a* with the other 4 inputs of the multiplexer 328*b* connected to the high bits D7, D5, D3 and D1 by a line 330*b*.

The output of the function generator register 274 is connected by a 7 bit output line 332 to a latch 334 having a control input line for address bit $\overline{A14}$ connected to the address bus 75 of the CPU. When address bit $\overline{A14}$ is low, the contents of the function generator register are gated through the latch 334. The output of the latch 334 corresponding to bit 3 of the function generator register is connected to the select inputs of the multiplexers 328*a* and 328*b* by a line 336. Thus, bit 3 of the function generator register controls the multiplexers 328*a* and 328*b*.

if bit 3 is a 0, for example, the multiplexer 328*a* will conduct the low bits of pixel data from the expand decoder 290 but if bit 3 is a 1, the multiplexer 328*a* will conduct the low bits of pixel data from the data bus 66*a*. The multiplexer 328*b* operates in a similar manner for the high bits of pixel data. In this manner, the expand function may be bypassed by placing a 1 in bit 3 of the function generator register.

The output of the multiplexer 328*a* is connected to the inputs of the shifter 320*a* and to the inputs of the rotator 322*a* with the output of the multiplexer 328*b* connected to the inputs of the shifter 320*b* and rotator 322*b*. As noted before, the shift and rotate functions are not performed at the same time. Bits 0 and 1 of the function generator register 274 control the amount of shift, if any, performed by the shifters 320*a* and *b*. The outputs of latch 334 corresponding to the bits 0 and 1 are connected to the shifter 320*a* and 320*b* by a 2 bit line 338.

Bit 2 of the function generator register controls whether a rotate is performed and its corresponding latch output is connected to rotators 322*a* and 322*b* by a line 340. The output of the shifter 320*a* and the rotator 322*a* are connected to the inputs of the flopper 324*a* with the output of rotator 322*b* and shifter 320*b* connected to the input of flopper 324*b*. The output of the latch 334 corresponding to bit 6 of the expand register 274 is connected to the floppers 324*a* and *b* by a line 342 and controls whether a flop function is performed.

The function generator register 274 is shown in FIG. 13 to comprise a 7-bit register having 7 inputs connected to the D6-D0 bits of the data bus 66*a*. (The logic design of each bit of the register 274 is also similar to the bit of the latch of the microcycle decoder 212 shown in FIG. 15). The latch 334 comprises NOR gates 334*a–g* each having an input connected to the address bit line $\overline{A14}$ and an input connected to an output of bits 6–0, respectively, of the function generator 274. The function generator register select line 218 is connected by a buffer 385, and by an inverter 346, to the function generator register 274.

The multiplexer 328*b*, rotator 322*b*, shifter 320*b* and flopper 324*b* for the high pixel data bits are constructed and operate in a manner similar to the multiplexer 328*a*, rotator 322*a*, shifter 320*a* and flopper 324*a*, for the low pixel data bits. Therefore, only those modifiers for the low pixel data bits (PDB6, PDB4, PDB2 and PDB0) will be described in detail. The high and low pixel data bits are modified at the same time and reassembled before being written to the display RAM.

The output of the NOR gate 334*d* (corresponding to bit 3 of the function generator register) is connected by line 336 to the select input A of the 4 units 328*a*0, 328*a*2, 328*a*4 and 328*a*6 of the multiplexer 328*a*. The line 336 is also connected to the select input B of each multiplexer unit by an inverter 348.

Figure 20:
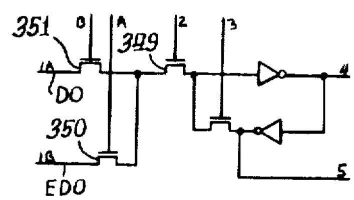
Figure 30:
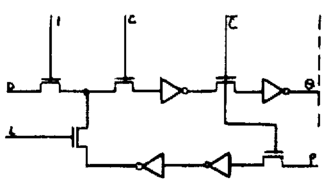

One such multiplexer unit, 328*a*0, is shown in greater detail in FIG. 20. The multiplexer unit 328*a*0 has an input 1A, connected to the unexpanded MDO bit of the data bus 66*a* and an input 1B, connected to the bit ED0 of the expand data bus 326*a*. The ED0 input is connected to a D type flip-flop shown generally at 349 having outputs 4 and 5, by a transistor switch 350 having a gate connected to the line 336 (not shown). The MD0 input is connected to the D flip-flop 348 by a transistor switch 351 whose gate is connnected to the line 336 through the inverter 348 (also not shown). Thus if the line 336 is a logical 1 (which is controlled by bit 3 of the function generator register when the address bit $\overline{A14}$ is a logical 0), the ED0 bit from the expander is conducted to the D flip-flop. The output of this D flip-flop defines pixel data bit PDB0. The output of the eight flip-flops of the multiplexer 328*a* and *b* for the low and high pixel data bits, respectively, together define PDB7-PDB0. Thus if the line 336 is a logical 1, the pixel data bits PDB7-PDB0 will be determined by expand bits ED7-ED0. But if the line 336 is a 0, the unexpanded bit from the data bus 66*a* is conducted to the D flip-flop and PDB0 is defined by MD0. In such a manner, bit 3 of the function generator register determines whether the expand function is utilized or whether the pixel data from the microcycle data bus is transferred directly. Each multiplexer unit of multiplexer 328*a* has an output line 352*a–d*, respectively, and carries the low pixel data bits PDB0, PDB2, PDB4 and PDB6, respectively.

The output line of each multiplexer unit is connected to the shifter for the low pixel data bits, indicated generally at 320*a* and the rotator for the low bits, indicated generally at 322*a* in FIG. 13. The shifter 320*a* comprises a programmed logic array (PLA) 321 having a plurality of input lines selectively coupled to a plurality of output lines 368*a–p* by a plurality of pull-down transistors 350. The output lines 352*a–d* of the multiplexer 328*a* are four of the PLA input lines.

Figure 21:
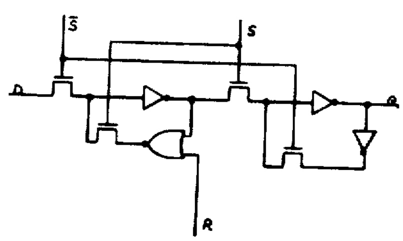

The shifter 320*a* further comprises a register 354*a* having 4 bits 354*a*0, 354*a*2, 354*a*4 and 354*a*6 which are connected to the inputs 356*a–d* of the PLA 321, respectively, (with bit 354*a*0 shown in greater detail in FIG. 21.) The register 354*a* stores the 4 low bits of the last pixel data byte from the CPU to be written to the display RAM which may be the previous byte of the sequence of bytes (such as those shown in FIG. 6) to be shifted. The register 354*a* is also clocked by the signal $\overline{\text{SHIFT}}$.

The NOR gate 344*a* (corresponding to bit 0 of the function generator register) of the latch 334 is connected by a line 358 to another input of the PLA 321. The line 358 is also connected to an input 359 by an inverter 360. NOR gate 344*b* (corresponding to bit 1 of the function generator register) of latch 334 is connected by a line 362 to an input of the PLA, with the line 362 also connected to an input 364 by an inverter 366. Bits 0 and 1 of the function generator register define the least and most significant bits of the shift amount performed by the shifter 320*a*. Each of the output lines 368*a–p* is connected to the voltage source VDD by one of a plurality of pull-up transistors 370.

The actual amount of the shift performed by the shifter 320*a* is the complement of the bits contained within bits 0 and 1 of the function generator register since the NOR gates 344*a* and *b* invert the outputs of bits 0 and 1 when the address bit A14 is low. Thus, if bits 0 and 1 have the value "11", this is complemented to the values "00" resulting in a shift of 0 pixel positions.

A shift of 1 position shown in FIG. 6 will be explained to illustrate the operation of the shifter 320*a*. If the bits 1 and 0 of the function generator register have the value "10", the complement of this is "01" indicating a shift of 1 pixel position. Thus, the line 358 will have the logic value of 1 with the line 362 at a logic value 0. The lines 359 and 364 will, of course, be a logical 0 and 1, respectively. As seen by the placement of the pull-down transistors 350, a logical 1 on the line 358 and the line 364 results in all the output lines being pulled down to logical 0 except output lines 368*c*, 368*g*, 368*k* and 368*o* since these lines do not have a pull-down transistor coupled to either the input line 358 or 364. The output lines 386*c* does have a pull-down transistor 350*a* coupled to the input line 352*b* which carries pixel data bit PDB2 from the multiplexer 328*a*. Thus the logic state of the output line 368*c* is the complement of the logic state of the input line 352*b* (or PDB2) from the output of the multiplexer unit 328*a*2. The pixel data bit PDB0 output of the shifter corresponds to output lines 368*a–d* and the particular value of PDB0 depends upon which of the lines 368*a–d* are selected by the input lines 358 and 362. Here, output line 368*c* was selected, therefore the pixel data bit PDB0 output of the shifter is defined by the PDB2 output of the multiplexer (but complemented). Since PDB0 is the low bit of the two bits representing the first pixel of a byte of pixel data and PDB2 is the low bit of the two bits representing the second pixel, it is seen that the pixel data values outputted by the multiplexer have shifted one pixel position.

Output lines 368*e–h* of the shifter correspond to PDB2 with output lines 368*i–l* and 368*m–p* corresponding to PDB4 and PDB6 respectively. The output line 368*g* is coupled by a pull-down transistor 350*b* to the line 352*c* which carries the bit PDB4 from the multiplexer. Thus output line 368*g* (PDB2 of the shifter) has the complement of the logic state of PDB4 from the multiplexer. Output line 368*k* (PDB4) has the complement of the bit PDB6 from the multiplexer.

The output line 368*o* of the shifter corresponding to PDB6 is coupled by a pull-down transistor 350*d* to the output bit 354*a*0 of the register 354*a*. Register 354*a* stores the low pixel data bits of the previous pixel data byte from the CPU to be written to memory. Bit 354*a*0 contains the pixel data bit PDB0 of the previous byte. Thus the logic state of the output line 368*o* (PDB6) is the complement of the bit PDB0 of the previous byte to be written.

Thus, for example, if the output bits PDB6, PDB4, PDB2 and PDB0 of the multiplexer 328*a* are the low bits of the 8 bits representing the pixel values P7, P6, P5 and P4, respectively, of byte 1 of the sequence of bytes to be shifted shown in FIG. 6, and the output of the register 354*a*0 is the low bit of the 2 bits representing pixel value P0 of the prior byte of the sequence, it is seen that the low pixel data bits PDB6, PDB4, PDB2 and PDB0 of byte 1 (together with the high pixel data bits PDB7, PDB5, PDB3 and PDB1) represent pixel data values P0, P7, P6 and P5, respectively, after a shift operation of 1 pixel position.

It is assumed that the first byte of pixel data of a sequence of bytes to be shifted is the first byte to be written to the display RAM after an output by the CPU to the function generator register. Accordingly, each bit of the register 354*a* has a reset input connected by a line 372 to the function generator register select line 218 such that the register 354*a* is reset to 0 with each output to the function generator register. Thus zeros are shifted into the first byte of a sequence as shown in FIG. 6. Each sequence is initialized by an output to the function generator register and therefore data should not be sent to the function generator register in the middle of the sequence.

The output pixel data of the shifter are in complemented form (whether shifted or not) and will be recomplemented by the flopper indicated generally at 324*a*. The NOR gate 344*g* has an input connected to the $\overline{\text{A14}}$ address bit and an input connected to bit 6 of the function generator register 274 which determines whether the flop function is performed when $\overline{\text{A14}}$ is low. The output of the NOR gate 344*g* is connected by a line 374 to the gates of four transistor switches 376*a–d*. The logic state of the input line 374 is inverted by an inverter 378 whose output is connected to the gates of transistor switches 380*a–d* of the flopper 324*a*. The output lines 368*a–p* of the shifter 320*a* are the input lines of the flopper 324*a*. The flopper 324*a* also comprises a programmed logic array having output lines 382*a–h* coupled to the input lines 368*a–p* by a plurality of pull-down transistors 384.

Figure 22:
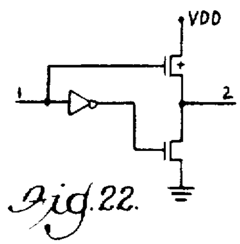
Figure 17:
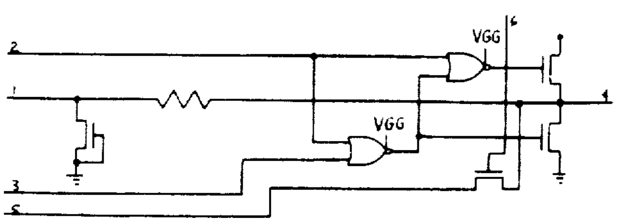
Figure 35:
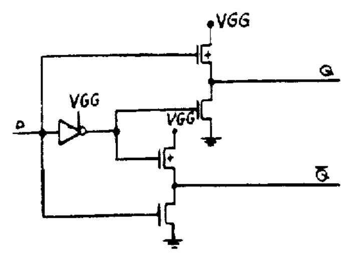

The output lines 382*a* and *b* are connected by the switches 376*a*and 380*a*, respectively, to a buffer 385 having an output line which is the flopper PDB0 output line 377*a*. (A typical buffer 385 logic circuit is shown in FIG. 22.) Lines 382*c* and *d* are connected by switches 376*b* and 380*b*, respectively, to a buffer 385 having the flopper PDB2 output line 377*b*, with the lines 382*e* and *f* connected by switches 376*c* and 380*c*, respectively, to a buffer 385 having the PDB4 output line 377*C* and the output lines 302*g* and *h* connected by switches 376*d* and 380*d*, respectively, to a buffer 385 having the flopper PDB6 output line 377*d*. The input line 368*c* (containing the complemented output pixel data bit PDB0 of the shifter when set for a shift of 1 pixel position) is coupled to the output line 382*b* by a pull-down transistor 384*a* and to the output line 382*g* by a pull-down transistor 384*b* wherein the logic state of the complemented shifter output bit PDB0 is recomplemented and carried uncomplemented on the flopper output lines 382*b* and 382*g*. A logical 1 state of the input line 374 turns on the transistor switch 376*d* whereby the shifter output bit PDB0 is conducted to the flopper PDB6 output line 377*d*. Thus, the PDB0 output of the shifter 320*a* is flopped to the flopper 324*a* output bit PDB6 when the input line 374 is a logical 1. On the other hand, if the logic state of line 374 is 0, the output of the inverter 378 is a logical 1 which turns on the transistor switch 380*a*- which conducts the shifter PDB0 bit to the flopper PDB0 line 377*a* and is not flopped. Thus when the logic state of the input line 374 is 0, the output of the shifter is not flopped. The other inputs of the flopper 324*a* for the bits PDB2, PDB4 and PDB6 are handled in a similar manner.

As an example, if the byte of pixel data being written to the display RAM represents pixel values P7, P6, P5 and P4 as for the byte of original data of FIG. 6 and the shifter is set for zero shifts so that the shifter does not shift the data, then the PDB6, PDB4, PDB2 and PDB0 output bits of the shifter 320*a* are the low bits of the bits representing pixel values P7, P6, P5 and P4, respectively, (but complemented). When bit 6 of the function generator register is a logical 0, the logic states of the pixel data bits will be recomplemented and flopped so that the PDB6, PDB4, PDB2 and PDB0 output bits of the flopper 324*a* (together with the PDB7, PDB5, PDB3 and PDB1 output bits of the flopper 324*b*) represent the pixel data values P4, P5, P6 and P7 after the flop operation as shown in FIG. 6.

The rotate function is performed on the low pixel data bits by a rotator indicated generally at 322*a* and comprises a programmed logic array 386 having 4 input lines connected to the register 354 PDB0, PDB2, PDB4 and PDB6 output lines 356*a–d* and 12 input lines connected to the 12 outputs of four 3-bit shift registers 388–391. The input of the first bit 388*a* of the shift register 388 is connected to the PDB0 input line 356*a* with the inputs of the first bits 389*a*–391*a* of register 389–391 connected to the PDB2, PDB4 and PDB6 lines 356*b–d*, respectively. (A typical bit circuit 388*a* of the bits of the shift registers 388–391 is shown in greater detail in FIG. 23.)

The rotator is used to rotate a four-by-four pixel image 90° in a clockwise direction. The four-by-four pixel image represented in FIG. 7A is shown with the individual pixel data bits PDB0–PDB7 of each of the four data bytes labeled. The rotator is initialized by an output to the function generator register and will reinitialize itself after every 8 writes to the display RAM. To perform a rotation, the following procedure is performed. The top byte or byte 0 of the unrotated image is written to a location in the display RAM. The next byte, byte 1 is written to the first location plus 40, byte 2 to the first location plus 80, and the last byte, byte 3 to the first location plus 120. These four locations correspond to 16 contiguous pixels since 40 bytes represent one line of pixels on the display screen. The process is then repeated with byte 0 rewritten to the first location, byte 1 to the first location plus 40, byte 2 to the first location plus 80 and byte 3 to the first location plus 120. After these 8 writes, the data will appear in the display RAM and (subsequently) the image on the screen rotated 90° from the original as shown in FIG. 7B.

The low 4-bit rotator 322*a* further comprises a 3-bit counter 394 for counting the 8 writes completed in a rotate sequence. (The logic circuitry of the bits 0–3 is shown in greater detail in FIG. 24 with bit 3 excluding that portion shown in phantom.) The counter 394 has a "clear" input, 2, connected to the function generator register select line 218 so that the counter is initialized to 0 with each output to the function generator register 274. A NOR gate 400 having a "$\overline{\text{DATEN}}$" control signal input and an address bit $\overline{\text{A14}}$ input is connected by series connected inverters 396 and 398 to the toggle input of the counter 394. The $\overline{\text{DATEN}}$ control signal is generated by a memory control circuit (FIG. 11F) of the data chip and is activated during memory write cycles. The NOR gate 400 has the input connected to the address bit A14 so that the counter is toggled only during memory write cycles in which the data written is to be modified by the function generator.

The output of the third bit (bit 2) of the counter 394 is connected to the input of a NOR gate 402 which also has an input connected to the output of the inverter 396. The output signal of NOR gate 402, $\overline{\text{SHIFT}}$ is connected to the shift inputs of the shift registers 388–391 and clock inputs of register 354 (as well as flip-flop 280 of the expander). During the first four memory writes of a rotate sequence, the third bit of the counter 394 is 0 (since the counter counts from 000 to 011) therefore, the NOR gate 402 performs as an inverter wherein the $\overline{\text{DATEN}}$ signal from the inverter 396 generates a shift signal at the output of the NOR gate 402 with each of the first four writes to the display RAM of a rotate sequence. With the next or fifth write, however, the third bit of the counter 394 goes to a logical 1 which drives the output of the inverter 402 low for the last four memory writes of a rotate sequence. The $\overline{\text{SHIFT}}$ clock signal is activated with each write to the display RAM (except for the last four writes of a rotate operation) whether or not the rotate function is utilized in a write of data to the display RAM. Thus the $\overline{\text{SHIFT}}$ signal is also used to clock the Expand flip-flop 280 so that the flip-flop 280 toggles with each write operation to the display RAM.

Each low bit of the first three bytes of a rotate sequence are shifted into the shift registers 388–391 of the low bit rotator 322*a*. Shift register 388 stores the pixel data bit PDB0 of pixels P0, P4 and P8 of the first three bytes, respectively, of the rotate sequence of FIG. 7A. Similarly, shift register 389 contains the low pixel data bit PDB2 of pixels P1, P5 and P9 after the first four memory writes of the rotate operation. The particular pixel data bits for each of the registers 388–391 are shown in FIG. 40.

The programmed logic array 386 of the rotator 322*a* further has inputs 404*a*–404*c* connected to the outputs of bits 388*a*–388*c*, respectively, of the shift register 388. The output of bits 389*a–c* of the shift register 389 are connected to the input lines 406*a–c* with the output of bits 390*a–c* and 391*a–c* of the shift registers 390 and 391 connected to the input lines 408*a–c* and 410*a–c*, respectively. The input lines 356*a–d* from the register 354 are coupled to output lines 412*a–d*, respectively, by four pull-down transistors 414. The output lines 412*a–d* are connected by four transistor switches 416*a–d* to the voltage source VDD by a pull-up transistor 418 and also to a common output line 420 which carries the pixel data bit PDB6 output of the rotator in complemented form.

The input lines 404*a*, 406*a*, 408*a* and 410*a* (from the LSB of the shift registers 388–391) are coupled to output lines 422*a–d*, respectively, by four pull-down transistors 424. The output lines 422*a–d* are connected by four transistors switches 426*a–d*, respectively, to a common output line 428 and to voltage source VDD by a pull-up transistor 430. The output line 428 carries the pixel data bit PDB4 output of the rotator in complemented form. The input lines 404*b*, 406*b*, 408*b* and 410*b* and input lines 404*c*, 406*c*, 408*c* and 410*c* are coupled to output lines 432*a–d* and output lines 434*a–d*, respectively, by pull-down transistors 436 and 438 respectively.

The output lines **432*a–d* are connected by four transistor switches 440*a–d* to a common output line 422 (for pixel data output bit PDB2) and to the voltage VDD by a pull-up transistor 444. The output lines 434*a–d* are connected by four transistor switches 446*a–d* to a common output line 448 (for pixel data output bit PDB0) and to voltage source VDD by a pull-up transistor 450**.

The rotator **322*a* has a second programmed logic array 452 having four output lines 454–457 which controls the transistor switches 416, 426, 440 and 446. The output line 457 is connected to the gates of the transistor switches 416*a*, 426*a*, 440*a*, and 446*a* with the output line 456 connected to the gates of the transistor switches 416*b*, 426*b*, 440*b* and 446*b***, etc.

The program logic array 452 has an input line 460 connected to the output $\overline{Q}$ of the third bit of the counter 394. The input line 460 is coupled to each of the output lines 454–457 by four pull-down transistors 462. Thus, when the third bit of the counter 394 is a logical 0 (i.e., during the first four writes to the display RAM of the rotate sequence) the output $\overline{Q}$ of the third bit is a logical 1 which pulls down the four output lines 454–457 of the PLA 452 which turns off the transistor switches **416*a–d*, 422*a–d*, etc. These switches are turned off since during the first four writes, the four shift registers 388–391 are being loaded with the proper pixel data bits of the first four writes. The PLA 452 has an input line 463 connected by an inverter 464 to the output of the NOR gate 344*c* of the latch 344. The input line 463 is coupled to the output lines 454–457 by four pull-down transistors 466, respectively. If bit 3 of the function generator register 274 is a logical 1, the logic state at the input line 463 will also be a logical 1 which pulls down the output lines 454–457 to a logical 0 turning off the transistor switches 416*a–d*, 426*a–d*, etc. of the programmed logic array 386**. The rotate function may be bypassed in this manner.

The PLA 452 has inputs 468 and 470 connected to the Q outputs first and second bits, respectively, of the three-bit counter 394. The input line 468 is connected to a second input line 469 by an inverter 472. The input line 470 is connected to still another input line 471 by an inverter 474. The input lines 468–471 are coupled to the output lines 454–457 by a plurality of pull-down transistors 476 such that as the counter 394 counts from 4 (100 Binary or B) to 7 (111 B) the output lines 454–457 are successively activated. Thus, when bits 1 and 2 of counter 394 are both 0, the output line 454 is enabled and with bits 1 and 0 equal to 01, respectively, output line 455 is enabled, etc.

As noted before, during the first writes of the rotate sequence, the shift registers 388–391 are loaded with their respective bits of the first three bytes of the rotate sequence of data with the last byte being stored in register 384. This corresponds to counts 0–3 of the counter 394. For counts 4–7 data is no longer shifted into the registers while the CPU re-transmits the four pixel data bytes of the sequence to be rotated. At count (100 B) in which byte 0 is transmitted, the output line 454 is enabled which turns on the transistor switches **416*d*, 426*d*, 440*d* and 446*d***.

Since output line **412*d* is coupled to input line 456*d* from register 384, pixel data bit PDB6 of the previous (at last) data byte of the sequence (i.e., byte 3), appears on the output line 420 (PDB6) of the rotator in complemented form. The pixel data bit PDB6 of byte 3 of the sequence is the lower bit of the pixel value represented by P15. The lower pixel data bit representing the pixel data value P11 stored in the 391*a* bit of the shift register 391 connected by the input line 410*a* is complemented by a pull-down transistor 424 and conducted by the transistor switch 426*d* to the PDB4 output line 428 of the rotator 322*a*. In a similar manner, the low pixel data bits representing pixel data values P7 and P3 stored in the shift register 391 appear on the rotator 322*a* pixel data outputs PDB2 and PDB0, respectively, since the transistor switches 440*d* and 446*d*, respectively, are turned on. Thus, although the CPU transmits byte 0 at count 100** B, the byte representing pixel data values P15, P11, P7 and P3 is actually written to the display RAM at the first location as shown in FIG. 7B.

On the next write to the display RAM, the count of the counter 394 changes to 101 B wherein the PLA 452 in turn causes the transistor switches **416*b*, 426*b*, 440*b*, and 446*b* to turn on. The low pixel data bit representing pixel data value P14 carried by input line 356*c* from the register 354 appears in complemented form on the rotator 322*a* output PDB6 line 420. Also, the low pixel data bits representing pixel data values P10, P6 and P2 stored in the register 390 appear in complemented form on the rotator 322*a* PDB4, PDB2 and PDB0 output lines 428, 442 and 448, respectively, and are stored in the first memory location plus 40, as indicated in FIG. 7B. After the last two writes, the low pixel data bits (as well as the high pizel data bits from the rotator 322*d*) representing the pixel data values will appear in the display RAM as shown in FIG. 7B. The flopper 324*a* recomplements the pixel data bits from the rotator 322*a*** so that the pixel data bits are stored in uncomplemented form in the display RAM.

Thus, the pixel data that will be written to the display RAM is transmitted by the CPU in the first four "writes" to the display RAM of the four bytes of the rotate sequence and is latched up in the registers 388–391 and 354. The rotate sequence is then re-transmitted (but any data could actually be sent) to the same four addresses of the display RAM with the pixel data latched up in the registers 354 and 388–391 actually being written to those four display RAM addresses represented in FIG. 7B. The rotator, shifter and flopper circuits for the high pixel data bits (PDB7, PDB5, PDB3 and PDB1) are indicated generally at **322*b*, 320*b* and 324*b*, respectively, in FIG. 13. The modifications to the high pixel data bits PDB7, PDB5, PDB3 and PDB1 are performed by the rotator 322*b*, the shifter 320*b* and the flopper 324*b* simultaneously with the modifications performed on the low pixel data bits. Each pixel data value, represented by a high and a low pixel data bit, can be shifted, flopped, or rotated as shown in FIGS. 6 and 7*a* and *b***.

The OR and exclusive-OR functions are performed by an OR/exclusive-OR circuit 480 shown in FIG. 11C to have a four bit input line **482*a* connected to the output of the low pixel data bit flopper 324*a* and a four bit input line 482*b* connected to the output of the high pixel data bit flopper 324*b*. The OR/exclusive-OR circuit 480 has two further inputs connected by a two-bit input line 484 to the latch 334 which latches the complement of bits 4 and 5 of the function generator register 274** when the address bit $\overline{A14}$ is low. These bits determine whether or not the OR or exclusive-OR functions, respectively, are performed.

These functions can be thought of as operating on a byte of pixel data as 8 bits rather than as 4 pixels. When the OR function is used in writing data to the display RAM, the input to the OR/exclusive-OR circuit is ORed with the contents of the display RAM location being accessed by the addressed chip. Accordingly, the OR/exclusive-OR circuit 480 has 8 inputs connected by an 8-bit input line 486 to a tri-state buffer 488 which is connected to an 8-bit memory data bus 490 from the display RAM which carries the memory data bits MDO–MD7.

Pixel data that was stored in the display RAM which is to be used in an OR or exclusive-OR operation, is latched up in the OR/exclusive-OR circuit 480. The OR/exclusive-OR circuit 480 has an 8bit output line 492 connected to the tri-state buffer 488 on which the resultant pixel data is carried to be stored at the display RAM location from which the pixel data was accessed.

The OR/exclusive-OR circuit 480 is shown in greater detail in FIG. 13 and comprises 8 units **480*a*–*h*. Each OR/exclusive-OR unit can perform an OR or exclusive-OR (as determined by bits 4 and 5 of the function generator register 274**) on a pixel data bit from the flopper and from the display RAM and can store the resultant pixel data bit in the display RAM.

Figure 25:
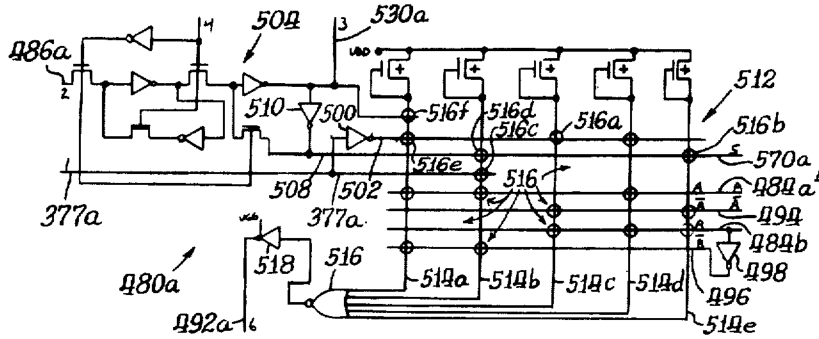

A typical unit **480*a* is shown in greater detail in FIG. 25. The unit 480*a* has an input connected to the output line 377*a* (which is one of the input lines 482*a* in FIG. 11C) which carries the pixel data bit PDB0 output of the flopper 324*a* and an input 486*a* which carries the pixel data bit PDB0 from the display RAM. The unit has an input 484*a* connected to the output of the NOR gate 344*e* of the latch 334 associated with bit 4 of the function generator register 274. Bit 4 determines whether or not the OR function is performed. The input line 484*a* is also connected to an inverter (not shown) having an output connected to an input 494. The unit has an input 484*b* connected to the output of the NOR gate 344*f* associated with bit 5 of the expand register which controls whether or not the exclusive-OR function is performed. The input line 384*b* is also connected to an input line 496 by an inverter 498**.

The input line **377*a* (the PDB0 bit from the flopper) is connected by an inverter 500 which is connected to a line 502. The input line 486*a* (for the PDB0 bit from the display RAM) is connected to a latch indicated generally at 504 which latches up the pixel data bit from the display RAM until the pixel data bit from the flopper arrives for the OR or exclusive-OR function. The latch 504 has an output line 506 which is connected to a line 508 by an inverter 510**.

The unit **480*a* further comprises a programmed logic array indicated generally at 512 which performs either the OR function or exclusive-OR function (or neither) as determined by bits 4 and 5 of the function generator register. The PLA 512 has output lines 514*a*–*e* selectively coupled by a plurality of pull-down transistors 516 to the lines 500, 502, 508, 377*a*, 494*a*, 494, 484*b*, and 496. The lines 514*a*–*e* are connected to a NOR gate 516 having an output connected to an inverter 518 which has an output 492*a* (of lines 492 FIG. 11C**).

To illustrate the operation of the unit **480*a*, it will be assumed that bits 4 and 5 of the function generator register have the values 0 and 1, respectively, which indicates an OR function is to be performed. When bit 4 is a logical 0, line 484*a* is a logical 1 which pulls-down the lines 514*a*, 514*b* and 514*d* to a logical 0. The PDB0 bit from the flopper carried on the line 377*a* is inverted by the inverter 500 and recomplemented by the pull-down transistor 516*a* so that line 514*c* carries the PDB0 bit from the flopper in the uncomplemented form. The PDB0 bit from the display RAM is complemented by the inverter 510 and recomplemented by the pull-down transistor 516*b* so that the line 514*e* carries the PDB0 bit from the display RAM in the uncomplemented form. Thus, if either the line 514*c* or line 514*e* is a logical 1, the output of the NOR gate 516 will be a logical 0 which is inverted by the inverter 518 to a logical 1 on line 492*a*. However, if both the lines 514*c*** and *e* are logical 0, the output of the NOR gate 516 is a logical 1 and the output of the inverter 518 is a logical 0. Thus, the logical OR function is performed on the PDB0 bits from the display RAM and from the CPU transmitted through the flopper.

To perform an exclusive-OR function, bits 4 and 5 of the function generator register are set to 1 and 0, respectively. The input line 494 then is a logical 1 which pulls the lines **514*c* and 514*e* to a logical 0. Also, the line 484*b* is a logical 1 which pulls the line 514*d* in addition to a logical 0. The line 377*a* which carries the PDB0 bit from the CPU (transmitted through the flopper 324*a*) is coupled to the line 514*b* by a pull-down transistor 516*c*. The line 508 which carries the complemented PDB0 bit from the display RAM is coupled to the line 514*b* by a pull-down transistor 516*d*. Thus, if the PDB0 bit from the CPU is a logical 0 and the complemented PDB0 bit from the display RAM is a logical 0 (i.e., the PDB0 bit from the display RAM is a logical 1) the logic state of the line 514*b* will be a logical 1 resulting in the output of the NOR gate 516 being a logical 0 and the output line 492*a* of the OR/exclusive-OR unit 480*a* being a logical 1. Otherwise, the logic state of the 514*b* line is a logical 0 and the logic state of the output line 492*a* depends upon the logic state of the line 514*a***.

The line 502 which carries the complemented PDB0 bit from the CPU is coupled to the line **514*a* by a pull-down transistor 516*e*. The line 506 which carries the PDB0 bit from the display RAM is coupled to the line 514*a* by a pull-down transistor 516*f*. Thus, if the complemented PDB0 bit from the CPU is a logical 0 (i.e., the PDB0 bit from the CPU is a logical 1) and the PDB0 bit from the display RAM is a logical 0, the logic state of the line 514*a* will be a logical 1 causing the output of the NOR gate 516 to be a logical 0 and the output of the OR/exclusive-OR unit 480*a* at the output line 492*a* to be a logical 1**.

If both the PDB0 bit from the display RAM and from the CPU are both 0 or alternatively are both 1, the logic state of both lines **514*a*** and *b* will be a logical 0 causing the output of the NOR gate 516 to be a logical 1 and the output line **492*a* of the OR/exclusive-Or unit 480*a* to be a logical 0**. Thus, the exclusive-OR function may be performed on th PDB0 bits from the display RAM and the CPU.

In a similar manner, a logical OR or exclusive-OR function can be performed on the PDB1–PDB7 bits from the CPU and the display RAM by the units **480*b*–*h* shown in FIG. 13. The output line 492 of each OR/exclusive-OR unit 480*a*–*h* is connected to the tri-state buffer indicated generally at 488 which is in turn connected to the memory data bus 490. The tri-state buffer 488 has 8 units 488*a*–*h***.

Figure 26:
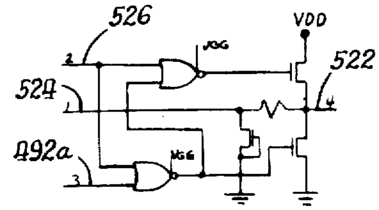
Figure 37:
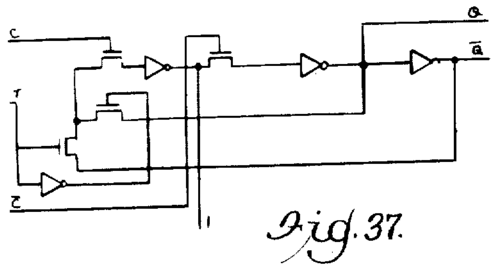

A typical tri-state buffer unit **488*a* is shown in greater detail in FIG. 26. The unit 488*a* has an input/output line 522 connected to the MD0 bit of the memory data bus 490. The tri-state buffer unit 488*a* also has an output line 524, and an input line 526 connected to the $\overline{\text{DATEN}}$ control signal. When the $\overline{\text{DATEN}}$ control signal is low, the logic state of the output line 522 is the same as the data bit carried on the input line 492***a* from the OR/exclusive-OR unit 480*a*. In this manner, the pixel data outputted from the OR/exclusive-OR unit may be transmitted to the display RAM at an address supplied through the address chip.

The CPU may read an intercept register 528 (FIG. 11C) having address 8H to determine if an intercept occurred during a write to the display RAM in which the OR or exclusive-OR function is utilized. An "intercept" is defined as the writing of a non-zero pixel data value at a location in the display RAM that previously contained a non-zero pixel data value. The intercept register 528 has an input connected to the 4-bit output line 482*b* of the flopper 324*b* and an input connected to the 4 bit output line 482*a* of the flopper 324*a* by which the pixel data bits from the CPU may be inputted. The intercept register 528 also has an 8-bit input line 530 connected to the OR/exclusive-OR circuit 480 by an 8-bit line 530. The output of the intercept register 528 is connected by an 8-bit output line 532 to the input of a 2-to-1 multiplexer 534.

The intercept register 528, shown in greater detail in FIG. 13, comprises 8 units 528*a–h*. A 1 in a particular intercept register unit means that an intercept has occurred. Since a pixel is represented by 2 bits of data, a byte of pixel data represents 4 pixels and thus has 4 pixel positions. Intercept register units 528*a–d* indicate whether an intercept has occured in any of the 4 pixel positions in the last write to the display RAM in which the OR or exclusive-OR functions were utilized. The unit 528*a* indicates whether an intercept has occurred in the first pixel position with the unit 528*b* indicating whether an intercept has occurred in a second pixel position, etc.

Figure 27:
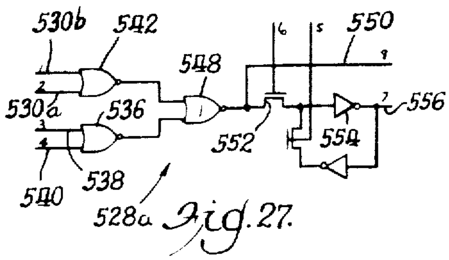
Figure 18:
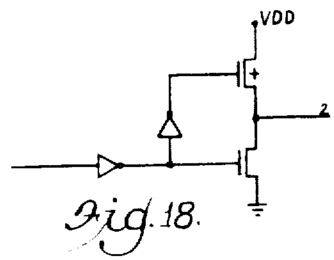

The unit 528*a*, typical of the units 528*a–d*, is shown in greater detail in FIG. 27. The unit 528*a* comprises a NOR gate 536 having an input 538 (connected to one of the lines 482*a*, FIG. 11C) for the PDB0 pixel data bit and an input 540 (connected tö one of the lines 482*b*, FIG. 11C) for the PDB1 pixel data bit from the CPU. PDB0 and PDB1 represent a pixel that is being ORed or exclusive-ORed with pixel data contained in the display RAM. The unit 528*a* further comprises a NOR gate 542 having an input 530*a* for the PDB0 bit from the display RAM latched up in the unit 480*a* of the OR/exclusive-OR circuit 480 and an input 530*b* for the PDB1 pixel data bit from the display RAM latched in the unit 480*b* of the OR/exclusive-OR circuit.

The output of the NOR gate 536 and the NOR gate 542 are connected to a NOR gate 548 having an output line 550. Line 550 is connected by a transistor switch 552 to an inverter 554 having an output line 556.

If the pixel transmitted from the CUP via the flopper 524*a* and *b* and represented by pixel data bits PDB0 and PDB1 is a non-zero pixel, that is, the logic state of the lines 538 or 540 is a logical 1, then the output of the NOR gate 536 is a logical 0. Similarly, if the pixel from the display memory latched up in the OR/exclusive-OR unit is a non-zero pixel, the output of the NOR gate 542 is a logical 0. If the output of both NOR gates 536 and 542 is a logical 0 (i.e., an intercept has occurred in the OR or exclusive-OR operation) the output of the NOR gate 538 is a logical 1 at the line 550. The other intercept register units 528*b–d* operate in a similar manner to indicate whether an intercept has occurred in the other 3 pixel positions.

The intercept register units 528*e–h* give the intercept information for all OR and exclusive-OR writes since the last read or input from the intercept register 528 by the CPU. An input from the intercept register resets the outputs of these units. Thus, each of the 4 intercept register units 528*e–h* is set to 1 if an intercept occurs in the corresponding pixel position and will not be reset until the next intercept register input.

Figure 28:
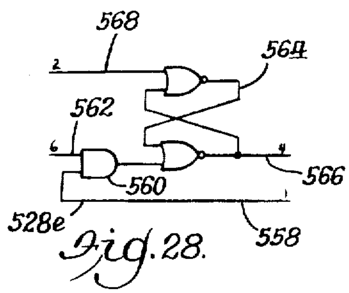
Figure 23:
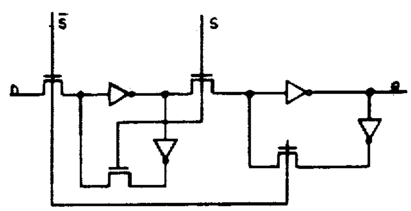
Figure 38:
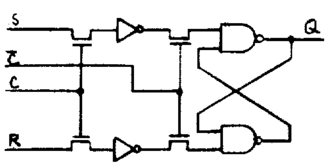

The unit 528*e*, typical of the units 528*e–h*, is shown in FIG. 28 to have an input 558 which is connected to the output 550 of the unit 528*a*. The input 558 is connected to the input of an AND gate 560 which has another input 562 for a clock signal. The output of the AND gate 560 is connected to the input "S" of an SR flip-flop indicated generally at 564 and having an output line 566 (which is one of the lines 532 of FIG. 11C). The SR flip-flop 564 has a reset input "R" line 568 connected to input 2.

If an intercept occurs in the first pixel position, the input line 558 will assume a logical 1 state since it is connected to the output of the intercept register unit 528*a*. When the clock signal on line 562 is a logical 1 the flip-flop 564 will be set. The flip-flop will remain set even though subsequent OR or exclusive-OR operations do not result in an intercept in the first pixel position. The unit 528*e* will remain set until the flip-flop is reset when the data is input from the intercept register 528. The intercept register select line 222 is connected to a delay indicated at 569 (FIG. 13) whose output is connected to the reset input '2' of each unit 528*e–h*.

Referring back to FIG. 11C, the output of the intercept register 528 is connected by the 8-bit output line 532 to the multiplexer 534. The 8-bit line 532 comprises the output lines 556 from the intercept register units 528*a–d* and the output lines 566 from the intercept register units 528*e–h* (FIG. 13). The multiplexer 534 has a select input connected to the select line 222 from the address decoder 214 (FIG. 11B) so that when the line 222 is enabled (corresponding to address 8H) the input lines from the intercept register 528 are selected. The multiplexer further has inputs connected to outputs of the OR/exclusive-OR circuit 480 by an 8 bit line 570. The OR/exclusive-OR circuit latches up data as it is read from the display RAM which may be data other than pixel data for OR or exclusive-OR operations such as instructions to be executed from the display RAM which are to be transmitted to the CPU.

The output of the multiplexer 534 is connected to the tri-state buffer 273. [As seen in FIG. 25, the line 570*a* of the input line 570 (FIG. 11C) is connected to the line 506 of each unit of the OR/exclusive-OR unit by the inverter 510].

The multiplexer 534 is shown to comprise 8 units 534*a–h* in FIG. 13. Each unit selects either a bit of data from the intercept register 528 or a bit of data from the display RAM latched up in the OR/exclusive-OR circuit 480 depending upon the logic state of input select signals.

Figure 29:
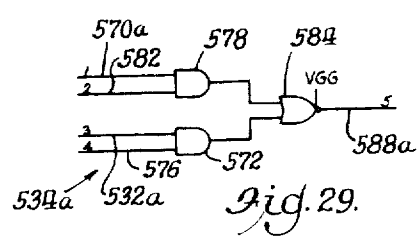

A typical multiplexer unit 534*a* is shown in FIG. 29 to comprise an AND gate 572 having an input 532*a* (one of the 8 bit input lines indicated as 532 in FIG. 11C) connected to the complemented output of the intercept register unit 528*a* at line 556 (FIG. 27) and a select input 576 connected to the intercept registers select line 222. An AND gate 578 has an input 570*a* (which is one of the output lines indicated as 570 in FIG. 11C) connecting the complemented latch output of exclusive-OR unit 480*h* and a select input 582. The outputs of the AND gate 572 and 578 are connected to a NOR gate 584 having an output line 588*a* which is the output line of the unit 534*a* (and is one of the 8 lines indicated at 588 in FIG. 11C connecting the multiplexer 534 to the tri-state buffer 273).

If the select line 582 is a logical 0, then the output of the AND gate 578 is a logical 0. And, if the intercept register select line 222 is a logical 1, then the input line 576 is also logical 1 and the output of the AND gate 572 will be the same as the logic state of the input line 532*a* carrying the complemented data bit from the intercept register. The NOR gate 584 will then recomplement the data. Since the data from the intercept register is in complemented form, the data appearing on the output line 558 will be uncomplemented. Conversely, if the intercept register select line 221 is a logical 0 and the select input 582 is a logical 1, then the complemented data from the display RAM latched up in the OR/exclusive-OR circuit 480 will appear in uncomplemented form on the output line 588. The data on the output line 588 will be transmitted to the CPU via the microcycle data bus 66.

The select line 582 is shown in FIG. 13 to be connected to a line 583 which carries the select signal MENB1 which is generated by the logic elements indicated generally at 585. The inputs to the elements 585 include the CPU control signal $\overline{M1}$.

The Z-80 CPU requires instruction data to arrive in an $\overline{M1}$ cycle (instruction fetch) at a different time than data during non-$\overline{M1}$ cycles. The data latched up in the OR/exclusive-OR circuit may be instructions that were stored in a scratchpad portion of the display RAM. The elements 585 which generate MENB1 which loads the instruction onto the microcycle data bus 66 (via the output lines 588 and tri-state buffer 273), insert a delay so that the instructions arrive at the CPU at the proper time.

It should be noted that non-$\overline{M1}$ cycle data from the RAM may be transferred directly from the memory data bus 490 to the microcycle data bus 66 via tri-state buffer 273 on the clock signal $\overline{ZIP}$. $\overline{ZIP}$ is a function (as is MENB1) of the CPU control signals $\overline{MREQ}$, $\overline{RD}$ and some address bits (so that it can be determined that RAM is being accessed) and is generated by the logic elements indicated generally at 589 and 591 which include a latch 593 (FIG. 13 with each bit of the latch logically similar to that shown in FIG. 15) for the address bits.

Briefly summarizing the operation of the function generator of the data chip, the CPU can update the pixel data stored in the display RAM by transferring pixel data from the ROMs to the display RAM at address sent to the display RAM via the address chip. However, numerous modifications to this pixel data can be performed by the function generator before the pixel data is stored in the display RAM. Thus, depending upon the data sent to the function generator register 274, the pixel data may be expanded, shifted or rotated, flopped, and exclusive-ORed ore ORed with the data already stored in the memory location being addressed.

Referring back briefly to FIG. 2, the display RAM 42 has stored therewithin, pixel data representative of the pixels of a picture displayed on the screen of the TV 28. Each pixel is represented by two bits of data which select a color register which defines the color and intensity of the associated pixel. An additional function of the video processor 52 is to sequentially read the pixel data stored in the display RAM 42, decode the pixel data into color and intensity data signals, convert these signals to analog signals, and supply the signals to the RF modulator 58 which converts the signals to a form suitable for the TV set 28. The address chip 56 sequentially reads the pixel data from the display RAM 42 synchronously with the raster scan of the TV 28 which will be more fully described later.

Each byte of pixel data read is conducted on the memory data bus 490 (FIG. 11C) to the tri-state buffer 488. The 8-bit output line 486 of the buffer 488 is connected to an 8-bit line 590 which divides into two 4-bit lines 592*a* and 592*b*. The line 592*a* is connected to a 4-bit shift register 594 with the line 592*b* connected to a 4-bit shift register 595. The shift register 594 stores the low pixel data bits PDB0, PDB2, PDB4 and PDB6 and shift register 595 stores the high pixel data bits PDB1, PDB3, PDB5 and PDB7, of the 4 pixels represented by a byte of pixel data read from the display RAM. The output of the shift registers 594 and 595 are connected by lines 596*a* and 596*b*, respectively, to the inputs of a multiplexer 598.

The multiplexer 598 has inputs "SERIAL 1" and "SERIAL 0" and two inputs from a background color register 600. The multiplexer 598 has 2 select inputs 602 and 604 to output 2 pixel data bits from either the shift registers 594 and 595 or the SERIAL 0 and SERIAL 1 inputs, or the background color register 600. The multiplexer 598 will operate to select pixel data bits from the background color register 600 when the pixels to be displayed on the display screen are located in the background area indicated at 608 (FIG. 5) of the display screen. The muliplexer 598 will select the pixel data bits from the shift register 594 and 595 (low resolution mode) when the pixels being displayed are located in the area indicated at 610 of the display screen (FIG. 5). Pixel data bits SERIAL 1 and SERIAL 0 will be selected for the area 610 when the video processor is operated in the high resolution mode.

The inter-connection of the shift registers 594 and 595 within the data chip is shown in FIG. 13. Each bit of the shift registers 594*a*-*d* and 595*a*-*d* has an input P connected to the tri-state buffer 488 by a buffer indicated at 611. (The buffers 611 are logically similar to that shown in FIG. 18.) Also each bit has clock inputs C and $\overline{C}$, a load input L, and input D from the previous register bit (except bits 594*a* and 595*a* which have their D input grounded) and an output Q to the succeeding register bit. The shift register 594 latches up the low pixel data bits of the 4 pixels represented by a byte of pixel data read from the display RAM and the shift register 594*b* latches up the high pixel data bits. Thus, register bits 594*a*-*d* latch up pixel data bits PDB0, PDB2, PDB4 and PDB6.

The output of the register bit 594*d* is connected by the line 596*a* to the multiplexer 598. The data stored in the shift register 594 is shifted one bit position upon the activation of the clock signals such that pixel data bit PDB0 is shifted to the register bit 594*b*, pixel data bit PDB2 is shifted to the register bit 594*c*, pixel data bit PDB4 is shifted to the register bit 594*d* and PDB6 is shifted to the multiplexer 598. The high pixel data bits are loaded and shifted in the shift register 595 at the same time as the low pixel data bits in a similar manner. (A typical shift register bit is shown in greater detail in FIG. 30.)

The clock signals for the clock inputs C and e,ovs/C/ of the shift registers are PXCLK and e,ovs/PXCLK/ which are the outputs of the buffer shown at 621 in FIG. 13. The input signal of the buffer 621 is a clock signal PX which is generated by the clock generator in FIG. 11D. PX occurs synchronously with the display of the pixels on the display screen. The generation of the clock signal PX will be described more fully later.

The load signal for loading pixel data into the shift registers 594 and 595 occurs once every four PX pulses since a byte of data from the display RAM represents four pixels. The generation of the load signal will also be more fully described later.

The multiplexer 598 is shown in FIG. 13 to have the input lines 596*a* and *b* from the shift registers 594 and 595, the input lines 608 and 610 for the SERIAL 0 and SERIAL 1 pixel data bits and the input lines 612 and 614 from the background color register 600 selectively coupled by pulldown transistors 616 to transistor switches 618. The output of the transistor switches 618 are selectively coupled to the output lines 620 and 622 by the two buffers 385. (A typical buffer 385 is shown in FIG. 22.) The output lines 620 and 622 carry the pixel data bits "Z" and "Y", respectively, which (together with the left/right bit) select a color register. The gates of the transistor switches 618 are selectively coupled to the outputs of a plurality of logic gates 623. The inputs of the logic elements 623 are selectively coupled to the input line 604 so that when the logic state of the line 604 is a logical 0, the pixel data bits from the background color register are conducted to the output lines 620 and 622. The logic elements 623 are also selectively coupled to the input line 602 from the low/high resolution mode flip-flop 606 (FIG. 13) such that when the logic state of the line 602 is a logical 0 (and the logic state of the input line 604 is a logical 1) the pixel data bits on the input lines 596*a* and *b* from the shift registers are conducted to the output lines 620 and 622. Otherwise, the pixel data bits SERIAL 0 and SERIAL 1 are conducted to the output lines 620 and 622 when the logic state of the input line 602 is a logical 1.

Referring back to FIG. 11C, the background color register 600 is a 2 bit register having inputs connected to the data bus 66*a* by a 2-bit line 624. The 2 bits stored therewithin (together with the left/right bit) identify one of the 8 color registers which determines the color and intensity of the background area indicated as area 608 in FIG. 5. The background color register 600 has the address 9H which activates the register select line 220 by which these 2 bits may be changed. (The circuitry of the storage unit for each bit of the background color registers is logically similar to that shown for the latch in FIG. 15.)

In order to determine when the multiplexer 604 should select the pixel data bits from the background color registers 600, the data chip further comprises a vertical position counter 626 and a horizontal position counter 628 shown in FIG. 11B. The vertical position counter 626 counts the number of lines of pixels as they are displayed in a raster scan. A "HORIZONTAL DRIVE" signal occurs with each line of pixels displayed. A "VERTICAL DRIVE" signal occurs once every field. Both the HORIZONTAL DRIVE and VERTICAL DRIVE signals are generated in another position of the data chip circuitry to be discussed later. The vertical position counter 626 has inputs for the HORIZONTAL DRIVE and VERTICAL DRIVE signals and counts each HORIZONTAL DRIVE signal (corresponding to a line of pixels displayed) and resets with each VERTICAL DRIVE signal. There is further provided a vertical "blank" register 630 having an 8-bit input line 632 connected to the data bus 66*a*. The vertical blank register 630 has address AH and contains the line number at which the background color (indicated by the background color register 600) will be displayed to the bottom of the screen. Through inputting this vertical line number to the vertical blank register 630, the bottom border line 634 (FIG. 5) may be set.

The vertical position counter 626 continues counting even after the raster scan has reset to the top of the screen. Hence the pixels at the top of the screen will continue to be defined by the background register. When the counter 626 reaches 162, it will reset which causes the next line of pixels to be defined by the display RAM and defines the top border of the background area.

The vertical blank register 630 further allows display RAM that would normally be utilized to store pixel data for the area 610 to be used for scratch pad memory. Thus, if the vertical blank register is set to 0, the entire display RAM can be used for scratch pad. In the low resolution embodiment, the register should be set to 101 or less in bits 1-7; in the high resolution system it should be set to 203 or less in bits 0-7.

The line number contained within the vertical blank register 630 is compared to the current line number indicated by the vertical position counter 626 by a "less-than-compare" 634 having inputs connected by lines 636 to the output and complemented output of each bit of the vertical blank register 630 and also has inputs connected to the output and complement of the output of each bit of the vertical position counter 626 by the lines 638. The output of the less-than-compare 634 goes to a logical 0 when the vertical position counter 626 reaches the number contained within the vertical blank register 630. The output of the less-than-compare is connected by a line 640 to a decoder 642. The decoder 642 further has inputs selectively coupled by a line 644 to the output and complemented output of the bits of the horizontal position counter 628.

The horizontal position counter 628 counts the pixel positions of a line as the pixels are being displayed. the horizontal position counter 628 has an input for the clock signal Φ which changes synchronously with the scanning of the pixel positions of the raster scan. The horizontal position counter 628 has an additional input for the HORIZONTAL DRIVE signal and resets utilizing the HORIZONTAL DRIVE signal. The decoder 642 has set and reset lines 646 connected to the inputs of a flip-flop 648. The flip-flop 648 has an output line 604 which is connected to a select input of the multiplexer 598 (FIG. 11C).

The decoder 642 decodes the output from the horizontal position counter 628 such that the flip-flop 648 is set when the horizontal position counter reaches a first number which defines the left margin of the background area. The output of the flip-flop 648 when set, causes the multiplexer 598 to switch from background color register 600 to either the shift register 594 and 595 of the SERIAL 0 to SERIAL 1 inputs. When the horizontal position counter 628 reaches a preset second number (corresponding to a second position in each line of pixels on the display screen and defining the right margin) the decoder 642 resets the flip-flop 648 causing the multiplexer 598 to switch back to the background color register 600 such that the pixels being displayed on the screen are then defined by the background color register 600.

In this manner, the pixel data defining the pixels of each horizontal line may be drawn from first the background color register then from the shift registers which shift data from the display RAM and then back to the background color register as shown in FIG. 5. When the vertical position counter 626 reaches the line number stored in the vertical blank register 636, the less-than-compare 634 inhibits the decoder 642 from setting the flip-flop 648 for the remaining lines of the frame. Since the flip-flop 648 is not reset, the multiplexer 598 (FIG. 11C) will not switch from the background color register so that the remaining pixels to be displayed will be defined by the pixel data bits stored within the background color register 600. Since the vertical position counter does not reset until after the top background area has been scanned, these pixels will also be defined by the background register.

Figure 24:
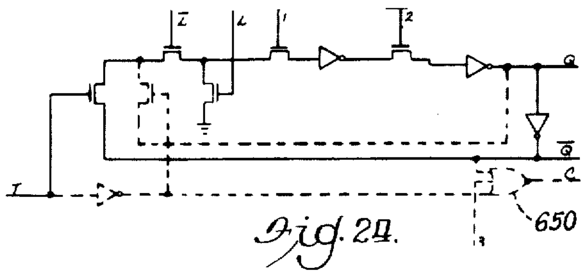

FIG. 13 details the interconnection of the vertical position counter 626 within the data chip and shows the counter 626 to comprise a 9 bit counter. (The logic circuitry of the least significant bit 626*a* is shown in FIG. 24.) Logic circuitry typical of the bits 626*b–h* is similar to that shown in FIG. 24 with the addition of the elements shown in phantom. Logic circuitry typical of the 626*i* is similar to that for bits 626*b–h* excluding the NOR gate 650.

Figure 15:
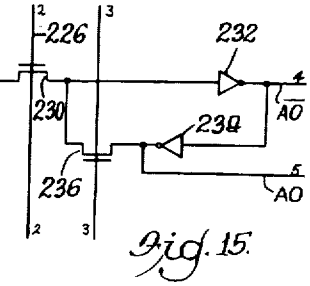

The vertical blank register 630 is shown in FIG. 13 to comprise an 8-bit register (with the logic circuitry of each bit similar to that shown in FIG. 15.) The logic circuitry of the less-than-compare 634 is indicated generally at 634 and comprises a plurality of NOR gates 652 and a PLA comprising pull-down transistors 654 and pull-up transistors 656 selectively coupled to the vertical blank register 630, vertical position counter 626, and output line 640 connected to the decoder indicated generally as 642.

The horizontal position counter indicated generally at 628 comprises an 8-bit latch 658*a–h* and a plurality of pull-down transistors 660 and a plurality of pull-up transistors 662. (The logic circuitry of the least significant bit 658*a* of the binary counter 628 is shown in greater detail in FIG. 31 with the logic circuitry of bit 658*b*, typical bits 658*b–h*, shown in greater detail in FIG. 32.) The horizontal position counter 628 is connected by 10 output lines indicated generally at 644 to the decoder 642 which comprises a plurality of pull-down transistors 644 and pull-up transistors 666. The decoder 642 has additional inputs "PX" and Φ2 clock signals. The set and reset output lines 646 are connected to the inputs of the flip-flop indicated generally at 648. Flip-flop 648 has an output line 604 which is connected to a select input of the multiplexer 598 (FIG. 11C).

The $\overline{Q}$ output of the least significant bit 658*a* of the horizontal position counter 628 is connected to the output of a NOR gate 667 whose output is the load signal for the shift registers 594 adn 595. The other input of the NOR gate 667 is connected to the clock signal Φ2. Since the counter 28 is clocked by the clock signals Φ1 and Φ2 which have half the frequency of PX, the output of bit 658*a* has one fourth the frequency of PX. Therefore, a load signal will occur for every four PX pulses, or for every four pixels displayed.

The output of 6 bits of the horizontal position counter 628 is shown in FIG. 11B to be connected by line 668 to the inputs of a "compare" circuit 670. The other inputs of the compare 670 are connected to the output of a 6 bit horizontal color boundary register 672 by the line 674. The horizontal color boundary register 672 has inputs connected to the data bus 66*a* by the line 676. The output of the compare 670 is connected to a flip-flop 678 by a line 680 with the flip-flop 678 having an output 682 which carries the "left/right" bit.

The horizontal color boundary register 672 defines the horizontal position of the imaginery vertical line 64 on the screen 32 of FIG. 5. As noted before, for pixel positions associated with a byte of pixel data to the left of the boundary, the left/right bit of the four pixels associated with that byte is set to one. The left/right bit is set to zero for pixels to the right of the boundary line 64. Color registers 0–3 are selected by a left/right bit equal to 0 and registers 4–7 are selected for the pixels to the left of the boundary.

The address sent to the horizontal color boundary register 672 is compared with the current address of the byte of pixel data being displayed as indicated by the horizontal position counter 628. If the state of the counter 628 is less than the address contained within the register 672, the pixel locations to be displayed are to the left of the horizontal boundary line and the flip-flop 678 is set such that the left/right bit is a logical 1, otherwise the pixel locations are to the right and the left/-right bit is reset to 0.

The inter-connection of the horizontal color boundary register 672 is shown in FIG. 13 wherein the register comprises a 6-bit register having the address 9H (the same as the background color register). (A bit of the horizontal color boundary register is logically similar to that shown for the latch in FIG. 15.)

Figure 33:
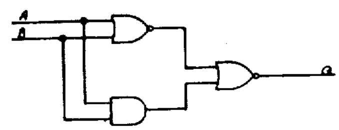
Figure 31:
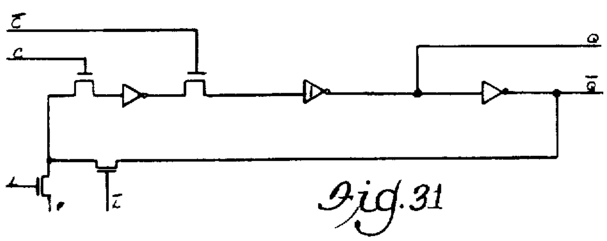

The "compare" circuit connected to the horizontal color boundary register 672 and horizontal position counters 628 is indicated generally at 670 and comprises 6 exclusive-OR units 684*a–f* (with the logic circuitry of a typical exclusive-OR unit 684*a* shown in greater detail in FIG. 33.) The output of each exclusive-OR unit is coupled to an output line 686 by a plurality of pull-down transistors indicated generally at 688. The line 686 is coupled to the voltage source VDD by a pull-up transistor 690 and to the left/right output line 682 by an inverter 692.

As previously discussed, two pixel bits are used to represent each pixel on the screen. These bits, referred to as Y and Z, may be read from the display RAM or from the background color register. These two bits, along with the left/right bit which is set by crossing the horizontal color boundary, map each pixel to one of the 8 different color registers. The value in the color register then defines the color and intensity of the pixel on the screen associated with the pixel data bits. The intensity of the pixels is defined by the 3 least significant bits of each color register, 000 for darkest and 11 for lightest. The colors are defined by the 5 most significant bits. The color registers have addresses 0-7H; and register 0 having address 0H, register 1 having the address 1H, etc.

Referring back to FIG. 11B, a serial data decoder 694 decodes the bits Y and Z, and the left/right bit to determine to which of the color registers 224 the bits point. The serial data decoder 694 comprises a gate indicated generally at 696 in FIG. 13 and has the Z input line 620, the Y input line 622 and the left/right input 682 with the clock signal inputs 7$\overline{\text{M}}$ and 7M. The serial data decoder 694 further comprises a PLA 698 having pull-down transistors 700 and pull-up transistors 702. The PLA 698 has 8 output lines indicated generally at 704 with one each connected to one of the color registers 224. A particular logic state of the pixel data bits Y, Z, and left/right activates a particular output line 704 which enables the corresponding color register to output its contents. In this manner, these pixel data bits point to a unique color register.

When a color register is selected or identified, the contents of the color register is outputted to a latch 706 shown in FIG. 11B which has five output lines 708 connected to a color decoder 710 for the five color bits and 3 outputs connected to serially connected latches 712 and 714 by the line 716, for the 3 intensity bits. The output of the latch 714 is connected to an intensity decoder 718.

The intensity decoder 718 has further inputs for the "SYNC" and "BLANK" NTSC standard signals. These signals, together with the 3 intensity bits from the selected color register, determine the analog values of the signal "VIDEO" at output line 720 together with a reference voltage of 2.5 volts at line 722.

The color decoder 710 further has inputs for the NTSC standard signals "BURST" and "BLANK" which, together with the 5 color bits from the selected color register, determine the analog values of the "R-Y" signal on line 724 and the "B-Y" signal on line 726.

The 8 color registers, shown in greater detail and indicated at 224*a–h*, each comprise an 8 bit register having register select lines 216*a–h*, respectively, and output enable lines 704*a–h*, respectively. Each color register is connected to the 8-bit data bus 66*a* so that any particular register may be addressed when its corresponding register select line is enabled in order to load the register with the color and intensity data. (A register bit 224*b*0, typical of the other register bits of the color registers 224 is shown in greater detail in FIG. 34.)

The Q output of each bit of the color registers is connected to the 8 bit latch indicated generally at 706. The latch 706 has five outputs connected by a buffer 728 to the color decoder indicated generally at 710. (The unit 728*a* typical of the five units of the buffer 728 is shown in greater detail in FIG. 35.)

The color decoder 10 converts the 5 digital bits from a color register into the analog color video signals R-Y and B-Y. The color decoder 710 comprises a PLA 730 (for the R-Y signal) and a PLA 740 (for the B-Y video signal) the outputs of which are coupled to the gates of a plurality of transistor switches 742 and 744, respectively. The inputs of the switches 742 and 744 are selectively coupled to a plurality of series-connected resistors 746. The output of the switches 742 are connected to the output line 724 for the R-Y color video signal and the switches 744 are connected to the output line 726 for the B-Y color video signal.

The 3 outputs of the latch 706 for the 3 intensity bits from the color registers 224 are connected to the latch indicated at 712 whose outputs are connected to the latch 714. The output of the latch 714 is connected to the intensity decoder indicated generally at 718. The additional latches 712 and 714 provide a timing delay. The intensity decoder 718 decodes the 3 intensity bits from a color register and converts then into the analog intensity signal "VIDEO". The intensity decoder 718 comprises a PLA indicated generally at 748 whose output is coupled to the gates of the plurality of transistor switches 750. The input of the transistor switches 750 are selectively coupled to the series-connected resistors 752 with the output of these switches 750 connected to the VIDEO signal line 720. The intensity decoder 718 further supplies a 2.5 reference voltage on the line 722 from the series-connected resistors 752.

A clock generator 754 shown in FIG. 11D uses the 7M and $\overline{7M}$ clock signals (7.159090 MHz square waves) to generate ΦG and $\overline{PX}$. These are the clock signals for the system. The frequency of $\overline{PX}$ is half that of 7M and the frequency of ΦG is half that of $\overline{PX}$.

The clock generator 754, shown in greater detail in FIG. 13, comprises a divide-by-2 counter indicated generally at 756 having inputs 7M and $\overline{7M}$. The divide-by-2 counter 756 has an output line 758 which carries the clock signal PX. The clock generator 754 further comprises a second divide-by-2 counter indicated generally at 760 which has inputs 7M and $\overline{7M}$ and the input PX from the divide-by-2 counter 756. The output of the divide-by-2 counter 760, line 762, is connected to a buffer indicated generally at 764 which has the output line 766 which carries the clock signal ΦG. The output line 762 is also connected to an inverter and buffer indicated generally at 768 which has the output line 770 for the clock signal Φ1 which is the same as ΦG and the output 772 for the clock signal Φ2 which is the inverse of clock signal ΦG.

The clock generator 754 has an input 774 connected to the output of a third signal generator indicated generally at 776 which has inputs 7M, $\overline{7M}$ and the HORIZONTAL DRIVE signal on the input line 778. The generator 776 generates a clear signal as a function of the HORIZONTAL DRIVE, 7M and $\overline{7M}$ clock signals which clears the clock generator 764.

The relationship between 7M, HORIZONTAL DRIVE, ΦG and $\overline{PX}$ is illustrated in FIG. 41. The frequency of $\overline{PX}$ is half that of 7M and the ΦG clock signal is ¼ of 7M. There are 455 cycles of 7M per horizontal line of pixels displayed and 113 and ¾ ΦG cycles per horizontal line. Because of the extra ¾ cycle, ΦG must be resynchronized at the beginning of each line. This is done by the clear signal generator 776 which "stalls" ΦG for 3 cycles of 7M and is initiated by clock signal HORIZONTAL DRIVE. $\overline{PX}$ is also stalled for the same amount of time.

FIG. 11E shows a television sync generator 780 which also uses the clock signal 7M and $\overline{7M}$ to generate NTSC, SYNC, BURST and BLANK signals to be sent to the intensity decoder 718 and color decoder 710 (FIG. 11B). Also generated are the HORIZONTAL and VERTICAL DRIVE signals. The TV sync generator comprises a ΦA and ΦB generator 782 having the 7M and $\overline{7M}$ clock inputs. The generator 782 has output lines 784 and 786 for the ΦA and ΦB clock signals, respectively, connected to a horizontal counter 788. The counter 788 has output lines 790 connected to input of a vertical counter 792 and outputs 794 connected to the inputs of a decoder 796. The horizontal counter 788 counts the ΦA and ΦB clock pulses and the decoder 794 decodes the output of the counter 788 to provide a HORIZONTAL BLANK signal on a line 800, a BURST signal on a line 802 and a HORIZONTAL DRIVE signal on a line 804. A decoder 806 is connected to the output of the vertical counter 792 and provides a VERTICAL BLANK signal on a line 808, two signals related to a VERTICAL SYNC signal on lines 810 and 811 connected to inputs of the decoder 796 and a VERTICAL DRIVE signal on a line 812.

An OR gate 818 has inputs connected to the HORIZONTAL BLANK signal line 800 and to the VERTICAL BLANK signal line 808 and has an output line 820 for the BLANK signal. The decoder 786 decodes the input lines 810 and 811 as well as the count of the counter 788 to produce the SYNC signal on line 798.

The SYNC, BLANK and BURST signals are NTSC standard timing signals and are utilized to generate the R-Y, B-Y and VIDEO signals. The HORIZONTAL DRIVE and VERTICAL DRIVE signals are used to synchronize the data chip with the address chip as well as to provide clock signals for the vertical position counter 626 and horizontal position counter 628 (FIG. 11B). The HORIZONTAL DRIVE signal occurs once every horizontal raster scan line (63.5 microseconds), and VERTICAL DRIVE occurs once every field (16.6 milliseconds).

Figure 36:
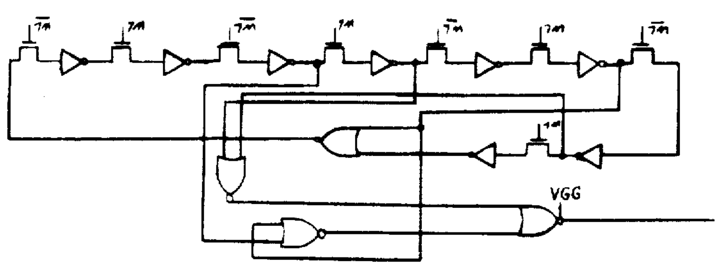

The ΦA and ΦB generator 782 is shown in FIG. 13 to comprise a counter 822 which is connected to an output buffer (indicated generally at 824) having output line 826 for the ΦA clock signal and output line 828 for the ΦB output signal, which are 2.045 MHz. (The counter 822 is shown in FIG. 36 to comprise a "divide by 3½" counter having the input clock signal 7M and $\overline{7M}$.)

The counter 788 has 8 bits, 788*a–h*, and a programmed logic array, or PLA indicated generally at 830. (The loic circuitry of the counter bits 788*a–g* are logically similar to those shown in FIGS. 31 and 32 for the horizontal position counter 628 with the logic circuitry of the bit 788*h* shown in greater detail in FIG. 37.) The horizontal counter 788 is a divide-by-130 counter and has a frequency of 63.5 microseconds. The Q and $\overline{Q}$ outputs of the bits 628*a–h* of the counter 788 are connected to the decoder indicated generally at 786 which comprises a programmed logic array 832. The output of the PLA 832 is selectively coupled to 3 flip-flops 834–836 either directly or by logic elements 838. (The flip-flop 834 is typical of the flip-flop 834–836 and is shown in greater detail in FIG. 38.)

The flip-flop 836 has an output line 800 which carries the HORIZONTAL BLANK signal and is connected to the OR gate 818 which comprises a NOR gate 840 and an inverter 842. An output line 802 of the flip-flop 835 (via a buffer 385) carries the BURST signal with the output line 798 of the flip-flop 834 (via a buffer 385 carrying the SYNC signal.) An output line 804 of the delay elements 839 from the decoder PLA 786 carries the HORIZONTAL DRIVE signal.

Figure 39:
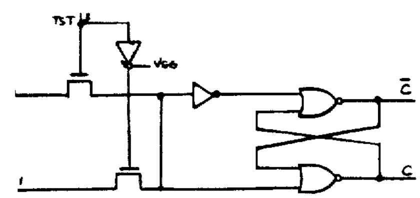
Figure 19:
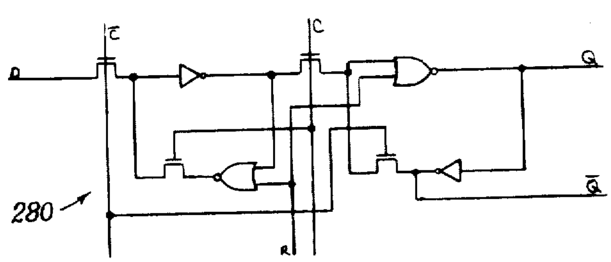

The Q output of the bit 788*b* of the counter 788 is connected to the input 2 of a flip-flop 850 (shown in greater detail in FIG. 39.) The outputs C and $\overline{C}$ of the flip-flop 850 have a frequency of half that of the horizontal counter 788 and are connected to the clock inputs of the counter 792 having bits 792*a–j*. The counter 792 is a divide-by-512 counter and has a period of 1/30 of a second. (The counter bits 792*b–j* are logically similar to those shown in FIG. 24 with the bit 792*a* also logically similar but excluding those elements shown in phantom.) The Q and $\overline{Q}$ outputs of the bits of the counter 792 are selectively coupled to a programmed logic array indicated generally at 852 of the decoder 806. An output line 853 of the PLA 852 is connected to a flip-flop 856 (shown in greater detail in FIG. 38) having an output line 857. The output line 857 carries the VERTICAL BLANK signal and is connected to an input of the NOR gate 840. An output line 854 is connected to a shift register bit 858 (shown in greater detail in FIG. 23). The output of the shift register 858 is connected to a plurality of logic elements 859 having additional clock signal inputs Φ1 and Φ2 and an output line 860 which carries the VERTICAL DRIVE signal. The line 860 is connected by a buffer 862 to the VERTICAL DRIVE pad 864.

FIG. 42 illustrates the relationship between SYNC, VERTICAL BLANK and VERTICAL DRIVE signals. Each division represents 1 horizontal scan of the raster scan.

FIG. 43 illustrates the relationship between the signals HORIZONTAL DRIVE, HORIZONTAL BLANK, SYNC and color BURST with each horizontal division equal to 3½ cycles of the clock 7M. The pattern repeats every 455 cycles of 7M. The shaded area voltages are determined by the pixel data bits from the display RAM. The color BURST signal time occurs when B-Y is at 1.7v and the SYNC signal time occurs when VIDEO is at 0v. The relationship between the HORIZONTAL DRIVE and VERTICAL DRIVE signals is illustrated in FIG. 41.

In memory write cycles, in which data is written to the display RAM, a control signal WRCTL (generated by the address chip) is activated and a memory control circuit 882 (FIG. 11F) of the data chip generates the $\overline{DATEN}$ control signal. The function generator (FIG. 11C) takes the data from the CPU from the microcycle data bus 66 and transfers it to the memory data bus in conjunction with the $\overline{DATEN}$ control signal. Of course, if the data is to be modified, the function generator will modify the data as required as it places the data on the memory data bus. The memory control circuit 882 has an additional input for another address chip generated control signal LTCHDO and an output line 884 at which the memory control circuit 882 outputs a second control signal which is a function of the LTCHDO control signal. The relationship between the data chip control signal $\overline{DATEN}$ and the address chip control signal $\overline{WRCTL}$ is shown for two memory write operations in FIGS. 1A and D.

The memory control circuit is shown in greater detail in FIG. 13 and is indicated generally at 882. The memory control circuit has an input line 886 for the $\overline{WRCTL}$ control signal which is connected by a plurality of logic elements 889 to a flip-flop 890 having an output line 892 which carries the $\overline{DATEN}$ control signal. The logic elements 888 include the transistor switch 889 which has a clock signal line 891 connected to the gate of the switch 889. The clock signal on the line 891 is a function of the clock signals Φ1, PX and $\overline{PX}$. The output line 892 (which carries the $\overline{DATEN}$ control signal is connected to a $\overline{DATEN}$ pad 896 by a buffer 385 and a buffer 894. The buffer 385 also has an output line 898 which also carries the $\overline{DATEN}$ control signal.

The memory control signal 882 further has an input line 900 for the LTCHDO control signal from the address chip. Line 900 is connected by a resistor and an inverter 902 to a NOR gate 904 having an additional input connected to the control signal line 891 and an input connected to the control signal Φ2. The output of the NOR gate 904 is connected by a buffer 385 to an output line 884. The LTCHDO control signal from the address chip indicates to the data chip when valid data from the display RAM is present on the memory data bus. The OR/exclusive-OR circuit 480 (FIG. 13) utilizes the control signal on the output 884 which is a function of the control signal LTCHDO to latchup data from the memory data bus which is utilized in the OR and exclusive-OR operations.

Referring now to FIG. 13, the data chip generates two further control signals, INPUT on a line 908 and OUTPUT on a line 910. These control signals are generated by the logic elements indicated generally at 912 which have an input line 914 for the $\overline{IORQ}$ CPU control signal, an input line 916 which carries the CPU control signal M1, and an input line 918 which carries the CPU control signal RD. The signals INPUT and OUTPUT indicate when an input or output operation is requested by the CPU and have a duration which is longer than that of the CPU control signals to compensate for delay due to the microcycler.

ADDRESS CHIP

The address chip 56 of the video processor 52 is shown in FIG. 10 to have inputs MXD0–MXD7 from the microcycle data bus 66 with memory address outputs MA0–MA7 connected to a latch 950 whose output is connected to the display RAM address bus 952. The address chip relays addresses transmitted by the CPU whereby the CPU may selectively read the contents of the display RAM, sequentially generates addresses for reading the display RAM synchronously with the display of pixels on the screen represented in the display RAM and handling and generating interrupts.

The address chip further has clock inputs Ø and Ø from the buffer 100, CPU control signal inputs $\overline{M1}$, $\overline{RD}$, $\overline{IORQ}$, $\overline{MREQ0}$ and $\overline{RFSH}$ and CPU control signal outputs $\overline{INT}$ and $\overline{WAIT}$ from and to, respectively, the CPU. Outputs carrying the address chip generated signals LTCHDO and $\overline{WRCTL}$ are connected to the corresponding inputs of the data chip 54 with inputs connected to the data chip outputs VERT. Dr. and HOR. DR. The address chip address bit has inputs A12–A14 connected to the CPU address bus 73, input $\overline{LIGHTEN}$/ from the light pen 62 (FIG. 2). Finally, the TEST VDD, VGG and VSS are connected to +5v, +5v, +10v, and ground with the row address strobe signal RASO connected to an input of the logic elements indicated generally at 954 which generate the write enable ($\overline{WE}$), column address strobe ($\overline{CAS}$), chip select ($\overline{CS}$) and row address strobe (RAS) signals.

The address chip 56 of the video processor 52 is shown in a block diagram in FIG. 44. The address chip 56 has a microcycle decoder 1000 which selects 12 bits of address from the data from 8-bit data bus 66*b* connected to the microcycle data bus 66 by a buffer 1001. The microcycle decoder 1000 is similar to the microcycle decoder 212 of the data chip and need not be discussed in detail.

A detailed circuit implementing the block diagram of the address chip is shown in FIGS. 45A–J with a composite diagram of FIGS. 4A–J shown in FIG. 46. The interconnection of the microcycle decoder 1000 within the address chip is shown in FIG. 45 (with an address bit unit A0 typical of the units A0–A7, shown in greater detail in FIG. 47 and address bit unit A8, typical of address units A8–A12 shown in greater detail in FIG. 48.) The address bit units A0–A7 of the microcycle decoder 1000 have an input line 1002 which carries the control signal LDL1 by which the low address bits A0–A7 are loaded. Similarly, the address bit units A8–A13 of the microcycle decoder 1000 have an input line 1004 which carries the control signal LDH1 by which the high address bits A8–A13 are loaded. The address bits are carried on the address chip data bus 66*b* which is connected to the microcycle data bus 66 by the tri-state buffer 1001 comprising units 1001*a–h* (with buffer unit 1001*a*, typical of the buffer units, shown in greater detail in FIG. 49). The control signals LDL1 and LDH1 are generated by the logic element indicated generally at 1006 in a manner similar to that for the LDL1 and LDH1 control signals generated by the microcycle generator 106 of the data chip shown in FIG. 11A.

Referring back to FIG. 44, the outputs of the address bit units A0–A7 of the microcycle decoder 1000 are connected to an address decoder 1008 also logically similar to the address decoder 214, (FIG. 11B) of the data chip. Thus the address decoder 1008 decodes the addresses transmitted by the CPU to activate an associated select line 1010–1018. As indicated in Table II, the address decoder 1008 will decode the address FH (when the INPUT control signal is present) which is operably connected to the horizontal feedback input register. As another example, address decoder 1008 will activate the line 1013 which is operably connected to the interrupt enable and mode registers when the address EH and the control signal OUTPUT are present.

The address decoder 1008 is shown in FIG. 45 to comprise a programmed logic array having input lines connected to the complemented and uncomplemented outputs of the address bit units A0–A7 of the microcycle decoder 1000, and input line 1020 for the OUTPUT control signal and an input line 1022 for the control signal INPUT. The select lines 1010–1017 of the address decoder 1008 for the horizontal feedback register, a vertical feedback register, an interrupt line register, the interrupt enable and mode register, an interrupt feedback register, a function generator register, a vertical blank register, a low/high resolution mode register, and an output line 1018 to the memory cycle generator, respectively, are also indicated.

The address bits A0–A7 from the microcycle decoder 1000, together with the address bits A8–A13 are conducted to a multiplexer 1024 which has 12 outputs as shown in FIG. 44. A scan address generator 1026 generates a 12-bit address which is used to read pixel data from the display RAM. The scan address is generated synchronously with the raster scan of the display and incrementally increases from OH to FFFH once every field (1/60 seconds).

The multiplexer 1024 sends either the scan address or the address from the CPU (via microcycle decoder 1000) to its 12 outputs. The outputs of the multiplexer 1024 are connected to a second multiplexer 1026 which multiplexes its 12 inputs to 6 address bits, MA0–MA5, in two "time slices" required for the 4K×1 16 pin RAMs which comprise the display RAM.

When the multiplexer 1024 sends the address bits from the CPU to its 12 outputs, the 12 address bits A0–A11 of the 14 input address bits A0–A13 from the microcycle decoder 1000 are selected in the low-resolution mode. In the high resolution mode, the 12 address bits A2–A13 are selected. The mode of operation, whether low or high resolution, is set by the logic statement of a low/high resolution mode flip-flop or register 1030 shown in FIG. 45. The flip-flop 1030 has the same address as the low/high flip-flop 606 of the data chip. (The logic circuitry of the flip-flop 1030 is shown in greater detail in FIG. 50.) The flip-flop 1030 has an output line 1032 shown in FIG. 44 to be connected to a select input of the multiplexer 1024 so that the proper address bits from the CPU (via the microcycle decoder 1000) are selected when the address from the CPU is to be transmitted to the outputs of the multiplexer 1024.

The scan address generator 1026 which generates the 12-bit address used to read pixel data from the display RAM resets with every other 40 address counts in the low resolution mode (as there are 40 bytes per horizontal display line) so that the scan address generator 1026 counts from 0 to 39 twice and then counts from 40 to 79 twice, etc. This results in each pixel of a field being scanned twice. In other words, each two-bit pixel data is utilized twice in two consecutive horizontal scans. Since a frame consists of two interleaved fields, any particular pixel extends four horizontal scan lines in the vertical direction.

The scan address generator 1026 has inputs for the HORIZONTAL DRIVE and VERTICAL DRIVE signals generated by the data chip to synchronize the scan address generator with the data chip and the TV raster scan.

Figure 53:
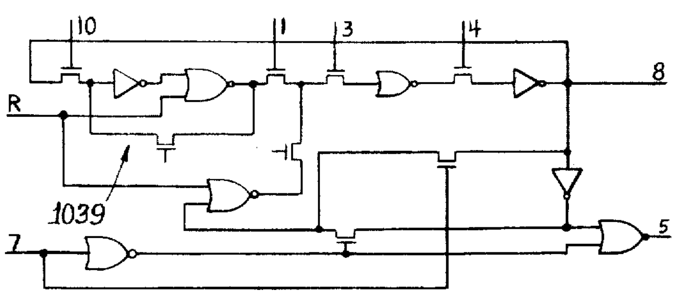

The scan address generator is indicated generally at 1026 in FIG. 45 and comprises a counter 1034 having 12-bits 1034*a*-1 and flip-flops 1036–1038. (The counter bits 1034*a* and 1034*b* are shown in greater detail in FIGS. 51 and 52 respectively.) Bit 1034*c*, typical of bits 1034*c*-1 is also shown in greater detail in FIG. 53. As seen in FIG. 53, each of the bits 1034*c*-1 comprise a latch 1039 which is activated synchronously with the HORIZONTAL DRIVE pulse so that the count is latched up with each HORIZONTAL DRIVE pulse which occurs after each 40 counts.

A line 1040 (FIG. 45) carrying the VERTICAL DRIVE signal from the data chip is connected by the logic elements indicated generally at 1042 to an input of the flip-flop 1038. The output of the flip-flop 1038 is connected to the reset input R of the counter units 1034*a*-1. Thus, the VERTICAL DRIVE signal operates to reset the counter 1034 to 0 after each field has been scanned.

Figure 54:
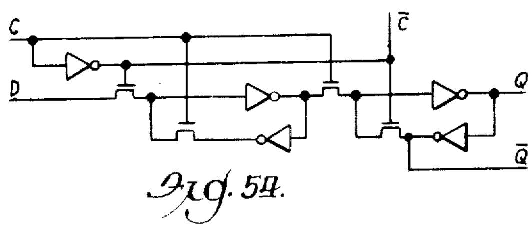
Figure 51:
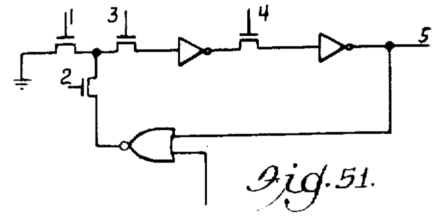
Figure 57:
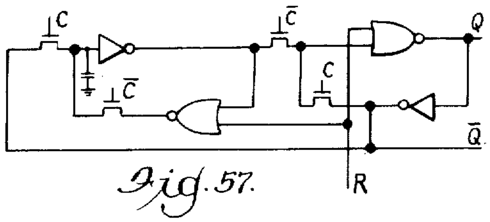

A line 1044 carrying the HORIZONTAL DRIVE signal from the data chip is connected by the logic elements indicated generally at 1046 to the input of the flip-flop 1037 whose output is connected to the D input of the flip-flop 1036 (which is shown in greater detail in FIG. 54.) The Q and $\overline{Q}$ outputs of the flip-flop 1036 are connected to the 10 and 9 inputs, respectively, of the counter bits 1034*d*-1.

The other output of the flip-flop 1037 is connected to the input of a NOR gate 1048 having another input connected to the output line 1032 of the low/high resolution flip-flop 1030 and still another input connected to the output of the least significant bit of a line counter to be described later. The output of the NOR gate 1048 is connected to the 1 input of the counter bits 1034*a*-1 and to the 2 input by an inverter 1050.

The output of the NOR gate 1048 will go low with every other scan line (as determined by the output of the LSB 1138*a* of the line counter 1138) upon a HORZ DR (HORIZONTAL DRIVE) pulse when in the low resolution mode. This causes the counter to be reset to the count that was latched up in the latches 1039. Since the count latched up is 40 less than the current count, the counter will count from 0–39 twice, 40–79 twice, 80–119 twice, etc. Thus a line of pixel data is utilized to define 2 consecutive scan lines in each field in the low resolution mode.

The scan address generator 1026 has an input line 1052 which carries a clock signal which is connected by a transistor switch 1054 and an inverter 1056 to the 4 input of the bits 1034*a*-1 and to the 3 inputs by an inverter 1058, of the counter 1034. The generation of the clock signal carried by the line 1052 will be described later also.

The multiplexer 1024 and 1028 comprise the NOR gates indicated at 1058, each having an input connected to the address bit outputs A0–A6 of the microcycle decoder 1000, 6 NOR gates 1060, each having an input connected to the address bit outputs A2–A7, respectively, 6 NOR gates indicated at 1062, each having an input connected to the address bit outputs A6–A11, respectively, and 6 NOR gates 1064, each having an input connected to the address bits A8–A13, respectively, of the microcycle decoder 1000.

The output line 1032 of the low/high resolution flip-flop 1030 is connected to the input of a NOR gate 1066 which is connected to the inputs of the NOR gates 1058 by the serially connected transistor switch 1068 and inverter 1070, with the output line 1032 also connected to the input of a NOR gate 1072 whose output is connected to the input of the NOR gate 1062 by the serially connected transistor switch 1074 and an inverter 1076. The output line 1032 is also connected to an inverter 1078 whose output is connected to the input of a NOR gate 1080. The output of the NOR gate 1080 is connected to the inputs of the NOR gates 1060 by a serially connected transistor switch 1082 and inverter 1084, with the output line 1032 also connected to an inverter 1086 whose output is connected to the input of a NOR gate 1088. The output of the NOR gate 1088 is connected to the inputs of the NOR gates 1064 by a serially connected transistor switch 1090 and an inverter 1092.

When the output of the low/high resolution mode flip-flop is a logical 0, (corresponding to the low resolution mode), the output of the inverter 1078 is a logical 1, the output of the NOR gate 1080 is a logical 0, and the output of the inverter 1084 is a logical 1 driving the outputs of the NOR gate 1060 (corresponding to address bits A2–A7) to a logical 0 with the outputs of the NOR gate 1064 (corresponding to the address bits A8–A13) also being driven to a logical 0. In this manner, the NOR gates 1058 corresponding to the address bits A0–A5 and the NOR gates 1062 corresponding to the address bits A6–A11 are selected in the low resolution mode. On the other hand, when the output of the flip-flop 1030 is a logical 1, corresponding to the high resolution mode, the NOR gates 1060 and 1064 are selected which corresponds to the address bits A2–A13.

The multiplexers 1024 and 1028 further comprise 6 NOR gates 1094, each having an input connected to the address bit outputs A0–A6 of the counter bits 1034*a–f*, respectively, and the 6 NOR gates 1096, each having an input connected to the address bit outputs A6–A11 of the counter bits 1034*g–l*, respectively.

The multiplexers 1024 and 1026 have a VIDNXT2 clock signal input line 1098 which is connected to an input of the NOR gates 1066 and 1080 and to the NOR gate 1072 by a transistor switch 1100 and to the NOR gate 1088 by a transistor switch 1102. The gates of the transistor switches 1100 and 1102 are connected to the clock signal Φ1. The VIDNXT2 clock signal input line 1098 is also connected to the inputs of the NOR gates 1094 by the series-connected transistor switch 1104 and inverter 1106. The VIDNXT2 input line 1098 is also connected by the series-connected inverter 1108, transistor switch 1110, inverter 1112, transistor switch 1114, and inverter 1116 to the inputs of the NOR gate 1096.

The logic state of the clock signal VIDNXT2 determines whether the address bits from the CPU (via the microcycle decoder 1000) or the address bits generated by the scan address generator 1052 are conducted to the memory address bus indicated at 1118 which carries the address bits MA0–MA5. VIDNXT2 occurs 40 times a scan line and indicates that the next RAM access cycle is a "video" cycle. In a video cycle, the system reads pixel data from the display RAM to be displayed on the screen. The generation of VIDNXT2 will be described later.

The outputs of the NOR gates 1058, 1060, 1062, 1064, 1094 and 1096 are selectively coupled to the output lines 1120-1125 by a plurality of transistor switches 1128. The output lines 1120, 1121 and 1122 are each connected by a series-connected NOR gate 1130 and buffer 1132 (shown in greater detail in FIG. 55), to the MA0, MA1 and MA2 bits of the memory address bus 1118. The output lines 1123, 1124 and 1125 are each connected by series-connected NOR gate 1130 and buffer 1134 (shown in greater detail in FIG. 56) to the MA3, MA4 and MA5 bits of the memory address bus 1118.

If the logic state of VIDNXT2 on line 1098 is a logical 0, the output of the inverters 1106 and 1116 are a logical 1 which drives the outputs of the NOR gates 1096 and 1094 (corresponding to scan address generator bits A0–A11) to a logical 0. Thus, the address bits from the scan address generator are not conducted to the memory address bus 1118 when VIDNXT2 is a logical 0. On the other hand, when the state of VIDNXT2 on line 1098 is a logical 1 indicating the next cycle is a video cycle, the output of the inverters 1070, 1084, 1072 and 1092 are a logical 1 which drives the outputs of the NOR gates 1058, 1060, 1062 and 1064 (corresponding to the address bits from the CPU) to a logical 0.

The NOR gates 1094 have an additional clock signal input Φ1 with the NOR gates 1096 also having an additional clock signal Φ2 which is the inverse of the clock signal Φ1. Thus, when the address bits from the scan address generator are to be transmitted to the memory address bus 1118, the clock signal Φ1 goes low first which allows the address bits A0–A5 to be conducted first, followed by the address bits A6–A11 from the NOR gates 1096 when the clock signal 01 goes high and the clock signal 01 goes low.

Similarly, the NOR gates 1058 (corresponding to the address bits A0–A5 during the low resolution mode) and the NOR gates 1060 (corresponding to the address bits A2–A7 during the high resolution mode) have an additional clock signal input Φ1 and the NOR gates 1062 (for bits A6–A11) and 1064 (for bits A8–A11) have the additional clock signal Φ2. When the address bits from the CPU are to be conducted to the memory address bus 1118, the bits are also transmitted in two 6-bit slices, A0–A5 first, then A6–A11 (low resolution mode) or A2–A7 first, then A8–A13 (high resolution mode).

SCREEN AND LIGHT PEN INTERRUPTS

An additional function of the address chip concerns interrupts, namely a "screen" interrupt and "light pen" interrupt. The purpose of the screen interrupt is to synchronize the system "software" with the video system. The CPU under the direction of the software or programming stored in the ROM's, can send a line number to an interrupt line register 1136 (which has address FH) shown in FIG. 44.

In the low resolution mode, bit 0 of interrupt line register 1136 is set to 0 and the line number is set to bits 1–7. In the high resolution mode, the line number is sent to bits 0–7. If the screen interrupt is enabled, the CPU will be interrupted when the display completes scanning the line which is contained in the interrupt register. A line counter 1138 counts the lines of pixels as they are displayed on the screen and the output of which is compared with the line number stored in the interrupt line register 1136 by a comparator 1140.

The output of the comparator 1140 sets a flip-flop 1142 which utilizes the HORIZONTAL DRIVE signal as a clock signal. The output of the flip-flop 1142 is connected to interrupt circuitry 1144 which generates an interrupt signal $\overline{INT}$ on an output line 1146 when the screen interrupt is enabled. The interrupt signal $\overline{INT}$ is transmitted to the CPU.

This interrupt can be used for timing since each line is scanned 60 times a second. It can also be used in conjunction with the color registers to make as many as 256 color-intensity combinations appear on a screen at the same time. Thus, after a screen interrupt, the data within the 8 color registers which can define 8 different color-intensity combinations may be changed to 8 additional color intensity combinations with the interrupt line register contents also being changed to a subsequent line number. When this line is reached the process may be repeated until the full 256 possible combinations represented by the 5 color bits and 3 intensity bits in each color register have been displayed.

The light pen interrupt occurs when the light pen trigger is pressed and the video scan of the display crosses the point on the screen were the light pen is located which generates a signal $\overline{LIGHTEN}$/ on an input line 1148 to the interrupt circuitry 1144. When the light pen interrupt is enabled, the interrupt circuitry 1148 generates the interrupt signal $\overline{INT}$ and transmits it to the CPU.

The CPU interrupt routine resulting from the $\overline{INT}$ signal can read two registers to determine the position of the light pen. The line number which indicates the vertical position of the light pen is read from a vertical feedback register 1150 which has address EH. In the high resolution system, the line number is in bits 0–7. In the low resolution system, the line number is in bits 1–7, and bit 0 should be ignored.

The horizontal position of the light pen can be determined by reading a horizontal feedback register 1152 having address FH and subtracting 8. In the low resolution system, the resultant value is the pixel position 0 to 159. In the high resolution system, the resultant must be multiplied by 2 to give the pixel position, 0 to 358.

A horizontal position counter 1154 counts the pixel position as the corresponding pixels are scanned. The counter 1154 is reset by the HORIZ DR signal and is clocked by the clock signal. The output of the horizontal position counter 1154 is connected to the horizontal feedback register 1152. The output of the line counter or vertical position counter 1138 is connected to the vertical feedback register 1150. When the light pen interrupt is enabled, the interrupt circuitry 1144, upon the occurence of a $\overline{LIGHTEN}$/ signal, causes the horizontal feedback register 1152 to latch up the current horizontal position as indicated by the horizontal position counter 1154. Similarly, the vertical feedback register 1150 is caused to latch up the current vertical position or line as indicated by the line counter 1138.

When the CPU acknowledges an interrupt, it reads 8 bits of data from the data bus. It then uses the data as an instruction or an address. This data is determined by the contents of an interrupt feedback register 1156 which has address DH. The contents of the interrupt feedback register 1156 is originally set by the placement of data in it by the CPU. In responding to a screen interrupt, the contents of interrupt feedback register are placed directly onto the data bus 66*a*. In responding to a light pen interrupt, the lower 4 bits of the data bus are set to 0 and the upper 4 bits are the same as the corresponding bits of the interrupt feedback register 1156. Thus, if the lower 4 bits are 0, the CPU can determine that the light pen initiated the interrupt. Otherwise, the interrupt is a screen interrupt.

In order for the Zilog Z-80 to be interrupted, the internal interrupt enable flip-flop must be set by an EI instruction and one or two of the external interrupt enable bits of an interrupt enable and mode registers 1158 which have address EH must be set. If bit 1 is set, light pen interrupts can occur. If bit 3 is set, screen interrupts can occur. If both bits are set, both interrupts can occur and the screen interrupt has high priority.

The interrupt mode bits of the interrupt enable and mode register 1158 can determine what happens if an interrupt occurs when the Zilog Z-80 CPU interrupt enable flip-flop is not set. Each of the two interrupts may have a different mode. In "mode 0" the Z-80 will continue to be interrupted until it finally enables interrupts and acknowledges the interrupt. In mode 1, the interrupt will be discarded if it is not acknowledged by the next instruction after it occured. If mode 1 is used, the software should be designed such that the system will not be executing certain Zilog Z-80 instructions when the interrupt occurs. The OP codes of these instructions being with CDH, DDH, EDH and FDH.

The line counter 1138 is shown in greater detail in FIG. 45 and comprises 8 bits 1138*a–h*. (The bit 1138*a* is shown in greater detail in FIG. 57 with the bit 1138*b*, typical of bits 1138*b–h* shown in greater detail in FIG. 58.) The counter 1138 has an input line 1160 which is connected to the output of the logic elements 1046 which have the HORIZONTAL DRIVE signal input. The HORIZONTAL DRIVE signal occurs once for each line of pixels displayed on the screen. The line counter 1138 synchronously counts the lines as they are displayed and indicates the current line number being displayed. The line counter 1138 has a reset input line 1162 which is connected to the output of the logic elements 1042 which have the VERTICAL DRIVE input signal. The line counter 1138 resets on each vertical drive pulse which occurs at the end of each field.

Figure 59:
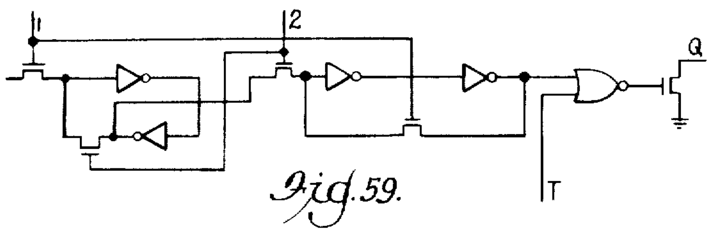

The output of each of the counter bits 1158*a–h* are connected to the inputs of the vertical feedback register indicated generally at 1150 and comprising bits 1150*a–h* (with typical bit 1150*a* shown in greater detail in FIG. 59). The vertical feedback register 1150 has a latch enable line 1164 connected to the output of the interrupt circuitry indicated generally at 1144. When this line is enabled, in response to a $\overline{\text{LIGHTEN}}$/ signal from the light pen, the vertical feedback register 1150 latches up the current count contained in the line counter 1138. The output of each bit 1150*a–h* is connected to the data bus 66*b*. The vertical feedback register 1150 has an output enable input connected by an inverter 1166 to the register select line 1011 from the address decoder 1008. The CPU may read the contents of the vertical feedback register 1150 by trransmitting its address to the address decoder wherein the line number contained within the vertical feedback register 1150 is conducted onto the data bus 66*b* to the CPU. The CPU will read the contents of the vertical feedback register 1150 in response to an interrupt signal $\overline{\text{INT}}$ after determining that the interrupt is a light pen interrupt by reading the interrupt feedback register. In this manner, the CPU can determine the vertical position of the light pen.

Figure 61:
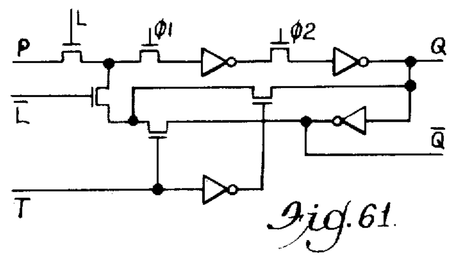
Figure 60:
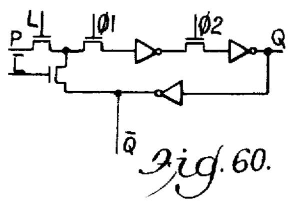
Figure 62:
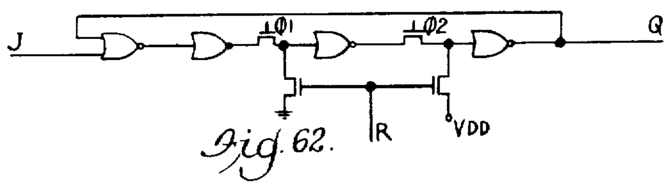

The horizontal position counter is indicated generally at 1154 and comprises bits 1154*a–h* (with bit 1154*a* shown in greater detail in FIG. 60 and bit 1154*b*, typical of bits 1154*b–h*, shown in greater detail in FIG. 61.) The counter 1154 further comprises a programmed logic array indicated generally at 1168. The horizontal position counter 1154 has clock inputs Φ1 and Φ2 and synchronously counts the pixels of the line of pixels being displayed. Thus, the count contained within the counter 1154 corresponds to the horizontal position of the last pixel displayed. The counter 1154 has a reset input line 1170 which is connected to the output of the logic elements 1046 which have the HORIZONTAL DRIVE signal input. The HORIZONTAL DRIVE signal which occurs at the end of each line of the raster scan causes the horizontal position counter 1154 to reset.

The outputs of the bits 1154*a–g* of the horizontal position counter 1154 are connected to the inputs of the bits 1152*a–g*, respectively, of the horizontal feedback register indicated generally at 1152. (Logic circuitry of the bits 1152*a–g* is similar to that shown for bit 1158*a* of the vertical feedback register shown in FIG. 59.) The output of the bits 1152*a–g* are connected to the data bus 66*b*.

The horizontal feedback register 1152 has a latch enable line connected to the line 1164 from the interrupt circuitry, such that the register 1152 can latch-up the current position count contained within the horizontal position counter 1154 upon a signal from the interrupt circuitry 1144 in response to the signal $\overline{\text{LIGHTEN}}$/ from the light pen. The horizontal feedback register 1152 has an input connected to the register select line 1010 from address decoder 1008 whereby the CPU may read the contents of the horizontal feedback register 1152 by transmitting the address of the horizontal feedback register 1152 to the address decoder. The CPU will read the horizontal feedback register to determine the horizontal position of the light pen in response to a light pen interrupt.

The output of the bits 1154*a–h* of the horizontal position counter 1158 are also connected to a decoder indicated generally at 1171 which includes a PLA 1275, a J-K flip-flop 1276 (shown in greater detail in FIG. 62) and pull-ups 1173 whose outputs are selectively coupled to a NOR gate 1175. The output of the NOR gate 1175 is connected to a plurality of delays and inverters at 1177 which have an output line 1098 which carries the clock signal VIDNXT2.

VIDNXT2 is activated when the horizontal counter 1154 indicates a negative 1 or if bit 0 is a 1 and bit 8 is a 0, which occurs 40 times a scan line. Since the MUX 1024 utilizes VIDNXT2 as a select signal, the addresses generated by the scan address generator 1026 are selected 40 times a line. Furthermore, the scan address generator clock signal input line 1052 is connected to an output of the elements 1177 so that the scan address generator is clocked 40 times a scan line to output 40 sequential addresses synchronously with the MUX 1024. VIDNXT2 is also utilized to generate the RAS (row address strobe) signals at 1179 for the video cycles.

Figure 63:
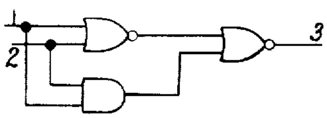
Figure 52:
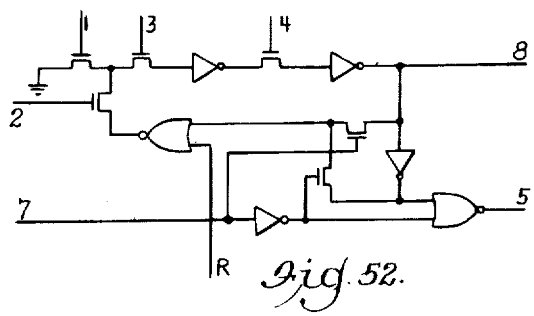
Figure 49:
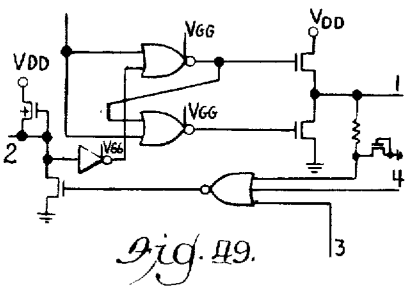

The output of the line counter 1138 is also connected to the inputs of the comparator 1140 shown to comprise 8 exclusive-OR units 1140*a–h* (with unit 1140*a*, typical of the units 1140*a–h*, shown in greater detail in FIG. 63) and a PLA 1172 connected to the outputs of the units 1140*a–h*. The comparator 1140 further comprises the flip-flop 1142 connected to the output of the PLA 1172 by a NOR gate 1174. The comparator 1140 has further inputs connected to the outputs of the interrupt line register 1136 which comprises bits 1136*a–h* (with the bits 1130*a–h* logically similar to that shown in FIG. 50). The interrupt line register 1136 which stores the screen interrupt line number from the CPU, has further input connected to the register select line 1012 from the address decoder 1008 by which the CPU may address the interrupt line register 1136 in order to input the interrupt line number.

The comparator 1140 compares the number of the current line being displayed by the display unit as indicated by the line counter 1138 with the line number stored in the interrupt line register 1136. When the line counter reaches the number in the line register 1136, the flip-flop 1142 (shown in greater detail in FIG. 64) is set. The flip-flop 1142 has an output line 1176 connected to the interrupt circuitry shown at 1144 which carries the screen interrupt signal to the interrupt circuitry.

The interrupt circuitry 1144 has an input line 1178 which carries the $\overline{\text{LIGHTEN}}$/ signal which indicates that the raster scan has crossed the point where the light pen 62 (FIG. 2) is located. The line 1178 is connected by resistor 1180 and NOR gate 1182 to the clock input of a flip-flop 1184. The output of the flip-flop 1184 is connected to the input of a flip-flop 1186 (with flip-flop 1184 logically similar to that shown in FIG. 64 and flip-flop 1186 logically similar to that shown in FIG. 54).

Figure 65:
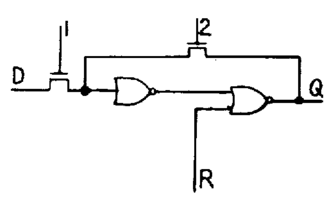
Figure 66:
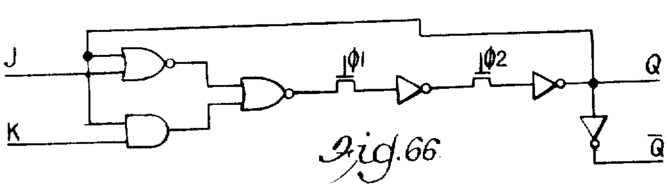
Figure 64:
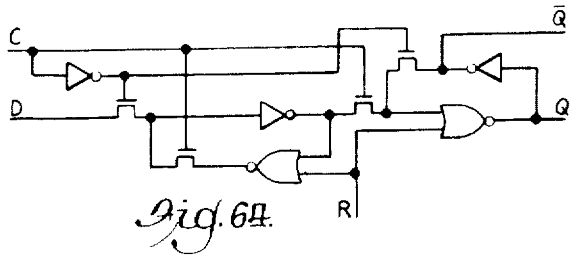
Figure 56:
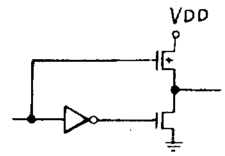
Figure 55:
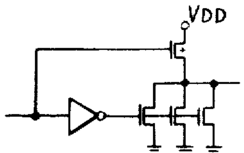
Figure 50:
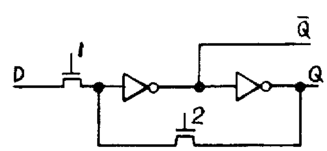

The interrupt mode and enable registers 1158 comprise 5 bits 1158*a–e* (with bit 1158*b* shown in greater detail in FIG. 65 and bits 1158*a* and 1158*c–e* logically similar to that shown in FIG. 50). The output of bit 1158*b* or bit 1 (which is the light pen enable bit) is connected to the input of an AND gate 1188 which is connected to the input of a NOR gate 1190. The other input to NOR gate 1190 is connected to the output of bit 4 or bit 1158*e* of the register 1158. The other input of the AND gate 1188 is connected to the output of a flip-flop 1192 (shown in greater detail in FIG. 66) whose input is connected to the output of a decoder indicated generally at 1194 which decodes the output of the horizontal counter 1154. The output of the NOR gate 1190 is connected by a NOR gate 1196 to the D input of the flip-flop 1184.

The output line 1176 from the flip-flop 1142 (which carries the screen interrupt signal) is connected to the clock input of a flip-flop 1198 (logically similar to that of flip-flop 1184). The output of the flip-flop 1198 is connected to the D input of a flip-flop 1200 (which is logically similar to that shown in FIG. 54 for the flip-flop 1186).

The output of bit 3 or bit 1158*d* (which is the screen interrupt enable bit) of the interrupt enable and mode registers 1158 is connected to the D input of the flip-flop 1198. The output of the flip-flop 1184 is also connected by a line 1202 to the input of a plurality of logic elements 1204 whose output is connected to a plurality of logic elements 1206 having the output line 1164 which is connected to the latch enable inputs of the vertical feedback register 1150 and horizontal feedback register 1152. The output of the flip-flop 1184 is also connected to the input of a NOR gate 1208 whose output is connected to a plurality of logic elements 1210 having an output line 1212. The output line 1212 is connected by a line 1214 to an output buffer 1216 whose output line 1218 carries the control signal $\overline{\text{INT}}$ which is the interrupt control signal to the CPU. The output line 1212 is also connected by a plurality of logic elements indicated generally at 1220 (which includes a flip-flop 1221) to the input of a flip-flop 1222. (The flip-flop 1221 and 1222 are logically similar to the flip-flop shown in FIG. 67). The $\overline{Q}$ output of the flip-flop 1222 is connected to the input of NOR gates 1223 and 1224 which have other inputs connected to a line 1225 which carries the CPU control signal M1 from the output of an inverter 1226 whose input is connected by a resistor 1228 to the CPU control signal $\overline{\text{M1}}$ input 1230.

The output of the NOR gate 1223 is connected to the input of a NOR gate 1232 which has an input connected to the output of the NOR gate 1234. The NOR gate 1234 has an input connected to the $\overline{Q}$ output of the flip-flop 1186 into the Q output of the flip-flop 1200 and an input connected to a line 1236 which is connected to the output of an inverter 1238.

The output of the inverter 1226 is connected to the input of a NOR gate 1240 whose output is connected to a NOR gate 1242. The NOR gate 1242 has another input connected to the CPU control signal $\overline{\text{IORQ}}$ input pad 1244. The output of the NOR gate 1242 is connected by a buffer 1246 to the input of the inverter 1238.

The output of the NOR gate 1232 is connected by an inverter 1248 to the reset input of the flip-flop 1184. The output of the NOR gate 1224 is connected to the input of a flip-flop 1250 which has an input connected to the output of a NOR gate 1252. The NOR gate 1252 has an input connected to the $\overline{Q}$ output of the flip-flop 1200 and an input connected to the line 1236.

The output of the bit 1158*a* of the interrupt mode and enable register 1158 (which is the mode bit for the light pen interrupt) is connected to the input of the NOR gate 1223. The $\overline{Q}$ output of the flip-flop 1158*c* (which is the mode bit for the screen interrupt) is connected to an input of the NOR gate 1224.

The output of the AND gate 1188 is a logical 1 when the light pen interrupt enable bit 1158*b* and the output of the flip-flop 1192 from the decoder 1194 are logical 1. The flip-flop 1192 is set to 1 when the pixels being displayed are defined by the display RAM, i.e., they are not background pixels. A logical 1 output of the AND gate 1188 causes the NOR gate 1190 to output a logical 0 causing the NOR gate 1196 to output a logical 1 which is presented to the D input of the flip-flop 1184.

The $\overline{\text{LIGHTEN}}$/ signal on line 1178 goes low when the raster scan crosses the point where the light pen is located causing the output of the NOR gate 1182 to go high which clocks the flip-flop 1184 to a logical 1 when the D input is a 1 which is a function of the light pen enable bit 1158*b*. The flip-flop 1186 will also be clocked to a logical 1. Since the output of the flip-flop 1184 is a logical 1, the output of the NOR gate 1208 is a logical 0 causing the output line 1212 and line 1214 to subsequently become a logical 1. This in turn causes the output line 1218 to become a logical 0 which is the CPU interrupt control signal $\overline{\text{INT}}$ for interrupts.

The logical 1 state on the line 1214 subsequently causes the flip-flop 1222 to assume a logical 1 state and the $\overline{Q}$ output to assume a logical 0. With the light pen mode bit 1158*a* at a logical 0 (mode 0) the $\overline{Q}$ output of the bit 1158*a* is a logical 1 which causes the output of the NOR gate 1223 to be a logical 0 and thus the output of the NOR gate 1232 depends upon the output of the NOR gate 1234. The flip-flop 1193 is set when the line number contained in the interrupt line register equals the current line number as indicated by the line counter (which initiates a screen interrupt). For purposes of illustration, it will be assumed that this condition is not true and that the output of the flip-flop 1198 which is connected to an input of the NOR gate 1234 is a logical 0. The state of the input line 1236 to the NOR gate 1234 is a logical 0 when the CPU acknowledges an interrupt. Thus, if the interrupt is acknowledged, all of the inputs of the NOR gate 1224 are a logical 0 and the output is a logical 1 causing the output of the NOR gate 1232 to be a logical 0. This output is inverted by the inverter 1243 which causes the flip-flop 1184 to be reset which causes the interrupt signal $\overline{INT}$ on output line 1218 to return to a logical 1 state.

If the interrupt has not been acknowledged, the state of the input line 1236 is a logical 1 causing the output of the NOR gate 1234 to be a logical 0, the output of the NOR gate 1232 to be a logical 1, and the output of the inverter 1248 to be a logical 0 and the flip-flop 1184 will not be reset. Thus, the interrupt signal $\overline{INT}$ will remain a logical 0 and the CPU will continue to be interrupted until it acknowledges the interrupt since the light pen interrupt is in mode 0.

If the light pen mode bit **1158*a* contained a logical 1 (mode 1) the $\overline{Q}$ output of bit 1158*a* is a logical 0. Since the $\overline{Q}$ output of the flip-flop 1222 is a logical 0, when the M1 signal also goes low (after the next instruction has been fetched) the output of the NOR gate 1223 will become a logical 1 causing the output of the NOR gate 1232 to be a logical 0 and the output of the inverter 1248 to be a logical 1 which resets the flip-flop 1184. When this flip-flop is reset, the interrupt signal $\overline{INT}$ returns to a logical 1. Thus, the CPU must acknowledge the interrupt upon the next instruction if at all, in Mode 1**.

The output of the screen interrupt enable bit **1158*d* is the D input of the flip-flop 1198 which is clocked by the output of the flip-flop 1142. As noted before, the flip-flop 1142 is set when the line number being displayed as indicated by the line counter 1138 reaches the line number stored in the interrupt line register 1136 which initiates a screen interrupt when enabled. If the enable bit 1158*d* contains a 1, the flip-flop 1198 will be clocked to 1 when the flip-flop 1142 is set. Otherwise, it will remain 0 since its D input is 0**.

Since the output of the flip-flop 1198 is also connected to an input of the NOR gate 1208, when the flip-flop 1198 is set, the interrupt control signal $\overline{INT}$ subsequently goes low indicating an interrupt just as for the light pen interrupt. Modes 0 and 1 for the screen interrupt are indicated by the bit **1158*c*** also operate in a manner similar to that for the light pen interrupt.

Thus, the flip-flop 1222 subsequently assumes a logical 1 state when the $\overline{INT}$ signal is activated due to a screen interrupt as well. With the screen interrupt mode bit **1158*c* at a logical 0 (mode 0), the $\overline{Q}$ output of the bit 1158*c* is a logical 1 which causes the output of the NOR gate 1224 to be a logical 0 and thus the output of the NOR gate 1250 depends upon the output of the NOR gate 1252**.

The Q output of the flip-flop 1200 is set to 1 (after being clocked by M1) when the flip-flop 1198 is set and the the $\overline{Q}$ output of the flip-flop 1200 goes to 0. When the CPU acknowledges the interrupt (i.e., the state of the line 1236 becomes a 0) the output of the NOR gate 1252 becomes a logical 1. This causes the output of the NOR gate 1250 to become a logical 0, the output of the inverter 1251 to become a logical 1 and the flip-flop 1198 to reset. This in turn deactivates the interrupt signal $\overline{INT}$.

Had the screen interrupt mode bit **1158*c* been set to 1 (i.e., mode 1), the output of the NOR gate 1224 would go to 1 when the CPU signal M1 goes to 0 (i.e., after the next instruction). This causes the output of the NOR gate 1250 to become a logical 0, the output of the inverter 1251 to become a logical 1 and the flip-flop 1198 to be reset. Thus, the interrupt will be discarded if not acknowledged by the next instruction in mode 1**.

Figure 68:
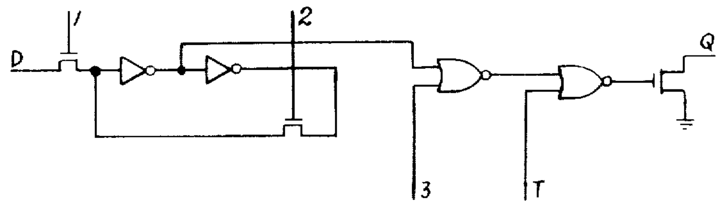
Figure 69:
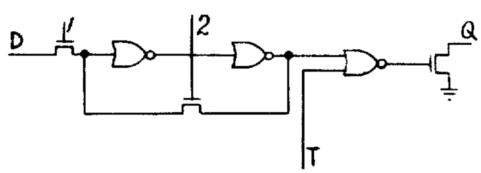
Figure 58:
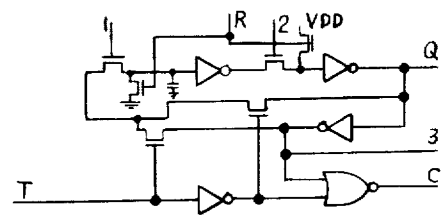

The input feedback register is indicated at 1156 and comprises 8 bits **1156*a–h* (with bit 1156*a* typical of bits 1156*a–d* shown in greater detail in FIG. 68 and bit 1156*e* typical of bits 1156*e–h* shown in greater detail in FIG. 69). The D input and Q output of each bit of the interrupt feedback register 1156 is connected to the data bus 66*b*. The interrupt feedback register 1156 has an input connected to the register select line 1024 from the address decoder 1008 by which the CPU may address the interrupt feedback register and store interrupt data in the register. Each bit also has a latch enable input connected to the line 1236 which goes low when the CPU acknowledges the interrupt. Thus, when the CPU acknowledges an interrupt, the data contained within the interrupt feedback register 1156 is conducted to the data bus 66*b* and transmitted to the CPU. The bits 1156*a–d* have a reset input connected by a line 1260 through the $\overline{Q}$ output of the flip-flop 1200**.

When the flip-flop 1200 contains a logical 1 indicating a screen interrupt, the $\overline{Q}$ output is a logical 0 and the data stored in the bits **1156*a–h* by the CPU is conducted back to the CPU on the data bus 66 unmodified when the CPU acknowledges the interrupt. Since the data is unmodified, it indicates to the CPU that the interrupt was a screen interrupt. However, if the flip-flop 1200 contains a logical 0, the $\overline{Q}$ output is a logical 1 which causes the bits 1156*a–d* to all conduct 0's onto the data bus 66 in response to an interrupt acknowledge signal indicating a light pen interrupt. The bits 1156*e–h* are conducted unmodified. Since the flip-flop 1200** is set by the occurrence of a screen interrupt, screen interrupts have priority over light pen interrupts.

The output of the line counter 1138 is shown in FIG. 44 to be also connected to a comparator 1262 which also has inputs from a vertical blank register 1264. The vertical blank register 1264 contains the line number at which pixel data from the display RAM is no longer used to define the pixels displayed on the screen and has the same address as the vertical blank register of the data chip but is utilized for a different purpose. When the line counter 1138 reaches the line number contained within the vertical blank register 1264, the comparator 1262 outputs a signal which is used by a memory cycle generator 1266 to activate a memory refresh cycle.

The memory cycle generator controls memory cycles generated by either CPU initiated reads or scan address generator read operations. The generator inputs include the CPU control signals $\overline{MREQ}$, $\overline{RD}$, $\overline{IORQ}$, $\overline{M1}$ and $\overline{RFSH}$, and address bits A12–A15 which are transmitted directly from the CPU. The RAS0–RAS3 outputs are generated by the memory cycle generator 1266 and are used to activate memory cycles.In the low resolution mode, only RAS0 is used to one bank of RAM (4K by 8). In the high resolution mode, all four RAS signals are used to control four banks of RAM (16k×8). Two other signals generated are WRCTL and LTCHDO which are control signals to the data chip. Also, a $\overline{Wait}$ signal is generated to initiate a wait state in the CPU.

The vertical blank register is indicated at 1264 in FIG. 45 and comprises 8 bits 1264$a$–$h$ (with each bit logically similar to that shown in FIG. 50). The vertical blank register 1264 has a register select line 1016 at which the CPU may address the vertical blank register and input data from the data bus 66$b$ which is the line number at which "blanking" occurs. The Q and $\overline{Q}$ output of each bit of the vertical blank register 1264 is connected to the comparator indicated generally at 1262 which comprises a programmed logic array 1268 which includes a plurality of pull-down transistors 1269 and pull-up transistors 1270 and a plurality of NOR gates 1271. The comparator 1262 also has inputs connected to the output of the line counter 1138 as previously mentioned.

The output of the comparator 1262 is connected to the D input of a flip-flop 1272 (shown in greater detail in FIG. 64) which has a reset input connected to the output of a flip-flop 1300 (shown in greater detail in FIG. 58) which has an input connected to the most significant bit 1138$h$ circuit of the line counter 1138. The $\overline{Q}$ output of the flip-flop 1272 is connected by a line 1274 to an input of the memory cycle generator indicated generally at 1266.

Figure 70:
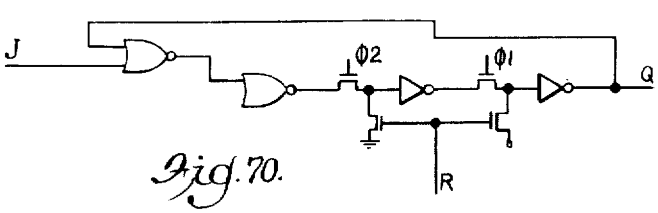
Figure 48:
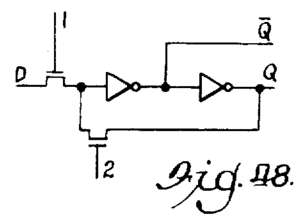
Figure 95:
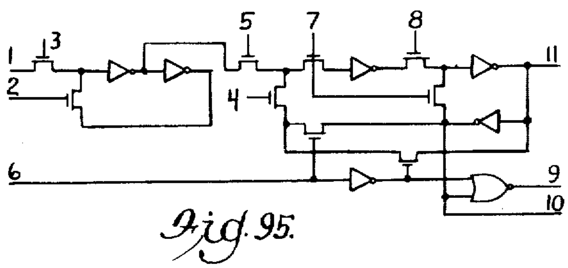

The memory cycle generator comprises a PLA 1275, which includes pull-down transistors 1276 and pull-up transistors 1278, and a J-K flip-flop 1280 (shown in greater detail in FIG. 70). The generator 1266 further comprises J-K flip flops 1282$a$–$g$ (each of which is logically similar to that shown in greater detail in FIG. 66) and bits 4 and 5 of a function generator register (each of which is logically similar to that shown in FIG. 50) having the same address as the function generator register of the data chip.

A RAS signal is generated for display RAM accesses and thus is the function of $\overline{\text{MREQ}}$, and VIDNXT2 and the address bits A12, A13, A15 (to determine whether the memory access concerns the display RAM). A $\overline{\text{WAIT}}$ signal is generated to initiate a wait state in the CPU for all input and output operations (IORQ) to compensate for any delay due to the microcycler since the CPU address bus and data bus "time share" the microcycle data bus. Wait states are similarly initiated for CPU read and write operations (for data and instructions). Two wait states from and to the display RAM are generated if the CPU is executing instructions in the display RAM.

An additional wait state is initiated if the CPU and the video processor attempt to access the display RAM at the same time. A $\overline{\text{WAIT}}$ signal is transmitted to the CPU when VIDNXT2 is active (indicating the next memory access cycle is to be a video cycle) and the CPU also requests the display RAM (MREQ). LTCHDO becomes active when data being read from the diplay RAM is on the display RAM data bus. LTCHDO enables the OR/exclusive-OR circuit of the data chip to latch up the data on the memory data bus. WRCTL indicates that the present memory cycle is a write operation rather than a read.

Figure 12B:
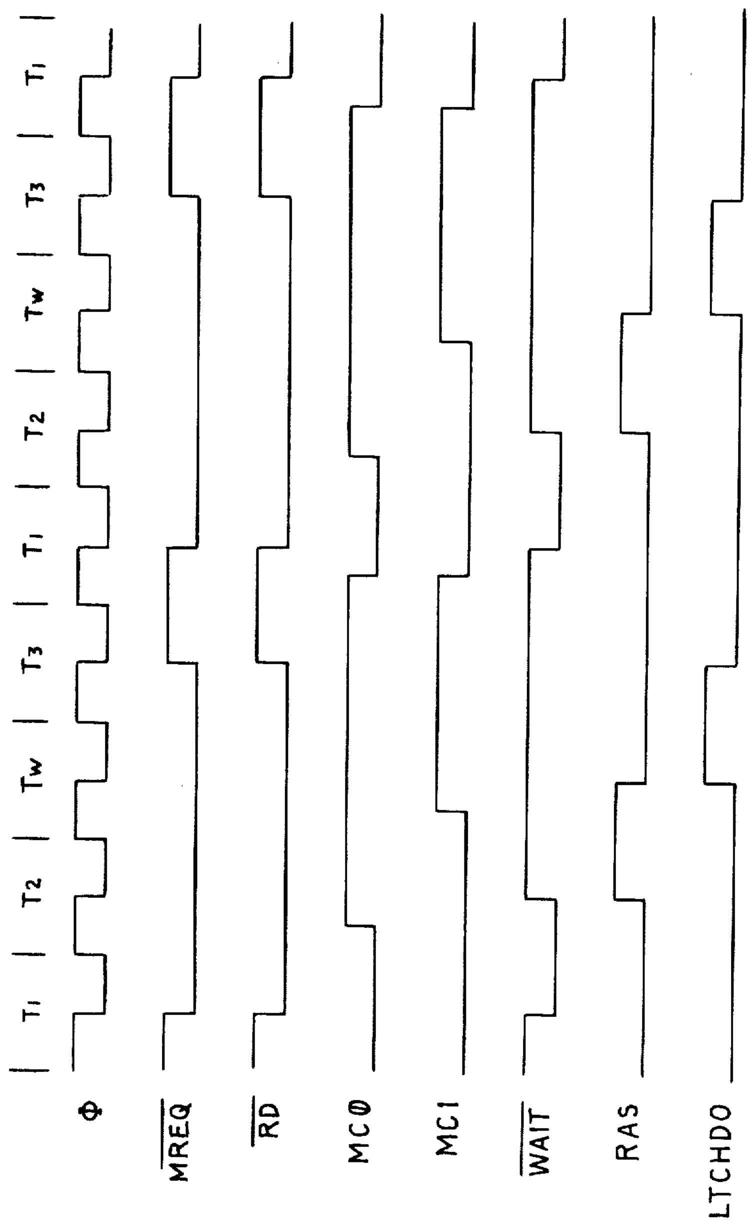
Figure 12C:
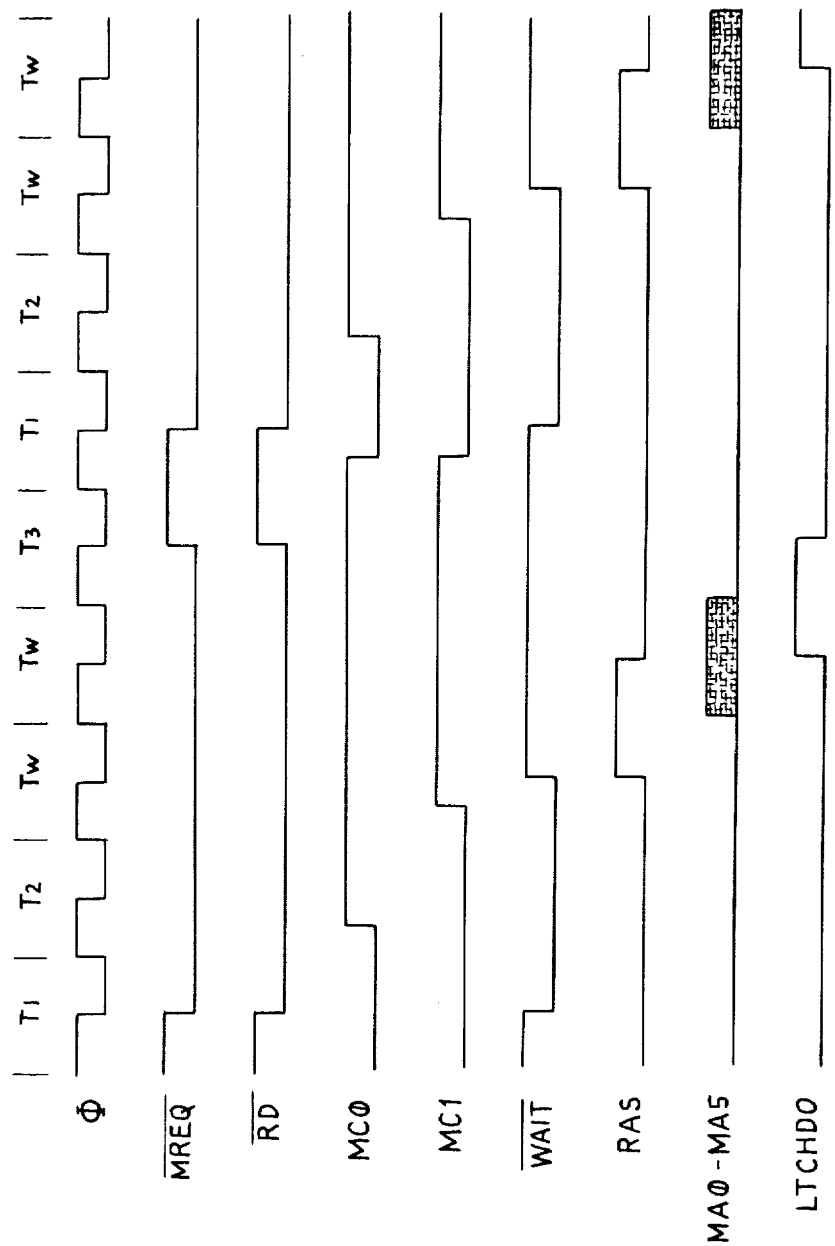
Figure 12D:
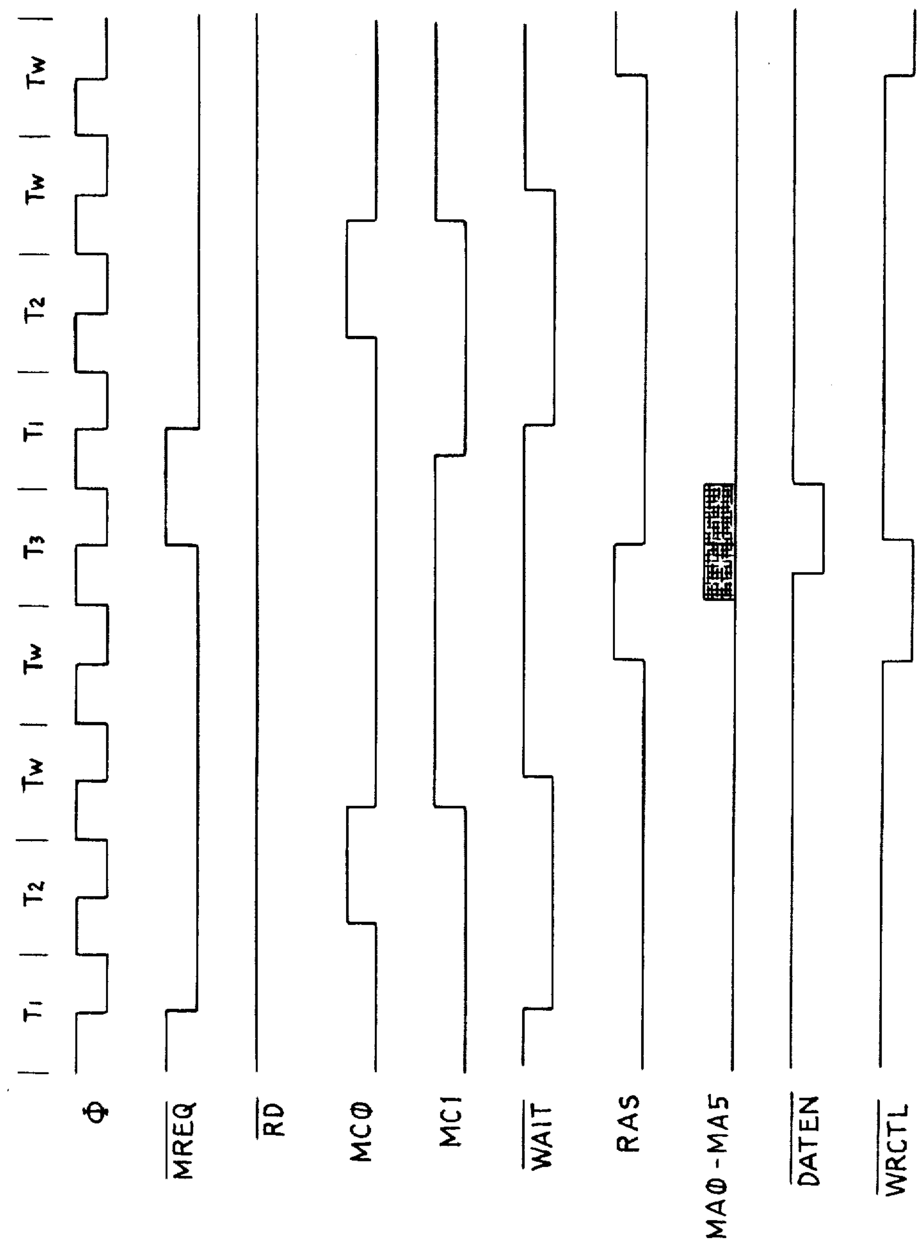

The relationship between the input signals $\overline{\text{MREQ}}$, $\overline{\text{RD}}$ from the CPU and the clock signal $\Phi$ to the memory cycle generator outputs $\overline{\text{WAIT}}$, RAS, $\overline{\text{WRCTL}}$ and LTCHDO are shown for CPU read and write operations to the display RAM with FIGS. 12A and D illustrating write operations and FIGS. 12B and C, read operations. FIGS. 12C and D illustrate the extra wait state generated when a CPU read or write conflicts with a video cycle by the video processor. The shaded areas of the MA0–MA5 lines are determined by the address bits MA0–MA5.

Figure 12E:
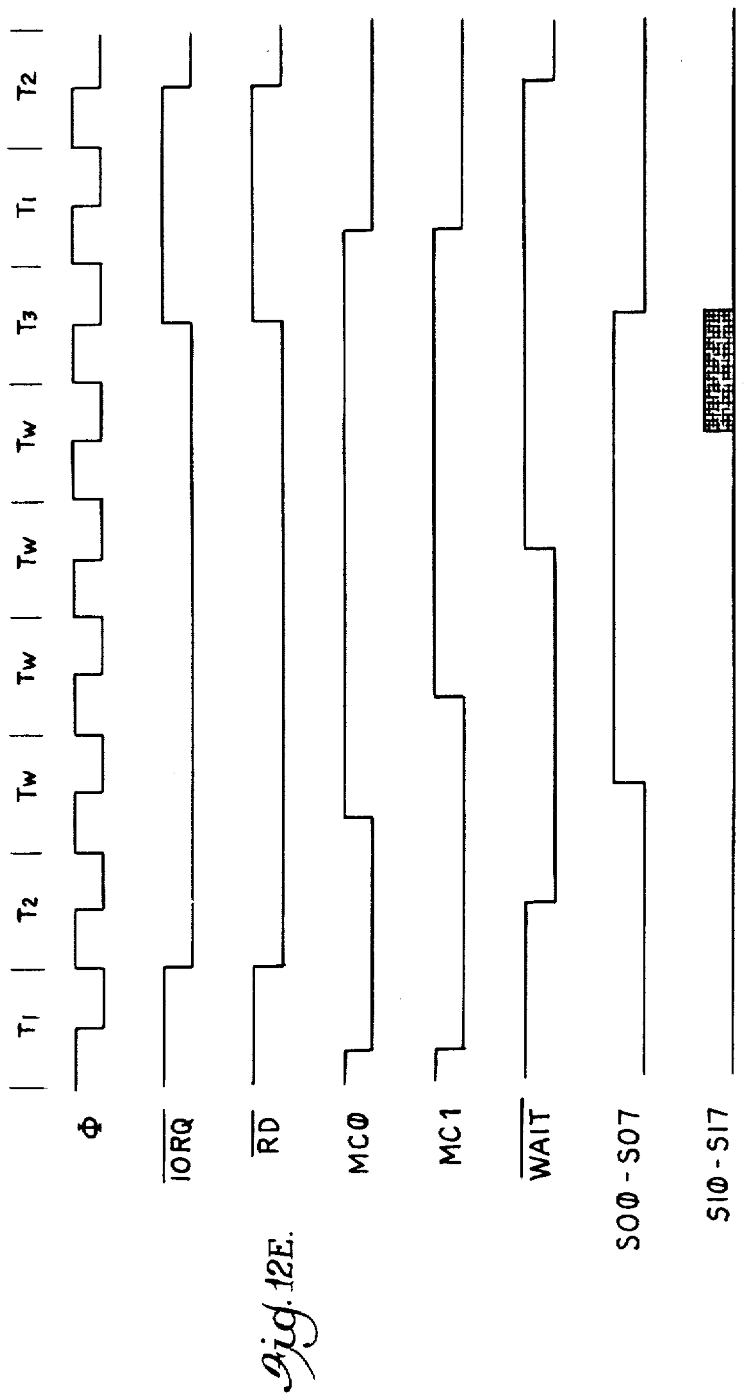

The relationship between the inputs of CPU control signals $\overline{\text{IORQ}}$, $\overline{\text{RD}}$ and the clock signal $\Phi$ and the memory cycle output WAIT is shown for input/output read operations in FIGS. 12E and G and input/output write operations in FIG. 12F. FIG. 12E illustrates an I/O read from the switch matrix ports 10H–17H and FIG. 12G illustrates the I/O reads from the other ports.

The RAS0 output of the address chip is shown in FIG. 10C to be connected to the D input of a flip-flop 956 of the logic elements 954, whose $\overline{Q}$ output carries the $\overline{\text{CS}}/\overline{\text{RAS}}$ (chip select and row address strobe) signal for the display RAM 42 and is connected to the RAM control signal bus 958. The clear input of the flip-flop 956 is connected to the output of a NAND gate 960 having inputs connected to the Q output of the flip-flop 956, the clock signal $\Phi$ from the buffer 100 and the $\overline{Q}$ output of a flip-flop 962.

The D input of the flip-flop 962 is connected to the clock signal $\Phi$ and the Q output is connected to the clock input of the flip-flop 956. The flip-flop 962 is clocked by the clock signal $\overline{\text{PX}}$. The flip-flop 956 operates to invert the signal RAS0 and to delay it to produce the $\overline{\text{CS}}/\overline{\text{RAS}}$ signal at its $\overline{Q}$ output, the delay being a function of the clock signal $\Phi$ and $\overline{\text{PX}}$ inputs to the logic elements 954.

The $\overline{\text{DATEN}}$ output of the data chip 54 is connected to the input of a NOR gate 964 having a grounded input and an output connected to the enable input of the tri-state drivers 966$a$–$h$ connected to the DO output of the RAM chips 104$a$–$h$, respectively. The output of the drivers are connected to the memory data bus 102.

The output of the NOR gate 964 is connected to the input of a NAND gate 968 whose output is connected to the control signal bus 958 and carries the write enable signal, $\overline{\text{WE}}$. The other input of the NAND gate 968 is connected to the Q output of a flip-flop 970 whose D input is connected to the Q output of the flip-flop 962. The $\overline{Q}$ output of the flip-flop 970 is connected to the control signal bus 958 and carries the column address strobe ($\overline{\text{CAS}}$) signal. The flip-flop 970 is clocked by the output of a flip-flop 972 which is enabled by the $\overline{\text{PX}}$ and PX clock signals.

When $\overline{\text{DATEN}}$ goes low, the output of the NOR gate 964 goes high which turns off the drivers 966$a$–$h$. Subsequently, when the clock signal from the $\overline{Q}$ output of the flip-flop 970 goes high, the output of the NAND gate 968 goes low which enables the RAM's 104$a$–$h$ to have data written in them.

I/O CHIP

As noted before, the control handles 12$a$–$d$ and the keypad 18 (FIG. 2) are connected to the I/O chip 50 and provide signals in response to manipulation by the players or operators to the I/O chip. The CPU 46 of the digital computer 44 receives the keypad and control handle input signals from the I/O chip 50 in the digital form. The I/O chip has a music processor which provides audio signals to RF modulator 58 in response to output data signals from the computer to play melodies or generate noise through the TV 28.

The interconnection of the I/O chip 50 within the system is shown in FIG. 10C. The I/O chip has inputs MXD0–MXD7 connected to the microcycle data bus 66 and inputs $\overline{\text{RD}}$ and $\overline{\text{IORQ}}$ for the CPU control signals READ AND INPUT/OUTPUT REQUEST, respectively and inputs for the clock signals $\Phi$ and $\overline{\Phi}$.

Outputs POT0-POT1 are each operatively connected to one of the potentiometers of the player control handles 12*a-d*. A signal transmitted to one of the potentiometers results in a signal returned to input MONOS which will be more fully explained later. Outputs SO0--SO7 are selectively coupled to the keys and switches of the keypad 18 and player control handles 12*a-d* of the switch matrix shown in FIG. 8. Activation of one of the outputs SO0-SO7 results in signals being received at the switch inputs SI0-SI7 also to be more fully explained later. The I/O chip has power supply inputs VDD, VGG and VSS connected to +5v, +10v and ground, respectively, a TEST input connected to the +5v supply and a $\overline{\text{RESET}}$ input connected to the extension plug 77.

The CPU communicates with the I/O chip shown in block diagram in FIGS. 71A-C, through input and output instructions. Each input or output instruction has an address at which data is to be inputted from or outputted to. This address is transmitted to the input-/output chip 50 (FIG. 71A) via the microcycle data bus 66, tri-state buffer 1400, and I/O data bus 66*c* to a microcycle decoder 1402 which assembles the address in a manner similar to that described for the microcycle decoder of the data chip. The microcycle decoder 1402 assembles the 11 bit address, A0-A10, which is decoded by an address decoder 1404. The address decoder 1404 has an input for the $\overline{\text{INPUT}}$ control signal and input for the $\overline{\text{OUTPUT}}$ control signal which are activated in conjunction with an input or an output instruction, respectively. The address decoder 1404 decodes the address from the microcycle decoder 1402 and activates one of the select lines 1406-1415 with select lines 1406 comprising eight select lines SO0-SO7. The particular select line activated depends upon the address transmitted to the address decoder 1404 and the state of the INPUT and OUTPUT control signals.

The select lines SO0-SO7 have addresses 10-17H and are activated with an input instruction. When one of these lines is activated, the switch matrix (shown in FIG. 8) will feedback the associated 8 bits of data on an input bus, SI0-SI7 indicated at 1418 to a multiplexer 1420 which will gate the data to a data bus 66*d* which is connected to the microcycle data bus 66 by the tri-state buffer 1400. Thus for example, if an input instruction transmits the address 12H to the address decoder 1404, the select line SO4 will be activated which will cause the keypad data indicated at 1422 (FIG. 8) of the switch matrix to be conducted to the microcycle data bus on the input data bus 1418.

The select lines 1407-1414 are output register select lines. These lines are activated with the concurrence of the OUTPUT control signal (which is activated by an output instruction) and the associated address (Table II) of a master oscillator, tone A frequency, tone B frequency, tone C frequency, vibrato and noise volume registers. In addition are the tone C volume, noise modulation, and MUX output registers and tone A and tone B volume output registers. These output registers are part of the music processor in which the CPU loads data with output instructions. This data determines the characteristics of the audio signal that is generated.

The CPU can read the positions of the four potentiometers 17 of the four player control handles 12*a-d* (FIG. 1) through an analog-digital converter circuit indicated generally at 1422. The potentiometers are continuously scanned by the analog-digital (A-D) converter circuit and the digital results of the conversion are stored in the pot 0-3 registers 1424. The CPU reads these registers with input instructions.

The CPU can address the registers 1424 by transmitting the address of one of the registers to the address decoder 1404 which activates the select line 1415. A potentiometer (or pot) register address decoder 1426 has an input for the select line 1415 as well as the address bits A0 and A1. The pot register address decoder 1426 decodes these inputs to select one of the four registers, pot 0-pot 3. A selected register feeds back all 0's when the corresponding potentiometer is turned fully counterclockwise and all 1's when turned fully clockwise.

The output of a 2-bit "scan" counter 1428 is connected to the inputs of a scan decoder 1430 which has a 4-bit output line 1432 indicated as POT 0-3 and 4 register select lines connected to the pot 0-3 registers 1424. Each line of the POT 0-3 lines 1432 is operatively connected to an associated potentiometer. Thus, for example, the POT 0 line of the line 1432 is shown connected to the associate potentiometer 17 of the player control handle 12*a* in FIG. 72. The potentiometer is connected to a capacitor 1436 having an output line 1438 which carries the analog signal MONOS.

Referring back to FIG. 71A, a comparator 1440 has an input for the analog signal MONOS which is compared to a reference signal REF. The output of the comparator 1440 is connected to a counter 1442 which counts until the voltage signal MONOS across the capacitor 1436 reaches the reference REF.

The scan decoder 1430 decodes the output of the scan counter 1428 to sequentially activate the POT 0, POT 1, POT 2 and POT 3 lines of the lines 1432. Thus, when the Pot 0 line is activated, the capacitor 1436 shown in FIG. 72 will begin to charge and the MONOS analog signal will begin rising. As the MONOS signal rises, the counter 1442 continues counting until the MONOS signal reaches the RAF signal. At that point, the counter 1442 stops. The rate at which the capacitor charges is related to the setting of the associated potentiometer. Thus the count that the counter 1442 reaches is determined by the potentiometer setting.

Synchronously with the sequential activation of the output lines 1432, the register select lines 1434 are activated such that the pot 0 register is selected to input the output of the counter 1442 after the POT 0 line is activated and the output of the counter 1442 is determined by the setting of the potentiometer of the control handle 12*a*. Next, the pot 1 register is selected to input the digital data representing the setting of the potentiometer of the control handle 12*b*, etc.

The CPU may then input this data by sending the corresponding addresses of the potentiometer registers 1424 (Table II) to the address decoder 1404 and pot register address decoder 1426. Each of the pot 0-3 registers 1424 are connected to the multiplexer 1420 by an 8 bit output line 1444. The multiplexer 1420 has an input for the line 1415 such that when an address corresponding to one of the pot 0-3 registers 1424 is sent by the CPU to input the data contained by the registers 1424, the multiplexer 1420 selects the 8 bits of data on the line 1444 from the registers 1424 and conducts them to the data bus 66*d*.

The I/O chip is shown in greater detail in FIGS. 73A-M with a composite diagram of FIGS. 73A-M shown in greater detail in FIG. 74. The microcycle decoder is indicated generally at 1402 in FIG. 73 and comprises 11 bit circuits 1402*a-k* for the address bits A0–A10, respectively, (with the decoder bit circuit 1402*a* typical of the bits 1402*a–k* shown in greater detail in FIG. 75). The low address bits A0–A7 are loaded by the bit circuits 1402*a–h* of the microcycle decoder 1402 on the control signal LDL1, with the high address bits A8–A10 loaded on the control signal LDH1 in a manner similar to that for the microcycle decoders of the address and data chips.

The address decoder is indicated generally at 1404 in FIG. 73 and comprises a PLA just as for the address and data chips. The address decoder 1404 decodes the address bits from the microcycle decoder 1402 and activates one of the switch matrix input port select lines SO0–SO7 indicated at 1406, (each of which is the output of a driver 1704, shown in greater detail in FIG. 76) if the corresponding address is present as well as the control signal $\overline{\text{INPUT}}$ on line 1446. Similarly, the address bits can be decoded to activate the associated music processor output port select lines 1407–1414 if the output control signal $\overline{\text{OUTPUT}}$ on line 1448 is active. All the music processor registers can be loaded with one Z-80 OTIR instruction. The contents of register C should be sent to output port address 18H, register B to 8H and HL should point to the 8 bytes of data. The output lines 1451 are sequentially activated such that the register select lines 1414–1407 are sequentially activated with the data pointed to by HL going to touput port 17H (noise volume register) and the next 7 bytes going to output ports 16H–10H.

The pot register input select line 1415 of the address decoder 1404 is also indicated. The switch input lines SI0–SI7 are indicated generally at 1418 and are operatively connected to the multiplexer indicated generally at 1420. The gates of the transistor switches which comprise the multiplexer 1420 are connected to the output of an inverter 1450 whose input is connected to the line 1415. When the logic state of the line 1415 is a logical 1, the pot 0-3 registers 1424 are selected causing output of the inverter 1450 to be a logical 0 which turns off the transistor switches of the multiplexer 1420 thereby turning off the SI0–SI7 inputs.

Figure 77:
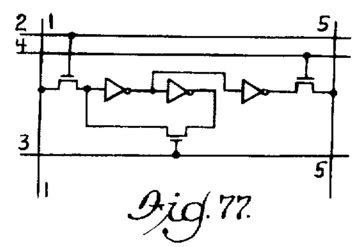
Figure 96:
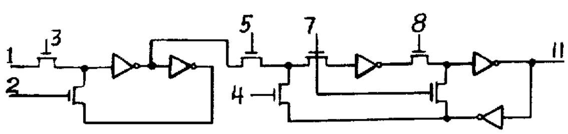
Figure 97:
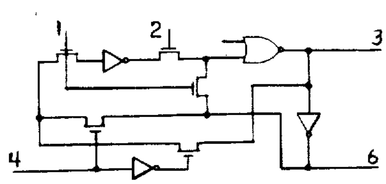
Figure 78:
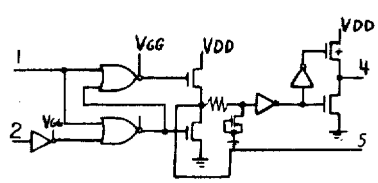

The pot 0-3 registers are indicated generally at 1424 (with the least significant bit 1424*a* of the pot 0 register tyical of the bits of the registers 1424, shown in greater detail in FIG. 77.) The output of each of the potentiometer registers 1424 is connected by the 8-bit output line 1444 to the output of the associated transistor switches of the multiplexer 1420. The output of the switches of the multiplexer 1420 are also connected to the 2 input of the tri-state buffer indicate generally at 1400 (with unit 1400*a*, typical of the 8 units of the tri-state buffer 1400 shown in greater detail in FIG. 78) by the I/O chip data bus 66*d*. The input/output terminal 3 of each unit of the tri-state buffer 1400 is connected to the microcycle data bus 66.

The 1 input of each buffer unit is connected to the output of an inverting gate 1553 (shown in greater detail in FIG. 79) which has an input line 1555 and an input line 1557, both from the address decoder 1404. The line 1555 is activated by addresses 10H–17H (the switch matrix input ports) and the line 1557 is activated by addresses 1CH–1FH (the potentiometer input registers). The activation of either line allows the tri-state buffer 1400 to transmit the data from the switch matrix or the potentiometer registers to the microcycle data bus 66.

Figure 80:
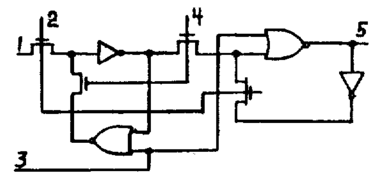
Figure 92:
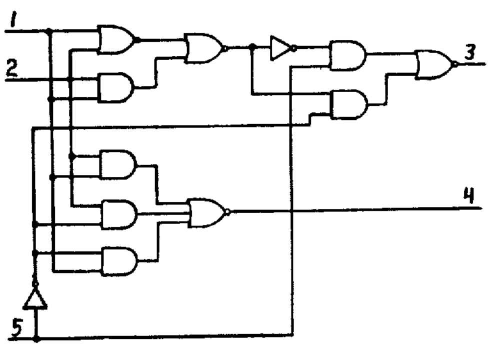

The scan counter is indicated generally at 1428 in FIG. 73 and comprises a 2-bit counter (with the least significant bit 1428*a* shown in greater detail in FIG. 80). The inputs of the counter 1428 are connected to the output of a flip-flop 1452, the output of which is connected to an input line 1454 which carries the clock signal. The output of the scan counter 1428 is connected to the scan decoder indicated generally at 1430 which comprises a PLA having four output lines 1432 and four output lines 1434.

Figure 81:
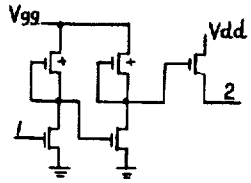

The output lines 1432 are connected to the POT 0, POT 1, POT 2 and POT 3 output pins of the I/O chip, respectively, by a buffer 1456 (shown in greater detail in FIG. 81). Each of the output lines 1434 of the PLA of the decoder 1430 are connected to a register select input 4 of each bit of a register of the pot 0-3 registers 1424.

As the counter 1428 cycles through its 4 output states (as it is a 2-bit counter) the POT 0-3 lines of the output lines 1432 are sequentially activated. As each output line is activated, a capacitor operatively connected to the potentiometer associated with that particular output line charges at a rate as determined by the setting of the potentiometer. The output of each capacitor is operatively connected to the MONOS input 1658 of the I/O chip which is connected by a resistor 1660 to the input of the comparator 1440. The comparator 1440 has another input connected to the junction of a voltage divider 1662 which generates the voltage reference signal REF.

Figure 82:
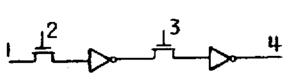
Figure 83:
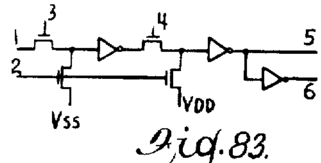

The output of the comparator 1440 is connected to the input of a plurality of logic elements indicated at 1664 which includes gates 1666–1669, with gate 1666, typical of gates 1666–1669 (shown in greater detail in FIG. 82). Also included are gates 1670–1672 (with gates 1670 and 1672 shown in greater detail in FIG. 83.) (The gate 1671 is also logically similar to that shown in FIG. 83, but VDD and VSS are interchanged.)

Figure 84:
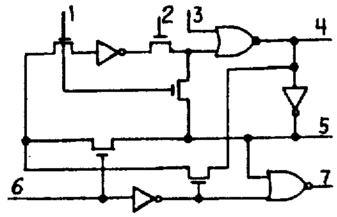

The output 4 of the gate 1666 is connected to a stop input 6 of each bit of the counter indicated generally at 1442 (with bit 1442*a* typical of the bits of the counter 1442 shown in greater detail in FIG. 84). The counter 1442 is clocked by a 2-bit counter 1678 (with bit 0 or 1678*a*, and bit 1, or 1678*b*, shown in greater detail in FIGS. 85 and 86, respectively, and buffer 1679 shown in greater detail in FIG. 87). The counter 1678 has an input for the clock signal Φ from a buffer 1681 (also shown in greater detail in FIG. 87.) The output of the counter 1678 at the buffer 1568 is the clock signal Φ divided by four. The counter 1442 counts until the MONOS signal reaches that of the REF reference signal such that the count contained within the counter 1442 is proportional to the potentiometer setting of the potentiometer associated with the particular output line of the output lines 1432.

Synchronously with the activation of the output lines 1432, the pot register select lines 1434 are sequentially enabled such that pot 0 of the registers 1424 is selected and enabled to latch up the data output of the counter 1442 when the counter 1442 indicates the positional setting of the potentiometer ("pot 0") associated with control handle 12*a*, etc. Accordingly, the output of each bit of the counter 1442 is connected by the logic gates indicated generally at 1468 to the 1 input of a bit of each register of the potentiometer registers 1424.

When a particular pot line of the POT0–POT3 lines 1432 is activated, the associated capacitor begins charging until the MONOS signal on the line 1658 reaches the REF voltage as determined by the comparator 1440. One delay later (gate 1666), the counter 1442 is stopped. If IORQ is not active, one delay later (gate 1667) the output lines 1434 of the scan decoder are enabled so that one of the pot registers 1424, corresponding to the count of the scan counter 1430, can latch up the count output of the counter 1442. One delay later (gate 1671), the output lines 1432 are turned off. Also one delay after gate 1667 (gate 1668), the scan counter is incremented and the counter 1442 is reset.

Figure 88:
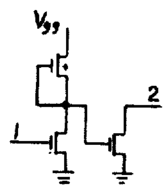

One delay later (gate 1670), a DISCHARGE signal on a line 1674 (which is the output of a buffer 1676 shown in greater detail in FIG. 88) discharges the capacitor. When the counter 1442 reaches 64, one delay later (gate 1670) the DISCHARGE signal is turned off. Two delays (gates 1669 and 1671) after the counter 1442 reaches 64, the POT0-POT3 lines 1432 are enabled so that the particular pot line of the lines 1432 corresponding to the incremented count of the scan counter 1428 is activated to start the cycle all over.

The pot register address decoder is indicated generally at 1426 in FIG. 73 and comprises a PLA having an input line 1415 from the address decoder 1404 and input lines 1469 and 1471 for the address bits A0 and A1, respectively. The CPU can read the contents of any particular potentiometer register 1424 by transmitting the appropriate address to the address decoder which activates the line 1415. The address bits A0 and A1 come directly from the microcycle decoder 1402 and determine which of the 4 registers, pot 0–3, is selected.

Figure 89:
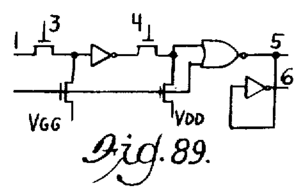

The $\overline{\text{INPUT}}$ and $\overline{\text{OUTPUT}}$ control signals are generated on the output lines 1446 and 1448, respectively, of a generator indicated generally at 1680 and includes gates 1682–1686 (and are logically similar to that shown in FIG. 89). Also included is counter bit 1688 (shown in greater detail in FIG. 86).

MUSIC PROCESSOR

A block diagram of the music processor of the I/O chip is shown in FIG. 71B and C. The music processor can be divided into two sections. The first section (shown in FIG. 71B) generates a master oscillator frequency and the second section (shown in FIG. 71C) uses the master oscillator frequency to generate tone frequencies and the analog AUDIO output.

The frequency of the master oscillator is determined by the contents of several output registers. The contents of all registers in the music processor are set by output instructions from the CPU.

The master oscillator frequency is a square wave whose frequency is determined by 8 binary inputs to a master oscillator 1470 and a clock signal. This 8 bit input word is the sum of the contents of a master oscillator register 1472 (having address 10H which activates the register select line 1407) and the output of a multiplexer 1474. The multiplexer 1474 is controlled by the output of a one bit multiplexer register 1476 (having address 15H which activates the register select line 1412). The addition of the contents of the master oscillator register 1472 and the output of the multiplexer 1474 is performed by an 8 bit adder 1478 which has an 8 bit output connected to the master oscillator 1470.

If the multiplexer register 1476 contains a logical 0, then the data from a "vibrato" system, indicated generally at 1480, will be conducted through the multiplexer 1474. The 2 bits from a 2-bit vibrato frequency register 1482 (having address 14H) determined the frequency of the square wave output of a low frequency oscillator 1484. The output of the low frequency oscillator 1484 is operatively connected to the input of a set of logic gates 1486 represented by an AND gate. The vibrato system 1480 further comprises a 6-bit vibrato register 1488 (also having address 14H) which is operatively connected by a 6 bit output line to the "AND" gate 1486. The 6-bit word at the output of the AND gate oscillates between 0 and the contents of the vibrato register 1488 since the contents of the vibrato register 1488 are being "ANDed" with the output of the low frequency oscillator 1484, with the frequency of oscillation determined by the contents of the vibrato frequency register 1482. The 6-bit output word of the AND gate 1486, along with 2 logical 0 bits (when the MUX register 1476 contains a logical 0) are conducted through the multiplexer 1474 to the 8 bit adder 1478 to be added to the contents of the master oscillator register. This causes the master oscillator frequency to be modulated between two values since the frequency is a function of alternatively the contents of the master oscillator register and the sum of the contents of the master oscillator register and the output of AND gates 1486 thus giving a vibrato effect.

If the multiplexer register 1476 contains a logical 1, the data from a "noise" system, indicated generally at 1490, will be conducted through the multiplexer 1474 to the 8-bit adder 1478. An 8-bit "noise vloume" register 1492 is operatively connected to the input of a set of gates 1494 also represented by an AND gate. An 8-bit noise generator 1496 is also operatively connected to the inputs of the "AND" gate 1494. The output of the noise generator is an 8-bit word that constantly varies. The gate 1494 functions as 8 AND gates so that each output bit of the noise volume register 1492 is ANDed with an output bit of the noise generator 1496. Thus the 8 bit output word from the noise volume register determines which bits from the noise generator will be present at the output of the gates 1494. Accordingly, if a bit in the noise volume register 1492 is 0, the corresponding bit at the output of the gates 1494 will also be 0. If a bit in the noise volume register is 1, the corresponding bit at the output of the AND gate will be a noise bit from the noise generator. This 8 bit word from the gates 1494 is conducted through the multiplexer 1474 (when the multiplexer register 1476 contains a 1) to the 8-bit adder 1478. Thus, the master oscillator frequency can be modulated by noise. Modulation can be completely disabled by setting the noise volume register 1492 to 0 if noise modulation is being used, or by setting the vibrato register 1488 to 0 when vibrato is used.

In the second part of the music processor shown in FIG. 71C, the square wave from the master oscillator on the output line 1498 of the master oscillator 1470 (FIG. 71B) is conducted to the clock input of 3 tone generator circuits, tone generators A, B, and C indicated at 1500, 1502 and 1504, respectively, which produce square waves at their outputs. The frequency of the outputs of each tone generator is determined by the contents of an associated tone generator register and the master oscillator frequency. Accordingly, a tone generator "A" register 1506 is connected to the input of the tone generator A, a tone generator "B" register 1508 is connected to the input of the tone generator B and a tone generator "C" register 1510 is connected to the inputs of the tone generator C.

The output of the tone generator A which carries the square wave output is operatively connected to the inputs of a set of gates indicated at 1512 which function as 4 AND gates, with the other 4 inputs of the "AND" gates 1512 operatively connected to the outputs of a tone volume "A" register 1514. The 4-bit output word of the AND gate 1512 oscillates between 0 and the contents of the tone volume "A" register 1514 at the frequency of the output of the tone generator A.

Similarly, the output of the tone generator B is operatively connected to the inputs of 4 "AND" gates indicated at 1516 with the other 4 inputs operatively connected to the outputs of a 4-bit tone volume "B" register 1518 and the output of the tone generator C operatively connected to the inputs of 4 "AND" gates 1520 with the other 4 inputs of the AND gates 1520 operatively connected to the outputs of a 4 bit tone volume "C" register 1522. The four-bit output of each set of AND gates oscillates between 0 and the contents of the associated tone volume register.

The output of the AND gates 1512 is operatively connected to a digital-analog converter 1524 whose output oscillates between ground and a positive analog voltage determined by the contents of the tone volume "A" register 1514 at a frequency determined by the tone generator A. Similarly, the output of the AND gates 1516 are operatively connected to a digital-analog converter 1526 and the outputs of the AND gates 1520 are operatively connected to a digital analog converter 1528.

A 4th tone generator comprises a set of gates indicated at 1530 which function as 4 AND gates which each have an input operatively connected to a line 1532 which carries a bit from the noise generator 1496 (FIG. 71B). The output of this bit of the noise generator 1496 is a square wave having a constantly varying frequency. The input 1532 is ANDed with 4 volume bits on lines 1534 from the noise volume register 1492 (FIG. 71B). The set of AND gates 1530 operate the same way as the AND gates for the tones A–C, except that a noise modulation register 1536 (having address 15H which activates register select line 1412) must contain a logical 1 for the outputs of the AND gate 1530 to oscillate.

The outputs of the AND gates 1530 are operatively connected to a digital-analog converter 1538. The analog outputs of the 4 D-A converters 1524, 1526, 1528 and 1538 are summed to produce a single audio output, AUDIO. This output is transmitted to the RF modulator 58 (FIG. 2).

The master oscillator is indicated generally at 1470 in FIG. 73 and comprises a programmble counter which can count up to FFH from the number presented at its program input. The programmable counter includes 8 units **1542*a–h* (with unit 1542*a*, typical of units 1542*a–g*, shown in greater detail in FIG. 90 and unit 1542*h* shown in greater detail in FIG. 91) and a PLA indicated generally at 1544. The units 1542*a–h* have inputs 4 and 5 for the clock signal Φ from the buffer 1681. The freqency, Fm, of the master oscillator 1470 is a function of the contents of the master oscillator register and the clock signal and is given by the following formula (in the absence of any modulation by the vibrato system 1480 or noise system 1490**):

$$Fm = \frac{1789}{(\text{contents of Master Osc. Reg. 1472}) + 1}\ \text{Khz}$$

The master oscillator register is indicated generally at 1472 and comprises 8 bits (with each bit circuit logically similar to that shown in FIG. 75), each having an input for the register select line 1407. The output of the master oscillator register 1472 is connected to the inputs of the 8-bit adder indicated at 1478 which comprises 8 bits **1478*a–h*. (Bit 1478*b*, typical of bits 1478*a–g* is shown in greater detail in FIG. 92 with bit 1478*h* shown in greater detail in FIG. 93) The outputs of the adder are connected to the program inputs 1 of the master oscillator 1470**.

The other inputs of the 8-bit adder 1478 are connected to the outputs of the multiplexer indicated generally at 1474. The output of the 8 bit adder 1478 is the sum of the contents of the master oscillator register 1472 and the output of the multiplexer 1474, which determines the frequency of which the master oscillator 1470 oscillates.

The multiplexer 1474 is shown in FIG. 73 to comprise a plurality of transistor switches 1546 and 1547. The gates of switches 1547 are connected by an inverter 1548 to an input line 1550 with the gates of the switches 1546 connected to the output of the inverter 1548 by an inverter 1549. The input line 1550 is connected to the output of the multiplexer register 1476 which is bit 4 of the output register having address 15H shown in FIG. 73 (with bit 4 shown in greater detail in FIG. 75).

Figure 75:
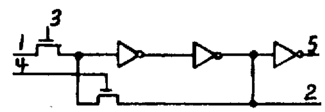
Figure 86:
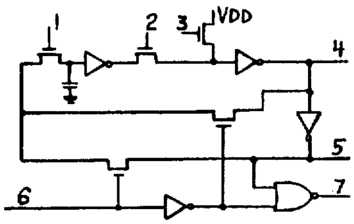

The "AND" gates 1486 are shown to comprise a plurality of NOR gates indicated at 1486 whose inputs are connected to the 6 outputs of the bits **1488*a–f* of the vibrato register 1488 (each bit being logically similar to that shown in FIG. 75). The vibrato register 1488 is the first 6 bits of the output register having the address 14H and the register select line 1411. The last 2 bits 1482*a* and *b* (also shown in greater detail in FIG. 75) comprise the vibrato frequency register 1482. The output of the 2 bits 1482*a* and *b* are connected to the inputs of the low frequency oscillator indicated generally at 1484**.

The low frequency oscillator 1484 comprises a 4-to-1 multiplexer in which the outputs from the vibrato frequency register 1482 are connected by a plurality of logic gates 1552 to the gates of four transistor switches 1554 of the multiplexer. The inputs of the transistor switches 1554 are connected to the 4 most significant bits **1556*a–d* of a counter comprising 13 bits 1556*a–m*. (The bit 1556*a*, typical of the bits 1556*a–l*, is shown in greater detail in FIG. 83 with the bit 1556*m* shown in greater detail in FIG. 85**.)

The output of the transistor switches 1554 are connected to one another and to the other inputs of the NOR gates 1486. The logic state of the bits of the vibrato frequency register 1482 determine which of the outputs of the bits **1556*a–d* are selected which determines the frequency of oscillation of the output of the low frequency oscillator 1484. The value 00 of the bits of the vibrato frequency register correspond to the lowest frequency and the value 11 corresponds to the highest. When the output of the low frequency oscillator 1484 is a logical 1, the NOR gates 1486 are each a logical 0, otherwise the contents of the vibrato frequency register 1482 are inverted and conducted to the multiplexer 1474. In this manner, the contents of the vibrato register 1488 "ANDed" (negative logic) by the NOR gates 1486 with the output of the low frequency oscillator 1484**.

The set of "AND" gates 1494 are shown to comprise a plurality of NOR gates indicated at 1494 in FIG. 73. The noise generator comprises a number generator and is indicated generally at 1496. The number generator comprises a 15-bit shift register 1558 (with each bit logically similar to that shown in FIG. 94) and an exclusive-OR gate indicated at 1560. The inputs of the NOR gates 1494 are connected to the outputs of the 8 most significant bits of the shift register 1558. The output of the two most significant bits are connected to the inputs of the exclusive-OR gate 1560 whose output is connected to the input of the least significant bit of the shift register 1558. The output of the 8 most significant bits of the shift register 1558 is a binary number that constantly changes with each clock signal to the shift register 1558. The other inputs of the NOR gates 1494 are connected to the outputs of noise volume register indicated at 1492 (each bit being logically similar to that shown in FIG. 75) and having an input connected to the register select line 1414. The shift register 1558 is clocked by a 4 bit counter 1559, having bits 1559_a–d_ and an input conneccted to the output of the buffer 1679 of the counter 1678, which also provides the clock signal for counter 1556 of the low frequency oscillator 1484. (The bit 1559_a_ is shown in greater detail in FIG. 85 with bit 1559_b_, typical of the bits 1559_b–d_, shown in greater detail in FIG. 86.)

If any particular bit of the noise volume register 1492 is a logical 1, the output of the corresponding NOR gate of the NOR gates 1494 is a logical 0. Otherwise, the output of the corresponding NOR gate 1494 is the inerse of the associated bit from the noise generator 1496. In this manner, the output of the noise generator 1496 is "ANDed" (negative logic) with the output of the 8 bits of the noise volume register 1492. The contents of the multiplexer register 1476 on line 1550 determines whether the multiplexer 1474 conducts the output of the NOR gates 1486 from the vibrato system or the output of the NOR gates 1494 from the noise system, to be summed with the contents of the master oscillator register 1472 by the 8 bit adder 1478.

Figure 87:
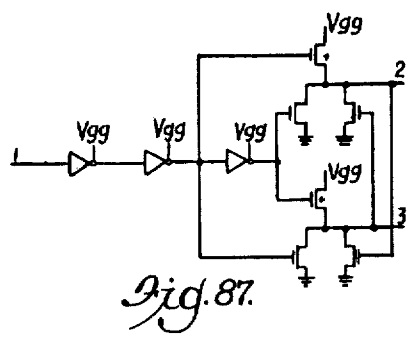
Figure 90:
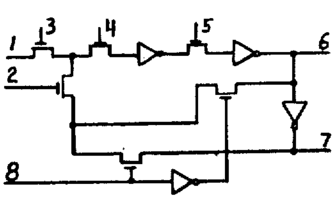
Figure 93:
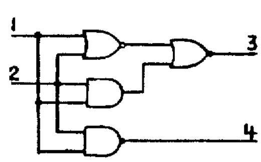
Figure 79:
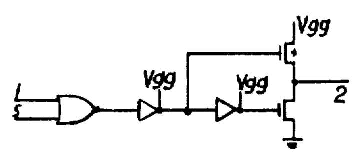
Figure 91:
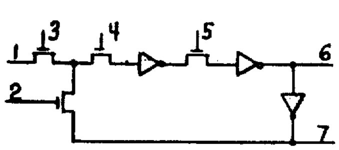
Figure 94:
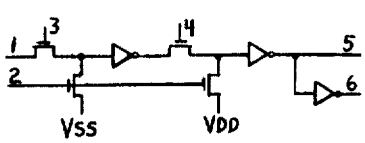
Figure 76:
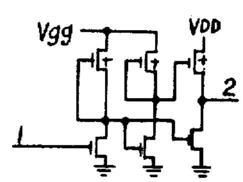

The master oscillator 1470 further comprises a plurality of logic elements indicated at 1562 (which include gates 1564 and 1566 which are logically similar to the gates shown in FIG. 82 and a buffer 1568 shown in greater detail in FIG. 87) having an input connected to the output of the PLA 1544 of the master oscillator 1470. The outputs of the buffer 1568 are connected to the clock inputs of the tone generators A, B and C, by the lines 1498. The tone generator "A" register 1506 and the tone generator A are shown to comprise an 8-unit circuit, which include a programmable counter, indicated 1570 (with a unit 1570_a_, typical of the units of the circuit 1570, with the exception of the unit 1570_b_, shown in greater detail in FIG. 95 and the unit 1570_b_ shown in greater detail in FIG. 96). The frequency of tone A is a function of the master oscillator frequency and the contents of the tone generator A register and is given by the following formula:

$$Fa = \frac{Fm}{2 \text{ (contents of tone gen. } A \text{ reg 1506)}}$$

The output line of the unit 1570_a_ of the tone A circuit 1570 is connected to the input of a toggle flip-flop 1572 (shown in greater detail in FIG. 92) which has an output line 1574 which carries the output of the tone generator A. The tone generator B register 1508 and tone generator B as well as the tone generator C register 1510 and tone generator C are logically similar to the tone A circuit 1570 and toggle flip-flop 1572. The tone generator B register and tone generator B are indicated generally at the circuit 1576 and toggle flip-flop 1578 with the tone generator C register and tone generator C indicated generally at circuit 1580 an toggle flip-flop 1582.

The output 1574 of the toggle flip-flop 1572 of the tone generator A is connected to an input of a PLA 1584 which also has inputs connected to the outputs of the tone volume "A" register 1514 (which are the four lower bits of the output register having address 16H and register select line 1414 with a bit shown in greater detail in FIG. 75). The PLA 1584 has a plurality of output lines which are connected to a resistor network 1586, the outputs of which are connected to a single output line 1588 which carries the analog signal AUDIO.

The PLA 1584 includes a plurality of pull-down transistors 1590 which couple each of the output lines of the PLA 1584 to the line 1574 which carries the output of the tone generator A. Thus, the output lines of the PLA 1584 all go to a logical 0 when the line 1574 goes to a logical 1 whereby the output of the PLA 1584 oscillates at the same frequency as the output of the tone generator A. The remaining portion of the PLA 1592 decodes the output of the tone A volume register 1514 to selectively activate one of the output lines of the PLA 1584 (when the line 1574 from the tone generator A register is low). The registor network 1586 produces an analog voltage in dependence upon the particular output line of the PLA 1584 activated.

Since the output of th PLA 1584 goes low each time the line 1574 goes low, the output of the tone A volume register 1514 is in a sense, ANDed with the output of the tone A generator. Thus the "AND" gates 1512 comprise the pull-down transistors 1590. The D-A converter 1524 (FIG. 71C) comprises the PLA 1584 and registor network 1586.

The output of the tone generators B and C are connected in a similar manner to PLAs 1594 and 1596, respectively. The outputs of each bit of the tone volume B register 1518 (with each bit shown in greater detail in FIG. 75) are connected to the inputs of the PLA 1594. The outputs of the tone volume C register 1522 (with each bit also shown in greater detail in FIG. 75) are connected to the inputs of the PLA 1596. The outputs of the PLA 1596 and the PLA 1586 are connected to the inputs of the resistor network 1586.

The output of the most significant bit of the shift register 1558 of the noise generator 1496 is connected to the input of a NOR gate 1598 whose output is connected by an inverter 1600 to a PLA 1602. The other input of the NOR gate 1598 is connected to the noise modulation register 1536 which is the most significant bit (shown in greater detail in FIG. 75) of the output register having address 15H and register select line 1412. The PLA 1602 has inputs connected to the output of the 4 most significant bits of the noise volume register 1492 and the output of the PLA 1602 is also connected to the registor network 1586. The set of "AND" gates 1530 comprise the plurality of pull-down transistor 1604 of the PLA 1602 with the digital-analog converter 1538 comprising the remainder of the PLA 1602 and resistor network 1586 in a manner similar to the tone generators. The resistor network 1586 has a common summing point 1540 which is connected to the output line 1588 which carries the analog signal AUDIO. In this manner, the AUDIO signal is the sum of the tones A, B and C, generted by the tone generators A, B and C (at their respective volumes), and the noise generator (at its respective volume).

The LDL1 and LDH1 signals for the microcycle decoder 1402 are generated indicated generally at 1690. The generator has inputs for the clock signals $\Phi$ and $\overline{\Phi}$ and the CPU control signal $\overline{\text{IORQ}}$and outputs 1692 and 1694 for the signals LDL1 and LDH1, respectively. The generator comprises gates 1696 and 1698 (each of which is logically similar to the gate shown in FIG. 82)

and NOR gate 1700 and 1702. The address bits A0–A7 are latched up in the microcycle decoder 1402 on the signal LDL1 with the address bits A8–A10 latched on the signal LDH1, just as for the address and data chips.

The video processor allows the easy manipulation of pixel data to be written to the display RAM. With one memory write instruction, pixel data can be taken from the CPU, modified by the video processor and sent to the display RAM. The modifications include expanding, shifting or rotating, flopping, and ORing or exclusive-ORing the pixel data. This allows a greater amount of data to be handled in a given time which in turn allows greater complexity in the games and computer function to be performed.

Furthermore, although only 2 bits of memory space in the display RAM are used to define a pixel on the display screen, the present system allows the associated pixel to be presented in one of 32 colors and one of eight different intensities. Color registers of a greater capacity than 8 bits would provide an even larger selection of colors and intensities.

The colors and intensitis of the entire or portions of the screen may be changed with one instruction without changing the contents of the display RAM by changing the horizontal color boundary. The colors and intensities may also be changed by changing the data in the color registers. The screen interrupt is programmable to allow these registers to be changed after any particular scan line so that 256 color/intensity combinations may be on the screen at one time in any one field of the raster scan.

The music processor is fully digital and adapted to produce a variety of sounds including melodies and noises by loading a plurality of registers. The tones produced can be modulated to produce a vibrato effect or can be modulated by noise.

Since the cassette ROM is removable and replaceable, the programming of the system is easily modified to allow the particular game or function performed to also be changed.

The system has a basic program and each game or function has a separate program. Program listing for the basic program and for a representative game "Gunfight" are disclosed in U.S. Pat. No. 4,301,503 issued Nov. 17, 1981 and such listings are incorporated herein by reference. Each game or function can utilize the basic program routines which include routines for creating screen images including initialization, character display, co-ordinate conversion and object vectoring. Other routines decrement times, play music and produce sounds. There are routines to read the keypad and control handles and input game selections and options. There are also math routines for manipulating floating binary coded decimal (BCD) numbers.

A "flow chart" for the power up sequence is given below in Table IV:

TABLE IV

```
POWER UP SEQUENCE
Disable interrupts
Set CONSUMER/COMMERCIAL port to CONSUMER
IF          Address 2000H=C3H
            Jump to address 2000H
ENDIF
Clear all system RAM
Clear shifter
Set timout count to max
Clear music ports
Set vertical blank
Set interrupt mode
```

TABLE IV-continued

```
POWER UP SEQUENCE
Set horizontal color boundary
Set color ports
Activate system interrupt routine
IF          Address 2000H=55H
            Menu Inx ← Cassette menu
ELSE
            Menu Inx ← On board menu
ENDIF
Call system menu routine
```

A flow chart describing the sequence performed to allow the user to select a game from the "menu" is set out in Table V below:

TABLE V

```
SYSTEM MENU ROUTINE
          Clear Screen
          Paint Banner
          Display 'SELECT GAME' on banner
          Line number ← 1
Display   Display line number at screen (character 1,
line:     line number)
          Display '—' at screen (character 2,
          line number)
          Display title (menu inx) at screen (character 3,
          line number)
          Line number ← line number+1
          Menu inx ← menu inx+1
          IF      title (menu inx) ≠ zero
                  Go to display line
          ENDIF
Wait:     Call system get number routine
          IF      number = 0 or number ≧ line number
                  Display '?' at screen (character 1, line 11)
                  Go to wait
          ENDIF
          Go to game (number)
```

Finally, a flow chart outlining the program for the "Gunfight" game is set out in Table VI:

TABLE VI

```
          Get Max. Score
          Clear Ram
          Set vertical blank, horz. color boundary,
          interrupt mode
          Set colors
          Play Streets of Laredo
STRND:    Start round
          Init Bullets and timers
          Set up screen
          Display scores
          Display "Get Ready"
          Put up proper number of Cacti, Trees & Wagon
          Set up vectors so cowboys walk out
          Start interrupts
          Pause until cowboys walk out
          Erase "Get Ready"
LOOP:     Call sentry (check for a change of input)
          Call DOIT
          If bullet hit anything
          kill object and set death flag if cowboy killed
          Go to LOOP
          DOIT:
          If time up for round
          Exit
          Go to STRND
          Else
          If Death Flag SET
          Exit
          Go to STRND
          Else
          If Player 1 or Player 2 Pot moved
          Update new arm angle
          Else
          If Player 1 or Player 2 Joystick moved
          Update new velocity
```

TABLE VI-continued

| |
|---|
| Else |
| If key depressed |
| Coffee break |
| Else |
| If Player 1 or Player 2 trigger pulled |
| Fire Bullet |
| Else |
| If 1 second has elapsed |
| Update new time |
| ENDIF |
| Exit |
| Interrupt Routine: |
| Bump all time bases |
| Erase all active bullets |
| Vector bullets |
| Write bullets to new location |
| Set each bullets hit flag if it hit something |
| Erase next object in write QUEUE |
| Vector that object |
| Write that object to new location |
| Put object back in QUEUE |
| SCHED next interrupt |
| Exit |

It should be noted that the computer or processor may form a part of the video processor and/or a part of the music processor so that the video processor and/or music processor may stand alone, with only minimal instructions from a central processor. This likewise may be employed for input/output processors. Thus, the term "computer" as used herein, together with its associated hardware, may be in the video, music and/or input/output processors. The so-called intelligence of the system may thus be split or divided between the individual processors and the central processor.

It will, of course, be understood that modifications of the present invention, in its various aspects, will be apparent to those skilled in the art, some being apparent only after study, and others being matters of routine electronic and logic design. As such, the scope of the invention should not be limited by the particular embodiment and specific construction herein described, but should be defined only by the appended claims, and equivalents thereof.

Various features of the invention are set forth in the following claims.

What is claimed is:

1. A computer system for use with a display for presentation of movable symbols, and for providing associated audio signals comprising generating means for generating digital control signals an for generating digital output signals representative of said movable symbols;

means for presentation of movable symbols on the display responsive to the digital output signals;

a clock generator for generating a clock signal responsive to the digital control signals; and, a music processor, including a programmable tone generator means, operatively connected to the clock generator for receiving the clock signal, for generating an oscillating signal, and a programming register, operatively connected to the programmable tone generator means, for storing a first binary number wherein the frequency of oscillation of the oscillating signal of the programmable tone generator means is a function of the first binary number and the clock signal.

2. The system of claim 1 wherein the tone generator comprises a digital programmable counter, having a programming input, an output, and a clock input, the clock input operatively connected to the clock generator, for generating an oscillating signal at the counter output, and wherein the programming register is operatively connected to the programming input of the counter.

3. The system of claim 2 wherein the music processor further has volume register means for storing a binary number representing the volume of the music processor, switching means, having inputs operatively connected to the volume register means and to the output of the counter, and having an output, said switching means for providing, at the output, digital signals alternatively corresponding to the binary number of the volume register means and a second binary number, and a digital-to-analog converter, operatively connected to the switching means, for converting the output signals of the switching means to an oscillating analog signal.

4. The system of claim 3 wherein the second binary number is 0.

5. The system of claim 3 wherein the volume register means is operatively coupled to the generating means for receiving from the generating means the binary number representing the volume of the music processor.

6. The system of claim 3 wherein the switching means switches between the binary number of the volume register and the second binary number at the frequency of oscillation of the counter output.

7. The system of claim 2 further comprising a second clock generator for generating a second clock signal, and wherein the first clock generator comprises a second digital programmable counter having a clock input operatively connected to the second clock generator for receiving the second clock signal, the programmable counter also having programming input, and an output operatively connected to the clock input of the first counter, and further comprises a second register operatively connected to the programming input of the second counter, for storing a third binary number wherein the frequency of oscillation of the second counter output is a function of the third binary number and the second clock signal, and the frequency of oscillation of the first counter output is a function of the output of the second counter and the first binary number.

8. The system of claim 7 wherein the music processor further comprises a vibrato system comprising:

a counter having a clock signal input and a plurality of outputs;

a multiplexer having a plurality of inputs selectively connected to the vibrato system counter outputs, a select input, and an output;

a third register, having an output operatively connected to the select input of the multiplexer, for storing a fourth binary number wherein the frequency of oscillation of the multiplexer output is a function of the vibrato system counter clock signal and the fourth binary number;

the vibrato system further comprises a fourth register for storing a fifth binary number, and switching means, having inputs operatively connected to the fourth register and to the output of the multiplexer and having an output, for providing, at the output, digital signals alternatively corresponding to a sixth binary number and the fifth binary number;

the music processor further comprising means having inputs operatively connected to the output of the vibrato system switching means and the second register, and having an output operatively connected to the programming input of the second programmable counter, for adding the third binary number to the output of the vibrato system switching means so that the frequency of oscillation of the second programmable counter output is a function alternatively of the sum of the third and sixth binary numbers and of the sum of the third and fifth binary numbers.

9. The system of claim 8 wherein the sixth binary number is 0.

10. The system of claim 8 wherein the vibrato system switching means switches between the sixth binary number and the fifth binary number at the frequency of oscillation of the multiplex output.

11. The system of claim 7 wherein the music processor further comprises a noise system comprising a digital number generator having outputs for generating a continuously varying digital signal representing continuously varying binary numbers;

a fifth register for storing a seventh binary number, and conducting means, having inputs operatively connected to the outputs of the number generator and the fifth register and having an output, for conducting selected random number signals to the output determined by the seventh binary number;

the music processor further comprising means, having inputs operatively connected to the noise system conducting means output and the second register, and having an output operatively connected to the programming input of the second programmable counter, for adding the third binary number to the output of the noise system conducting means so that the frequency of oscillation of the second programmable counter output is a function of the output of the adding means which varies continuously.

12. The system of claim 11 wherein the fifth register is operatively coupled to the generating means for receiving the seventh binary number from the generating means.

13. A system for providing a display signal to a raster scan display for displaying thereon a matrix of discrete picture elements, each picture element being defined as a line segment of a horizontal line on the display, and for providing associated audio signals, the system comprising:

a random access display memory having a unique storage location for each discrete picture element of the display for storage of digital memory data signals representative of the picture elements of the display;

a processor comprising means for receiving a plurality of groups of picture element signals, each picture element signal comprising a memory address signal and a memory data signal which together correspond to one particular picture element of the display, each group of picture element signals corresponding to a plurality of picture elements representing a symbol located at a predetermined location on the display, said processor generating control signals;

first addressing means for sequentially and repetitively addressing the storage locations of the display memory, reading the memory data signasl stored therein, and supplying the display signal to the display for displaying thereon the picture elements representative of the memory data signals stored in the display memory;

video processing means operatively coupled to the processsor for receiving therefrom both said picture element signals and said control signals, said control signals activating the video processing means for transforming a group of picture element signals to produce a transformed group of picture element signals so that a symbol as displayed on the display corresponding to the transformed group of picture element signals is different than a symbol as displayed on the display corresponding to the original group of picture element signals; and transfer means for transferring picture element signals from the video processing means to the display memory whereby memory data signals corresponding to said picture element signals are stored in memory locations of the display memory as determined by the memory address signals corresponding to said picture element signals, said transfer means for transferring the transformed group of picture element signals from the video processing means to the display memory without processing the transformed group of picture element signals with the processor;

a clock generator for generating a clock signal responsive to the control signals; and a music processor, including a programmable tone generator means, operatively connected to the clock generator for receiving the clock signals, for generating an oscillating signal, and a programming register, operatively connected to the programmable tone generator means, for storing a first binary number wherein the frequency of oscillation of the oscillating signal of the programmable tone generator means is a function of the first binary number and the clock signal.

14. The system of claim 13 wherein the tone generator means comprises a digital programmable counter, having a programming input, an output, and a clock input, the clock input operatively connected to the clock generator, for generating an oscillating signal at the counter output, and wherein the programming register is operatively connected to the programming input of the counter.

15. The system of claim 14 wherein the music processor further has volume register means for storing a binary number representing the volume of the music processor, switching means, having inputs operatively connected to the volume register means and to the output of the counter, and having an output, said switching means for providing, at the output, digital signals alternatively corresponding to the binary number of the volume register means and a second binary number, and a digital-to-analog converter, operatively connected to the switch means, for converting the output signals of the switching means to an oscillating analog signal.

16. The system of claim 15 wherein the volume register means is operatively coupled to the processor for receiving from the processor the binary number representing the volume of the music processor.

17. The system of claim 15 wherein the second binary number is 0.

18. The system of claim 15 wherein the switching means switches between the binary number of the volume register and the second binary number at the frequency of oscillation of the counter output.

19. The system of claim 14 further comprising a second clock generator for generating a second clock signal, and wherein the first clock generator comprises a second digital programmable counter having a clock input operatively connected to the second clock generator for receiving the second clock signal the programmable counter also having a programming input, and an output operatively connected to the clock input of the first counter, and further comprises a second register operatively connected to the programming input of the second counter, for storing a third binary number wherein the frequency of oscillation of the second counter output is a function of the third binary number and the second clock signal, and the frequency of oscillation of the first counter output is a function of the output of the second counter and the first binary number.

20. The system of claim 19 wherein the music processor further comprises a vibrato system comprising:

a counter having a clock signal input and a plurality of outputs;

a multiplexer having a plurality of inputs selectively connected to the vibrato system counter outputs, a select input, and an output;

a third register, having an output operatively connected to the select input of the multiplexer, for storing a fourth binary number wherein the frequency of oscillation of the multiplexer output is a function of the vibrato system counter clock signal and the fourth binary number;

the vibrato system further comprises a fourth register for storing a fifth binary number, and switching means, having inputs operatively connected to the fourth register and to the output of the multiplexer and having an output, for providing, at the output, digital signals alternatively corresponding to a sixth binary number and the fifth binary number;

the music processor further comprising means having inputs operatively connected to the output of the vibrato system switching means and the second register, and having an output operatively connected to the programming input of the second programmable counter, for adding the third binary number to the output of the vibrato system switching means so that the frequency of oscillation of the second programmable counter output is a function alternatively of the sum of the third and sixth binary numbers and of the sum of the third and fifth binary numbers.

21. The system of claim 20 wherein the sixth binary number is 0 .

22. The system of claim 20 wherein the vibrato system switching means switches between the sixth binary number and the fifth binary number at the frequency of oscillation of the multiplex output.

23. The system of claim 19 wherein the music processor further comprises a noise system comprising a digital number generator having outputs for generating a continuously varying digital signal representing continuously varying binary numbers;

a fifth register for storing a seventh binary number, and conducting means, having inputs operatively connected to the outputs of the number generator and the fifth register and having an output, for conducting selected random number signals to the output determined by the seventh binary number;

the music processor further comprising means, having inputs operatively connected to the noise system conducting means output and the second register, and having an output operatively connected to the programming input of the second programmable counter, for adding the third binary number to the output of the noise system conducting means so that the frequency of oscillation of the second programmable counter output is a function of the output of the adding means which varies continuously.

24. the system of claim 23 wherein the fifth register is operatively coupled to the processor for receiving the seventh binary number from the processor.

* * * * *